United States Patent
Cohen et al.

(10) Patent No.: US 9,934,134 B2
(45) Date of Patent: *Apr. 3, 2018

(54) GENERATING A TEST SCENARIO TEMPLATE FROM RUNS OF TEST SCENARIOS BELONGING TO DIFFERENT ORGANIZATIONS

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Hod Hasharon (IL)

( * ) Notice: Subject to any disclaimer, the term of this patent is extended or adjusted under 35 U.S.C. 154(b) by 57 days.

This patent is subject to a terminal disclaimer.

(21) Appl. No.: 15/067,225

(22) Filed: Mar. 11, 2016

(65) Prior Publication Data

US 2016/0210224 A1 Jul. 21, 2016

Related U.S. Application Data

(63) Continuation of application No. 14/141,514, filed on Dec. 27, 2013, now Pat. No. 9,317,404, which is a continuation-in-part of application No. 13/103,078, filed on May 8, 2011, now Pat. No. 8,739,128.

(60) Provisional application No. 61/747,313, filed on Dec. 30, 2012, provisional application No. 61/814,305, (Continued)

(51) Int. Cl.
*G06F 9/445* (2006.01)
*G06F 11/36* (2006.01)

(52) U.S. Cl.
CPC ...... *G06F 11/3684* (2013.01); *G06F 9/44589* (2013.01)

(58) Field of Classification Search
None
See application file for complete search history.

(56) References Cited

U.S. PATENT DOCUMENTS 5,544,310 A * 8/1996 Forman ............... G06F 11/3672
714/31
5,629,878 A 5/1997 Kobrosly
(Continued)

OTHER PUBLICATIONS

Sreedevi Sampath, A Scalable Approach to User-session based Testing of Web Applications through Concept Analysis, 2004.
(Continued)

*Primary Examiner* — Isaac T Tecklu
(74) *Attorney, Agent, or Firm* — Active Knowledge Ltd.

(57) ABSTRACT

System, method, and non-transitory computer-readable medium for generating a test scenario template from runs of test scenarios run on software systems belonging to different organizations, including: clustering the runs to clusters comprising similar runs of test scenarios; selecting from the clusters a certain cluster comprising a first run of a first test scenario and a second run of a second test scenario belonging to different organizations. At least 95% of values used in the first run of the first test scenario are provided automatically by a test script. And generating a test scenario template representing the certain cluster, wherein the test scenario template identifies a transaction used in the first and second runs, and possible values for running the transaction.

21 Claims, 58 Drawing Sheets

Related U.S. Application Data filed on Apr. 21, 2013, provisional application No. 61/919,773, filed on Dec. 22, 2013.

(56) References Cited

U.S. PATENT DOCUMENTS

| | | | | |
|---|---|---|---|---|
| 5,781,720 | A * | 7/1998 | Parker | G06F 11/3688 714/38.11 |
| 5,905,856 | A * | 5/1999 | Ottensooser | G06F 11/3688 714/38.1 |
| 6,360,332 | B1 * | 3/2002 | Weinberg | G06F 11/3688 714/38.13 |
| 6,546,523 | B1 * | 4/2003 | Boorananut | G05B 19/41875 700/82 |
| 6,810,494 | B2 | 10/2004 | Weinberg et al. | |
| 6,865,692 | B2 | 3/2005 | Friedman et al. | |
| 6,898,784 | B1 | 5/2005 | Kossatchev et al. | |
| 7,032,212 | B2 * | 4/2006 | Amir | G06F 11/3684 714/E11.207 |
| 7,191,435 | B2 * | 3/2007 | Lau | G06F 8/65 714/38.1 |
| 7,475,289 | B2 * | 1/2009 | Rosaria | G06F 11/3672 714/38.1 |
| 7,490,319 | B2 * | 2/2009 | Blackwell | G06F 11/3664 717/124 |
| 7,506,211 | B2 * | 3/2009 | Apostoloiu | G06F 11/3688 714/33 |
| 7,512,839 | B2 * | 3/2009 | Coulter, Jr. | G06F 11/261 714/30 |
| 7,516,440 | B2 * | 4/2009 | Upton | G06F 9/541 717/106 |
| 7,526,680 | B2 * | 4/2009 | Mathew | G06F 11/3409 714/32 |
| 7,581,212 | B2 | 8/2009 | West et al. | |
| 7,596,731 | B1 * | 9/2009 | Sharma | G06F 11/263 324/762.02 |
| 7,809,525 | B2 | 10/2010 | Chagoly et al. | |
| 7,849,447 | B1 | 12/2010 | Karis et al. | |
| 8,001,527 | B1 * | 8/2011 | Qureshi | G06N 5/048 717/100 |
| 8,205,191 | B1 * | 6/2012 | Kolawa | G06F 11/368 717/124 |
| 8,266,592 | B2 * | 9/2012 | Beto | G06F 11/3672 717/124 |
| 8,276,123 | B1 * | 9/2012 | Deng | G06F 11/368 714/37 |
| 8,411,579 | B2 * | 4/2013 | Ngo | H04L 12/2697 370/248 |
| 2002/0138226 | A1 * | 9/2002 | Doane | G06F 11/2294 702/119 |
| 2003/0131290 | A1 * | 7/2003 | Weinberg | G06F 11/3688 714/46 |
| 2004/0107415 | A1 * | 6/2004 | Melamed | G06F 11/3684 717/124 |
| 2004/0123272 | A1 * | 6/2004 | Bailey | G06F 11/3696 717/125 |
| 2005/0071818 | A1 * | 3/2005 | Reissman | G06F 11/3672 717/127 |
| 2005/0166094 | A1 * | 7/2005 | Blackwell | G06F 11/3664 714/38.14 |
| 2006/0129994 | A1 * | 6/2006 | Srivastava | G06F 11/3676 717/124 |
| 2006/0168565 | A1 * | 7/2006 | Gamma | G06F 11/3688 717/122 |
| 2006/0200803 | A1 * | 9/2006 | Neumann | G06F 8/71 717/120 |
| 2007/0038908 | A1 * | 2/2007 | Hirano | G01R 31/31701 714/724 |
| 2007/0043980 | A1 * | 2/2007 | Ohashi | G06F 11/3684 714/45 |
| 2007/0055911 | A1 * | 3/2007 | Boehm | G06F 11/261 714/31 |
| 2007/0220341 | A1 * | 9/2007 | Apostoloiu | G06F 11/3684 714/33 |
| 2007/0226543 | A1 * | 9/2007 | Young | G06F 11/2257 714/43 |
| 2008/0010537 | A1 * | 1/2008 | Hayutin | G06F 11/3664 714/38.14 |
| 2008/0065687 | A1 * | 3/2008 | Coulter, Jr. | G06F 11/261 |
| 2008/0086348 | A1 | 4/2008 | Rao et al. | |
| 2008/0086499 | A1 * | 4/2008 | Wefers | G06Q 10/06 |
| 2008/0098361 | A1 * | 4/2008 | Kumar | G06F 11/3684 717/128 |
| 2008/0127095 | A1 * | 5/2008 | Brennan | G06F 11/3664 717/124 |
| 2008/0141221 | A1 * | 6/2008 | Benesovska | G06F 11/3688 717/124 |
| 2008/0184206 | A1 * | 7/2008 | Vikutan | G06F 11/3688 717/127 |
| 2008/0228805 | A1 * | 9/2008 | Bruck | G06F 11/3672 |
| 2008/0263505 | A1 * | 10/2008 | StClair | G06F 8/10 717/101 |
| 2009/0106262 | A1 | 4/2009 | Fallen et al. | |
| 2009/0138855 | A1 * | 5/2009 | Huene | G06F 11/3676 717/125 |
| 2009/0144010 | A1 * | 6/2009 | Witter | G06Q 20/102 702/115 |
| 2009/0183143 | A1 | 7/2009 | Li et al. | |
| 2009/0187894 | A1 * | 7/2009 | Bell | G06F 8/71 717/127 |
| 2009/0204591 | A1 * | 8/2009 | Kaksonen | G06F 11/3684 |
| 2009/0259992 | A1 * | 10/2009 | Cormier | G06F 11/3668 717/126 |
| 2009/0307650 | A1 * | 12/2009 | Saraf | G06F 8/65 717/101 |
| 2010/0064282 | A1 * | 3/2010 | Triou | G06F 11/3696 717/125 |
| 2010/0146490 | A1 * | 6/2010 | Grosse | G06F 17/5081 717/131 |
| 2010/0192220 | A1 | 7/2010 | Heizmann et al. | |
| 2010/0287534 | A1 * | 11/2010 | Vangala | G06F 11/3612 717/124 |
| 2010/0332535 | A1 * | 12/2010 | Weizman | G06F 11/3672 707/770 |
| 2011/0145788 | A1 * | 6/2011 | Xu | G06F 11/368 717/121 |
| 2012/0197626 | A1 * | 8/2012 | Kejariwal | G06F 11/3419 703/22 |
| 2012/0216176 | A1 * | 8/2012 | Gaikwad | G06F 11/3684 717/124 |
| 2014/0115565 | A1 * | 4/2014 | Abraham | G06F 8/30 717/128 |
| 2014/0237450 | A1 * | 8/2014 | Levy | G06F 11/3684 717/124 |

OTHER PUBLICATIONS

Jinhua Li, Clustering User Session Data for Web Applications Test, 2011, Journal of Computational Information Systems.

G. Ruffo, R. Schifanella, and M. Sereno, WALTy: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

David Leon, A Comparison of Coverage-Based and Distribution-Based Techniques for Filtering and Prioritizing Test Cases.

* cited by examiner

US 9,934,134 B2

GENERATING A TEST SCENARIO TEMPLATE FROM RUNS OF TEST SCENARIOS BELONGING TO DIFFERENT ORGANIZATIONS

CROSS-REFERENCE TO RELATED APPLICATIONS

This application is a Continuation of application U.S. Ser. No. 14/141,514, filed Dec. 27, 2013. U.S. Ser. No. 14/141,514 is a Continuation-In-Part of application U.S. Ser. No. 13/103,078, filed May 8, 2011, now U.S. Pat. No. 8,739,128. U.S. Ser. No. 14/141,514 claims the benefit of U.S. Provisional Patent Application No. 61/747,313, filed Dec. 30, 2012, and U.S. Provisional Patent Application No. 61/814,305, filed Apr. 21, 2013. U.S. Ser. No. 14/141,514 also claims the benefit of U.S. Provisional Patent Application No. 61/919,773, filed Dec. 22, 2013 that is herein incorporated by reference in its entirety.

BACKGROUND

Organizations that install, upgrade, maintain, and/or customize software systems (e.g., SAP ERP, or Oracle EBS), need to run many tests in order to validate the correctness of the software systems. Due to the large scale of such software systems, the testing and validation of the systems is a laborious task, often requiring several man-years to complete. In addition, it is often difficult for testers belonging to an organization to construct or select test scenarios that are likely to be relevant to their organization and be effective for the validation task at hand.

A software system belonging to an organization may be quite complex, containing a large number of software modules, and it may also be customized specifically for the organization (e.g., due to a selection of a specific set of software module and/or organization-specific customizations to software modules). However, software systems belonging to different organizations often utilize the same or similar software modules and may involve similar customizations. For example, software systems belonging to different organizations in the same field of operations may involve similar customizations that are related to the field of operations. Additionally, software systems of different organizations may involve similar updates, such as when a new build of a generic software module is released. Thus, despite organization-specific differences in software systems of different organization, it is often the case that testers belonging to the different organizations end up running the same, or quite similar, tests on their respective systems.

Current testing approaches adopted by many organizations require each organization to devise its own testing suite. Thus, each organization needs to learn which tests are effective, which aspects of the software system should be tested, and how to do so in a cost-effective way. Gaining this knowledge may require much effort and experience; in the meantime, testing the software systems may be a less effective and prolonged process. However, were organizations able to utilize each other's testing-related knowledge, which is in a sense a wisdom of the crowd (of testers), they might be able to come up with a more effective and efficient testing plan. That being said, there are many obstacles in the way of harnessing the wisdom of the crowd when it comes to testing. For one, software systems belonging to different organizations may each be customized for their respective organizations. Thus, it is not likely that a test scenario devised for a first organization will run "as is" on a system belonging to a second organization. Additionally, test scenarios used to test a system belonging to an organization often contain proprietary data related to the organization; organizations are not likely to share their testing data if it means that in the process, their proprietary data is at risk of being leaked to an unauthorized party.

BRIEF SUMMARY

Some aspects of this disclosure involve methods, systems, and/or non-transitory computer-readable medium that enable generation and/or suggestion of test scenario templates that are relevant for validating a software system. The test scenario templates are generated based on data collected from users that may be considered crowd users (e.g., testers from other organizations), tasked with testing similar software systems. Optionally, test scenario templates may enable utilization of the wisdom of the crowd for testing. With the templates, organizations may efficiently obtain test scenarios that are effective for their systems and also export such knowledge to be used by other organizations.

In one embodiment, a test scenario template is a model according to which a test scenario may be structured. A test scenario template may include one or more test steps, which instruct a user on an action to be performed as part of the test, such as where to enter a value, what button to push, what screen to select, or what transaction to run. Optionally, a test scenario template may include one or more default values used for miming an instantiation of the test scenario template (e.g., default values for certain fields in a screen).

In one embodiment, runs of test scenarios are clustered into clusters that contain similar runs of test scenarios. A test scenario template may be generated from a cluster of runs of test scenarios that come from multiple organizations. This may enable generation of a test scenario template from runs that have been used by many user from multiple organizations (e.g., runs from a large cluster and/or a cluster with runs from many organizations), and thus is likely to be useful for other organizations as well. Additionally, this may enable both determination of default values for the test scenarios template (e.g., values used by many organizations) and/or removal of proprietary data from the template (e.g., values used by a small number of organizations).

One aspect of this disclosure involves a computer system configured to generate a test scenario template. The computer system includes a monitoring module that is configured to monitor users belonging to different organizations to identify runs of test scenarios run on software systems belonging to the different organizations. The computer system also includes a clustering module that is configured to cluster the runs of the test scenarios to clusters that include similar runs of test scenarios. Optionally, the clustering module is configured to process one or more of the following logged activities: a list of users who ran the test scenarios, an analysis of access to a database, messages returned from executed transactions, values returned by fields, and procedures utilized by a test scenario. A cluster selector included in the computer system is configured to select from the clusters a certain cluster that includes a first run of a first test scenario and a second run of a second test scenario. The first run is associated with a first organization belonging to the different organizations, and the second run is associated with a second organization belonging to the different organizations. Additionally, the first run is not identical to the second run, and the first organization is not the second organization. The computer system also includes a template generator that is configured to generate a test scenario template based on the first and second runs. The test scenario template identifies a transaction, used in the first and second runs, and possible values for running the transaction. Optionally, the template generator may also be configured to remove from the test scenario template proprietary data captured by the monitoring module. Optionally, the computer system may also include a template filter that is configured to receive a profile of a certain user and to test whether the test scenario template is relevant to the certain user based on the user profile. Additionally or alternatively, the computer system may include a user interface, coupled to the template filter, which is configured to suggest a relevant test scenario template to the certain user.

Another aspect of this disclosure involves a computer implemented method for generating a test scenario template. Executing the method may involve performing the following: Monitoring users belonging to different organizations to identify runs of test scenarios run on software systems belonging to the different organizations. Clustering the runs to clusters that include similar runs of test scenarios. Selecting from the clusters a certain cluster that includes a first run of a first test scenario and a second run of a second test scenario. The first run is associated with a first organization belonging to the different organizations, and the second run is associated with a second organization belonging to the different organizations. Additionally, the first run is not identical to the second run, and the first organization is not the second organization. And generating, based on the first and second runs, a test scenario template representing the certain cluster. The test scenario template identifies a transaction used in the first and second runs, and possible values for running the transaction. Optionally, the test scenario template includes values, captured during the monitoring, which appear in at least one of the first and second runs. In one embodiment, the method also involves removing from the test scenario template proprietary data captured from monitoring the users. Optionally, data captured from monitoring the users is considered proprietary if it appears in runs of less than a predetermined number of the users.

Yet another aspect of this disclosure involves a non-transitory computer-readable medium for use in a computer to generate a test scenario template. The computer includes a processor, and the non-transitory computer-readable medium includes the following program code: Program code for monitoring users belonging to different organizations to identify runs of test scenarios run on software systems belonging to the different organizations. Program code for clustering the runs of the test scenarios to clusters that include similar runs of test scenarios. Program code for selecting from the clusters a certain cluster that includes a first run of a first test scenario and a second run of a second test scenario. The first run is associated with a first organization belonging to the different organizations, and the second run is associated with a second organization belonging to the different organizations. Additionally, the first run is not identical to the second run, and the first organization is not the second organization. And program code for generating, based on the first and second runs, a test scenario template representing the certain cluster. The test scenario template identifies a transaction used in the first and second runs and possible values for running the transaction.

BRIEF DESCRIPTION OF THE DRAWINGS

The embodiments are herein described, by way of example only, with reference to the accompanying drawings. In the drawings.

DETAILED DESCRIPTION

Figure 1:
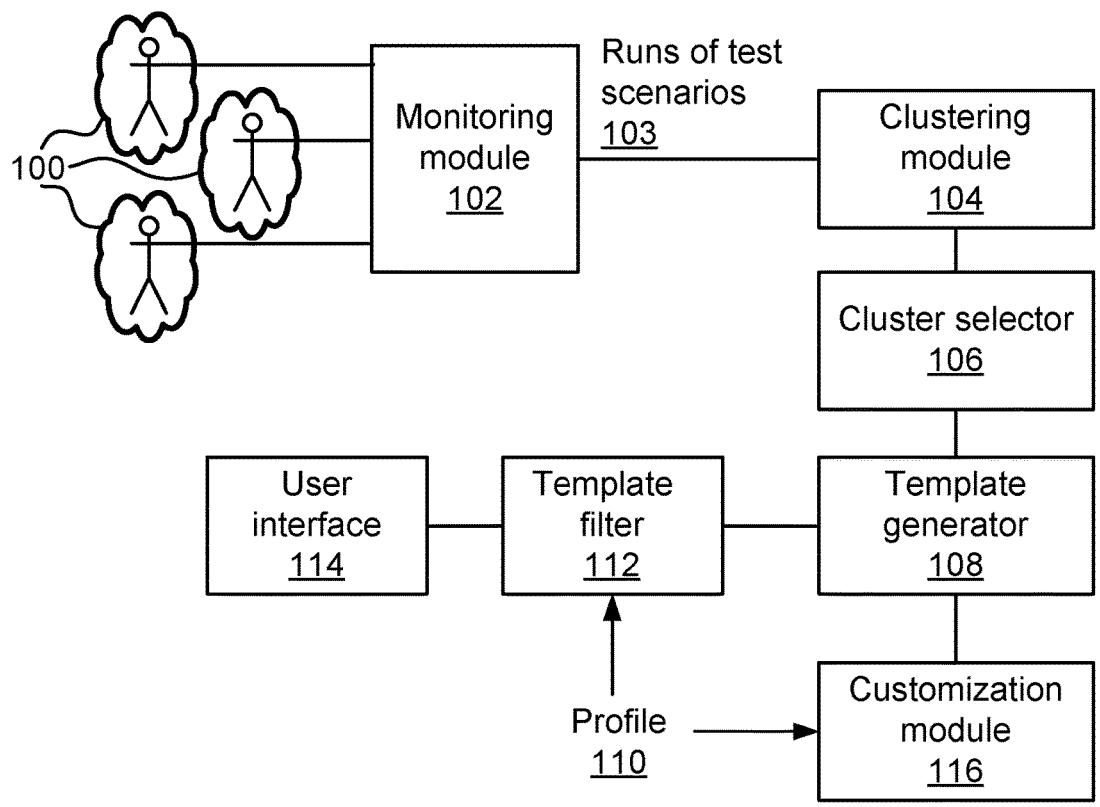
FIG. 1 illustrates one embodiment of a computer system configured to generate a test scenario template.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen).

Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

FIG. 1 illustrates one embodiment of a computer system configured to generate a test scenario template. The illustrated embodiment includes at least a monitoring module 102, a clustering module 104, a cluster selector 106, and a template generator 108.

The monitoring module 102 is configured to monitor users 100 belonging to different organizations to identify runs of test scenarios 103 run on software systems belonging to the different organizations. Optionally, the monitoring is done at least in part on the software systems belonging to the different organizations. For example, the monitoring module 102 may include components that are installed on the software systems of the different organizations and collects data generated while the users 100 are miming the test scenarios. Additionally or alternatively, the monitoring module 102 may operate remotely from the software systems of the different organizations. For example, the monitoring module may be implemented, at least in part, using programs running on a cloud-based server that receive information related to activity of the users 100 on the software systems of the different organizations.

The clustering module 104 is configured to cluster the runs of the test scenarios 103 to clusters that include similar runs of test scenarios. Optionally, the clusters may be of various sizes, and include runs of various users belonging to different organizations. Optionally, the clustering module 104 performs processing of the runs prior to clustering, for example, it extracts field values from screens in runs. Optionally, the clustering module 104 may receive the runs after they undergo processing. For example, the runs may be represented as vectors of features on which a clustering algorithm utilized by the clustering module 104 may operate. Optionally, the clustering module 104 is configured to process and utilize for the clustering one or more of the following logged activities: a list of users who ran the test scenarios, an analysis of access to a database, messages returned from executed transactions, values returned by fields, and procedures utilized by a test scenario.

The cluster selector 106 is configured to select from the clusters a certain cluster. The selection of the certain cluster may be done according to various parameters, such the cluster's size, the number organizations associated with runs belonging to the cluster, and/or attributes of transactions executed in the runs belonging to the cluster. In one embodiment, the certain cluster selected by the cluster selector 106 includes a first run of a first test scenario and a second run of a second test scenario. Optionally, the first run is associated with a first organization belonging to the different organizations and the second run is associated with a second organization belonging to the different organizations. Additionally, the first run is not identical to the second run, and the first organization is not the second organization. In this embodiment, the fact that the certain cluster includes runs associated from different organizations may be indicative of the fact that the test scenarios test business processes and/or transactions that are likely also to be used by organizations other than the first and second organizations.

The template generator 108, is configured to generate a test scenario template based on one or more runs belonging to the certain cluster. In one embodiment, the certain cluster contains the first run of a first test scenario and the second run of a second test scenario, and test scenario template is generated by the template generator 108 based on the first and second runs. For example, the template generator 108 includes transactions identified in the first and/or second runs in the template. Additionally, the generated template may identify a transaction used in the first and second runs, and possible values for running the transaction. Optionally, the identified transaction is a transaction that was executed in both the first and second runs, and the possible values for running the identified transaction are obtained directly from the first and/or second runs, or derived from the first and/or second runs. Optionally, at least one of the possible values for running the transaction does not appear in each of the first and second runs. Optionally, the test scenario template includes a combination of the possible values, and the combination does not appear in any of the first and second runs. Optionally, the template generator 108 is configured to receive the certain cluster from the clustering selector 106 and to select the first and second runs from the certain cluster.

In one embodiment, the template generator 108 is also configured to remove from the test scenario template proprietary data captured by the monitoring module. Optionally, data captured by the monitoring module is considered proprietary if it is captured from less than a predetermined number of the users. For example, data is proprietary if it appears in runs of less than 5 users or less than 5% of the users. Optionally, the template generator 108 utilizes a data cleaner module to remove the proprietary data.

In one embodiment, the computer system may optionally include a template filter 112. The template filter 112 is configured to receive a profile 110 of a certain user and to check whether the test scenario template is relevant to the certain user based on the profile 110. For example, the template filter 112 may check whether the template involves modules that the profile 110 indicates that the certain user typically uses. In another example, the template filter 112 may consult the profile 110 to check whether the user has permission to runs certain transactions included in the template.

In one embodiment, the test scenario template includes values, captured by the monitoring module 102, which were used by at least one of the users. The template generator 108 is further configured to remove from the test scenario template a value that is expected to be irrelevant to the certain user. Optionally, the template generator 108 receives the profile 110 and determines relevancy of the values based on the profile 110. For example, if the template includes values that are specific to a certain field of operations (e.g., insurance business), however the profile 110 indicates that the user is in another field of operations (e.g., auto manufacturing), then insurance related values may be removed from the template.

In one embodiment, the computer system may optionally include a user interface 114 configured to suggest a relevant test scenario template to the certain user. Optionally the relevant template is selected by the template filter 112. Optionally, the user interface 114 is coupled to the template filter 112. For example, they both involve software running on a same server accessed by the certain user. Alternatively, the template filter 112 may operate remotely from the user interface 114. For example, the template filter 112 may be part of a cloud-based service running on a remote server, while the user interface 114 includes hardware (e.g., a terminal) located at a site where the certain user runs test scenarios.

In one embodiment, the computer system may optionally include a customization module 116 that is configured to customize the test scenario template by adding thereto proprietary data relevant to a certain user for whom the test scenario template is customized. Optionally, the customization module performs at least some of the customization based on the profile 110 and the template is customized for the certain user. Alternatively, the template may be customized for a generic user belonging to a specific organization. Optionally, the customization module 116 may receive a profile of the specific organization and/or a profile of a typical user belonging to the specific organization, and perform the customization based on the profile or profiles.

In one embodiment, the template generator 108 is configured to calculate a cohesion rank describing how close to each other are runs of test scenarios associated with different organizations. Optionally, the test scenarios involve screens that include fields, and the cohesion rank is proportional to percentage of the fields that are common to the screens that are included in runs of test scenarios belonging to a cluster.

It is to be noted that there may be considerable flexibility when it comes implementing computer systems such as the systems modeled according to FIG. 1. Thus, various embodiments may implement components of the computer system illustrated in FIG. 1 in various ways. For example, in some embodiments one or more of the following may be implemented utilizing the same software modules, and/or software running on the same server and/or processor: the monitoring module 102, the clustering module 104, the cluster selector 106, the template generator 108, and the template filter 112. Additionally, one or more of the aforementioned components may be implemented on a remote server, such as a cloud-based server. In one example, clustering module 104 and the cluster selector 106 are both implemented as software running on the same server. In another example, the clustering module 104, cluster selector 106, and the template generator 108 are implemented as a cloud-based service that receives runs of test scenarios from the users 100 belonging to the different organizations, and generates templates that may be offered new users. In this example, the template filter 112 may also be part of the cloud-based service, and may be used to suggest to users certain templates that are appropriate for them.

Figure 2:
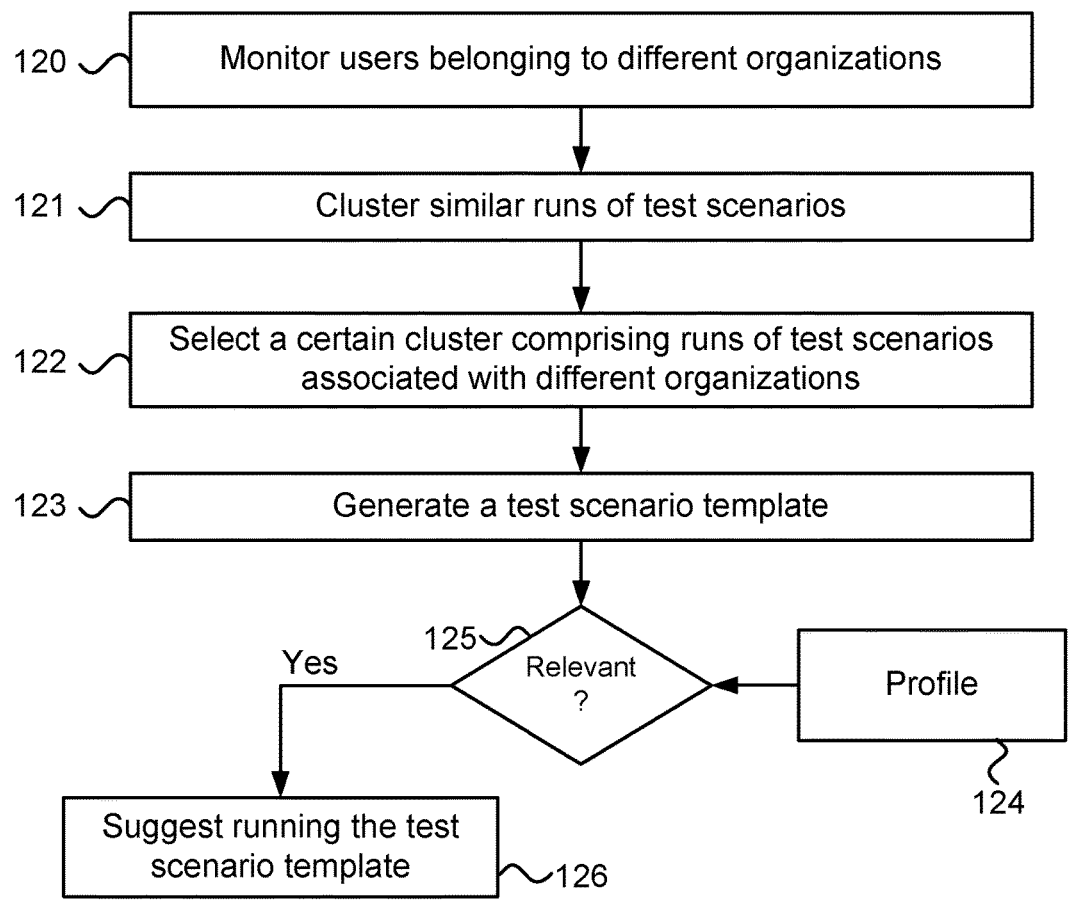
FIG. 2 illustrates one embodiment of a computer implemented method for generating a test scenario template.

FIG. 2 illustrates one embodiment of a computer implemented method for generating a test scenario template. The illustrated embodiment includes the following steps:

In step 120, monitoring users belonging to different organizations to identify runs of test scenarios run on software systems belonging to the different organizations.

In step 121, clustering the runs of the test scenarios to clusters that include similar runs of test scenarios.

In step 122, selecting, from among the clusters, a certain cluster that includes a first run of a first test scenario, associated with a first organization belonging to the different organizations, and a second run of a second test scenario, associated with a second organization belonging to the different organizations. In this embodiment, the first run is not identical to the second run, and the first organization is not the second organization.

And in step 123, generating a test scenario template representing the certain cluster, based on the first and second runs. Optionally, the test scenario template identifies a transaction used in the first and second runs, and possible values for running the transaction. For example, the template may provide an identifier of a transaction and/or code for executing the transaction. Optionally, at least one of the possible values for running the transaction does not appear in each of the first and second runs. Optionally, the test scenario template includes a combination of the possible values, and the combination does not appear in any of the first and second runs. Optionally, the test scenario template includes values, captured during the monitoring, which appear in at least one of the first and second runs. Optionally, the template is generated based on the first test scenario and/or the second test scenario.

In one embodiment, the method illustrated in FIG. 2 may also include additional optional steps: an optional step involving receiving a profile 124 of a certain user; in optional step 125 testing whether the test scenario template is relevant to the certain user based on the profile 124; and in optional step 126, if the template is found to be relevant, suggesting to the certain user to utilize the test scenario template. Optionally, the test scenario template includes values, captured during the monitoring, which appear in at least one of the first and second runs. Generating the template may be followed by, and/or include, a step of removing from the test scenario template a value that is expected to be irrelevant to the certain user. Optionally, determining whether the value is irrelevant is done based on the profile of the certain user.

A test scenario template may be processed after being generated in order to remove certain data that appears in it. In one embodiment, the method illustrated in FIG. 2 may also include an optional step of removing proprietary data related to one or more of the users from the generated template. Optionally, the proprietary data was captured from monitoring the users. Optionally, data captured from monitoring the users is considered proprietary if it appears in runs of less than a predetermined number of the users. For example, if a certain value appears in runs of less than 5% of the users, it may be considered proprietary. Clustering runs may rely on various notions of similarity. In one embodiment, similar runs of test scenarios are characterized by having at least one of: essentially the same fields, essentially the same field values, similar combinations of fields, similar combinations of field values, similar execution of transactions, similar user interactions, similar requests, similar calls to procedures, and similar executions of procedures.

In another embodiment, the clustering of the runs in step 121 is based on counting the number of similar fields used in screens corresponding to the runs; the more similar fields, the more similar the runs of the test scenarios are considered to be.

In yet another embodiment, the clustering of the runs in step 121 is based on similarity between order of displaying similar fields in screens corresponding to the runs; the closer the orders, the more similar the runs are considered to be.

In still another embodiment, the clustering of the runs in step 121 is based on similarity between executed procedures associated with the test scenarios. Optionally, the clustering is also based on the order of executing the procedures. Additionally or alternatively, the clustering may be based on transactions executed as part of runs of test scenarios.

Monitoring the users in step 120 may involve various activities. In one embodiment, monitoring the users includes monitoring transactions in the identified runs that were tested by the users. Additionally or alternatively, monitoring the users may include monitoring procedures involved in testing of the transactions. In one example, the monitoring is screen-based UI monitoring (e.g., monitoring content presented to a user on a screen and/or monitoring data entered by the user such as selections on the screen). In another example, monitoring involves recording a value provided by a user (e.g., a value entered with a keyboard). In yet another example, the monitoring includes recording programs that were executed and the corresponding invocation values. In still another example, the monitoring includes monitoring network traffic (e.g., recording messages exchanged between system modules).

Coverage, such as coverage of transactions or business processes, which may be achieved by utilizing a template, may be a consideration, in some embodiments, when it comes to deciding which templates to generate and/or which template to suggest to a user. Additionally, coverage may be estimated for a group of templates. In one embodiment, the computer implemented method illustrated in FIG. 2 may include an optional step of receiving a value representing a required coverage for a certain user, and achieving the required coverage with a substantially minimal number of test scenario templates by estimating coverage of testing achieved by many templates before the step of suggesting the certain user to utilize at least one of the templates. Optionally, the computer implemented method illustrated in FIG. 2 may include an optional step of calculating the required coverage based on a usage information of the certain user. For example, usage information of the certain user may be obtained from the profile 110.

There may be various templates and/or combinations of templates that can achieve a required coverage for a user; thus, additional factors may be considered when selecting templates to achieve the required coverage. In one embodiment, achieving a required coverage for a certain user may be done by an additional factor: the run time required to runs instantiations of templates. Optionally, the required coverage is achieved by selecting templates that require the shortest time to run for a user that runs test scenarios based on templates of test scenarios that achieve the required coverage. Optionally, selection of the templates is done in this case by estimating time to achieve a required coverage for the certain user by many templates before the step of suggesting the certain user to utilize at least one of the templates. For example, various subsets of templates are considered to determine if they achieve the required coverage and how long they take to run. A subset of templates that both achieves the required coverage and has a minimal running time may then be selected for the certain user. Optionally, the shortest time is achieved by suggesting templates relevant to test scenarios that are expected to be used by the certain user, and spreading the suggested templates to approximately achieve a uniform coverage of the test scenarios with the suggested templates.

In one embodiment, the computer implemented method illustrated in FIG. 2 may include an optional step of estimating the importance of a test scenario for a certain user. Following that, the method may include an optional step of suggesting to the certain user templates corresponding to the most important test scenarios essentially first. Optionally, the importance of a certain test scenario is determined by frequency in which the certain test scenario is used relative to frequency in which other test scenarios are used. For example, the more frequently a test scenario is used, the more important its corresponding template may be considered. Optionally, the importance of a certain test scenario is determined by characteristics of users of the certain test scenario compared to characteristics of users of other test scenarios. For example, if a certain test scenario is used primarily by testers of management-related modules, it may be considered more important than a test scenario that is used primarily by a tester of modules that involve a product-related website. Optionally, the importance of a certain test scenario is determined by financial value associated with the certain test scenario compared to financial value associated with other test scenarios. For example, a test scenario involving completing a sale may have higher financial value than a test scenario that involves data mining the internet to find email addresses of potential customers.

In one embodiment, a non-transitory computer-readable medium stores program code that may be used by a computer to generate a test scenario template. The computer includes a processor, and the non-transitory computer-readable medium stores the following program code:

Program code for monitoring users belonging to different organizations to identify runs of test scenarios run on software systems belonging to the different organizations.

Program code for clustering the runs of the test scenarios to clusters that include similar runs of test scenarios. Optionally, the program code for clustering includes instructions or processing one or more of the following logged activities: list of users who ran the test scenarios, analysis of access to a database, messages returned from executed transactions, values returned by fields, and procedures utilized by a test scenario.

Program code for selecting from the clusters a certain cluster that includes a first run of a first test scenario and a second run of a second test scenario. Optionally, the first run is associated with a first organization belonging to the different organizations, the second run is associated with a second organization belonging to the different organizations, the first run is not identical to the second run, and the first organization is not the second organization.

And program code for generating, based on the first and second runs, a test scenario template representing the certain cluster. The test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the non-transitory computer-readable medium optionally stores program code for receiving a profile of a certain user, program code for testing whether the test scenario template is relevant to the certain user based on the user profile, and program code for suggesting to the certain user to utilize the test scenario template based on the profile if the test scenario template is deemed relevant to the certain user. Optionally, the test scenario template includes values, captured during the monitoring, which were used by at least one of the users. The non-transitory computer-readable medium may also store program code for removing from the test scenario template a value that is expected to be irrelevant to the certain user.

In one embodiment, the non-transitory computer-readable medium optionally stores program code for removing from the test scenario template proprietary data captured from monitoring the users. Optionally, data captured from monitoring the users is considered proprietary if it is captured from less than a predetermined number of the users.

In one embodiment, the non-transitory computer-readable medium optionally stores program code for calculating a cohesion rank describing how close to each other are runs of test scenarios from different organizations. Optionally, the runs of test scenarios include screens that have fields, and the cohesion rank describes a percentage of the fields that are common to the screens that are included in runs of test scenarios belonging to a cluster.

Figure 3:
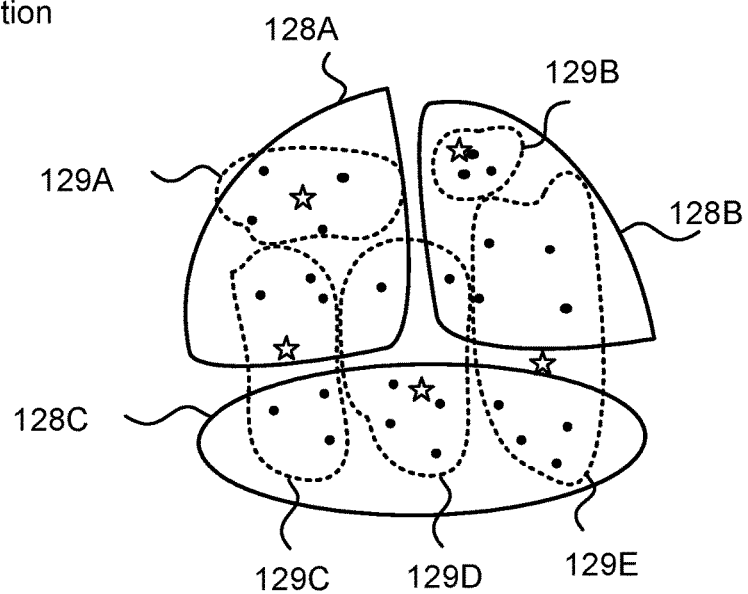
FIG. 3 is a schematic illustration of runs of test scenarios, clusters, and templates.

FIG. 3 is a schematic illustration of runs of test scenarios (represented by dots) of three different organizations (128A-C). The runs are clustered into five different clusters of similar runs of test scenarios (129A-E). Each cluster is represented by a test scenario template (illustrated by a start symbol). Some of the clusters span runs of multiple organizations (e.g., 129C-E), while other include runs from a single organization (129A,B). In addition, the templates need not be exact derivations of test scenarios; in this illustration, the fact that the stars (templates) do not overlap with the dots (runs), illustrates that the content of the templates is not derived completely from any one of the runs. For example, this may be due to the templates containing combinations of values obtained from multiple runs.

Figure 4:
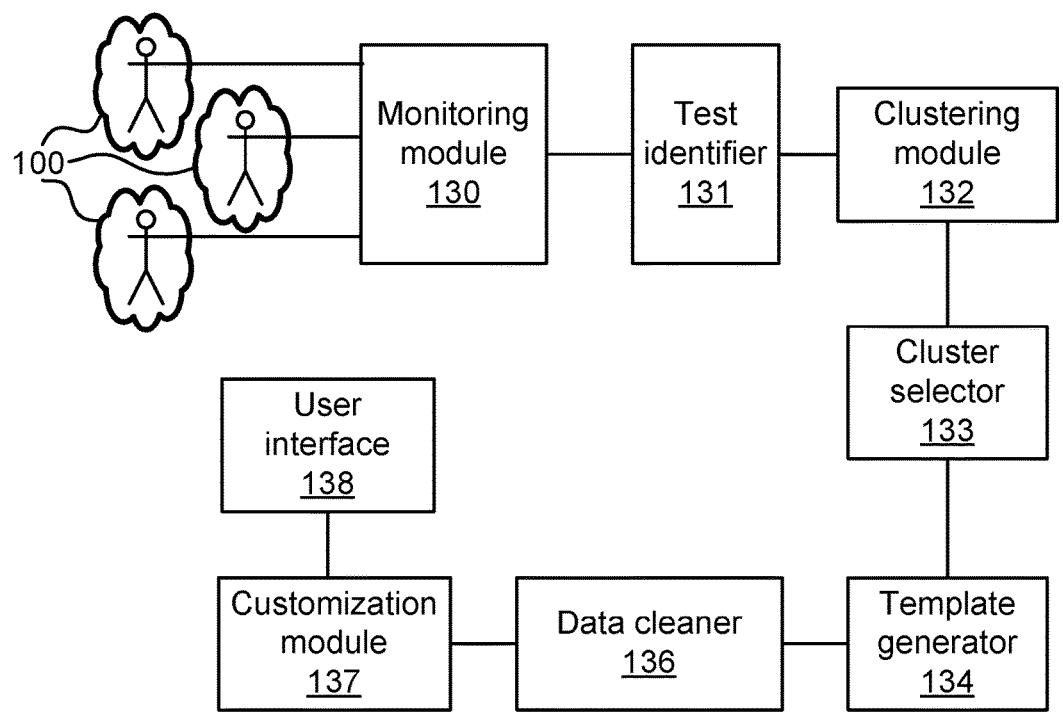
FIG. 4 illustrates one embodiment of a computer system to generate a customized test scenario template.

FIG. 4 illustrates one embodiment of a computer system to generate a customized test scenario template based on runs of test scenarios run by users belonging to different organizations. The illustrated embodiment includes at least a test identifier 131, a clustering module 132, a cluster selector 133, a template generator 134, a data cleaner 136, and a customization module 137.

The test identifier 131 is configured to identify runs of test scenarios run by the users on software systems that belong to the different organizations. Optionally, the test identifier 131 receives data obtained from monitoring the users 100. Optionally, the runs of test scenarios identify transactions that are run as part of the test scenarios and possible values that may be used by the transactions. For example, the template may provide an identifier of the transaction and/or code for executing the transaction.

The clustering module 132 is configured to cluster the runs of the test scenarios to clusters that include similar runs of test scenarios. Optionally, the clustering module 132 is configured to process one or more of the following logged activities: a list of users who ran the test scenarios, an analysis of access to a database, messages returned from executed transactions, values returned by fields, and procedures utilized by a test scenario.

The cluster selector 133 is configured to select from among the clusters a certain cluster that includes a first run of a first test scenario, associated with a first organization belonging to the different organizations, and a second run of a second test scenario, associated with a second organization belonging to the different organizations. In this embodiment, the first run may not identical to the second run (e.g., they have different values to certain fields), and the first organization is not the second organization. Optionally, the cluster selector 133 is also configured to receive a profile of the certain user, and to select a cluster appropriate for the certain user based on the profile and at least one of the following: coverage of the clusters, importance of the clusters, and ranking of the clusters. For example, the cluster selector 133 may be more likely to select a first cluster, which has a high ranking, than a second cluster that has a lower ranking than the first. Similarly, the cluster selector 133 may be more likely to select a cluster that includes runs of test scenario, which based on the profile of the certain user, may offer higher coverage for the certain user.

The template generator 134 is configured to generate a test scenario template based on the first and second runs. Optionally, the first and second runs are runs of the same test scenario. Alternatively, the first and second runs may be runs of different test scenarios (however, the different test scenarios likely possess some degree of similarity since the first and second runs were placed in the same cluster by the clustering module 132). Optionally, the template identifies a transaction used in the first and second runs, and possible values for running the transaction. For example, the template may include identifiers of transactions and/or code that runs the transactions. Additionally, the template may include values for running the transaction such as default input values that the transaction can use. Optionally, at least one of the possible values for running the transaction does not appear in each of the first and second runs. Optionally, the test scenario template includes a combination of the possible values, and the combination does not appear in any of the first and second runs.

The data cleaner 136 is configured to remove from the test scenario template proprietary data associated with at least one of the first organization and the second organization. Optionally, most output fields of the first and second runs are removed, and as a result, the test scenario template does not include expected values for most test steps. Optionally, the output fields may be removed by the data cleaner 136 and/or the template generator 134, the customization module 137, and/or by another suitable module or combination of modules.

In one embodiment, a value in a test scenario template may be considered proprietary and consequently removed from the template. Optionally, the proprietary value is removed by the data cleaner 136. Optionally, a decision on whether a value is proprietary may be based on at least one of: a number of runs of test scenarios in the certain cluster in which the value appears, and a number of different organizations associated with the runs of the test scenarios in which the value appears. Optionally, if the number of runs in which the value appears is below a certain threshold and/or the number of organizations associated with runs in which the certain value appears is below a certain threshold then the data cleaner 136 may remove the certain value from the template.

In one embodiment, the data cleaner 136 may enable or restrict the customization module 137 from utilizing a certain value based on whether or not the certain value is considered proprietary. The decision on whether or not the certain value is proprietary may also be based on at least one of: the number of runs of test scenarios in which the certain value appears, and the number of different organizations associated with the runs of the test scenarios in which the certain value appears. For example, if the number of runs in which the certain value appears reaches a predetermined threshold, the certain value may be considered non-proprietary, and as such is allowed to be used for customization. In another example, if the number of organizations associated with the runs in which the selected value appears reaches a predetermined threshold, this may indicate that the selected value is non-proprietary; it is not likely to be able to identify an organization associated with a run from which the selected value was taken.

The customization module 137 is configured to customize the test scenario template by adding to the test scenario template proprietary data relevant to a certain user for whom the test scenario template is customized. Optionally, at least some of the data added to the template by the customization module replaces proprietary data that has been removed from the template (e.g., by the data cleaner).

In one example, the proprietary data may be entered by the certain user (e.g., after being prompted to provide it). In another example, proprietary data is automatically acquired, e.g., by querying a database for information relevant to the user such as information obtained from a user profile. In yet another example, proprietary data used in customization is obtained from a database the holds information about the organization to which the certain user belongs.

In one embodiment, the certain user for whom the test scenario template is customized is a generic user belonging to a specific organization. Optionally, the specific organization may be one of the different organizations, or a new organization that does not belong to the different organizations.

There may be various relationships between the customization module 137 and the data cleaner 136. In one embodiment, the customization module 137 and the data cleaner 136 are realized, at least in part, by the same software module. For example, a certain program may perform both removal of at least some of the proprietary data from a template, and additionally, the module may perform at least some of customization of the template.

In some embodiments, the data cleaner 136 operates on the template before the customization module 137 receives the template. While in other embodiments, the order may be reversed; first the template may customized by the customization module 137, and then proprietary data may be removed by the data cleaner 136.

In one embodiment, the system illustrated in FIG. 4 optionally includes a monitoring module 130 that is configured to monitor the users 100 belonging to the different organizations and to provide data obtained from monitoring the users 100 to the test identifier 131.

In another embodiment, the system illustrated in FIG. 4 optionally includes a user interface 138 configured to suggest to the certain user to run an instantiation of the customized test scenario template. Optionally, the user interface 138 may initiate the instantiation of the customized test scenario template. For example, the user interface 138 may present a first screen of the customized test scenario template and prompt the user to take a certain action to proceed with execution of the customized template.

In one embodiment, the data cleaner 136 is configured to: select a value from the test scenario template, and remove the selected value from the test scenario template if the selected value appears in less than a first predetermined number of the runs of test scenarios in the certain cluster or the selected value appears in runs of test scenarios in the certain cluster that are associated with less than a second predetermined number of different organizations. Optionally, both the first predetermined number and the second predetermined number are greater than one.

In another embodiment, the data cleaner 136 is configured to: select a value from a run of a test scenario; check whether the value appears in at least a first predetermined number of the runs of the test scenarios; check whether the value appears in runs of test scenarios associated with at least a second predetermined number of different organizations; and if both conditions are positive, enable the customization module to utilize the selected value for customizing the test scenario template. Optionally, the data cleaner is further configured not to enable customization of the test scenario template to utilize the selected value if at least one of the conditions is negative.

It is to be noted that different embodiments may implement components of the computer system illustrated in FIG. 4 in different ways. For example, in some embodiments one or more of the following may be implemented utilizing the same software modules, and/or software modules running on the same server: the monitoring module 130, the test identifier 131, the clustering module 132, the cluster selector 133, the template generator 134, the data cleaner 136, and the customization module 137. Additionally, one or more of the aforementioned components may be implemented on a remote server, such as a cloud-based server. In one example, clustering module 132 and the cluster selector 133 are both implemented as software running on the same server. In another example, the clustering module 132, cluster selector 133, and the template generator 134 are implemented as a cloud-based service that receives runs of test scenarios from the users 100 belonging to the different organizations, and generates templates that may be offered new users. In this example, the data cleaner 136 and/or the customization module 137 may also be part of the cloud-based service, and may be used to prepare a template to be utilized by users.

Figure 5:
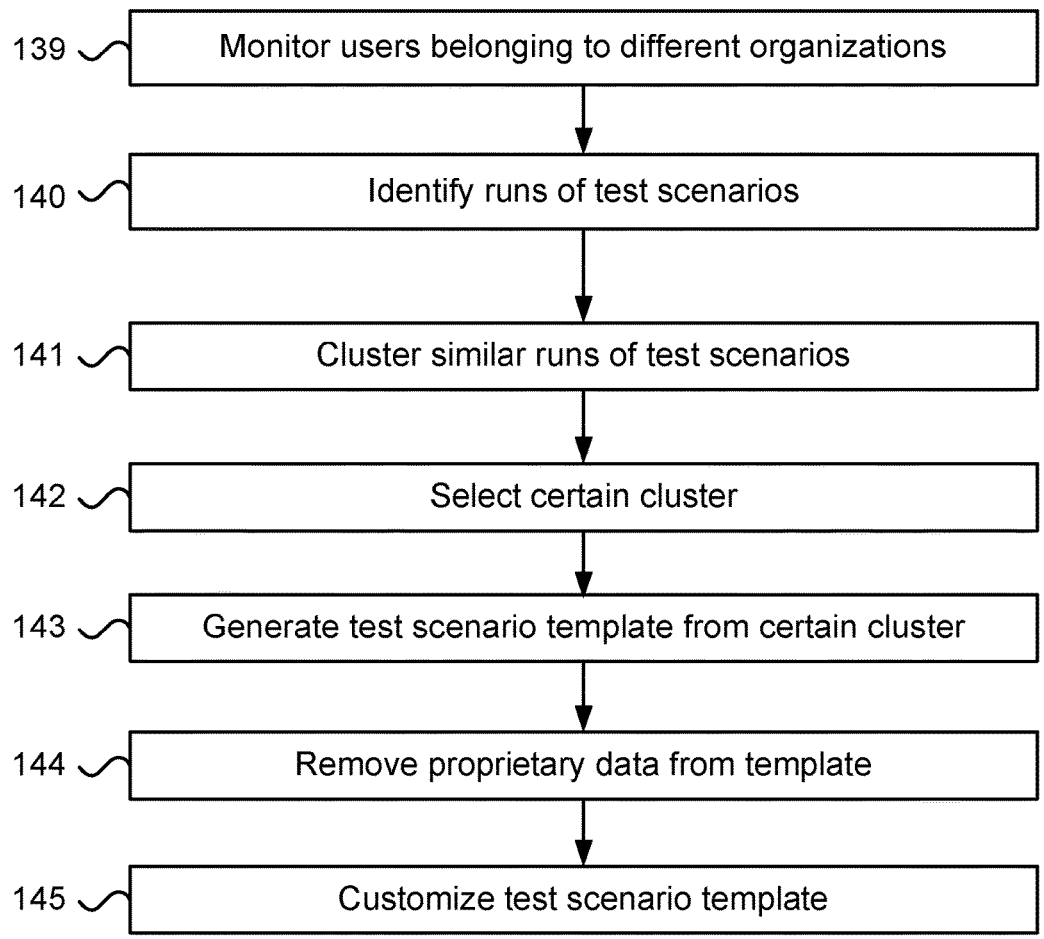
FIG. 5 illustrates one embodiment of a computer implemented method for generating a customized test scenario template.

FIG. 5 illustrates one embodiment of a computer implemented method for generating a customized test scenario template based on runs of test scenarios run by users belonging to different organizations. The illustrated embodiment of the method includes the following steps:

In step 140, identifying runs of test scenarios run by the users on software systems that belong to the different organizations.

In step 141, clustering the runs of the test scenarios to clusters that include similar runs of test scenarios. In one example, the runs of test scenarios in the certain cluster include five non-identical runs of test scenarios, each associated a different organization. Optionally, similar runs of test scenarios are characterized by having at least one of: essentially the same fields, essentially the same field values, similar combinations of fields, similar combinations of field values, similar execution of transactions, similar user interactions, similar requests, similar calls to procedures, similar executions.

In step 142, selecting, from among the clusters, a certain cluster that includes a first run of a first test scenario, associated with a first organization belonging to the different organizations, and a second run of a second test scenario, associated with a second organization belonging to the different organizations. Optionally, the first run is not identical to the second run, and the first organization is not the second organization. Optionally, the first test scenario is identical to the second test scenario. Alternatively, the first test scenario may be different from the second test scenario.

In step 143, generating a test scenario template associated with the certain cluster based on the first and second runs. Optionally, the template is also generated, at least in part, based on the first test scenario and/or the second test scenario. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In step 144, removing from the test scenario template proprietary data associated with at least one of the first organization and the second organization. Optionally, most of the output fields of the first and second runs are removed. As a result, the test scenario template does not include expected values for most test steps.

And in step 145, customizing the test scenario template by adding to the test scenario template proprietary data relevant to a certain user for whom the test scenario template is customized. Optionally, the certain user for whom the test scenario template is customized is a generic user belonging to a specific organization.

In one embodiment, the computer implemented method includes step 139, which involves monitoring the users and providing data obtained from the monitoring for use in the identifying of the runs of test scenarios.

In one embodiment, step 144 may be performed after step 145; that is first customizing of the template is performed, and then proprietary data is removed; while in other embodiments, the order may be first to remove proprietary data (step 144) and then to customize (step 145).

In one embodiment, prior to selecting the certain cluster in step 142, a profile of a certain user is received, and selecting the certain cluster is done, at least in part, based on the profile so the certain cluster is appropriate for the certain user. Optionally, at least one of the following factors is considered in along with information in the profile: coverage of the clusters, importance of the clusters, and ranking of the clusters. Optionally, at least one of the factors is computed for at least some of the clusters with respect to the profile. For example, the coverage of the clusters is computed with respect to an indication in the profile regarding the modules and/or business processes utilized by the user. Similarly, importance of the clusters may be computed with respect to the number of modules, tested by runs in a cluster, which are utilized often by the user.

In one embodiment, step 144 which involves removing from the test scenario template proprietary data, involves selecting a value derived from the test scenario template. Optionally, the certain value is derived from at least one of the first and second runs. Following that, removing the selected value from the test scenario template if the selected value appears in less than a first predetermined number of the runs of test scenarios in the certain cluster or the selected value appears in runs of test scenarios in the certain cluster that are associated with less than a second predetermined number of different organizations. In this embodiment, both the first predetermined number and the second predetermined number are greater than one.

In one embodiment, step 144 which involves removing from the test scenario template proprietary data includes: selecting a value appearing in at least one of the first run and the second run; testing whether the value appears in at least a first predetermined number of the runs in the certain cluster; testing whether the value appears in runs in the certain cluster that are associated with at least a second predetermined number of different organizations; and if both conditions are positive, enabling customization of the test scenario template to utilize the selected value. Optionally, if at least one of the aforementioned conditions is negative, customization of the test scenario template is not allowed to utilize the selected value.

In one embodiment, the computer implemented method illustrated in FIG. 5 includes an optional step of suggesting to the certain user to run an instantiation of the generated customized test scenario template. Optionally, the suggestion to run the instantiation is done via the user interface 138.

In one embodiment, clustering the runs in step 141 involves processing one or more of the following logged activities: a list of users who ran the test scenarios, an analysis of access to a database, messages returned from executed transactions, values returned by fields, and procedures utilized by a test scenario. Optionally, clustering of the runs in step 141 is based on counting the number of similar fields used in screens corresponding to the runs; the more similar fields, the more similar the runs of the test scenarios are considered to be. Additionally or alternatively, clustering of the runs in step 141 may be based on similarity between order of displaying similar fields in screens corresponding to the runs; the closer the orders, the more similar the runs are considered to be. Additionally or alternatively, clustering of the runs in step 141 may be based on similarity between executed procedures associated with the test scenarios. Optionally, the clustering may also be based on the order of executing the procedures and/or on transactions executed as part of runs of test scenarios.

Figure 6:
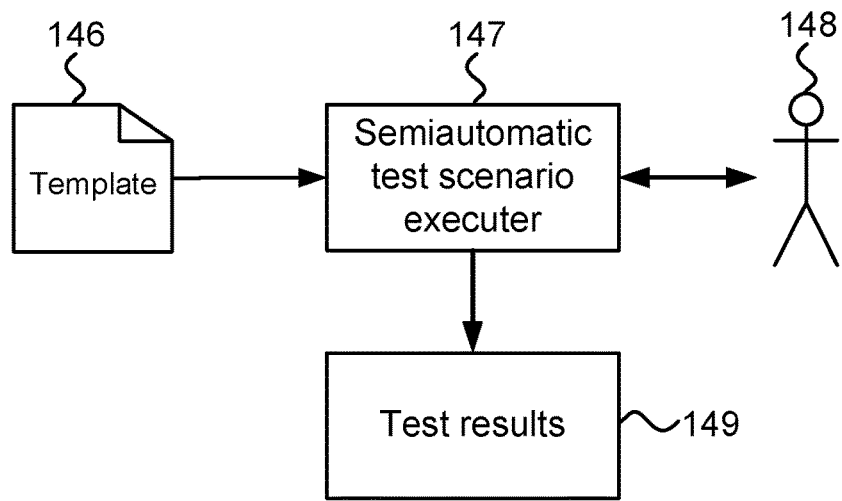
FIG. 6 illustrates one embodiment involving a user that performs a semiautomatic run of a test scenario that is an instantiation of a test scenario template.

FIG. 6 illustrates one embodiment in which a user 148 performs a semiautomatic run of a test scenario that is an instantiation of a test scenario template 146. The template 146 is provided to the semiautomatic test scenario executer 147 which is a system capable of communicating with the user 148. When faced with a value missing from the template 146, but needed for running the test scenario, the semiautomatic test scenario executer prompts the user 148 to provide a value. After providing the value, the semiautomatic executer continues with the run. Optionally, the semiautomatic executer 147 may require the user to enter multiple values, possibly at multiple times. After completing the run, the semiautomatic test scenario executer generates test results 149. Optionally, values provided by the user 148 to the semiautomatic executer 147 may be utilized in order to customize the template 146. Thus, additional runs of the template 146 and/or runs of other related templates, which can utilize the provided values, may not require user intervention and may run automatically.

Figure 7:
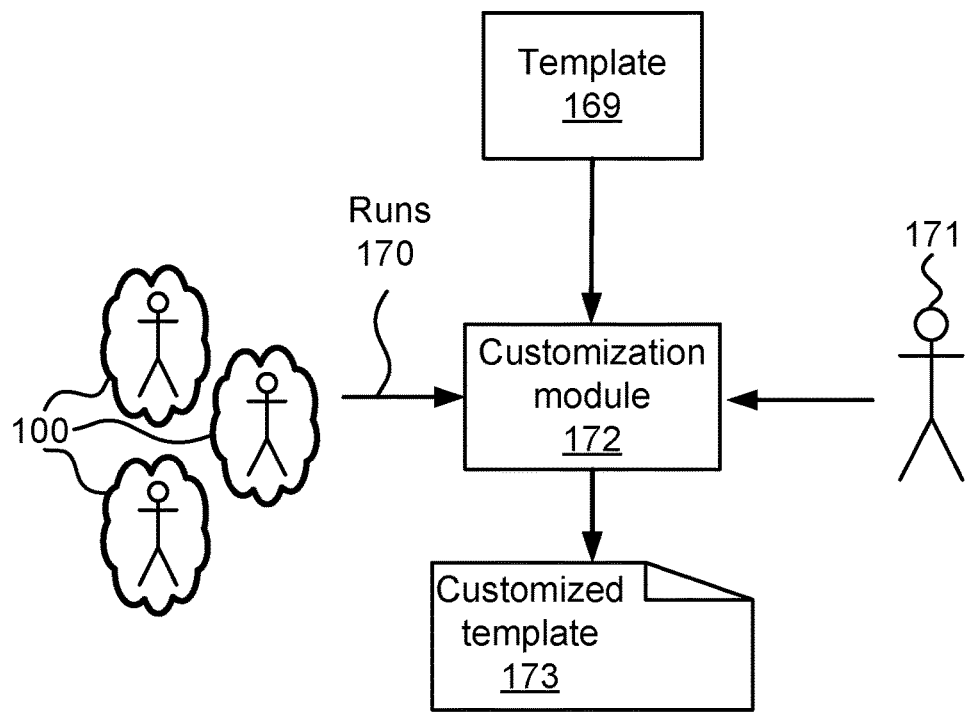
FIG. 7 illustrates one embodiment involving a test scenario template being customized using a customization module.

FIG. 7 illustrates one embodiment in which a test scenario template 169 is customized by a user 171, using a customization module 172. Certain values for the customization of the template 169 are provided by the user 171, while other values are obtained by analyzing the runs 170 of test scenarios of the users 100 which ran the test scenarios on software systems belonging to different organizations. In one example, the customization module 172 attempts to extract needed values from the runs 170. If the customization module 172 is unable to extract certain needed values, the user 171 is prompted to enter the certain needed values. After, receiving values (e.g., default values and/or proprietary data) to add to the template 169, the customization module 172 generates a customized template 173.

In one embodiment, a non-transitory computer-readable medium stores program code that may be used by a computer to generate a customized test scenario template based on runs of test scenarios run by users belonging to different organizations. The computer includes a processor, and the non-transitory computer-readable medium stores the following program code:

Program code for monitoring the users belonging to the different organizations to identify runs of test scenarios run on similar software systems belonging to the different organizations.

Program code for clustering the runs to clusters that include similar runs of test scenarios.

Program code for selecting from the clusters a certain cluster that includes: a first run of a first test scenario associated with a first organization belonging to the different organizations, and a second run of a second test scenario associated with a second organization belonging to the different organizations; the first run is not identical to the second run, and the first organization is not the second organization.

Program code for generating a test scenario template representing the certain cluster, based on the first and second runs. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

Program code for removing from the test scenario template proprietary data associated with at least one of the first organization and the second organization. Optionally, the program code involves removing most of the output fields of the first and second runs, and as a result, the test scenario template does not include expected values for most test steps.

And program code for generating a customized test scenario template by adding thereto proprietary data relevant to a certain user for whom the test scenario template is customized.

In one embodiment, the non-transitory computer-readable medium optionally stores program code for receiving a profile of the certain user, and selecting a cluster appropriate for the certain user based on the profile and at least one of the following: coverage of the clusters, importance of the clusters, and ranking of the clusters.

In one embodiment, the program code for removing from the test scenario template proprietary data associated with at least one of the first organization and the second organization includes: program code for selecting a value derived from the test scenario template, wherein said value is derived from at least one of the first and second runs. And in addition, program code for removing the selected value from the test scenario template if the selected value appears in less than a first predetermined number of the runs of test scenarios in the certain cluster or the selected value appears in runs of test scenarios in the certain cluster associated with less than a second predetermined number of different organizations. Optionally, both the first predetermined number and the second predetermined number are greater than one.

In one embodiment, the program code for removing from the test scenario template proprietary data associated with at least one of the first organization and the second organization includes program code for: selecting a value that appears in at least one of the first run and the second run; testing whether the value appears in at least a first predetermined number of the runs in the certain cluster; testing whether the value appears in runs in the certain cluster that are associated with at least a second predetermined number of different organizations; and if both conditions are positive, enabling customizing of the test scenario template to utilize the selected value. Optionally, the non-transitory computer-readable medium may also store program code for not enabling customization of the test scenario template to utilize the selected value if at least one of the conditions is negative.

In one embodiment, the non-transitory computer-readable medium may also store program code for suggesting to the certain user to run an instantiation of the generated customized test scenario template.

Figure 8:
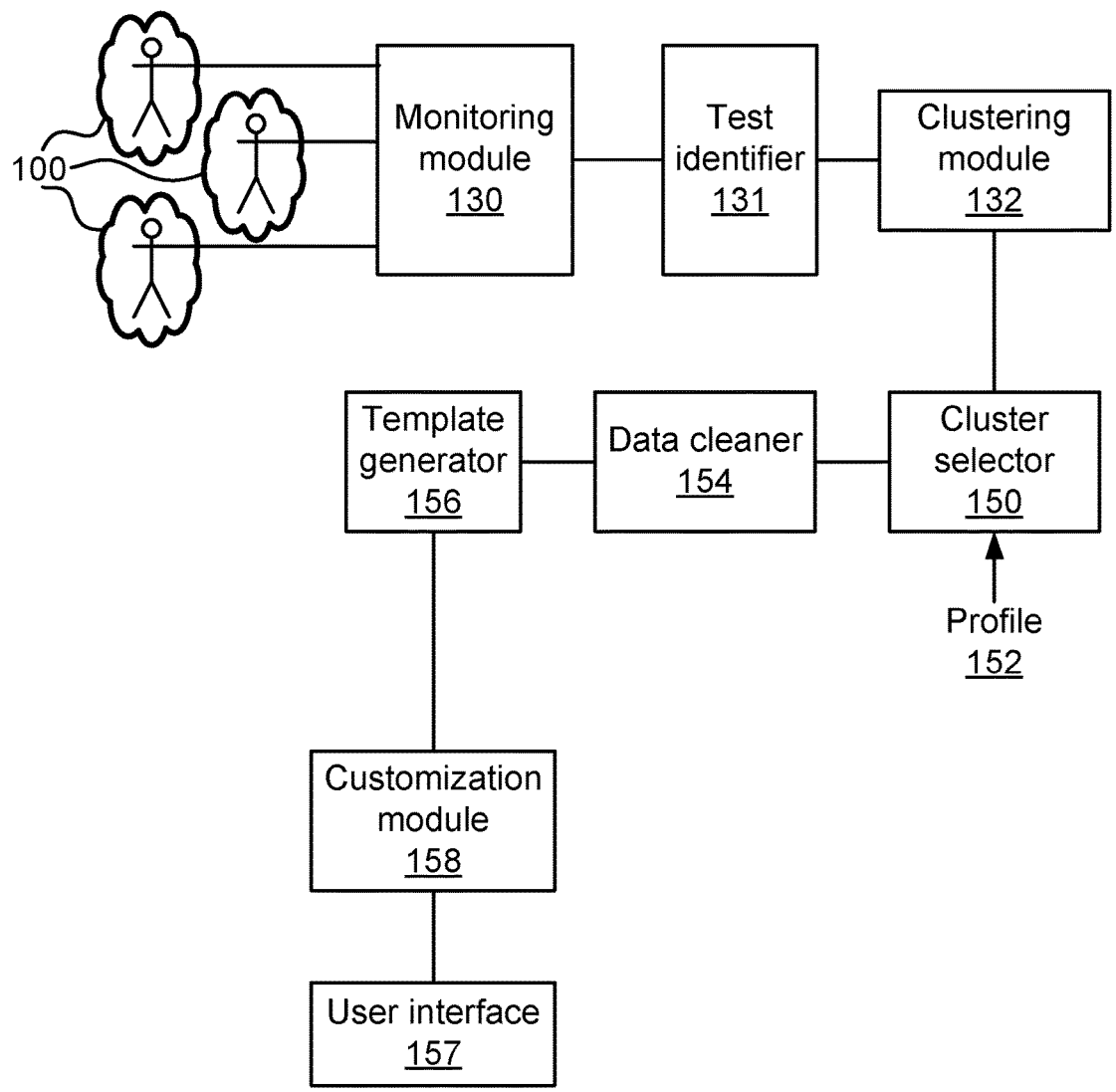
FIG. 8 illustrates one embodiment of a computer system configured to generate a test scenario template based on a user profile.

FIG. 8 illustrates one embodiment of a computer system configured to generate a test scenario template based on a user profile. The illustrated embodiment includes at least a test identifier 131, a clustering module 132, a cluster selector 150, a data cleaner 154, and a template generator 156.

The test identifier 131 is configured to identify runs of test scenarios run by users on software systems that belong to different organizations. Optionally, the users belong to different organizations.

The clustering module 132 is configured to cluster the runs of the test scenarios to clusters that include similar runs of test scenarios. Optionally, the clustering module 132 is configured to process one or more of the following logged activities: a list of users who ran the test scenarios, an analysis of access to a database, messages returned from executed transactions, values returned by fields, and procedures utilized by a test scenario. Optionally, the clusters may be of various sizes, and include runs of various users belonging to different organizations. Optionally, the clustering module 132 performs processing of the runs prior to clustering; for example, it extracts field values from screens in runs. Optionally, the clustering module 132 may receive the runs after they undergo processing. For example, the runs may be represented as vectors of features on which a clustering algorithm utilized by the clustering module 132 may operate.

The cluster selector 150 is configured to receive a profile 152 of a first user, and to select, from among the clusters, a certain cluster that suits the profile. In this embodiment, the certain cluster may include a first run of a first test scenario, associated with a first organization belonging to the different organizations, and a second run of a second test scenario, associated with a second organization belonging to the different organizations. Additionally, the first run is not identical to the second run, and the first organization is not the second organization.

In one embodiment, in addition to considering the profile 152, selection of a cluster may be done, at least in part, according to various parameters, such the cluster's size, the number organizations associated with runs belonging to the cluster, and/or attributes of transactions executed in the runs belonging to the cluster. Optionally, the more runs belong to a cluster and/or the larger the number of organizations associated with runs that belong to the cluster, the likelier the cluster selector 150 is to select the cluster to be the certain cluster.

The data cleaner 154 is configured to remove from the first run proprietary data associated with the first organization. Optionally, the data cleaner 154 is also configured to remove from the second run proprietary data associated with the second organization. Optionally, the data cleaner 154 is also configured to remove a selected value from the first run based on at least one of: number of runs of test scenarios in which the value appears, and number of different organizations associated with the runs of the test scenarios in which the value appears. Optionally, most output fields of the first and second runs are removed by the data cleaner 154, and as a result, the test scenario template does not include expected values for most test steps.

The template generator 156 is configured to generate a test scenario template based on the first and second runs. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the data cleaner 154 may be configured to remove proprietary data from the template. Optionally, the data cleaner 154 removes from the template proprietary data associated with the first and/or second organizations. Optionally, the data cleaner 154 may be implemented as part of the template generator 156. For example, removal of proprietary data may be part of the process of generating the template.

In one embodiment, the computer system optionally includes a customization module 158. The customization module 158 is configured to customize the test scenario template for the first user by adding to the test scenario template proprietary data relevant to the first user. Optionally, customization module 158 is also configured to obtain the proprietary data relevant to the first user from a previously monitored run of test scenario associated with the first user, and substitute a non-empty subset of the removed proprietary data with the obtained data. Additionally or alternatively, the customization module may be configured to extract proprietary data relevant to the customization of the template from the profile 152. Additionally or alternatively, the customization module 158 may be configured to obtain the proprietary data relevant to the first user from parsing a manual test scenario associated with the first user for obtaining a value associated with the first user, and substituting a non-empty subset of the removed proprietary data with the obtained value. Additionally or alternatively, the customization module 158 may be configured to obtain the proprietary data relevant to the first user from analyzing a database of the software system associated with the first user to obtain a value associated with the first user, and substituting a non-empty subset of the removed proprietary data with the obtained value.

In one embodiment, the customization module 158 is also configured to: provide the test scenario template to a second user, prompt the second user to provide a missing value, and record an input value provided by the second user. Optionally, the first user and the second user are the same user.

In one embodiment, the computer system optionally includes a user interface 157 configured to suggest to the first user to run an instantiation of the test scenario template. Optionally, the template suggested to the first user is customized by the customization module 158. For example, the template suggested to the user includes proprietary data relevant to the first user (e.g., one or more values taken from the profile 152).

In another embodiment, the computer system optionally includes a monitoring module 130. The monitoring module is configured to monitor the users 100 belonging to the different organizations and to provide data obtained from monitoring the users to the test identifier 131.

In one embodiment, the profile 152 of the first user includes transactions (e.g., code of the transactions or identifiers of the transactions) executed by the first user and the cluster selector 150 is also configured to select, from among the clusters, a certain cluster which contains runs of test scenarios that involve similar transactions to the transactions executed by the first user. Additionally or alternatively, the profile 152 of the first user may include values used by the first user during execution of transactions, and the cluster selector is configured to select, from among the clusters, a certain cluster which contains runs of test scenarios that involve similar values to the values used by the first user.

It is to be noted that different embodiments may implement components of the computer system illustrated in FIG. 8 in different ways. For example, in some embodiments one or more of the following may be implemented utilizing the same software modules, and/or software modules running on the same server: the monitoring module 130, the test identifier 131, the clustering module 132, the cluster selector 150, the template generator 156, the data cleaner 154, and the customization module 158. Additionally, one or more of the aforementioned components may be implemented on a remote server, such as a cloud-based server. In one example, clustering module 132 and the cluster selector 150 are both implemented as software running on the same server. In another example, the clustering module 132, cluster selector 150, the data cleaner 154, and the template generator 156 are implemented as a cloud-based service that receives runs of test scenarios from the users 100 belonging to the different organizations, and generates templates that may be offered new users. In this example, the customization module 158 may also be part of the cloud-based service, and may be used to prepare a template to be utilized by users. Optionally, the customization module 158 and the data cleaner 154 may be both implemented as modules of the template generator.

Figure 9:
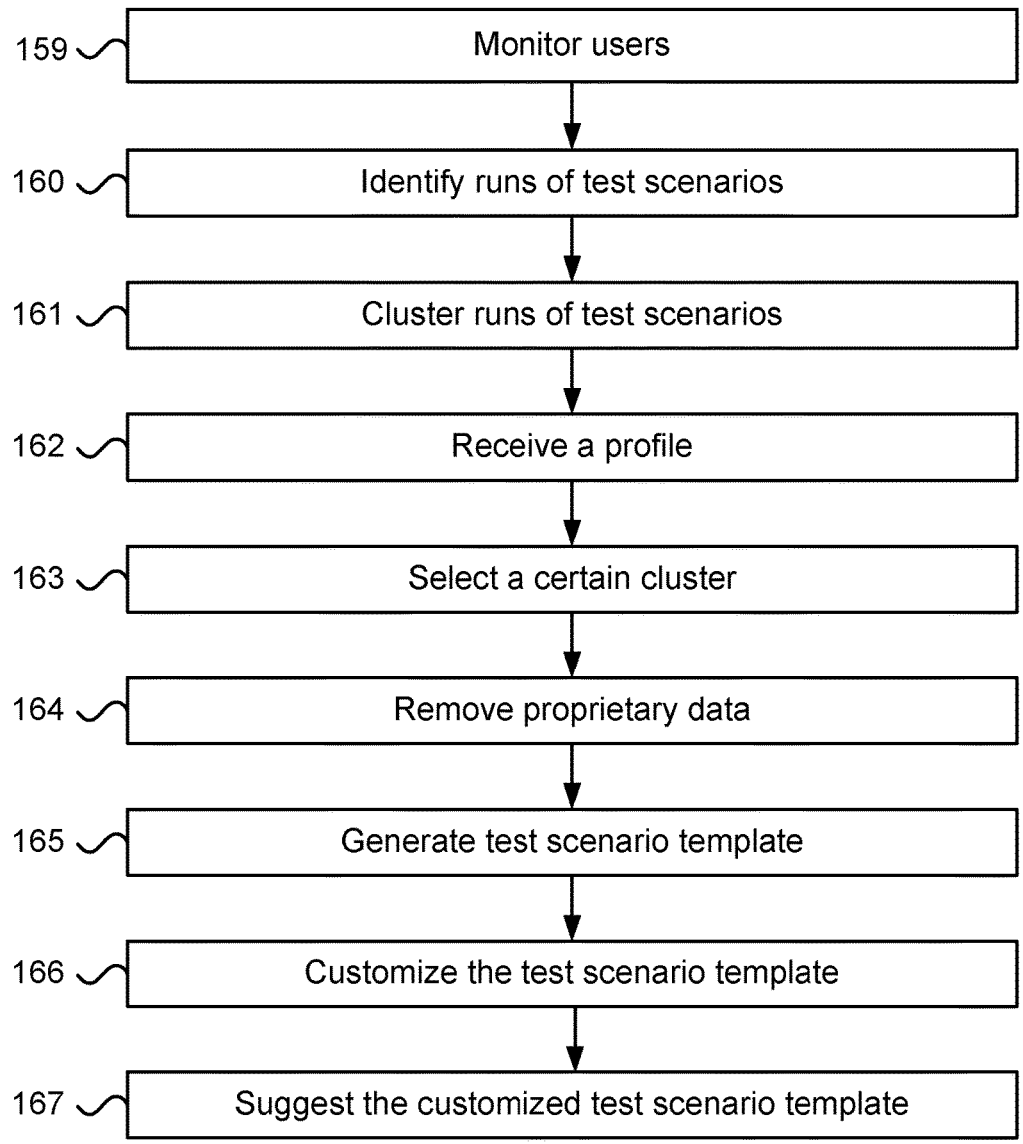
FIG. 9 illustrates one embodiment of a computer implemented method for generating a customized test scenario template based on a user profile.

FIG. 9 illustrates one embodiment of a computer implemented method for generating a customized test scenario template based on a user profile. The illustrated embodiment includes the following steps:

In step 160, identifying runs of test scenarios run by users belonging to different organizations on software systems that belong to the different organizations.

In step 161, clustering the runs of the test scenarios to clusters that include similar runs of test scenarios.

In step 162, receiving a profile of a first user. Optionally, the profile of the first user includes transactions (e.g., code of the transactions or identifiers of the transactions) executed by the first user and the selecting from the clusters of the certain cluster is done by examining transactions involved in runs in the clusters to identify a cluster containing test scenarios that involve similar transactions to the transactions executed by the first user. Optionally, the profile of the first user includes values used by the first user during execution of transactions, and the selecting of the certain cluster is done by examining values involved in runs in the clusters to identify a cluster containing test scenarios that involve similar values to the values used by the first user.

In step 163, selecting, from among the clusters, a certain cluster that suits the profile. In this embodiment, the certain cluster includes a first run of a first test scenario, associated with a first organization belonging to the different organizations, and a second run of a second test scenario, associated with a second organization belonging to the different organizations; the first run is not identical to the second run, and the first organization is not the second organization.

In step 164, removing from the first run proprietary data associated with the first organization. Optionally, step 164 may also involve removing from the second run proprietary data associated with the second organization. Optionally, most output fields of the first and second runs are removed, and as a result, the test scenario template does not include expected values for most test steps.

And in step 165, generating a test scenario template based on the first and second runs. Optionally, generation of the test scenario template is also based on the first test scenario and/or the second test scenario. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, removing from the first run proprietary data associated with the first organization in step 165 includes: selecting a value from the first run, and removing the selected value if the selected value appears in less than a first predetermined number of runs of test scenarios or the selected value appears in runs of test scenarios associated with less than a second predetermined number of different organizations. Both the first predetermined number and the second predetermined number may be greater than one.

In one embodiment, the computer implemented method includes an additional optional step 159, which involves monitoring the users belonging to different organizations and providing data collected in the monitoring for the identifying of the runs of test scenarios.

In one embodiment, the computer implemented method includes an additional optional step 166, which involves customizing the test scenario template for the first user by adding to the test scenario template proprietary data relevant to the first user. Optionally, customizing the test scenario template involves obtaining a value from a run of a previously monitored test scenario associated with the first user, and substituting a non-empty subset of the removed proprietary data with the obtained value. Optionally, customizing the test scenario template may involve parsing a manual test scenario associated with the first user in order to obtain a value associated with the first user, and substituting a non-empty subset of the removed proprietary data with the obtained value. Optionally, customizing the test scenario template may involve analyzing a database of the software system associated with the first user to obtain a value associated with the first user, and substituting a non-empty subset of the removed proprietary data with the obtained value. Optionally, customizing the test scenario template may involve extracting proprietary data useful for customization of the template from a profile of the first user.

In one embodiment, customizing the test scenario template in step 166 involves: providing the test scenario template to a second user, prompting the second user to provide a missing value, and recording an input value provided by the first user. Optionally, the first user and the second user may be the same user.

In one embodiment, the computer implemented method may include an additional optional step 167 involving suggesting to the first user to run an instantiation of the customized test scenario template. For example, the user interface 157 may be utilized to present the template to the first user.

In one embodiment, a non-transitory computer-readable medium stores program code that may be used by a computer to generate a customized test scenario template based on a user profile. The computer includes a processor, and the non-transitory computer-readable medium stores the following program code:

Program code for monitoring users belonging to different organizations to identify runs of test scenarios run on software systems belonging to the different organizations.

Program code for clustering the runs of test scenarios to clusters that include similar runs of test scenarios;

Program code for receiving a profile of a first user.

Program code for selecting, from among the clusters, a certain cluster that suits the profile. In this embodiment, the certain cluster includes a first run of a first test scenario, associated with a first organization belonging to the different organizations, and a second run of a second test scenario, associated with a second organization belonging to the different organizations; the first run is not identical to the second run, and the first organization is not the second organization.

Program code for removing from the first run proprietary data associated with the first organization. Additionally or alternatively, the program code may involve removing from the second run proprietary data associated with the second organization. Optionally, the program code for removing proprietary data involves removing most of the output fields of the first and second runs; and as a result, the test scenario template does not include expected values for most test steps.

And program code for generating a test scenario template based on the first and second runs. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the non-transitory computer-readable medium optionally stores program code for monitoring the users belonging to different organizations and providing data collected in the monitoring for the identifying of the runs of test scenarios.

In one embodiment, the profile of the first user includes descriptions of transactions executed by the first user. Optionally, the program code for the selecting of the certain cluster includes computer code for examining transactions involved in runs in the clusters in order to identify a cluster containing test scenarios that involve similar transactions to the transactions executed by the first user.

In another embodiment, the profile of the first user includes values used by the first user during execution of transactions, and the computer code for the selecting of the certain cluster includes computer code for examining values involved in runs in the clusters in order to identify a cluster containing test scenarios that involve similar values to the values used by the first user.

In one embodiment, the program code for removing from the first run proprietary data associated with the first organization includes: program code for selecting a value from the first run, and program code for removing the selected value if the selected value appears in less than a first predetermined number of runs of test scenarios or the selected value appears in runs of test scenarios associated with less than a second predetermined number of different organizations; both the first predetermined number and the second predetermined number are greater than one.

In one embodiment, the non-transitory computer-readable medium optionally stores program code for customizing the test scenario template for the first user by adding to the test scenario template proprietary data relevant to the first user. Optionally, the program code for customizing the test scenario template for the first user includes: program code for obtaining the proprietary data relevant to the first user from a previously monitored run of test scenario associated with the first user, and program code for substituting a non-empty subset of the removed proprietary data with the obtained value. Optionally, the program code for customizing the test scenario template for the first user includes: program code for obtaining the proprietary data relevant to the first user from parsing a manual test scenario associated with the first user, for obtaining a value associated with the first user, and program code for substituting a non-empty subset of the removed proprietary data with the obtained value. Optionally, the program code for customizing the test scenario template for the first user includes: program code for obtaining the proprietary data relevant to the first user from analyzing a database of the software system associated with the first user to obtain a value associated with the first user, and program code for substituting a non-empty subset of the removed proprietary data with the obtained value. Optionally, the program code for customizing the test scenario template for the first user includes program code for extracting proprietary data that may be useful for customization of the template from a profile of the first user.

Figure 10:
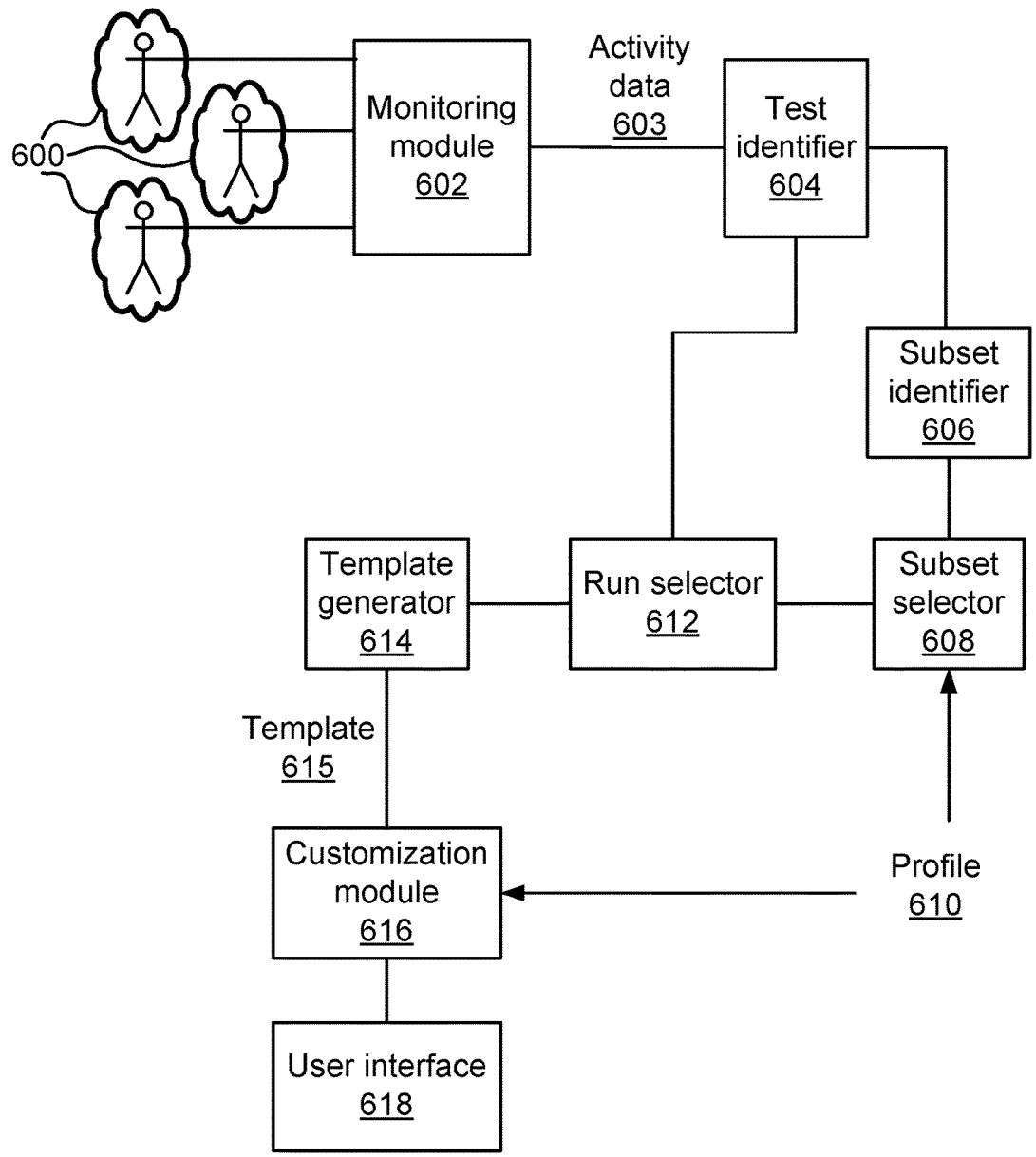
FIG. 10 illustrates one embodiment of a computer system configured to generate a test scenario template from runs of test scenarios that include a subset of test steps.
Figure 11:
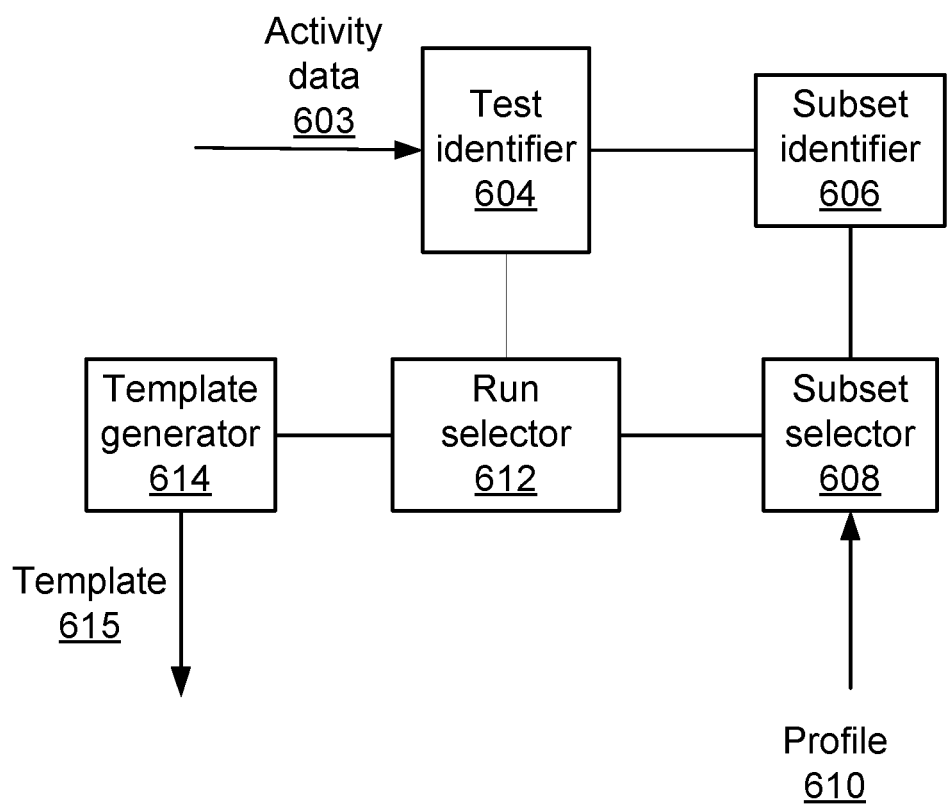
FIG. 11 illustrates one embodiment of a computer system configured to generate a test scenario template from runs of test scenarios that include a subset of test steps.

FIG. 10 and FIG. 11 illustrate embodiments of a computer system configured to generate a test scenario template from runs of test scenarios that include a subset of test steps. The computer system includes at least the test identifier 604, a subset identifier 606, a subset selector 608, a run selector 612, and a template generator 614.

The test identifier 604 is configured to identify runs of test scenarios run by users on software systems that belong to different organizations. Optionally, the users belong to the different organizations. Optionally, the test identifier 604 receives activity data 603 obtained from monitoring the users. In one example, the identified runs include at least a first run that was run by a first user belonging to a first organization and a second run that was run by a second user belonging to a second organization, and the first organization is not the second organization and the first user is not the second user.

In one embodiment, a test scenario may be characterized as including test steps; running the test scenario involves executing the test steps, and a run of the test scenario may describe the test steps. For example, each run of a test scenario may include a description of the test steps that were executed as part of running the test scenario (e.g., code executed in the test steps, values utilized by the test steps, and/or identifiers of the test steps). Optionally, since different test scenarios may include different test steps, runs of the different test scenarios may describe different subsets of test steps that were executed when running the different test scenarios. Additionally, in some cases, runs of the same test scenario may follow different control paths (e.g., due to different system behavior). Thus, in such cases, different runs of the same test scenario may describe different subsets of test steps.

The subset identifier 606 is configured to identify subsets of test steps that are frequently described in the runs of the test scenarios. Optionally, subsets may be frequently described in the runs because the test steps are frequently executed in the runs. Optionally, based on analysis of the runs, the subset identifier 606 is able to determine, for at least some of the runs of the test scenarios, at least some of the test steps that are executed while running the test scenarios. Optionally, a test step may identified by various means, such as via a name of the test step, an identifier (e.g., an identification number and/or hash value that represents the test step), code executed by the test step, and/or a description of a value associated with the test step (e.g., a value provided as input for the test step). Optionally, each run of the at least some runs, is associated with at least one subset of test steps that are described in the run and/or that were executed in the run. Optionally, a run may be associated with a number of subsets of test steps that may or may not overlap to some extent. For example, some subsets from a run may have certain test steps in common, while other subsets from the run may not have any test steps in common. Optionally, each subset includes a fixed number of test steps (e.g., three test steps). Alternatively, subsets of test steps may be of various sizes.

In one embodiment, the subset identifier 606 assigns identifiers to subsets of test steps. For example, the subsets may be stored in a database, and each run of a test scenario may be associated with one or more entries in the database that correspond to one or more subsets of test steps. Optionally, a subset of test steps may be identified by a hash value (e.g., a hash function value that is given to an input that includes a description of the test steps). Optionally, the identifiers of the subsets may be utilized to identify subsets that are frequently described in runs. For example, a database that stores subsets of test steps may have fields that store a value representing how many times the subsets of test steps were described in runs. When a new run is processed, values corresponding to subsets found in the run are incremented; thus after processing multiple runs, it may be possible to determine which subsets are frequently described by evaluating the values in the fields. In another example, entries in a hash table that accept as keys subsets of test steps, and/or identifiers of subsets of test steps, may have values that correspond to the number of times the subsets were described in runs and/or the number of organizations associated with runs in which the subsets of test steps were described. Thus, scanning the values in the hash table may help identify frequently described subsets.

Based on the test step associated with the at least some runs, the subset identifier 606 may determine which of the subsets of test steps are frequently described in the runs of the test scenarios. In one example, a subset of test steps is considered to be frequently described if its test steps are described in at least a predetermined number of the runs. In another example, a subset of test steps is considered to be frequently described if its test steps are described in at least a predetermined proportion of the runs. In yet another example, a certain number and/or a certain proportion of the subsets of test scenarios that are described the most times are considered frequently described. In this example, the subsets of test steps may be ranked according to the number of times they were described in runs of test scenarios, and the top ranked subsets are considered frequently described. For example, the top 5% of the subsets of test steps may be considered frequently described subsets of test steps.

In one embodiment, a subset of test steps is considered frequently described if the test steps included in the subset are described in runs of test scenarios associated with at least a predetermined number of different organizations. For example, the subset of test steps may need to be described in test scenarios run by users from at least five different organizations in order to be considered frequently described.

It is to be noted that a "predetermined number" refers to a fixed number known a priori, or to a number derived according to logic that is known a priori. For example, a threshold for a number of runs may be 10% of the runs (in this case the logic for computing the predetermined number is known a priori, but the actual number is determined at runtime when the number of runs is known).

The subset selector 608 is configured to receive a profile 610 of a first user and, based on the profile 610, to select a certain subset, from among the frequently described subsets of test steps, which is appropriate for the first user. Optionally, the profile 610 indicates test steps that are likely to be relevant to the first user. For example, the profile may include previous runs of test scenarios of the first user and/or list specific transactions executed by the first user and/or an organization to which the first user belong. Optionally, the certain subset contains at least one test step that involves execution of a transaction that is not mentioned in the profile 610. Optionally, the certain subset contains at least one test step that involves a value that is not mentioned in the profile 610.

In one embodiment, the profile 610 describes transactions executed by the first user. The subset selector 608 is configured to select from the subsets of frequently described test steps a certain subset which contains at least one test step that involves a transaction similar to a transaction executed by the first user. Optionally, a subset of test steps that includes at least one test step executed by the first user is considered appropriate for the first user. For example, if based on the profile 610, the first user is known to frequently execute a test step involving creating a new client record, then subsets of test steps involving the test step of creating a new client record may be considered appropriate for the first user.

In one embodiment, similar transactions refer to transactions that behave similarly and/or have essentially the same functionality. For example, a "create" transaction for a material number and a "change" transaction for the material number are similar because they process essentially the same date, e.g., the create transaction introduces the material number and its related properties, and the change transaction manipulates the properties of the material number. In another embodiment, two transactions are similar when one includes a certain option while the other does not include the certain option. In still another embodiment, there are transactions in which most of the steps are the same, and the difference is in the user interface. For example, SAP transaction ST03 and SAP transaction ST03N have a different interface but essentially the same functionality.

In another embodiment, the profile 610 describes values used by the first user during execution of transactions. The subset selector 608 is configured to select from the subsets of frequently described test steps a certain subset that contains at least one test step that involves a value similar to a value used by the first user to execute a transaction. Optionally, a subset of test steps that includes at least one test step that involves a value similar to a value used by the first user is considered appropriate for the first user. For example, if the profile 610 indicates that the first user executes test steps in which the accounting department is frequently the destination for messages, then a subset of test steps that includes a test step which uses the accounting department as a destination for messages may be considered appropriate for the user. It is to be understood that the user in this embodiment may be a tester and/or a production user who executes test steps as part of his/her usual working procedure.

In yet another embodiment, a subset of test steps may be considered appropriate for the first user, if based on the profile 610, it may be determined that the first user executed at least a predetermined number and/or a predetermined proportion, of the test steps in the subset. For example, a subset of test steps may be considered appropriate for the first user if the profile 610 indicates that at least 50% of the test steps in the subset were executed by the first user. Optionally, the at least 50% of the steps are described in various runs of test scenarios. For example, each of the test steps is described in a different run). Optionally, the at least 50% of the steps are described in a single run; that is, there is a certain run corresponding to an instantiation of a test scenario in which the first user executed the at least 50% of the test steps.

In still another embodiment, a subset of test steps may be considered appropriate for the first user, if based on the profile 610, it may be determined that the first user executed test steps that involve at least a predetermined number and/or a predetermined proportion, of the values utilized in test steps belonging to the subset. For example, a subset of test steps may be considered appropriate for the first user if the profile 610 indicates that at least 80% of the values in test steps in the subset were utilized by the first user. Optionally, the at least 80% of the values are described in various runs of test scenarios. For example, each of the values may be described in a different run). Optionally, the at least 80% of the values are described in a single run; that is, there is a certain run corresponding to an instantiation of a test scenario in which the first user utilized the at least 80% of the values while running the test scenario.

The run selector 612 is configured to receive the certain subset of test steps, and to select from among the runs of the test scenarios, a first run of a first test scenario that is associated with a first organization belonging to the different organizations, and a second run of a second test scenario that is associated with a second organization belonging to the different organizations. The first run includes a first subset of test steps that is essentially identical to the certain subset, and the second run includes a second subset of test steps that is essentially identical to the certain subset. Optionally, the first organization and the second organization are different organizations. Optionally, the first user is not associated with any of the first organization and the second organization.

In one embodiment, subset of test steps A is essentially identical to subset of test steps B, if the test steps in A are the same as the test steps in B, but possibly involve different values. For example, A and B involve execution of the same transactions however some of the default values in A might be different from the default values in B.

In another embodiment, subset of test steps A is essentially identical to subset of test steps B, if the test steps in A involve execution of similar transactions to transactions involved in executions of the test steps in B. For example, the transactions executed by test steps from A may be the same type as the transactions executed by test from B (e.g., they perform a similar action or involve similar system components). In another example, most of the transactions executed in test steps in to A are also executed in test steps in B, and vice versa.

The template generator 614 is configured to generate a test scenario template 615 based on the first and second runs. Optionally, the test scenario template 615 identifies a transaction used in the first and second runs, and possible values for running the transaction. Optionally, the identified transaction is a transaction that was executed in both the first and second runs, and the possible values for running the identified transaction are obtained directly from the first and/or second runs, or derived from the first and/or second runs.

In one embodiment, the computer system optionally includes a customization module 616. The customization module 616 is configured to customize the test scenario template 615 for the first user by adding to the test scenario template 615 proprietary data relevant to the first user. Optionally, at least some of the proprietary data if obtained from the profile 610. Additionally, the computer system may include an optional user interface 618 configured to suggest to the first user to run an instantiation of the customized test scenario template.

In one embodiment, the customization module 616 is configured to obtain the proprietary data relevant to the first user from a previously monitored run of test scenario associated with the first user, and substitute a non-empty subset of the removed proprietary data with the obtained value. Optionally, a run may be considered associated with the first user if the run was run by the first user and/or the run is associated with an organization to which the first user belongs. Additionally or alternatively, the customization module 616 may be also configured to obtain the proprietary data relevant to the first user from parsing a manual test scenario associated with the first user for obtaining a value associated with the first user, and substituting a non-empty subset of the removed proprietary data with the obtained value. Optionally, a manual test scenario may be considered associated with the first user if the first user ran an instantiation of the test scenario and/or is supposed to run an instantiation of the test scenario (e.g., according to a testing plan). Additionally or alternatively, the customization module 616 may be also configured to obtain the proprietary data relevant to the first user from analyzing a database of the software system associated with the user to obtain a value associated with the first user, and substituting a non-empty subset of the removed proprietary data with the obtained value.

In another embodiment, the customization module 616 is also configured to: provide the test scenario template 615 to a second user, prompt the second user to provide a missing value, and record an input value provided by the second user. Optionally, the first user and the second user are the same user.

In another embodiment, the computer system optionally includes a monitoring module 602. The monitoring module is configured monitor the users 600 belonging to the different organizations, and to provide activity data 603 obtained from monitoring the users 600 to the test identifier 604.

It is to be noted that different embodiments may implement components of the computer systems illustrated in FIG. 10 and/or FIG. 11 in different ways. For example, in some embodiments one or more of the following may be implemented utilizing the same software modules, and/or software modules running on the same server: the monitoring module 602, the test identifier 604, the subset identifier 606, the subset selector 608, the run selector 612, the template generator 614, the customization module 616, and the user interface 618. Additionally, one or more of the aforementioned components may be implemented on a remote server, such as a cloud-based server. In one example, subset identifier 606 and the subset selector 608 are both implemented as software running on the same server. In another example, the subset identifier 606, the subset selector 608, the runs selector 612, and the template generator 614 are implemented as a cloud-based service that receives runs of test scenarios run by the users 600 belonging to the different organizations, and generates templates that may be offered new users. In this example, the customization module 616 may also be part of the cloud-based service, and may be used to prepare a template to be utilized by users. Optionally, each of the customization module 616 and the run selector 612 may be implemented as modules of the template generator 614.

Figure 12:
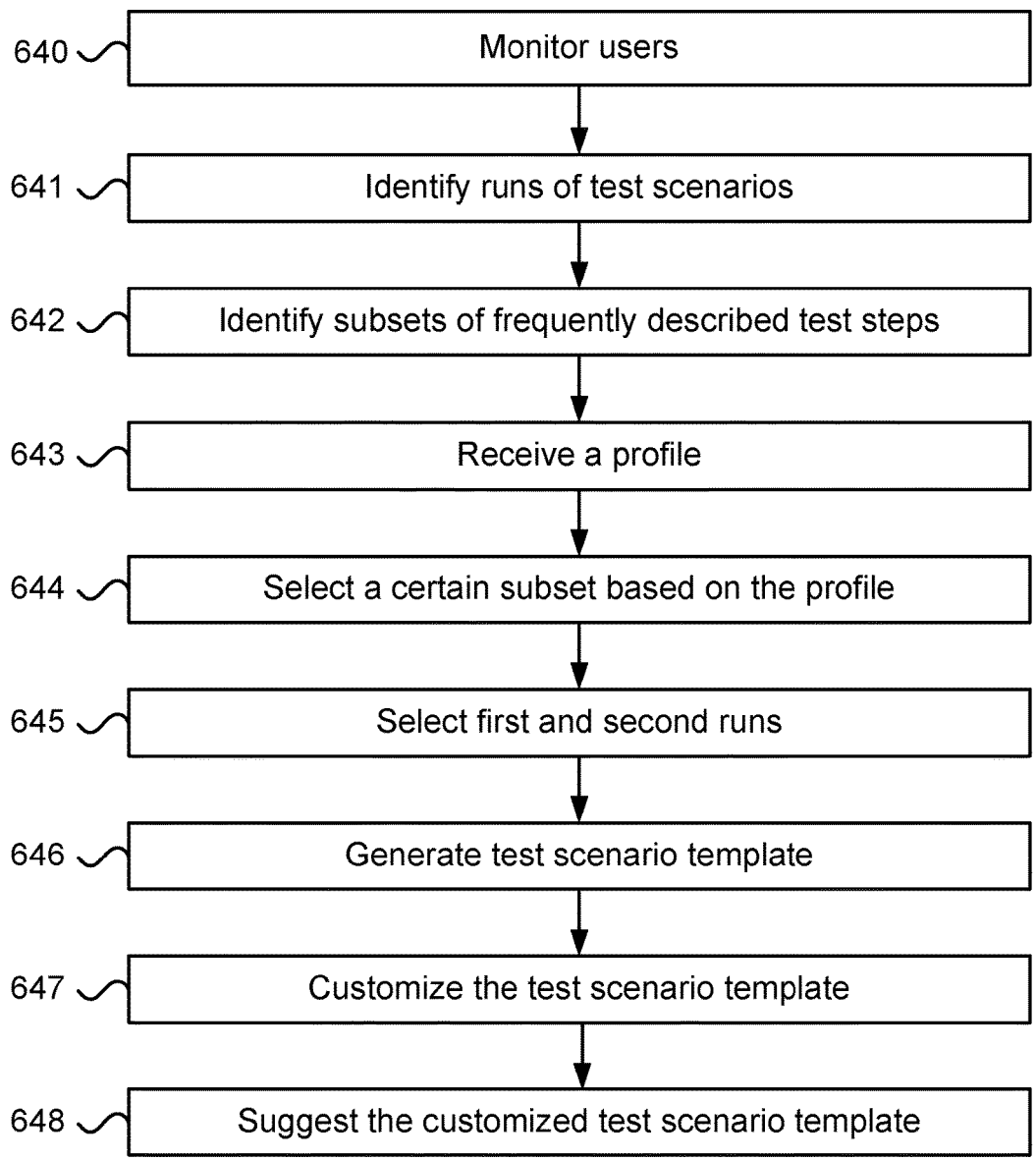
FIG. 12 illustrates one embodiment of a computer implemented method for generating a test scenario template from runs of test scenarios that include a subset of test steps.

FIG. 12 illustrates one embodiment of a computer implemented method for generating a test scenario template from runs of test scenarios that include a subset of test steps. The illustrated embodiment includes the following steps:

In step 641, identifying runs of test scenarios run by users belonging to different organizations on software systems that belong to the different organizations; each run of a test scenario describes test steps.

In step 642, identifying subsets of test steps that are frequently described in the runs of the test scenarios. Optionally, a subset of test steps is frequently described in the runs of the test scenarios if the test steps included in the subset are described in at least a predetermined number of the runs of test the test scenarios. Optionally, a subset of test steps is frequently described in the runs of the test scenarios if the test steps included in the subset are described in runs of test scenarios associated with at least a predetermined number of different organizations.

In step 643, receiving a profile of a first user.

In step 644, selecting, based on the profile, a certain subset, from among the subsets, which is appropriate for the first user.

In step 645, selecting, from among the identified runs, a first run of a first test scenario and a second run of a second test scenario. The first run is associated with a first organization belonging to the different organizations and the second run is associated with a second organization belonging to the different organizations. In addition, the first run includes a first subset of test steps that is essentially identical to the certain subset and the second run includes a second subset of test steps that is essentially identical to the certain subset. Optionally, the first organization and the second organization are different organizations. Optionally, the first user is not associated with any of the first organization and the second organization.

And in step 646, generating a test scenario template based on the first and second subsets of test steps.

In one embodiment, the computer implemented method includes an additional optional step 647, which involves customizing the test scenario template for the first user by adding to the test scenario template proprietary data relevant to the first user. Optionally, customizing the test scenario template involves obtaining a value from a run of a previously monitored test scenario associated with the first user, and substituting a non-empty subset of the removed proprietary data with the obtained value. Alternatively or additionally, customizing the test scenario template may involve parsing a manual test scenario associated with the first user in order to obtain a value associated with the first user, and substituting a non-empty subset of the removed proprietary data with the obtained value. Alternatively or additionally, customizing the test scenario template may involve analyzing a database of the software system associated with the first user to obtain a value associated with the first user, and substituting a non-empty subset of the removed proprietary data with the obtained value.

In one embodiment, customizing the test scenario template in step 647 involves: providing the test scenario template to a second user, prompting the second user to provide a missing value, and recording an input value provided by the first user. Optionally, the first user and the second user may be the same user.

In one embodiment, the computer implemented method includes an additional optional step 648 involving suggesting to the first user to run an instantiation of the customized test scenario template. For example, the user interface 618 may be utilized to present the template to the first user.

In one embodiment, the computer implemented method illustrated in FIG. 12 includes an optional step of removing proprietary data associated with at least one of the different organizations from at least one of the runs of test scenarios. Optionally, most output fields of the first and second runs are removed, and as a result, the test scenario template does not include expected values for most test steps. Additionally or alternatively, the computer implemented method may include a step of removing proprietary data that is associated with at least one of the first and second organizations from the template.

In one embodiment, the computer implemented method includes an additional step 640, which involves monitoring the users belonging to different organizations and providing data collected in the monitoring for the identifying of the runs of test scenarios.

In one embodiment, a non-transitory computer-readable medium stores program code that may be used by a computer to generate a test scenario template from runs of test scenarios that include a subset of test steps. The computer includes a processor, and the non-transitory computer-readable medium stores the following program code:

Program code for identifying runs of test scenarios run by users on software systems that belong to different organizations; each run of a test scenario describes test steps.

Program code for identifying subsets of test steps that are frequently described in the runs of the test scenarios.

Program code for receiving a profile of a first user.

Program code for selecting, based on the profile, a certain subset, from among the subsets, which is appropriate for the first user. Optionally, a subset of test steps is frequently described in the runs of the test scenarios if the test steps included in the subset are described in at least a predetermined number of the runs of test the test scenarios. Optionally, a subset of test steps is frequently described in the runs of the test scenarios if the test steps included in the subset are described in runs of test scenarios associated with at least a predetermined number of different organizations.

Program code for selecting, from among the identified runs, a first run of a first test scenario and a second run of a second test scenario. The first run is associated with a first organization belonging to the different organizations and the second run is associated with a second organization belonging to the different organizations. Additionally, the first run involves a first subset of test steps that is essentially identical to the certain subset and the second run involves a second subset of test steps that is essentially identical to the certain subset. Optionally, the first organization and the second organization are different organizations. Optionally, the first user is not associated with any of the first organization and the second organization.

And program code for generating a test scenario template based on the first and second subsets of test steps.

In one embodiment, the non-transitory computer-readable medium optionally stores program code for monitoring activity of the users on software systems belonging to the different organizations and providing data obtained from the monitoring for use in the identifying of the runs of the test scenarios.

In one embodiment, the non-transitory computer-readable medium optionally stores program code for suggesting to the first user to run an instantiation of the customized test scenario template.

In one embodiment, the non-transitory computer-readable medium optionally stores program code for removing proprietary data associated with at least one of the different organizations from at least one of the runs of test scenarios.

In one embodiment, the non-transitory computer-readable medium optionally stores program code for removing proprietary data associated from at least one of the first organization and the second organization from the test scenario template.

In one embodiment, the non-transitory computer-readable medium optionally stores program code for customizing the test scenario template for the user by adding to the test scenario template proprietary data relevant to the user.

Figure 13:
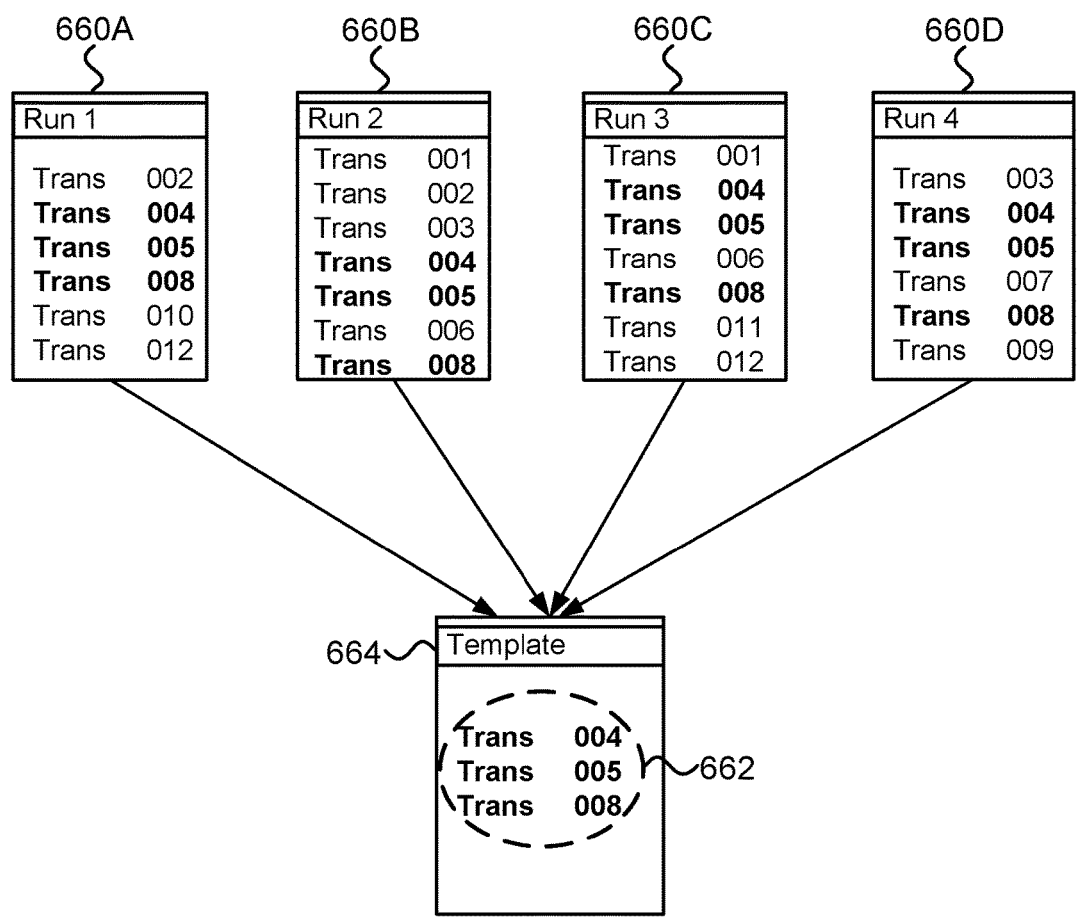
FIG. 13 illustrates generation of a test scenario template from a subset of test steps that is frequently executed as part of running test scenarios.

FIG. 13 illustrates generation of a test scenario template 664 from a subset of test steps 662 that is frequently executed as part of running test scenarios. In this illustration, each test step corresponds to a transaction executed when running a test scenario. Thus, transactions 001 to 012 ("Trans 001" to "Trans 012" in FIG. 13) may be considered to correspond to 12 possible test steps that may be included in the template 664. Runs of test scenarios 660A-D include multiple test steps that involve running subsets of the various transactions 001 to 012. A certain subset of test steps 662 that involve transactions 004, 005, and 008 appears in each of the runs 660A-D (these transaction are emphasized in bold in the runs 660A-660D). The portions relevant to the certain subset (are taken from the runs 660A-4 and combined into test scenario template 664. Note that the test scenario template involves running only the common subset of test steps (transactions 004, 005, and 008), and no other transactions executed as part of other test steps in the runs 660A-D.

Figure 14:
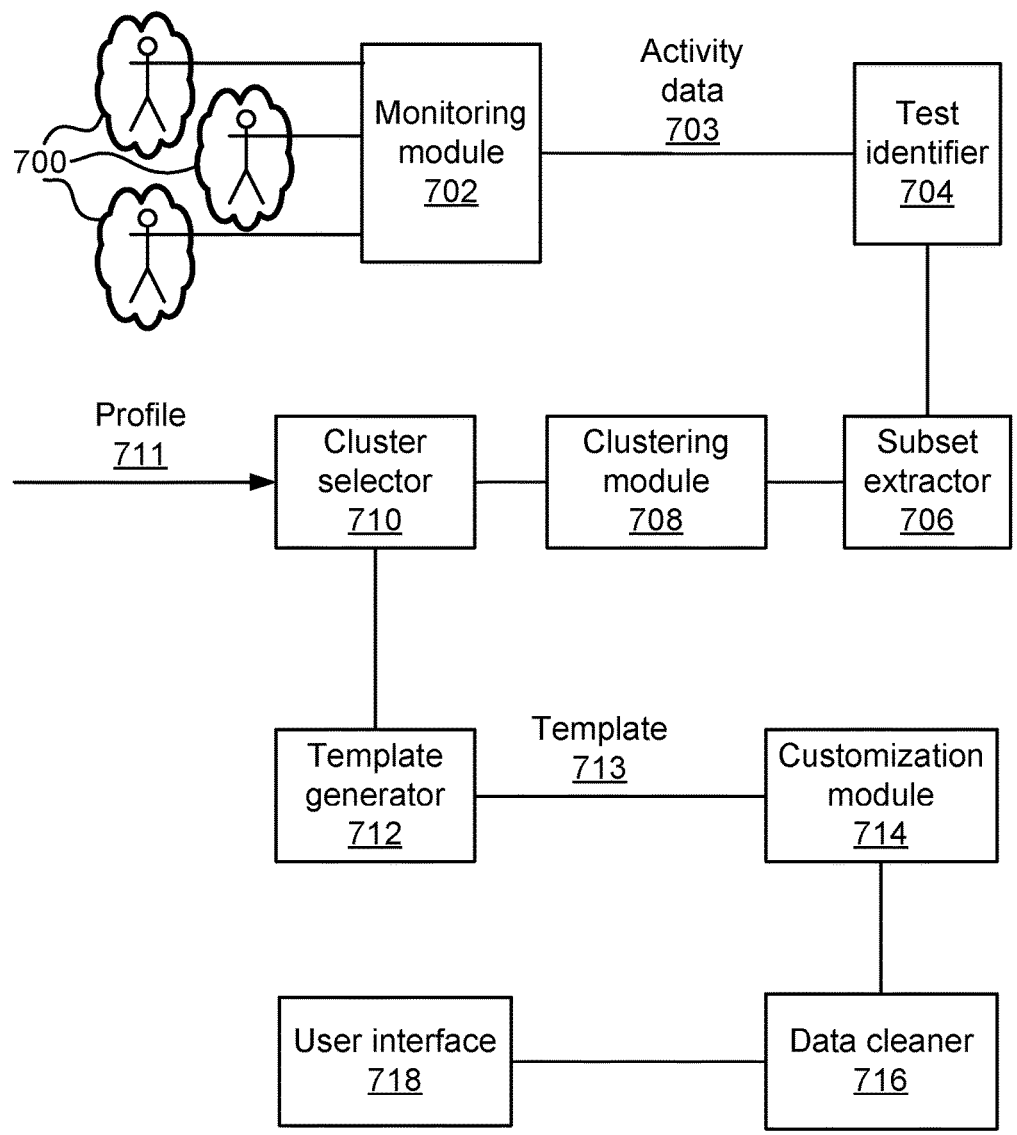
FIG. 14 illustrates one embodiment of a computer system configured to generate a test scenario template from a cluster of similar partial runs of test scenarios.
Figure 15:
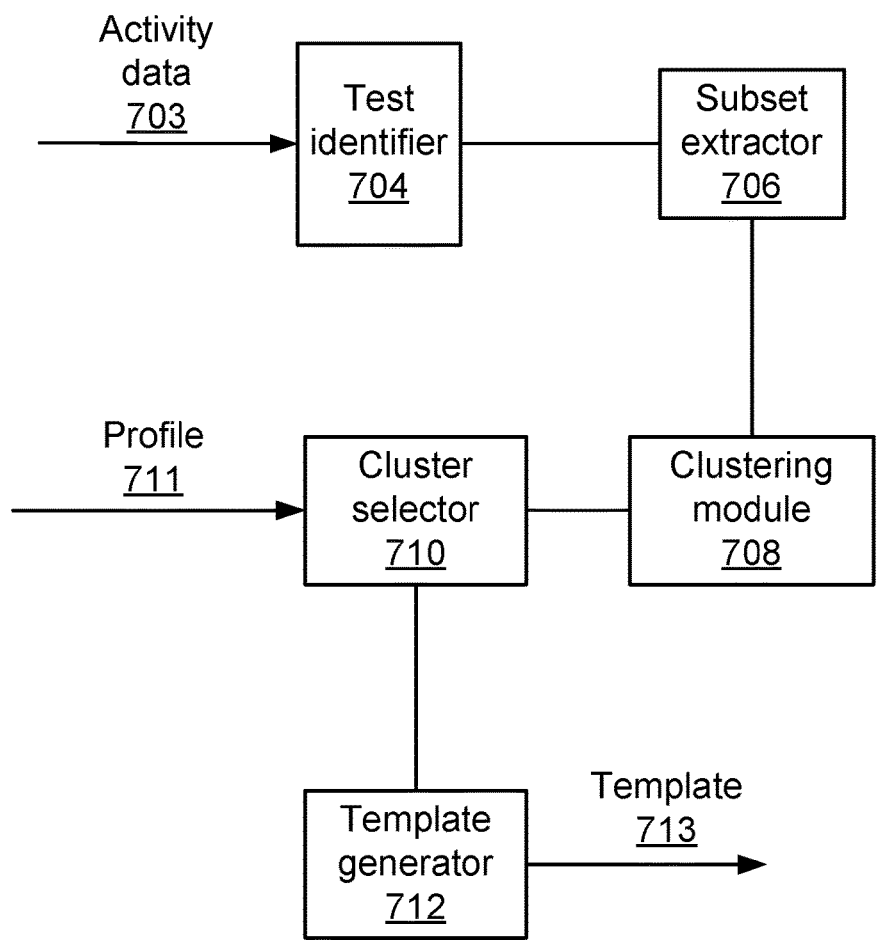
FIG. 15 illustrates one embodiment of a computer system configured to generate a test scenario template from a cluster of similar partial runs of test scenarios.

FIG. 14 and FIG. 15 illustrate embodiments of a computer system configured to generate a test scenario template from a cluster of similar partial runs of test scenarios. The computer system includes at least the test identifier 704, a subset extractor 706, a clustering module 708, a cluster selector 710, and a template generator 712.

The test identifier 704 is configured to identify runs of test scenarios run by users on software systems that belong to different organizations. Optionally, the users belong to different organizations. Optionally, the runs are identified, at least in part, from activity data 703. In one example, the identified runs include at least a first run that was run by a first user belonging to a first organization and a second run that was run by a second user belonging to a second organization, and the first organization is not the second organization and the first user is not the second user.

In one embodiment, a test scenario may be characterized as including test steps, running the test scenario may involve execution of the test steps, and a run of the test scenario may describe the test steps. Optionally, the test identifier 704 determines for at least some of the runs of the test scenarios, at least some of the test steps that are executed while running the test scenarios. Optionally, test steps may be identified by various ways, such as by a name, code, description, and/or serial number. Optionally, each run of the at least some runs, is associated with at least one subset of test steps that were executed in the run.

The subset extractor 706 is configured to receive a run of a test scenario and to generate from the run of the test scenario a partial run of the test scenario by extracting from the run of the test scenario data pertaining to a proper subset of the test steps described in the run. The partial run is a run of a test scenario that includes data from the received run of a test scenario that pertains to the test steps belonging to the proper subset of the test steps. Optionally, the extracted data pertaining to the proper subset also pertains to other test steps that do not belong to the proper subset. For example, at least some of the extracted data includes an input value used for a test step that is not in the proper subset. Optionally, the extracted data is marked as relevant to the proper subset. For example, a file containing a run of a test scenario may be associated with a record indicating certain portions of the file.

In one embodiment, a partial run is generated by parsing the received run of the test scenario and selecting certain portions of the received run to be included in the partial run. Optionally, the certain portions are related to the proper subset of the test steps. Optionally, the certain portions may undergo processing prior to being included in the partial run.

In another embodiment, a partial run is generated by processing data included in the received run of the test scenario; for example, summarizing the received run, converting representation of data in the received run (e.g., from a list of commands to a table of test steps), and/or representing data in the received run using canonical data (e.g., test steps in the received run are described by default or exemplary test steps that are similar to them). Thus, in some cases, the partial run that is generated from the received run may not necessarily contain portions of the received run as they appear in the received run.

In one embodiment, the proper subset of the test steps described in the run has a predetermined size. For example, predetermined size may be two or three. Alternatively, the proper subset may have different sizes under different circumstances. For example, the size may be proportional to the average number of test steps in the runs of test scenarios (e.g., at least 20% of the average number of test steps).

Herein, the term "proper subset" is used as follows: set A is a proper subset of set B if set B includes all elements in set A, and additionally set B includes at least one element that is not in set A.

In one embodiment, the subset extractor 706 receives an indication of which test steps are included in the run of the test scenario. For example, the indication is received from the test identifier 704. Additionally or alternatively, the subset extractor 706 may participate in the identification of at least some of the test steps that belong to the run of the test scenario.

In one embodiment, each run of a test scenario includes a sequence of test steps and the proper subset of the test steps in the run includes a subsequence of the sequence of the test steps in the run. In one example, the subsequence is a prefix of the sequence of test steps or a suffix of the sequence of test steps. In another example, the subsequence is an internal subsequence, which does not include the first or the last test steps in the sequence.

As used herein, a prefix of a sequence is a subsequence that starts with the first test step in the sequence. Similarly, a suffix of a sequence is a subsequence that ends with the last test step in the sequence.

In one embodiment, the subset extractor 706 is configured to generate from the run of the test scenario a number, greater than one, of partial runs of the test scenario. Optionally, each partial run of the number of partial runs is generated from a different proper subset of test steps. Optionally, the number of partial runs that is generated from a run of a test scenario is a fixed predetermined number. Alternatively, the number of partial runs is proportional to the number of test steps in the run of the test scenario. In one example, the number of partial runs is linear in the number of test steps in the run. In another example, the number of partial runs increases quadratically with the number of test steps in the run.

In one embodiment, the proper subset of the test steps described in the run includes at least one test step that is frequently executed when running the test scenarios. Optionally, a test step is considered frequently executed as part of miming the test scenarios if the test step is described in at least a predetermined number of the runs of test the test scenarios. Additionally or alternatively, a test step may be considered frequently executed if the test step is described in runs of test scenarios that are associated with at least a predetermined number of different organizations.

The clustering module 708 is configured to receive partial runs of test scenarios generated from the runs of the test scenarios and to cluster the partial runs of the test scenarios to clusters that include similar partial runs. Optionally, the clusters may be of various sizes, and include partial runs of different users belonging to different organizations.

It is to be noted, that partial runs of test scenarios may be treated by system modules essentially the same as runs of a test scenarios would be treated, since the partial runs may include the same type of data as the runs of test scenarios and/or data derived from the runs of the test scenarios. Thus, the partial runs may be clustered utilizing the same approaches used for clustering the runs of test scenarios (e.g., algorithms, vector representation, and similarity functions). Additionally, partial runs may undergo removal of proprietary data, and/or customization, similarly to how runs of test scenarios undergo these processes. Additionally, partial runs may be utilized to generate test scenario templates similarly to how runs of test scenarios may be utilized for that purpose.

The cluster selector 710 is configured to receive a profile 711 of a first user and, based on the profile 711, to select a certain cluster, from among the clusters of partial runs, which is appropriate for the first user. Optionally, the profile 711 indicates test steps that are likely to be relevant to the first user. For example, the profile 711 may include previous runs of test scenarios of the first user and/or list specific transactions executed by the first user and/or an organization to which the first user belong. Optionally, the certain cluster contains a partial run with at least one test step that involves execution of a transaction that is not mentioned in the profile 711. Optionally, the certain cluster contains at least one partial run with a test step that involves a value that is not mentioned in the profile 711.

The template generator 712 is configured to generate a test scenario template 713 based on the first and second runs. Optionally, the test scenario template 713 identifies a transaction used in the first and second runs, and possible values for running the transaction. Optionally, the identified transaction is a transaction that was tested in both the first and second runs, and the possible values for running the identified transaction are obtained directly from the first and/or second runs, or derived from the first and/or second runs.

In one embodiment, the computer system optionally includes a customization module 714. The customization module 714 is configured to customize the test scenario template 713 for the first user by adding to the test scenario template 713 proprietary data relevant to the first user. Optionally, at least some of the proprietary data is obtained from the profile 711. Additionally, the computer system may include an optional user interface 718 configured to suggest to the first user to run an instantiation of the test scenario template.

In one embodiment, the computer system optionally includes a data cleaner 716. The data cleaner 716 is configured to remove from the template proprietary data. Additionally or alternatively, the data cleaner may be configured to remove proprietary data from the partial runs, form the runs of the test scenarios, and/or from the activity data 703. Optionally, the data cleaner 716 is also configured to remove a selected value from a run or a partial run based on at least one of: number of runs of test scenarios in which the value appears, and number of different organizations associated with the runs of the test scenarios in which the value appears. Optionally, most output fields of the first and second partial runs are removed, and as a result, the test scenario template does not include expected values for most test steps.

In another embodiment, the computer system optionally includes a monitoring module 702. The monitoring module 702 is configured monitor the users 700 that belong to the different organizations and to provide the activity data 703 obtained from monitoring the users 700 to the test identifier 704.

In one embodiment, determining whether a cluster of partial runs is suitable for the first user is based on the profile 711. Optionally, the cluster may be considered suitable for the first user if partial runs belonging to the cluster describe at least one test step that is indicated in the profile 711 as being frequently described in runs of test scenarios of the first user. Optionally, a test step is indicated as being frequently described in runs of the first user if the profile 711 indicates that it was executed a large number of times. For example, the test step was executed more than 10 times, and/or in more than 5% of the runs. Optionally, a test step is indicated as being frequently described in runs of the first user if the profile 711 includes a large number of runs of test scenarios that describe the test step as being executed in the test scenarios. For example, the test step is described in 5% of runs that are included in the profile 711 and/or at least 17 different runs included in the profile 711.

In another embodiment, a cluster of partial runs is suitable, based on the profile 711, for the first user if partial runs belonging to the cluster utilize at least one value included in the profile 711 of the first user. For example, if the profile 711 indicates that the first user access an external database, a cluster that includes partial runs that have a test step that involves the same external database (e.g., by reading from it or writing to it), may be considered suitable for the first user.

In yet another embodiment, a cluster of partial runs is suitable, based on the profile 711, for the first user if partial runs belonging to the cluster include a frequently described subset of test steps. Additionally, the profile 711 indicates that at least one test step belonging to the subset is utilized by the first user. For example, the at least one test step is described in runs of test scenarios included in the profile 711. In another example, one or more similar test steps to the at least one test step are described in runs of test scenarios included in the profile 711. Optionally, a subset of test steps may be considered frequently described if the test steps included in the subset are described in at least a predetermined number of the partial runs. For example, the predetermined number may be 10 or 5% of the partial runs. Optionally, a subset of test steps may be considered frequently described if the test steps included in the subset are described in partial runs associated with at least a predetermined number of different organizations. For example, the predetermined number may be 3 or 10% of the different organizations.

It is to be noted that different embodiments may implement components of the computer systems illustrated in FIG. 14 and/or FIG. 15 in different ways. For example, in some embodiments one or more of the following may be implemented utilizing the same software modules, and/or software modules running on the same server: the monitoring module 702, the test identifier 704, the subset extractor 706, the clustering module 708, the cluster selector 710, the template generator 712, the customization module 714, the data cleaner 716, and the user interface 718. Additionally, one or more of the aforementioned components may be implemented on a remote server, such as a cloud-based server.

In one example, subset extractor 706 and the clustering module 708 are both implemented as software running on the same server. Optionally, the clustering module 708 extracts subsets and generates partial runs prior to clustering. In another example, the cluster selector 710 and the template generator 712 are realized by the same software module, which receives the profile 711 and generates the template 713. In another example, the subset extractor 706, the clustering module 708, the cluster selector 710, and the template generator 712 are implemented as a cloud-based service that receives runs of test scenarios run by the users 700 belonging to the different organizations, and generates templates that may be offered new users. In this example, the data cleaner 716 and/or the customization module 714 may also be part of the cloud-based service, and may be used to prepare a template to be utilized by users. Optionally, each of the customization module 714 and the data cleaner 716 may be implemented as modules of the template generator.

In one embodiment, the template 713 undergoes customization by the customization module 714 prior to removal of proprietary data from the template 713 by the data cleaner 716. In another embodiment, the order is reversed: proprietary data is removed from the template 713 by the data cleaner 716, and then the template 713 is customized by the customization module 714. In still another embodiment, customizing the template 713 and removing proprietary data from it are performed by the same software module. Optionally, the software module utilizes the profile 711 to determine which proprietary data needs to be removed from the template 713, and which proprietary data should be added to the template 713 when customizing it.

Figure 16:
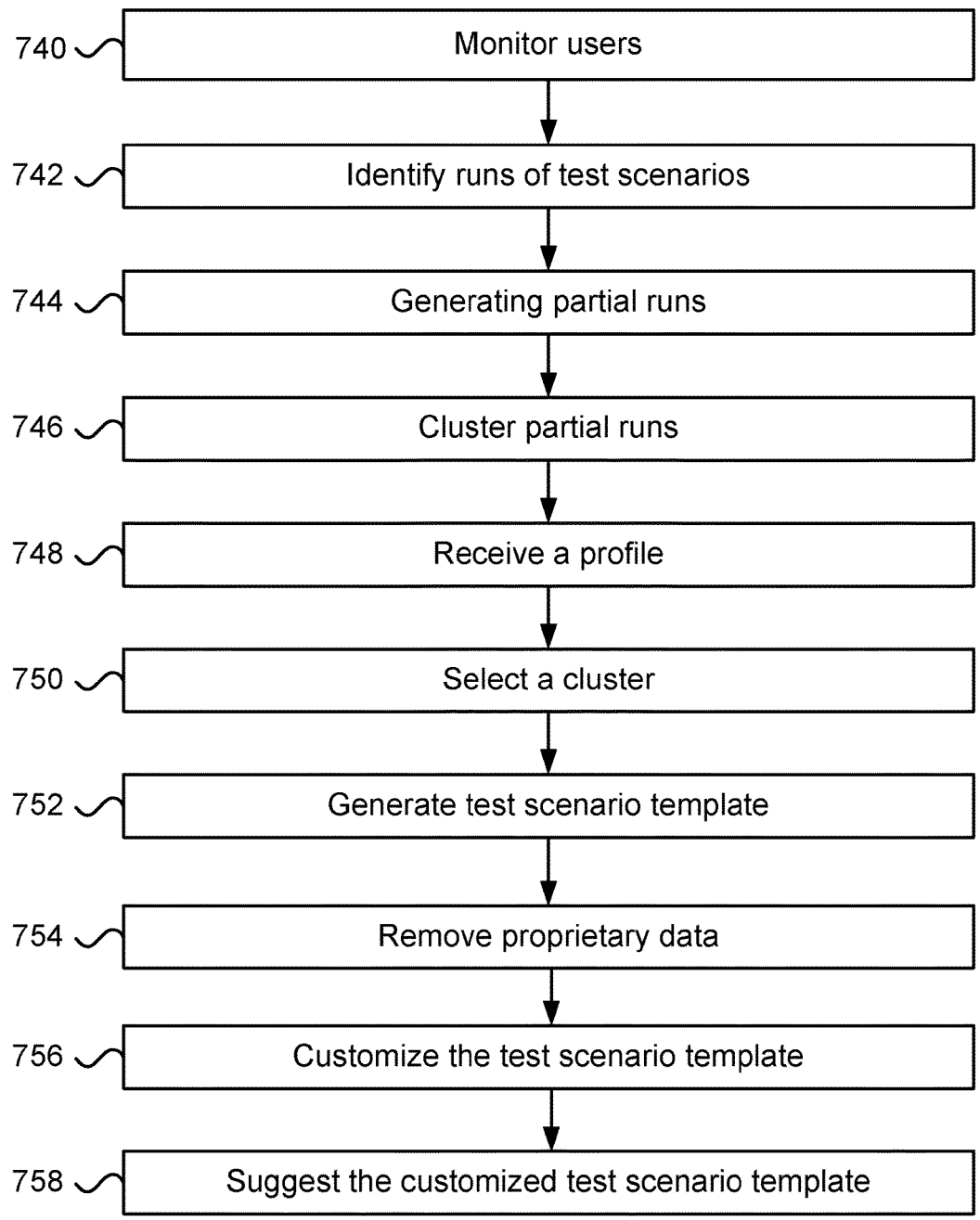
FIG. 16 illustrates one embodiment of a computer implemented method for generating a test scenario template from a cluster of subsets of test steps taken from runs of test scenarios.

FIG. 16 illustrates one embodiment of a computer implemented method for generating a test scenario template from a cluster of subsets of test steps taken from runs of test scenarios. The illustrated embodiment includes the following steps:

In step 742, identifying runs of test scenarios run by users on software systems that belong to different organizations. Each run of the identified runs of a test scenario describes test steps.

In step 744, generating partial runs of the test scenarios by extracting from each run of a test scenario data pertaining to a proper subset of the test steps described in the run. Optionally, a partial run is itself a run of a test scenario. Optionally, a partial run generated from a run of a test scenario includes information taken from the run that pertains to the test steps belonging to the proper subset of the test steps. Optionally, the proper subset of the test steps in the run has a predetermined size, such as two or three. Optionally, each run of a test scenario includes a sequence of test steps and the proper subset of the test steps in the run includes a subsequence of the sequence of the test steps in the run. Optionally, the subsequence is a prefix of the sequence of test steps or a suffix of the sequence of test steps.

In step 746, clustering the partial runs of the test scenarios into clusters of similar partial runs. Optionally, the clustering involves processing one or more of the following logged activities: a list of users who ran the test scenarios, an analysis of access to a database, messages returned from executed transactions, values returned by fields, and procedures utilized by a test scenario.

In step 748, receiving a profile of a first user.

In step 750, selecting, based on the profile, from among the clusters a certain cluster suitable for the first user. Optionally, the certain cluster includes a first partial run of a first test scenario that is associated with a first organization belonging to the different organizations, and a second partial run of a second test scenario that is associated with a second organization belonging to the different organizations.

And in step 752, generating a test scenario template based on the first and second partial runs. Optionally, the test scenario template identifies a transaction used in the first and second partial runs, and possible values for running the transaction. Optionally, at least one of the possible values for running the transaction does not appear in each of the first and second partial runs. Optionally, the test scenario template includes a combination of the possible values, and the combination does not appear in any of the first and second partial runs.

In one embodiment, the computer implemented method optionally includes an additional step 740, which involves monitoring the users belonging to different organizations and providing data collected in the monitoring for the identifying of the runs of test scenarios.

In one embodiment, the computer implemented method optionally includes an additional step 756, which involves customizing the test scenario template for the first user by adding to the test scenario template proprietary data relevant to the first user. In one example, customizing the test scenario template involves obtaining a value from a run of a previously monitored test scenario associated with the first user, and substituting a non-empty subset of the removed proprietary data with the obtained value. In another example, customizing the test scenario template involves parsing a manual test scenario associated with the first user in order to obtain a value associated with the first user, and substituting a non-empty subset of the removed proprietary data with the obtained value. In yet another example, customizing the test scenario template involves analyzing a database of the software system associated with the first user to obtain a value associated with the first user, and substituting a non-empty subset of the removed proprietary data with the obtained value.

In one embodiment, customizing the test scenario template involves: providing the customized test scenario template to a second user, prompting the second user to provide a missing value, and recording an input value provided by the first user. Optionally, the first user and the second user may be the same user.

In one embodiment, the computer implemented method may include an optional step 758 involving suggesting to the first user to run an instantiation of the test scenario template. For example, the user interface 718 may be utilized to present the template to the first user.

In one embodiment, the computer implemented method optionally includes step 754, which involves removing proprietary data associated with at least one of the different organizations from at least one of the partial runs of test scenarios. Optionally, most output fields of the first and second partial runs are removed, and as a result, the test scenario template does not include expected values for most test steps. Additionally or alternatively, the computer implemented method may also include a step of removing proprietary data associated with the first organization from the first partial run. Additionally or alternatively, the computer implemented method may also include a step of removing proprietary data associated from at least one of the first organization and the second organization from the test scenario template.

In one embodiment, generating the partial runs in step 744 involves generating from the received run a number greater than one of partial runs of the test scenario; each partial run of the number of partial runs is generated from a different proper subset of test steps. Optionally, the number of partial runs is a fixed predetermined number. Alternatively, the number of partial runs is proportional to number of the test steps in the run of the test scenario.

In one embodiment, clustering partial runs of test scenarios ins step 746 involves processing one or more of the following logged activities: a list of users who ran the test scenarios, an analysis of access to a database, messages returned from executed transactions, values returned by fields, and procedures utilized by a test scenario.

In one embodiment, similar partial runs of test scenarios are characterized by having at least one of: essentially the same fields, essentially the same field values, similar combinations of fields, similar combinations of field values, similar execution of transactions, similar user interactions, similar requests, similar calls to procedures, similar executions.

In one embodiment, the clustering of the partial runs to clusters that include similar partial runs of test scenarios is based on counting the number of similar fields used in screens corresponding to the runs; the more similar fields, the more similar the runs of the test scenarios are considered to be.

In another embodiment, the clustering of the partial runs of test scenarios to clusters that include similar partial runs of test scenarios is based on similarity between order of displaying similar fields in screens corresponding to the runs; the closer the orders, the more similar the runs are considered to be.

In yet another embodiment, the clustering of the partial runs of test scenarios to clusters comprising similar partial runs is based on similarity between executed procedures associated with the test scenarios. Optionally, the clustering is also based on the order of executing the procedures. Optionally, the clustering is also based on transactions executed as part of the runs of test scenarios.

In one embodiment, a non-transitory computer-readable medium stores program code that may be used by a computer to generate a test scenario template from a cluster of similar partial runs of test scenarios. The computer includes a processor, and the non-transitory computer-readable medium stores the following program code:

Program code for identifying runs of test scenarios run by users on software systems that belong to different organizations; each run of a test scenario describes test steps.

Program code for generating partial runs of the test scenarios by extracting from each run of a test scenario data pertaining to a proper subset of the test steps described in the run. Optionally, a partial run is itself a run of a test scenario. Optionally, a partial run generated from a run of a test scenario includes information taken from the run that pertains to the test steps belonging to the proper subset of the test steps. Optionally, the proper subset of the test steps in the run has a predetermined size, such as two or three. Optionally, each run of a test scenario includes a sequence of test steps and the proper subset of the test steps in the run includes a subsequence of the sequence of the test steps in the run. Optionally, the subsequence is a prefix of the sequence of test steps or a suffix of the sequence of test steps.

Program code for clustering the partial runs of the test scenarios into clusters of similar partial runs.

Program code for receiving a profile of a first user.

Program code for selecting, based on the profile, from among the clusters a certain cluster suitable for the first user; the certain cluster comprises a first partial run of a first test scenario that is associated with a first organization belonging to the different organizations, and a second partial run of a second test scenario that is associated with a second organization belonging to the different organizations. Optionally, the first user is not associated with at the first organization and the first user is not associated with the second organization.

And program code for generating a test scenario template based on the first and second partial runs.

In one embodiment, the non-transitory computer-readable medium optionally stores program code for monitoring activity of the users on software systems belonging to the different organizations and providing data obtained from the monitoring to be used in the identifying of the runs of the test scenarios.

In one embodiment, the non-transitory computer-readable medium optionally stores program code for suggesting to the first user to run an instantiation of the test scenario template.

In one embodiment, the non-transitory computer-readable medium optionally stores program code for removing proprietary data associated with at least one of the different organizations from at least one of the runs of test scenarios. Additionally or alternatively, the non-transitory computer-readable medium may optionally store program code for removing proprietary data associated with the first organization from the first partial run. Additionally or alternatively, the non-transitory computer-readable medium may optionally store program code for removing proprietary data associated from at least one of the first organization and the second organization from the test scenario template.

In one embodiment, the non-transitory computer-readable medium optionally stores program code for customizing the test scenario template for the first user by adding to the test scenario template proprietary data relevant to the first user.

In one embodiment, the program code for clustering includes program code for processing one or more of the following logged activities: a list of users who ran the test scenarios, an analysis of access to a database, messages returned from executed transactions, values returned by fields, and procedures utilized by a test scenario.

Figure 17:
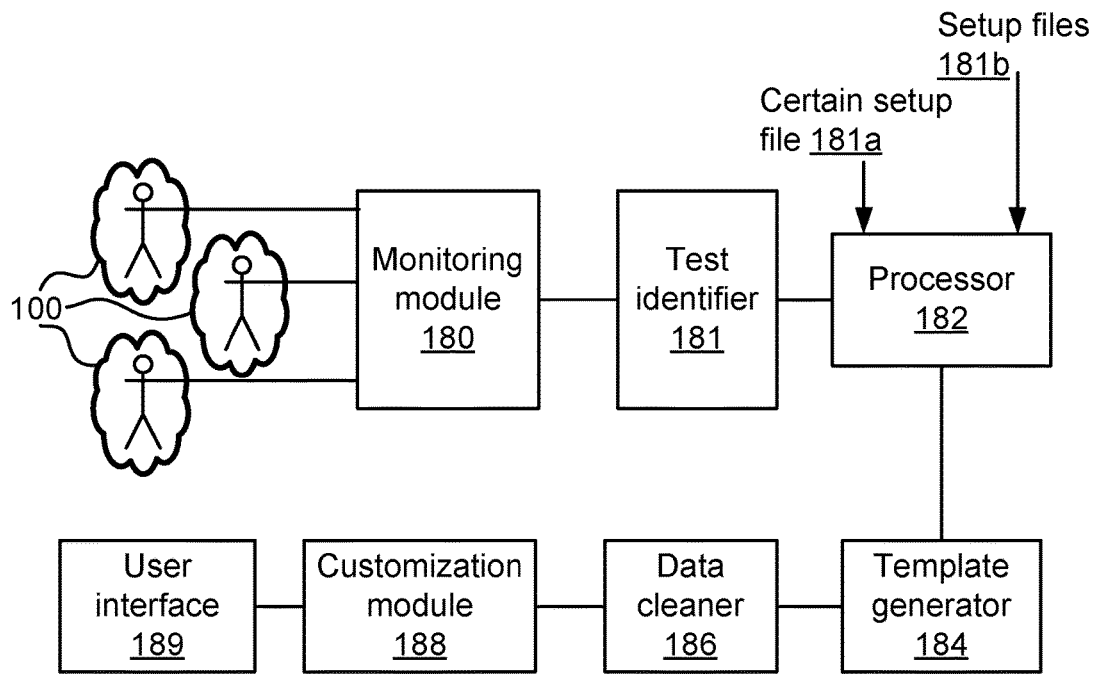
FIG. 17 illustrates one embodiment of a computer system configured to generate a test scenario template based on similarity between setup files associated with different organizations.

FIG. 17 illustrates one embodiment of a computer system configured to generate a test scenario template based on similarity between setup files associated with different organizations. The computer system includes at least a test identifier 181, a processor 182, a template generator 184, and a data cleaner 186.

The test identifier 181 is configured to identify runs of test scenarios run by users on software systems that belong to the different organizations. In this embodiment, each organization of the different organizations is associated with a different setup file customized for the organization.

The processor 182 is configured to receive the setup files 181b that are associated with the different organizations and a certain setup file 181a that is associated with a certain organization. The processor 182 is also configured to identify, based on similarity between the certain setup file 181a and the setup files 181b, similar organizations, from among the different organizations, which are similar to the certain organization.

In one embodiment, an organization may be considered similar to the certain organization if the similarity between the certain setup file 181a and a setup file of the organization exceeds a predetermined threshold. For example, the number of configuration elements that are common to both setup files reaches a predetermined threshold (e.g., 40% of the configuration elements in the certain setup file are also present in the setup file of the organizations, and vice versa).

In another embodiment, a predetermined proportion of the different organizations that have the most similar setup files to the certain setup file 181a are considered similar to the certain organization. For example, the top 20% of the different organizations that have the most similar setup files are considered similar to the certain organization.

The processor 182 is also configured to identify a run of a specific test scenario that is utilized by one or more of the similar organizations. Optionally, selection of the run of the specific test scenario is based on the certain setup file 181a. For example, based on the certain setup file 181a, it may be determined which modules and/or business processes are utilized by the certain organization, and the specific test scenario involves one or more of those modules and/or business processes. Optionally, selection of the run of the specific test scenario is based on a profile of the certain organization which indicates which business processes and/or modules it typically utilizes.

In one embodiment, the run of the specific test scenario is a run by a user belonging to an organization with a setup file that has high similarity to the certain setup file 181a. Optionally, the run of the specific test scenario is a run by a user belonging to an organization with a setup file that has highest similarity to the certain setup file 181a.

In another embodiment, the specific test scenario is a test scenario widely utilized by the similar organizations. For example, of all the test scenarios which have instantiated runs identified by the test identifier 181, the specific test scenario is one that has instantiated runs associated with the largest number of similar organizations. In another example, the specific test scenario is a test scenario that has a large number of instantiations of runs that are associated with one or more of the similar organizations. For example, there are at least 100 different runs of the specific test scenario that are associated with organizations belonging to the similar organizations.

The template generator 184 is configured to generate the test scenario template based on the run of the specific test scenario. Optionally, the template identifies a transaction used in the run of the specific test scenario, and possible values for running the transaction. For example, the template may include identifiers of transactions and/or code that run the transactions. Additionally, the template may include values for running the transaction such as default input values that the transaction can use.

The data cleaner 186 is configured to remove from the test scenario template proprietary data associated with at least one of the similar organizations. Additionally or alternatively, the data cleaner 186 may be configured to remove proprietary data from the run of the specific test scenario. Optionally, most output fields of the run of the specific test scenario are removed, and as a result, the test scenario template does not include expected values for most test steps. Optionally, the output fields may be removed by the data cleaner 186, the template generator 184, a customization module 188, and/or by another suitable module or combination of modules.

In one embodiment, a value in the test scenario template may be considered proprietary and consequently removed from the template. Optionally, the proprietary value is removed by the data cleaner 186 and/or a different module such as the template generator 184. Optionally, a decision on whether a value is proprietary may be based on at least one of: a number of the runs of test scenarios that include the value, and a number of different organizations associated with the runs of the test scenarios in which the value appears. Optionally, if the number of runs in which the value appears is below a certain threshold and/or the number of organizations associated with runs in which the certain value appears is below a certain threshold then the data cleaner 186 may remove the certain value from the template. Optionally, the data cleaner 186 may enable or restrict the customization module 188 from utilizing a certain value based on whether or not the certain value is considered proprietary.

In one embodiment, the specific test scenario was not available in any test suite of the certain organization prior to generating the test scenario template. Thus, the generated template may enable testing of new aspects of a system of the certain organization that were not tested before.

In one embodiment, the computer system also optionally includes a customization module 188 that is configured to customize the test scenario template by adding to the test scenario template proprietary data relevant to the certain organization. Optionally, the customization module is configured to utilize data included in the certain setup file 181a to customize the test scenario template. For example, the certain setup file 181a may include organizations-specific values that may be utilized as default values when running instantiations of the template.

In one embodiment, the computer system also optionally includes a user interface 189 that is configured to suggest to a user to run an instantiation of the test scenario template. Optionally, the user belongs to the certain organization.

In one embodiment, the processor 182 is also configured to receive usage data associated with the certain organization, and utilize the usage data to identify the run of the specific test scenario. For example, the usage data may indicate which modules, business processes, and/or transactions are utilized by the certain organization and/or extent at which the certain organization utilizes certain modules, business processes, and/or transactions. This data may be used to guide the selection of a specific test scenario that involves similar modules, business processes, and/or transactions to the ones that are utilized by the certain organization.

In one embodiment, the computer system also includes a monitoring module 180 that is configured to monitor the users 100 belonging to the different organizations to identify runs of test scenarios run on software systems belonging to the different organizations.

In one embodiment, the processor 182 is also configured to identify a second run of the specific test scenario, and the template generator 184 is also configured to generate the test scenario template based on the second run. The generated test scenario template identifies a transaction used by the run of the specific test scenario the second run of the specific test scenario, and possible values for running the transaction. Optionally, at least one of the possible values for running the transaction does not appear in each of the run of the specific test scenario the second run of the specific test scenario. Optionally, the test scenario template includes a combination of values, which does not appear in any of the run of the specific test scenario the second run of the specific test scenario.

In another embodiment, the processor 182 is also configured to identify a second run of a second test scenario, and the template generator 184 is also configured to generate the test scenario template based on the second run. The generated test scenario template identifies a transaction used by the run of the specific test scenario the second run of the specific test scenario, and possible values for running the transaction. Optionally, at least one of the possible values for running the transaction does not appear in each of the run of the specific test scenario the second run of the second test scenario. Optionally, the test scenario template includes a combination of values which does not appear in any of the run of the specific test scenario the second run of the second test scenario.

In one embodiment, a setup file is a source of information (e.g., program code and/or a data file), that may be used to control and/or customize a software system. In one example, a setup file may be used to define the way a business process works. Business processes are often designed and/or developed in a parametric way; the setup file may contain values for many system parameters that can be set in order to define how the system behaves. In another example, a setup file may indicate which screens are to be utilized in a business process, and/or the layout and/or content of screens; for instance, field names, field locations, and/or field values that are to appear in screens. In yet another example, a setup file may indicate logic that links between screens (e.g., logic that controls the transition between various screens when a user is interacting with the software system). In this example, the logic may be implicitly stated (e.g., by including code that realizes the logic and/or values that are used by the logic) and/or the logic may be in the form of indicating certain programs and/or procedures that may be utilized to control the flow of the execution of the software system.

In one embodiment, a setup file does not necessarily store all information that defines how a system behaves. For example, a setup file may or may not include user permissions. Thus, while in some cases user permissions (e.g., access permission to resources) may be stored at a server end (e.g., a server from which a resource may be accessed), while the setup file may be stored on the client end (e.g., on a software system of an organization). In another example, a setup file may or may not store information related to backing-up data on a system. Optionally, a back-up policy for the system may be stored on an external system which stores the backed-up files.

In one embodiment, similarity of setup files is determined according certain values described in the setup files. Thus, based on modules, business processes, and/or transactions that are mentioned in setup files and/or values associated with the modules, business processes, and/or transactions, it may be determined if two setup files are similar and/or a degree of their similarity. In one example, two setup files may be considered similar if a certain module or business process is mentioned in both. In another example, a degree of similarity between two setup files is proportional to the overlap of business processes mentioned in the two setup files. Thus, two setup files may be considered similar if the overlap of business processes described in both setup file exceeds a predetermined threshold.

In another embodiment, setup files are treated as documents, and determining similarity between setup files is done utilizing natural language and/or semantic analysis methods. For example, setups file may be represented as a "bag of words", e.g., in a vector representation, and various methods such as latent semantic analysis may be used to find similar setup files and/or determine the level of similarity between setup files.

In some embodiments, setup files may become quite large, e.g., encompassing many business processes and containing many values. Thus, it may quite difficult to compare these large and potentially diverse objects, making it unlikely to find two setup files that are similar enough throughout. However, certain portions of the setup files may be similar. For example, two setup files may primarily involve different modules, however, the portions in the two setup files that happen to involve the same modules may be quite similar. Optionally, given a run of a test scenario, subsets of setup files that are relevant to the run are selected and compared in order to determine similarity of the setup files. For example, given a run, the specific business processes involved in the run are identified, and setup files are compared with respect to a subset of their values that is related to the specific business processes. Restricting the comparison of the setup files to certain subsets of the files can both may the comparisons more computationally tractable and increase the chances of finding similar setup files.

In one embodiment, usage data associated with the certain organization is received and utilized for identifying the similar organizations similar to the certain organization. Optionally, the usage data includes data pertaining to one or more module and/or business process utilized by the certain organization. Additionally or alternatively, the usage data may include one or more run of a test scenario associated with the certain organization. Based on the usage data, similarity between the setup file of the certain organization and the files of the different organizations can be determined with respect to the usage data. This enables the detection of organizations that are similar to the certain organization with respect to the usage data.

In one example, the usage data is received from monitoring the certain organization. Activities recorded in the usage data, such as a listing of executed transactions, may be compared with the activities that characterize a run of a test scenario that is utilized by one or more of the similar organizations. If the comparison results in a close hit, the test scenario is considered to be utilized by the certain organization; if the comparison does not result in a close hit, the test scenario is considered not to be utilized by the certain organization.

It is to be noted that different embodiments may implement components of the computer system illustrated in FIG. 17 in different ways. For example, in some embodiments one or more of the following may be implemented as software modules running on the processor 182: the monitoring module 180, the test identifier 181, the template generator 184, the data cleaner 186, the customization module 188, and the user interface 189. Additionally, one or more of the aforementioned components may be implemented on a remote server, such as a cloud-based server. Optionally, one or more of the aforementioned modules may be realized, at least in part, by the same software module.

In one example, the customization module 188 and/or the data cleaner 186 are both implemented as part of the template generator 184. In another example, the test identifier 181 and the monitoring module 180 are realized by the same software module that both performs monitoring and analyzes data obtained from the monitoring in order to identify the runs of the test scenarios. In another example, the monitoring module 180 is realized at least in part as a software module that runs on software systems with which the users interact in order to run the test scenarios. The test identifier 181, may be implemented at least in part as a remote service (e.g., a cloud-based service) that receives data obtained from the monitoring.

In one embodiment, the test scenario template undergoes customization by the customization module 188 prior to removal of proprietary data from the template by the data cleaner 186. In another embodiment, the order is reversed: proprietary data is removed from the template by the data cleaner 186, and then the template is customized by the customization module 188. In still another embodiment, customizing the template and removing proprietary data from it are performed by the same software module. Optionally, the software module utilizes the certain setup file 181a and/or the setup files 181b to determine which proprietary data needs to be removed from the template, and which proprietary data should be added to the template when customizing it.

Figure 18:
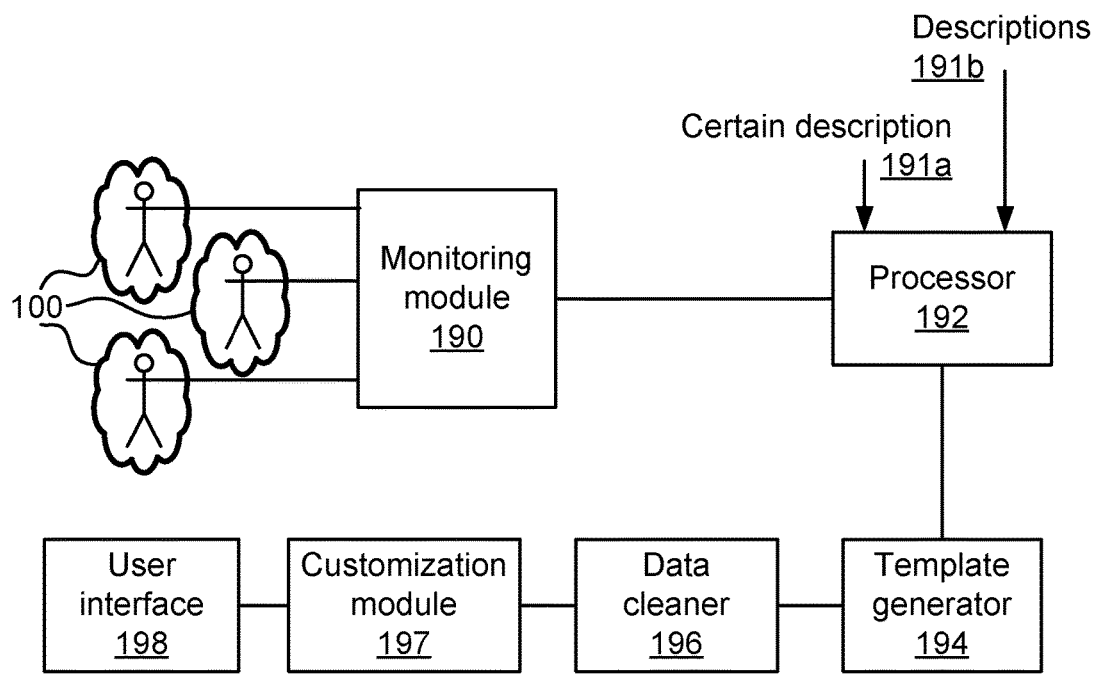
FIG. 18 illustrates one embodiment of a computer system configured to generate a test scenario template based on similarity between descriptions associated with different organizations.

FIG. 18 illustrates one embodiment of a computer system configured to generate a test scenario template based on similarity between descriptions associated with different organizations. The illustrated embodiment includes at least a monitoring module 190, a processor 192, a template generator 194, and a data cleaner 196.

The monitoring module 190 is configured to monitor users 100 belonging to different organizations to identify runs of test scenarios run on software systems belonging to the different organizations. Optionally, the monitoring is done at least in part on the software systems belonging to the different organizations. For example, the monitoring module 190 includes modules that are installed on the software systems of the different organizations and collects data generated while the users 100 are running the test scenarios. Additionally or alternatively, the monitoring module 190 may operate remotely from the software systems of the different organizations. For example, the monitoring module may be implemented, at least in part, using programs running on a cloud-based server that receive information related to activity of the users 100 on the software systems of the different organizations.

The processor 192 is configured to receive a certain description 191a of a certain organization and descriptions 191b of the different organizations. For example, the certain description 191a may include a field of operation of the certain organization. The processor 192 is also configured to identify, based on similarity between the certain description 191a and the descriptions 191b, similar organizations that are similar to the certain organization.

In one embodiment, an organization may be considered similar to the certain organization if the similarity between the certain description 191a and a description of the organization exceeds a predetermined threshold. In another embodiment, a predetermined proportion of the different organizations that have the most similar descriptions to the certain description 191a are considered similar to the certain organization. For example, the top 20% of the different organizations that have the most similar descriptions are considered similar to the certain organization.

The processor 192 is also configured to identify a run of a specific test scenario that is utilized by one or more of the similar organizations. Optionally, selection of the run of the specific test scenario is based on the certain description 191a. For example, based on the certain description 191a, it may be determined which modules and/or business processes are utilized by the certain organization, and the specific test scenario involves one or more of those modules and/or business processes. Optionally, selection of the run of the specific test scenario is based on a profile of the certain organization which indicates which business processes and/or modules it typically utilizes.

In one embodiment, the run of the specific test scenario is a run by a user belonging to an organization with a description that has high similarity to the certain description 191a. Optionally, the run of the specific test scenario is a run by a user belonging to an organization with a description that has highest similarity to the certain description 191a.

In another embodiment, the specific test scenario is a test scenario widely utilized by the similar organizations. For example, of all the test scenarios which have instantiated runs identified by the monitoring module, the specific test scenario is one that has instantiated runs associated with the largest number of similar organizations. In another example, the specific test scenario is a test scenario that has a large number of instantiations of runs that are associated with one or more of the similar organizations. For example, there are at least 100 different runs of the specific test scenario that are associated with organizations belonging to the similar organizations.

In one example, the certain description 191a of the certain organization comprises usage data associated with the certain organization, and the processor 192 is further configured to utilize the usage data to identify the run of the specific test scenario. For example, the usage data may mention certain business processes, and the processor 192 may inspect the runs of various test scenarios to detect a run of a specific test scenario that involves the certain business processes. Optionally, if two descriptions that include usage data may be considered similar if they both describe usage of a certain number of business processes. For example, if the two descriptions have an overlap of at least 25% in the business processes they described, they may be considered similar. In another example, if two descriptions have at least 50 business processes in common, they may be considered similar.

The template generator 194 is configured to generate the test scenario template based on the run of the specific test scenario. Optionally, the template identifies a transaction used in the run of the specific test scenario, and possible values for running the transaction. For example, the template may include identifiers of transactions and/or code that runs the transactions. Additionally, the template may include values for running the transaction such as default input values that the transaction can use.

The data cleaner 196 is configured to remove from the test scenario template proprietary data associated with at least one of the similar organizations. Additionally or alternatively, the data cleaner 196 may be configured to remove proprietary data from the run of the specific test scenario. Optionally, most output fields of the run of the specific test scenario are removed, and as a result, the test scenario template does not include expected values for most test steps. Optionally, the output fields may be removed by the data cleaner 196, the template generator 194, a customization module 197, and/or by another suitable module or combination of modules.

In one embodiment, a value in the test scenario template may be considered proprietary and consequently removed from the template. Optionally, the proprietary value is removed by the data cleaner 196. Optionally, a decision on whether a value is proprietary may be based on at least one of: a number of the runs of test scenarios that include the value, and a number of different organizations associated with the runs of the test scenarios in which the value appears. Optionally, if the number of runs in which the value appears is below a certain threshold and/or the number of organizations associated with runs in which the certain value appears is below a certain threshold then the data cleaner 196 may remove the certain value from the template. Optionally, the data cleaner 196 may enable or restrict the customization module 197 from utilizing a certain value based on whether or not the certain value is considered proprietary.

In one embodiment, the specific test scenario was not available in any test suite of the certain organization prior to generating the test scenario template. Thus, the generated template may enable testing of new aspects of a system of the certain organization that were not tested before.

In one embodiment, the computer system also includes the customization module 197 that is configured to customize the test scenario template by adding to the test scenario template proprietary data relevant to the certain organization. Optionally, the customization module is configured to utilize data included in the certain description 191a to customize the test scenario template. For example, the certain description 191a may include organizations-specific values that may be utilized as default values when running instantiations of the template.

In one embodiment, the computer system also includes a user interface 198 that is configured to suggest to a user to run an instantiation of the test scenario template. Optionally, the user belongs to the certain organization.

In one embodiment, a description of an organization (e.g., the certain description 191a) may include information characterizing the organization and/or systems belong to it. For example, languages used by users belonging to the organization, location of the organization, size of the organization, and/or a field of operation of the organization (e.g., insurance, defense, communications, etc.) For example, the location of the organization may change the behavior and logic of a screens; e.g., tax rules change between countries, and the related screens presented to users may reflect the differences in tax rules. In one example, organizations in the same field of operation are considered similar. Alternatively, organizations in the same field of operation and having approximately the same number of employees are considered similar.

In another embodiment, a description of an organization may include permissions and/or authorizations relevant to a system of the organization. Such information may assist in selecting relevant test scenarios for the certain organization (e.g., a test scenario that involves specific procedures and/or modules that are utilized by the certain organization). For example, organizations that implement similar organizational hierarchies and/or security procedures may be considered similar (e.g., organizational hierarchies and/or security procedures may be reflected in listings of permissions included in the descriptions).

In yet another embodiment, a description of an organization (e.g., the certain description 191a) describes usage information of the organization; for example, information pertaining to modules and/or business processes utilized by the certain organization. Optionally, the usage information includes runs of test scenarios and/or the usage information is derived from analysis of runs of test scenarios. In one example, organizations that have a certain number of modules in common (e.g., at least 100 software modules are the same), and/or a certain proportion of their modules in common (e.g., at least 50% of the software modules used by the organizations), are considered similar. In another example, organizations that have instantiations of the same test scenarios associated with them are considered similar. For example, if for two organizations, at least 10% of the runs of test scenarios associated with each organization are instantiated from the same test scenarios, then the two organizations may be considered similar.

Determining similarity of the certain organization to the different organization may be based on one or more of the aforementioned factors. For example, similarity may be based both on field of operation of the organizations and usage data of the organizations. In another example, both usage data and lists of modules utilized by each organization and descriptions of screens in business processes utilized by each organization are used to determine the similarity.

In some embodiments, the certain description 191*a* and the descriptions 191*b* may be converted to feature values. Optionally, the feature values may be represented as vectors. In one example, similarity between vectors representing descriptions is determined based on vector similarity metrics such as got-product or Pearson correlation. In another example, similarity is determined based on proximity in a space of the vectors. For example, a nearest neighbor search may be performed to find similar vectors. Optionally, a certain number of organizations with corresponding vectors that are most similar to a vector representing the certain description 191*a* are considered similar to the certain organization. Optionally, organizations whose corresponding vector is within a certain distance (e.g., within a certain radius) from a vector representing the certain description 191*a*, are considered similar to the certain organization.

In one embodiment, the processor 192 is also configured to identify a second run of the specific test scenario, and the template generator 194 is also configured to generate the test scenario template based on the second run. The generated test scenario template identifies a transaction used by the run of the specific test scenario and the second run of the specific test scenario, and possible values for running the transaction. Optionally, at least one of the possible values for running the transaction does not appear in each of the runs. Optionally, the test scenario template includes a combination of values which does not appear in any of the runs.

In another embodiment, the processor 192 is also configured to identify a second run of a second test scenario (that is different from the specific test scenario), and the template generator 194 is also configured to generate the test scenario template based on the second run. The generated test scenario template identifies a transaction used by the runs, and possible values for running the transaction.

It is to be noted that different embodiments may implement components of the computer system illustrated in FIG. 18 in different ways. For example, in some embodiments one or more of the following may be implemented as software modules running on the processor 192: the monitoring module 190, the template generator 194, the data cleaner 196, the customization module 197, and the user interface 198. Additionally, one or more of the aforementioned components may be implemented on a remote server, such as a cloud-based server. Optionally, one or more of the aforementioned modules may be realized, at least in part, by the same software module.

In one example, the customization module 197 and/or the data cleaner 196 are both implemented as part of the template generator 194. In another example, the monitoring module 190 is realized at least in part as a software module that runs on Additionally, the monitoring module 190, may be implemented at least in part as a remote service (e.g., a cloud-based service) that receives data obtained from the monitoring.

In one embodiment, the test scenario template undergoes customization by the customization module 197 prior to removal of proprietary data from the template by the data cleaner 196. In another embodiment, the order is reversed: proprietary data is removed from the template by the data cleaner 196, and then the template is customized by the customization module 197. In still another embodiment, customizing the template and removing proprietary data from it are performed by the same software module. Optionally, the software module utilizes the certain description 191*a* and/or the descriptions 191*b* to determine which proprietary data needs to be removed from the template, and which proprietary data should be added to the template when customizing it.

Figure 19:
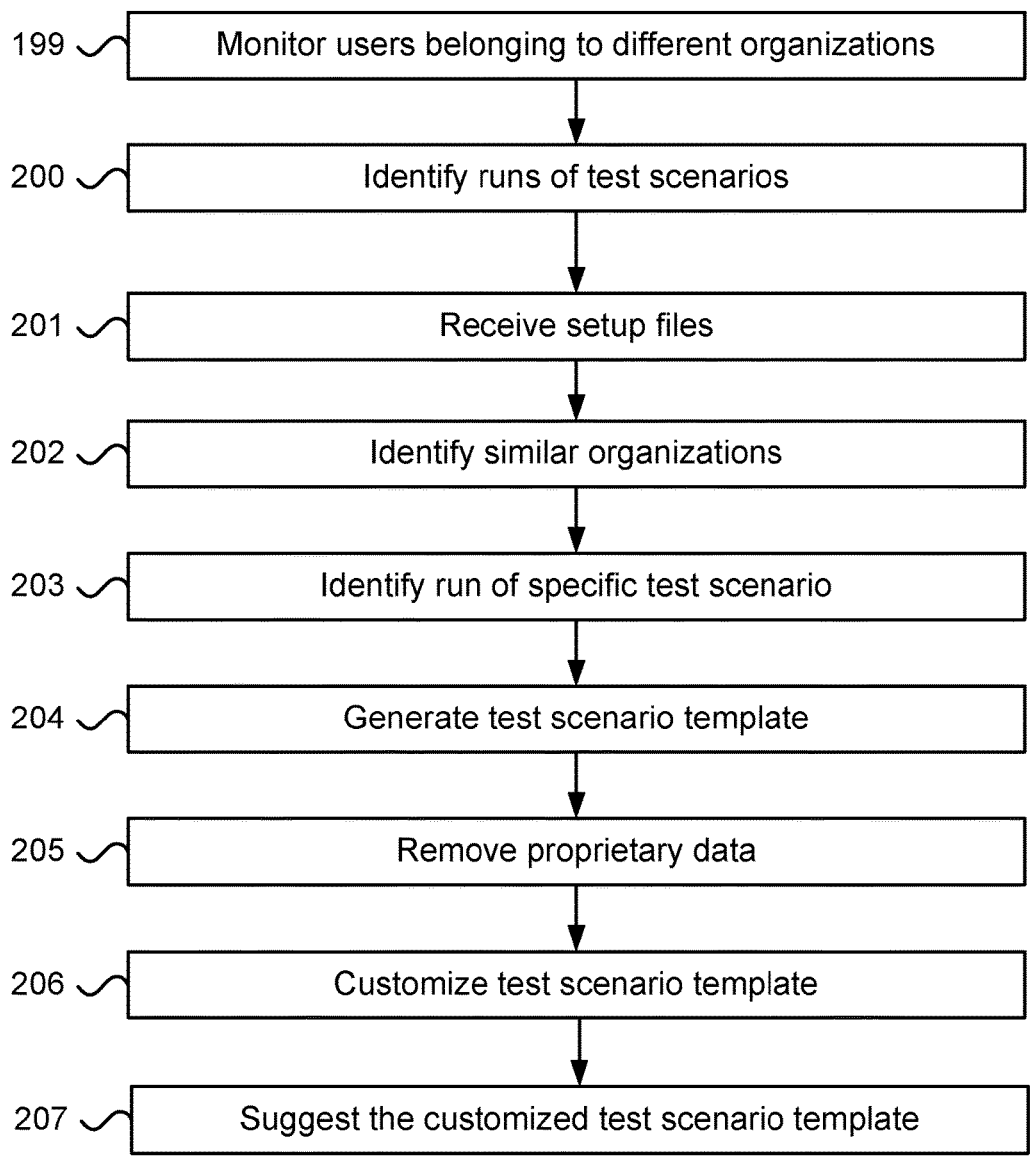
FIG. 19 illustrates one embodiment of a computer implemented method for generating a test scenario template based on similarity between setup files associated with different organizations.

FIG. 19 illustrates one embodiment of a computer implemented method for generating a test scenario template based on similarity between setup files associated with different organizations. The illustrated embodiment includes the following steps:

In step 200, identifying runs of test scenarios run by users on software systems that belong to the different organizations. Each organization of the different organizations is associated with a different setup file customized for the organization.

In step 201, receiving the setup files and a certain setup file associated with a certain organization.

In step 202, identifying, based on similarity between the certain setup file and the setup files, similar organizations which are similar to the certain organization.

In step 203, identifying a run of a specific test scenario that is utilized by one or more of the similar organizations.

In step 204, generating the test scenario template based on the run of the specific test scenario. Optionally, the specific test scenario was not available in any test suite of the certain organization prior to generating the test scenario template.

And in step 205, removing from the test scenario template proprietary data associated with at least one of the similar organizations. Optionally, not all the proprietary data associated with at least one of the similar organizations is removed. Therefore, after removing from the test scenario template proprietary data associated with at least one of the similar organizations, the test scenario template may still contain certain proprietary data associated with at least one of the similar organizations.

In one embodiment, the computer implemented method includes an additional optional step 206, which involves customizing the test scenario template by adding to the test scenario template proprietary data relevant to a user. Additionally, the computer implemented method may include an additional optional step 207 involving suggesting to the user to run an instantiation of the test scenario template. For example, the user interface 189 may be utilized to present the template to a user belonging to the certain organization.

In one embodiment, customizing the test scenario template in step 206 involves utilizing data included in the certain setup file 181*a* for customizing the test scenario template for the certain organization. For example, values included in the certain setup file 181*a* may be placed in the template instead of values that came from runs associated with other organizations.

In another embodiment, customizing the test scenario template for the certain organization in step 206 also involves guiding a user to provide proprietary data relevant to the certain organization. Optionally, guiding the user to provide proprietary data may involve: providing to the user the test scenario template from which proprietary data associated with at least one of the similar organizations was removed, prompting the user to provide missing values, and recording the user inputs. Optionally, customizing the test scenario template for the certain organization is done by adding at least one of the recorded user inputs to the test scenario template from which proprietary data associated with at least one of the similar organizations was removed. Optionally, guiding the user to provide proprietary data comprises semiautomatic execution of an instantiation of the test scenario template from which proprietary data associated with at least one of the similar organizations was removed.

In one embodiment, the computer implemented method illustrated in FIG. 19 includes an additional optional step of receiving proprietary data associated with a certain user. Customizing the test scenario template for the certain organization may then take place by adding to the test scenario template at least some of the received proprietary data associated with the certain user. Optionally, the received proprietary data associated with the certain user is generated from previously recorded runs of test scenarios associated with the certain user. Optionally, the received proprietary data associated with the certain user is generated by parsing manual test scenarios associated with the certain user. Optionally, the received proprietary data associated with the certain user is generated from analysis of a database of the software system associated with the certain user. For example, analyzing the database system may yield certain values associated with the certain user that may be used for customizing the template.

In one embodiment, step 205 which involves removing from the test scenario template proprietary data includes selecting a value derived from the test scenario template. Following that, removing the selected value from the test scenario template if the selected value appears in less than a first predetermined number of the runs of test scenarios or the selected value appears in runs of test scenarios associated with less than a second predetermined number of different organizations. In this embodiment, both the first predetermined number and the second predetermined number are greater than one.

In another embodiment, step 205 which involves removing from the test scenario template proprietary data includes: selecting a value appearing in the run of the specific test scenario; testing whether the value appears in at least a first predetermined number of the runs of the test scenarios; testing whether the value appears in runs that are associated with at least a second predetermined number of different organizations; and if both conditions are positive, enabling customization of the test scenario template to utilize the selected value. Optionally, if at least one of the aforementioned conditions is negative, customization of the test scenario template is not allowed to utilize the selected value.

In one embodiment, the computer implemented method includes an additional optional step 199, which involves monitoring the users belonging to different organizations and providing data collected in the monitoring for the identifying of the runs of test scenarios.

In one embodiment, the computer implemented method illustrated in FIG. 19 includes an additional optional step that involves receiving usage data associated with the certain organization. Optionally, the usage data is utilized for identifying the run of the specific test scenario. Additionally or alternatively, the usage data may be utilized for identifying the similar organizations which are similar to the certain organization. In one example, usage data may be used to identify business processes utilized by the certain organization, database tables accessed by the certain organization, procedures and/or transactions executed by users belonging to the certain organization, and/or screens and/or forms utilized by the certain organization.

In one embodiment, the usage data is received from monitoring users belonging to the certain organization. The activities recorded in the usage data are compared with activities that characterize a test scenario utilized by one or more of the similar organizations (e.g., users belonging to the one or more similar organizations ran instantiations of the test scenario). If the comparison results in a close hit, the test scenario may be considered to be utilized by the certain organization; if the comparison does not result in a close hit, the test scenario may be considered not to be utilized by the certain organization.

In one embodiment, the computer implemented method illustrated in FIG. 19 includes an additional optional step that involves identifying an organization that is most similar to the certain organization, and selecting a run of a test scenario associated with the most similar organization as the run of the specific test scenario. For example, an organization that has the largest overlap in utilized business processes with the certain organization (as determined from comparing setup files), is identified. Following that, a test scenario that has many runs associated with the identified organization is selected as the specific test scenario.

Figure 20:
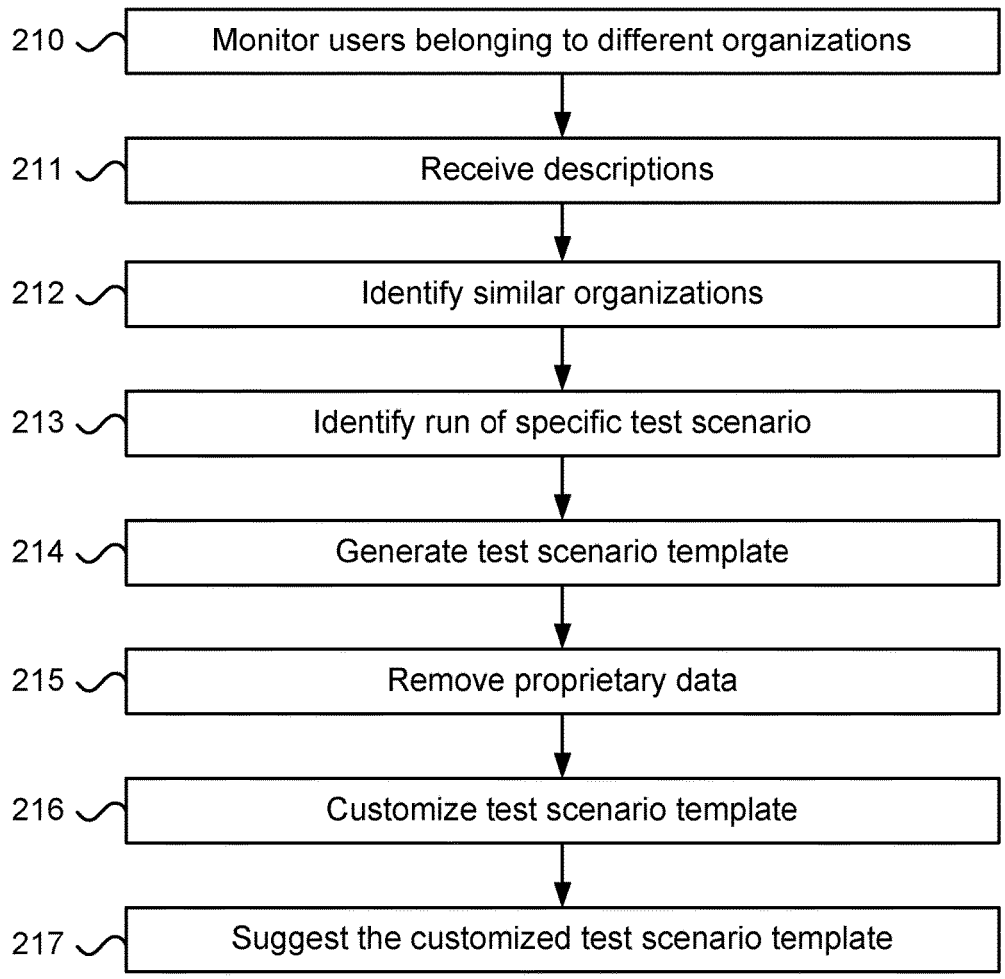
FIG. 20 illustrates a computer implemented method for generating a test scenario template based on similarity between descriptions with different organizations.

In one embodiment, the computer implemented method illustrated in FIG. 19 includes an additional optional step that involves identifying a second run of the specific test scenario, which is not utilized by the certain organization, and the generating of the test scenario template is also based on the second run of the specific test scenario. Additionally, the test scenario template identifies a transaction used by the run of the specific test scenario and the second run of the specific test scenario, and possible values for running the transaction. Optionally, at least one of the possible values for running the transaction does not appear in each of the run of the specific test scenario and the second run of the specific test scenario. Optionally, the test scenario template includes a combination of the possible values, and the combination does not appear in any of the run of the specific test scenario and the second run of the FIG. 20 illustrates a computer implemented method for generating a test scenario template based on similarity between descriptions with different organizations. The illustrated embodiment includes the following steps:

In step 210, monitoring users belonging to different organizations to identify runs of test scenarios run on software systems belonging to the different organizations.

In step 211, receiving a certain description of a certain organization and descriptions of the different organizations. Optionally, the certain description comprises a field of operation of the certain organization. Optionally, the certain description and the descriptions include usage information. In one example, usage identifies the business processes utilized by the certain organization. In another example, usage information identifies database tables accessed by the certain organization and/or the different organization. In yet another example, usage information may describe procedures, transactions, screens, and/or forms utilized by the certain organization and/or the different organizations.

In step 212, identifying, based on similarity between the certain description and the descriptions, similar organizations that are similar to the certain organization.

In step 213, identifying a run of a specific test scenario that is utilized by one or more of the similar organizations. Optionally, the specific test scenario was not available in any test suite of the certain organization prior to generating the test scenario template.

In step 214, generating the test scenario template based on the run of the specific test scenario And in step 215, removing from the test scenario template proprietary data associated with at least one of the similar organizations. Optionally, not all the proprietary data associated with at least one of the similar organizations is removed. Therefore, after removing from the test scenario template proprietary data associated with at least one of the similar organizations, the test scenario template may still contain certain proprietary data associated with at least one of the similar organizations.

In one embodiment, the method illustrated in FIG. 20 also includes an optional step of identifying an organization that is most similar to the certain organization. Additionally, identifying the run of the specific test scenario in step 213 involves selecting an instantiation of a test scenario associated with the most similar organization as the run of the specific test scenario.

In one embodiment, the method illustrated in FIG. 20 also includes an optional step of identifying a second run of the specific test scenario, which is not utilized by the certain organization. Additionally, generating of the test scenario template is also based on the second run of the specific test scenario. The test scenario template identifies a transaction used by the run of the specific test scenario and the second run of the specific test scenario, and possible values for running the transaction. Optionally, at least one of the possible values for running the transaction does not appear in each of the run of the specific test scenario and the second run of the specific test scenario. Optionally, the test scenario template includes a combination of the possible values, and the combination does not appear in any of the run of the specific test scenario and the second run of the specific test scenario.

In one embodiment, the computer implemented method includes an additional step 216, which involves customizing the test scenario template by adding to the test scenario template proprietary data relevant to a user. Additionally, the computer implemented method may include an additional step 217 involving suggesting to the user to run an instantiation of the test scenario template. For example, the user interface 198 may be utilized to present the template to a user belonging to the certain organization.

In one embodiment, step 215 which involves removing from the test scenario template proprietary data includes selecting a value derived from the test scenario template. Following that, removing the selected value from the test scenario template if the selected value appears in less than a first predetermined number of the runs of test scenarios or the selected value appears in runs of test scenarios associated with less than a second predetermined number of different organizations. In this embodiment, both the first predetermined number and the second predetermined number are greater than one. Additionally or alternatively, removing from the test scenario template proprietary data may also involve: selecting a value appearing in the run of the specific test scenario; testing whether the value appears in at least a first predetermined number of the runs of the test scenarios; testing whether the value appears in runs that are associated with at least a second predetermined number of different organizations; and if both conditions are positive, enabling customization of the test scenario template to utilize the selected value. Optionally, if at least one of the aforementioned conditions is negative, customization of the test scenario template is not allowed to utilize the selected value.

In one embodiment, identifying the run of the specific test scenario template involves clustering runs of test scenarios associated with the similar organizations into clusters of similar runs of test scenarios. Following that, selecting a cluster from the clusters of similar runs of test scenarios. For example, the selected cluster may be selected from among the larger clusters and/or it may be a one of the clusters containing runs of test scenarios associated with a large number of the similar organizations. Additionally, generating the test scenario template involves obtaining from the selected cluster the run of the specific test scenario.

In one example, the run of the specific test scenario is a run which returns the shortest distance according to a distance function operating on runs of test scenarios belonging to the selected cluster. Optionally, the distance function measures a distance between pairs of runs of test scenarios in the selected cluster, and a run having a minimal average distance from other runs in the selected cluster is selected as the run of the specific test scenario.

In another example, the specific test scenario is one of the most popular test scenarios from among test scenarios with runs belonging to the selected cluster. Optionally, popularity of a test scenario is proportional to the number of users who used it (i.e., ran it). Optionally, popularity of a test scenario is proportional to the number of organizations that have users who used it.

In one embodiment, a non-transitory computer-readable medium stores program code that may be used by a computer to generate a test scenario template based on similarity between descriptions of different organizations. The computer includes a processor, and the non-transitory computer-readable medium stores the following program code:

Program code for monitoring users belonging to different organizations to identify runs of test scenarios run on software systems belonging to the different organizations.

Program code for receiving a certain description of a certain organization and descriptions of the different organizations. Optionally, the certain description comprises a field of operation of the certain organization.

Program code for identifying, based on similarity between the certain description and the descriptions, similar organizations that are similar to the certain organization.

Program code for identifying a run of a specific test scenario that is utilized by one or more of the similar organizations.

Program code for generating the test scenario template based on the run of the specific test scenario. Optionally, the specific test scenario was not available in any test suite of the certain organization prior to generating the test scenario template.

And program code for removing from the test scenario template proprietary data associated with at least one of the similar organizations.

In one embodiment, the non-transitory computer-readable medium also stores program code for customizing the test scenario template for the certain organization.

In some embodiments, vendor-customized packaged application modules are modules designed and developed to include many options and possibilities in various aspects which can be customized. During the installation and implementation at a customer, the modules may be customized. One possibility to implement a customization to a module is by developing additional code which is added as part of the packaged application. Optionally, the additional code is organization-specific and/or developed by the organization. Another possibility to implement a customization is via setting some configurable option, for example by adding, removing, and/or editing configuration elements belonging to a configuration file associated with a module.

A customization of a module may change the way a business process associated with the module works without changing the code itself. In one example, one may configure a module that deals with human resources of a certain organization by providing it with organization-specific list of levels (titles) of the certain organization. Thus, when a user of the certain organization runs human resources-related business processes, the user may utilize a different list of levels than a user of another organization utilizes, even though they both may be running the same version of application code. In another example, one organization may require a direct manager of an employee to add a summary of an interview of a new employee, while another organization may not have such a requirement. Customizing an application module for the requirement to add a summary may be accomplished by adding code that requests an input of a summary after an interview, and integrating the code in to a business process that involves adding a new employee.

In one embodiment, a customization to a module may involve adding data that a user may be required to enter when interacting with the module. For example, a customization may enter certain organization-specific data (e.g., name of organization, address, account number). Thus, for example, a user of the module would not have to enter the data when running each test scenario. Optionally, the user may be given an opportunity to approve and/or edit data associated with a customization. Additionally or alternatively, a customization to a module may involve information that is required for a test scenario that involves the module to run smoothly. Optionally, without the information being provided, the test scenario would not run smoothly (e.g., leading to errors in execution of the test scenario). For example, for a test scenario to run smoothly may requires a customization that provides information such as location of resources (e.g., directories or databases), and/or certificates or permissions to access certain resources.

In one embodiments, customizations of an organization to a module may indicate usage of the module by the organization. It is often the case that a software system of a certain organization may include many vendor-customized packaged application modules (e.g., a standard collection of application modules). However, a certain organization may not utilize all of the installed modules. The certain organization may utilize other solutions instead of the modules. For example, the certain organization may utilize SalesForce™ Customer Relationship Management (CRM) instead of corresponding module of SAP™ that is installed. In this case, providing a user belonging to the certain organization test scenarios for testing a CRM module of SAP is not beneficial.

Figure 21:
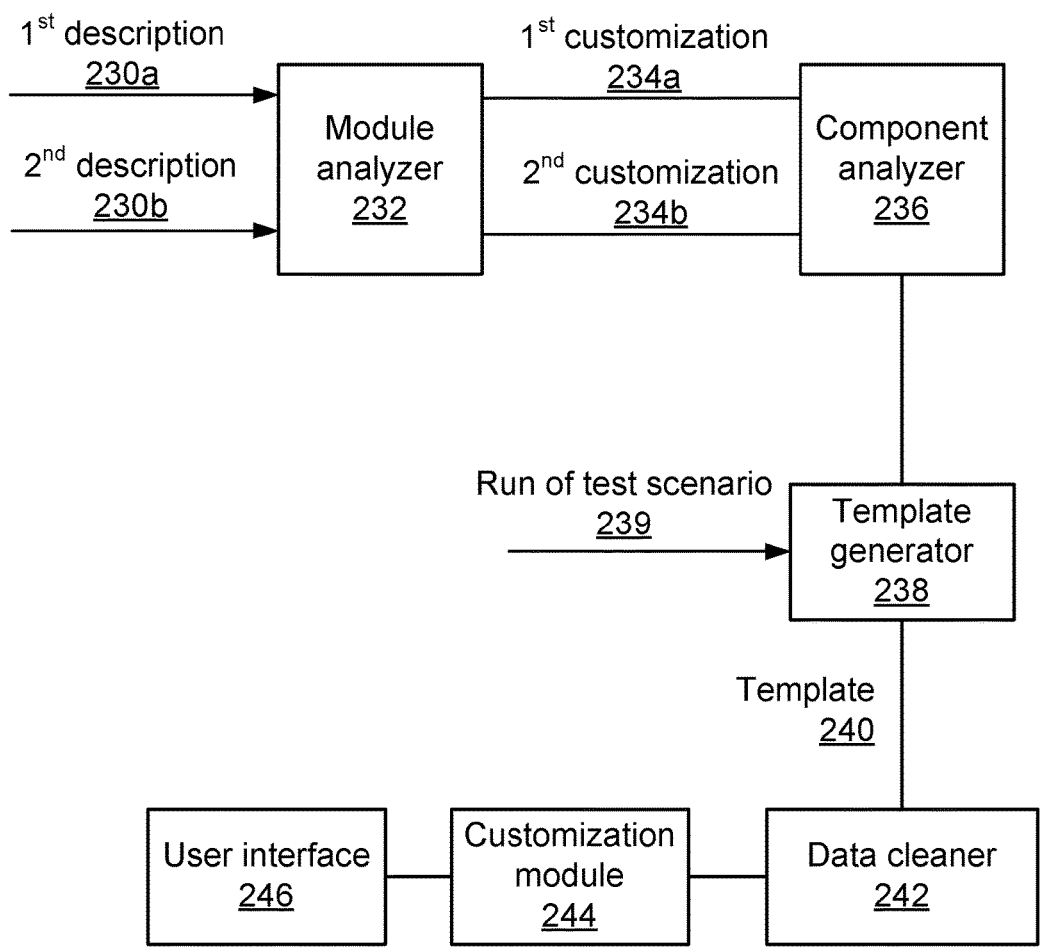
FIG. 21 illustrates one embodiment of a computer system configured to generate a test scenario template from data collected from users running test scenarios to test vendor-customized packaged application modules.

FIG. 21 illustrates one embodiment of a computer system configured to generate a test scenario template from data collected from users running test scenarios to test vendor-customized packaged application modules. The illustrated embodiment includes at least a module analyzer 232, a component analyzer 236, a template generator 238, and a data cleaner 242.

The module analyzer 232 is configured to receive: a first description 230a of a first set of vendor-customized packaged application modules, and a second description 230b of a second set of vendor-customized packaged application modules. Optionally, a first organization utilizes the first set of modules, and a second organization utilizes the second set of modules. Optionally, the first set of modules and the second set of modules each include at least one module. Optionally, the second set includes at least one module that is not included in the first set. Optionally, the first organization and the second organization are associated with the same field of operation. For example, both organizations may be in the travel industry. Alternatively, the first organization and the second organization may be associated with different fields of operation. For example, the first organization may be in the travel industry, while the second organization may be in the banking industry.

In one embodiment, the second organization is an organization that is most similar to the certain organization. For example, from among a plurality of different organizations, the second organization is the most similar to the first organization, based on one or more factors such as: field of operation, organizational hierarchy, lists of utilized modules, and/or customizations associated with the organizations.

The first description 230a includes customizations to modules belonging to the first set, and the second description 230b includes customizations to modules belonging to the second set. Optionally, each of the first description 230a and the second descriptions 230b may include customization code, settings to modules (e.g., configuration elements), default values utilized by modules, and/or information required for modules to run smoothly (e.g., resource locations, certificates, and/or permissions). Additionally or alternatively, the first description 230a and the second description 230b may also include information that characterizes the first and/or second organizations. In one example, the first description 230a and/or the second description 230b may include languages used by users belonging to the organization, location of the organization, size of the organization, and/or a field of operation of the organization (e.g., insurance, defense, communications). In another example, the first description 230a and/or the second description 230b may list modules, business processes, transactions, and/or screens utilizes by the first and/or second organizations. In yet another example, the first description 230a and/or the second description 230b may include usage data. Optionally, the usage data may include activity data of users of the first and/or second organizations, runs of test scenarios associated with the first and/or second organizations, and/or data derived from the runs.

The module analyzer 232 is also configured to identify, based on the first description 230a and the second description 230b, a first customization 234a to a first instance of a certain module and a second customization 234b to a second instance of the certain module. The first and second instances belong to the first and second sets, respectively. Optionally, the first and second instances involve essentially the same code base but different customizations may be associated with each instance. Optionally, the first and/or second descriptions explicitly refer to an instance of the certain module being used by their respective organizations; for example, the first description 230a and/or the second description 230b may list the certain module as being utilized by their respective organization. Optionally, the first description 230a and/or the second description 230b may imply that their respective organization utilizes an instance of the certain module. For example, the first description 230a and/or the second description 230b may include runs of test scenarios from which it may be implied that certain transactions, which involve the certain module, were run.

The first customization 234a and the second customization 234b selected by the module analyzer 232 are typically similar to each other. In one example, the first customization 234a includes customization code that is similar to customization code included in the second customization 234b. Optionally, similarity of customization code is determined via string comparisons and/or clustering of customization code. In another example, the first customization 234a and the second customization 234b involve similar data that may be used to customize the respective first and second instances of the certain module. For example, to customize and instant of a inventory module, both customizations provide data of a similar types related to ordering parts for a warehouse (e.g., respective organization names, bank accounts, shipping options). In yet another example, the first customization 234a and the second customization 234b both describe information of their respective organizations that is required for test scenarios to run smoothly. For example, they describe resource locations (for similar resources), and/or provide similar certificates of their respective organizations. In another example, similar customizations each include at least one similar component in common.

The component analyzer 236 is configured to identify, based on the first customization 234a and the second customization 234b, components in the second instance that are similar to components in the first instance. Optionally, a component of a customization of a module may involve one or more of the following: a certain business process run on the module, a certain transaction run on the module, a certain field on a screen used by a certain transaction run on the module, a certain value used by a certain transaction run on the module, and a certain command executed when running the module. Optionally, a first customization and a second customization may be considered similar by virtue of at least one of: a similar business process being described in the first and second customizations, a similar transaction being described in the first and second customizations, a similar field on a screen used by a certain transaction being described in the first and second customizations, a certain value used by a certain transaction being described in the first and second customizations, and a certain command described in the first and second customizations.

In one example, the first customization 234a and the second customization 234b both include a shipping address for their respective organizations. In another example, the first customization 234a and the second customization 234b include code that alters behavior of a certain transaction; e.g., each customization alters what an instance of the certain module does with a record of a new employee after the record is added in the certain transaction. In yet another example, the first customization 234a and the second customization 234b each include certificates of their respective organizations required by the certain module in order to access a customer database of each organization.

The template generator 238 is configured to receive: a specific run 239 of a test scenario run to test the second instance, and a description of similar components that includes an indication of at least one component of the second instance that is similar to at least one component of the first instance. For example, the indication of the at least one component may be a name, an identifier, and/or a description of a business process; a name, identifier, code, and/or description of a certain transaction; a description of a screen or portions of a screen such as field names belonging to the screen; a certain value used by a transaction; and/or a command executed when running a transaction.

The template generator 238 is also configured to generate, based on the specific run 239 and the description of similar components, a test scenario template 240 for testing the first instance of the certain module. Optionally, the template 240 may focus on portions of the specific run that relate to the at least one component of the second instance that is similar to at least one component of the first instance. For example, the at least one component may be a certain transaction, and the template may primarily involve testing the certain transaction. In another example, the at least one component may include values utilized to run a transaction, e.g., the values entered in a screen, and the template may include essentially the same screen and utilize the same values as default values for the screen. In yet another example, the at least one component may be a certificate for accessing an external website, and the template includes a transaction that accesses the external website.

In one embodiment, the template generator 238 is configured to select the run of a test scenario run to test the second instance from a plurality of runs of test scenarios that were run to test the second instance. For example, the template generator 238 may select the second run based on similarity of the second run to the specific run 239. In another example, the template generator 238 may select the second run based on the fact that it involves the at least one component of the second instance that is similar to at least one component of the first instance, and that the second run is an instantiation of a test scenario run by many users belonging to the second organization.

In another embodiment, the template generator 238 is also configured to rank popularity of runs of test scenarios, run to test the second instance, and to select the specific run of a test scenario run to test the second instance from popular runs of popular test scenarios. For example, the runs may be ranked according to popularity of the test scenarios and/or the template of which the runs are instantiations. Optionally, the popularity of the test scenarios and/or templates may be determined based on the number of users that ran instantiations of the test scenarios and/or templates, and/or the number of organizations associated with instantiations of the test scenarios and/or the templates. In one example, the second run is selected from among the top 20% of most popular runs. In another example, the second run is the most popular run that involves the at least one component of the second instance that is similar to at least one component of the first instance.

In one embodiment, the template generator 238 is configured to receive a second run of a test scenario run to test the second instance of the certain module. Optionally, the template generator 238 is configured to select the second run from among runs of test scenarios associated with the second organization. The template generator 238 is configured to generate the test scenario template 240 based on the second run (in addition to the specific run 239). Optionally, the template 240 identifies a transaction used by the specific run and the second run, and possible values for running the transaction. Optionally, at least one of the possible values for running the transaction is not used in any of the specific run 239 and the second run. Optionally, the test scenario template 240 includes a combination of the possible values, and the combination is not used in any of the specific run 239 and the second run.

The data cleaner 242 is configured to remove from the test scenario template 240 proprietary data associated with the second organization. Additionally or alternatively, the data cleaner 242 may be configured to remove from the specific run 239 of the test scenario proprietary data associated with the second organization. Optionally, most output fields of the specific run are removed, and as a result, the test scenario template 240 does not include expected values for most test steps.

In one embodiment, the computer system optionally includes a customization module 244 that is configured to customize the test scenario template by adding to the test scenario template proprietary data relevant to the first organization. Optionally, at least some of the proprietary data is obtained from the first description 230*a*.

In another embodiment, the computer system optionally includes a user interface 246 that is configured to suggest to a user to run an instantiation of the template. Optionally, the user interface 246 may initiate an instantiation of the template. For example, the user interface 246 may present a first screen of the customized template and prompt the user to take a certain action to advance execution.

It is to be noted that different embodiments may implement components of the computer system illustrated in FIG. 21 in different ways. For example, in some embodiments one or more of the following may be implemented by the same software module and/or software modules running on the same processor: the module analyzer 232, the component analyzer 236, the template generator 238, the data cleaner 242, the customization module 244, and the user interface 246. Additionally, one or more of the aforementioned components may be implemented on a remote server, such as a cloud-based server.

In one example, the customization module 244 and/or the data cleaner 242 are both implemented as part of the template generator 238. In another example, the component analyzer 236 and the module analyzer 232 are both implemented by the same software module.

In one embodiment, the test scenario template undergoes customization by the customization module 244 prior to removal of proprietary data from the template by the data cleaner 242. In another embodiment, the order is reversed: proprietary data is removed from the template by the data cleaner 242, and then the template is customized by the customization module 244. In still another embodiment, customizing the template and removing proprietary data from it are performed by the same software module. Optionally, the software module utilizes the first description 230*a* and/or the second description 230*b* to determine which proprietary data needs to be removed from the template 240, and which proprietary data should be added to the template 240 when customizing it.

Figure 22:
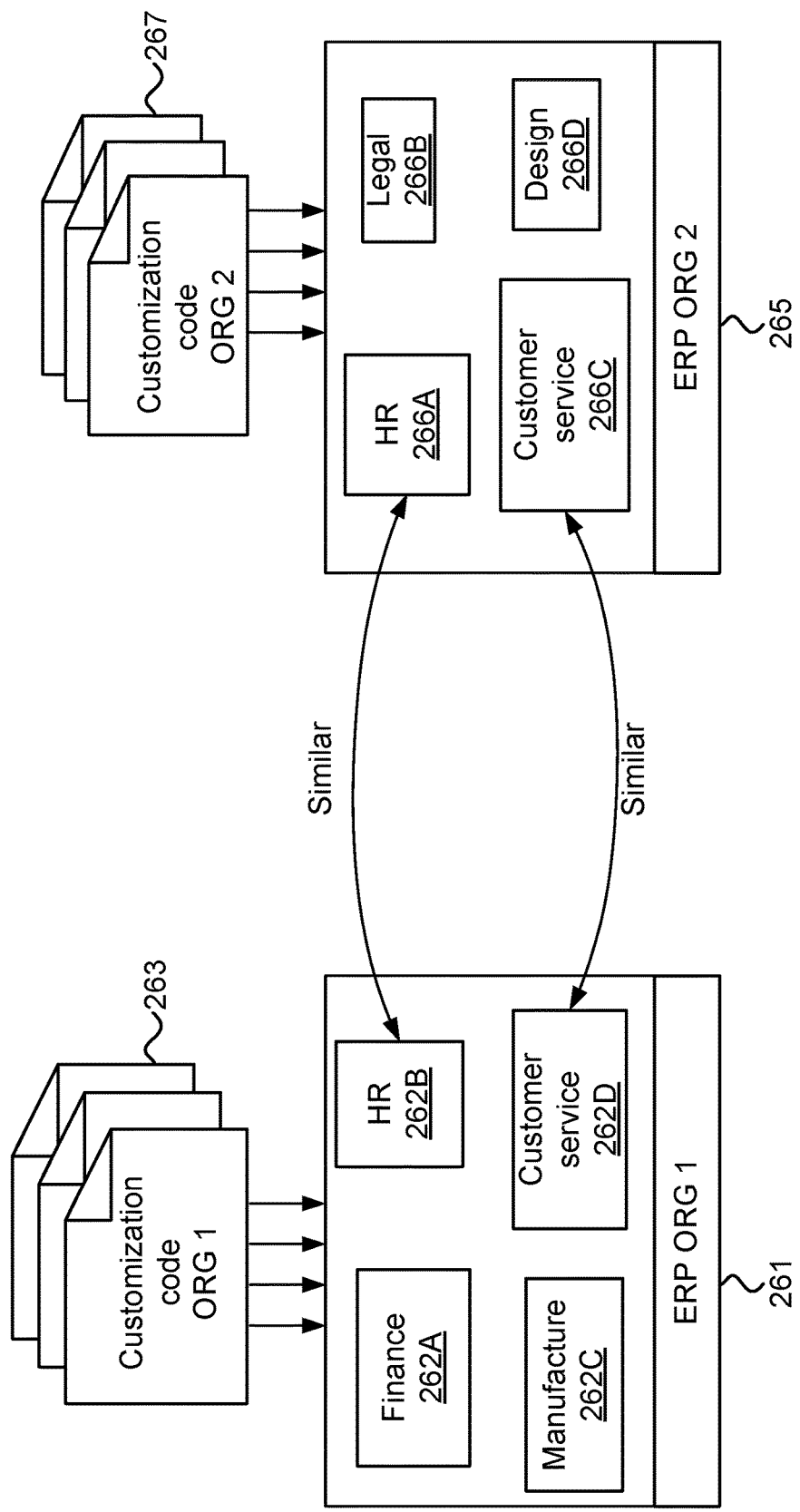
FIG. 22 illustrates similar modules detected based on descriptions of two organizations.

FIG. 22 illustrates similar modules detected based on descriptions of two organizations. In the illustration, each organization is associated with an ERP that includes vendor-customized packaged application modules (a first organization is associated with ERP 261 and a second organization is associated with ERP 265). Each ERP is customized by organization-specific customization code (the ERP of the first organization is customized by code 263 and the second ERP is customized by code 267). The description of the first ERP indicates which modules it includes; among the modules are finance 262A, human resources 262B, manufacture 262C, and customer service 262D modules. The description of the second ERP indicates which modules it includes; among them are human resources 266A, legal 266B, customer service 266C, and design 266D. Based on the first and second descriptions, and the customization code associated with the two organizations, it is determined that modules 262B and 266A are similar instances of a human resources module. In addition, it is determined that modules 262D and 266C are similar instances of a customer service module. Thus, a run of a test scenario of a user of the second organization that tests at least one of the modules 266A and 266C, may be utilized to generate a template for the first organization, that tests module 262B and/or 262D.

Figure 23:
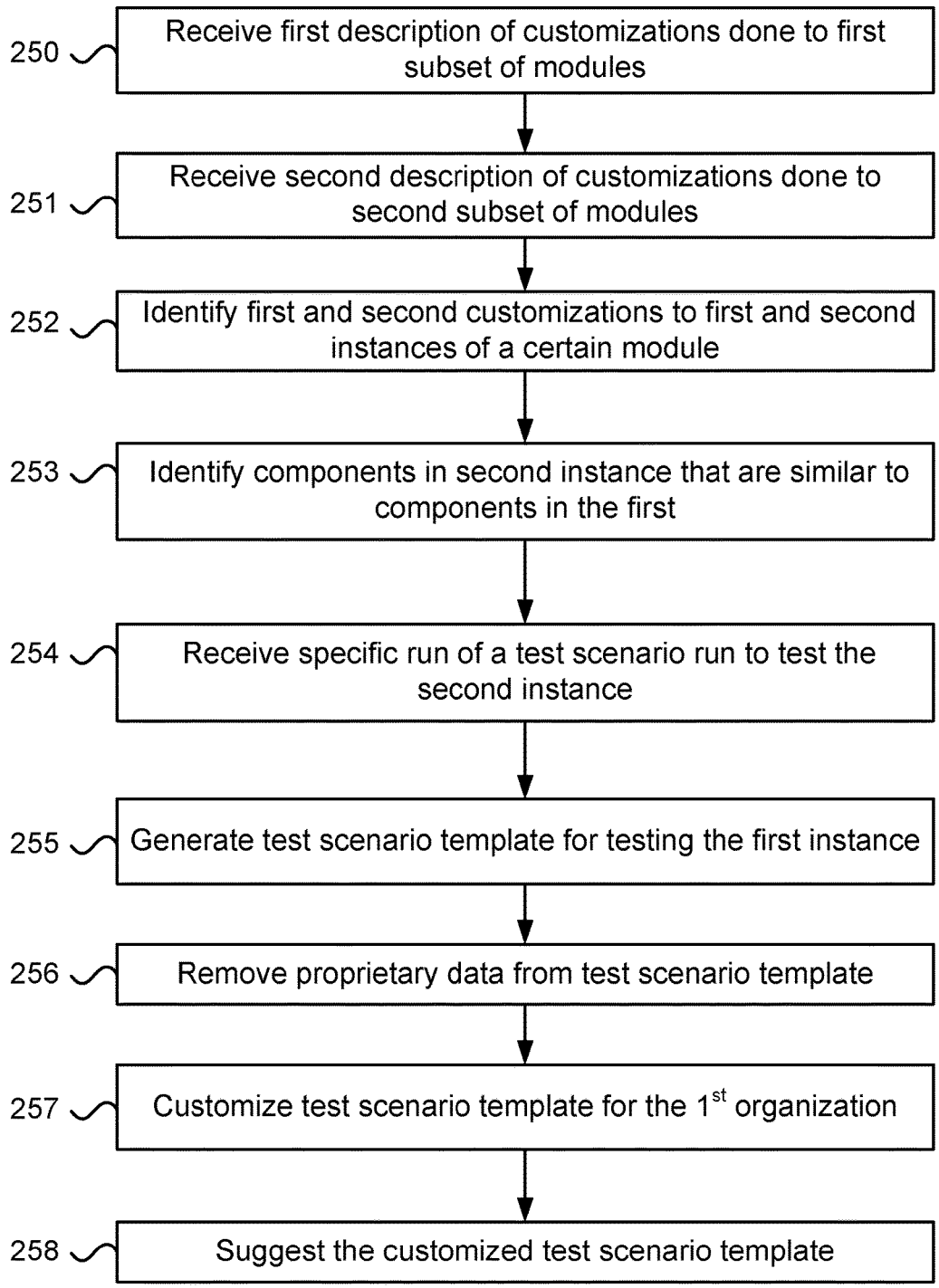
FIG. 23 illustrates one embodiment of a computer implemented method for generating a test scenario template from data collected from users running test scenarios to test vendor-customized packaged application modules.

FIG. 23 illustrates one embodiment of a computer implemented method for generating a test scenario template from data collected from users running test scenarios to test vendor-customized packaged application modules. The illustrated embodiment includes the following steps:

In step 250, receiving a first description of a first set of instances vendor-customized packaged application modules. A first organization uses the first set of modules and the first description includes customizations to modules from the first set.

In step 251, receiving a second description of a second set of instances vendor-customized packaged application modules. A second organization uses the second set of modules and the second description includes customizations to modules from the second set. Optionally, the second set includes at least one module that is not included in the first set. Optionally, the first organization and the second organization are associated with different fields of operation. Alternatively, the first organization and the second organization may be associated with a same field of operation.

In one embodiment, steps 250 and 251 are performed simultaneously. For example, the first and second descriptions are received in a same message (e.g., the same file).

In step 252, identifying, based on the first and second descriptions, a first customization to a first instance of a certain module and a second customization to a second instance of the certain module. Optionally, the first and second instances belong to the first and second sets, respectively. In addition, the first customization is similar to the second customization.

In step 253, identifying, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

In step 254, receiving a specific run of a test scenario run to test the second instance, and a description of similar components that includes an indication of at least one component of the second instance that is similar to at least one component of the first instance.

In step 255, generating, based on the specific run and the description of similar components, a test scenario template for testing the first instance.

And in step 256, removing from the test scenario template proprietary data associated with the second organization.

In one embodiment, generating the template in step 255 also involves selecting the specific run of a test scenario run to test the second instance from runs of test scenarios that were run to test the second instance. Alternatively or additionally, generating the template in step 255 may involve ranking popularity of runs of test scenarios, run to test the second instance, and selecting the specific run of a test scenario run to test the second instance from popular runs of test scenarios.

In one embodiment, the computer implemented method illustrated in FIG. 23 includes an optional step of receiving a second run of a test scenario run on the second instance of the certain module; generating the test scenario template is based both on the specific run and the second run. As a result, the test scenario template identifies a transaction used by the specific run and the second run, and possible values for running the transaction. Optionally, at least one of the possible values for running the transaction is not used in any of the specific run and the second run. Optionally, the test scenario template includes a combination of the possible values, and the combination is not used in any of the specific run and the second run.

In one embodiment, the computer implemented method illustrated in FIG. 23 includes an optional step of removing proprietary data from the specific run; most output fields of the specific run are removed, and as a result, the test scenario template does not include expected values for most test steps.

In one embodiment, the computer implemented method includes optional step 257 which involves customizing the test scenario template for the first organization by adding to the test scenario template proprietary data relevant to the first organization. Optionally, customizing the test scenario template for the first organization involves guiding a user to provide proprietary data relevant to the first organization. Optionally, guiding the user to provide proprietary data involves: providing to the user the test scenario template from which proprietary data associated with the second organization was removed, prompting the user to provide missing values, and recording a response of the user. Optionally, customizing the test scenario template for the first organization may involve adding the response of the user to the test scenario template from which proprietary data associated with the first organization was removed.

In one embodiment, guiding the user to provide proprietary data may involve semiautomatic execution of an instantiation of the test scenario template from which proprietary data associated with the second organization was removed. Additionally or alternatively, proprietary data of the first organization may be removed from the template. Additionally, customizing the test scenario template for the first organization may involve marking locations of values that were removed from the test scenario template; the guiding of the user to provide the proprietary data may involve directing the user's attention to the marked locations.

In one embodiment, the computer implemented method illustrated in FIG. 23 includes an optional step of receiving proprietary data associated with the first organization. Additionally, customizing the test scenario template for the first may involve adding to the test scenario template at least some of the received proprietary data associated with the first organization. Optionally, the received proprietary data associated with the first organization is generated from a previously recorded run of a test scenario associated with the first organization. Optionally, the received proprietary data associated with the first organization is generated by parsing manual test scenarios associated with the first organization. Optionally, the received proprietary data associated with the first organization is generated from analysis of a database of the software system associated with the first organization.

In one embodiment, the computer implemented method includes optional step 258 involving suggesting to a user to run an instantiation of the test scenario template.

In one embodiment, a non-transitory computer-readable medium stores program code that may be used by a computer to generate a test scenario template from data collected from users running test scenarios to test vendor-customized packaged application modules. The computer includes a processor, and the non-transitory computer-readable medium stores the following program code:

Program code for receiving a first description of a first set of instances vendor-customized packaged application modules. A first organization uses the first set and the first description comprises customizations to modules from the first set.

Program code for receiving a second description of a second set of instances vendor-customized packaged application modules. A second organization uses the second set and the second description comprises customizations to modules from the second set. Optionally, the second set includes at least one module that is not included in the first set.

Program code for identifying, based on the first and second descriptions, a first customization to a first instance of a certain module and a second customization to a second instance of the certain module; the first and second instances belongs to the first and second sets, respectively. Additionally, the first customization is similar to the second customization;

Program code for identifying, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

Program code for receiving a specific run of a test scenario run to test the second instance, and a description of similar components comprising an indication of at least one component of the second instance that is similar to at least one component of the first instance.

Program code for generating, based on the specific run and the description of similar components, a test scenario template for testing the first instance.

And program code for removing from the test scenario template proprietary data associated with the second organization.

In one embodiment, the non-transitory computer-readable medium optionally stores program code for r ranking popularity of runs of test scenarios run to test the second instance of the certain module, and selecting the specific run from the most popular results.

In one embodiment, the non-transitory computer-readable medium optionally stores program code for customizing the test scenario template for the first organization.

Figure 24:
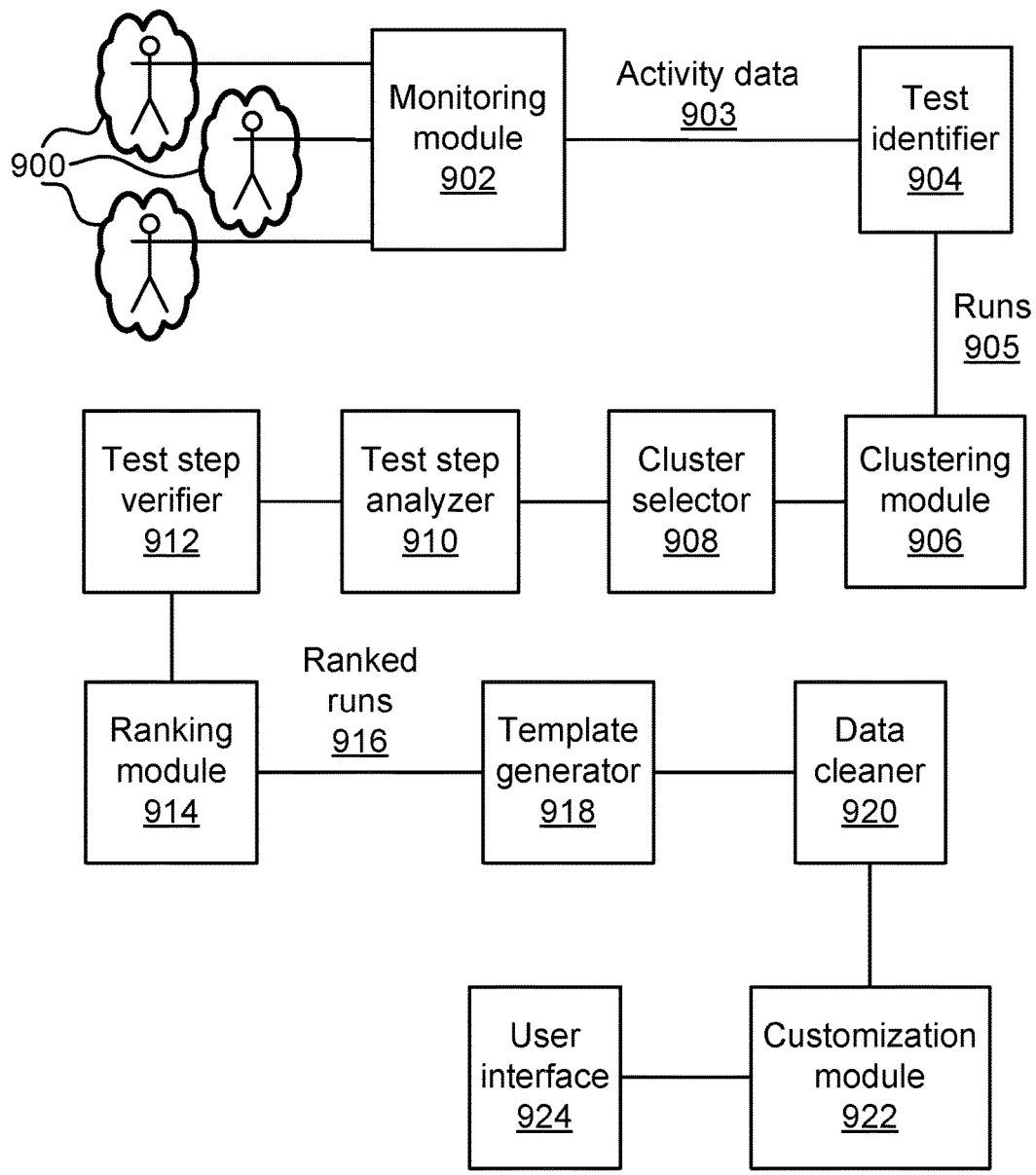
FIG. 24 illustrates one embodiment of a system configured to rank similar runs of test scenarios based on unessential test steps in the runs.
Figure 25:
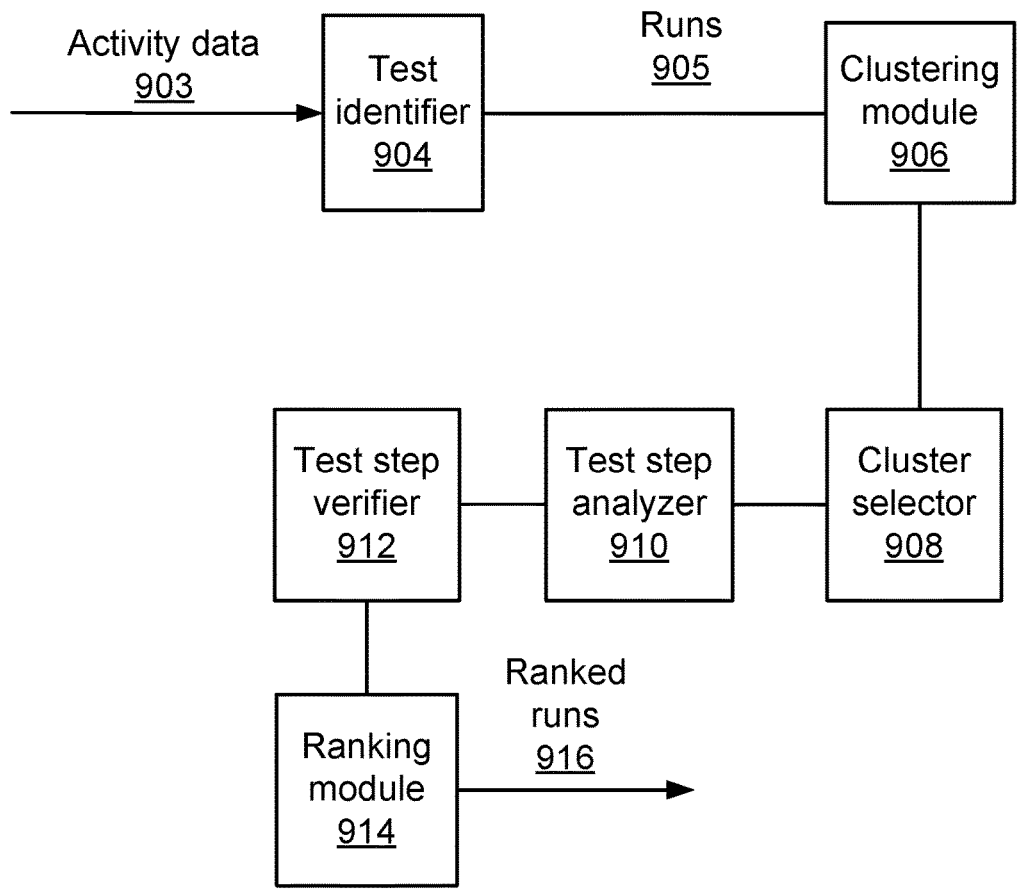
FIG. 25 illustrates one embodiment of a system configured to rank similar runs of test scenarios based on unessential test steps in the runs.

FIG. 24 and FIG. 25 illustrate embodiments of a computer system configured to rank similar runs of test scenarios based on unessential test steps in the runs. The illustrated embodiments include at least a test identifier 904, a clustering module 906, a cluster selector 908, a test step analyzer 910, a test step verifier 912, and a ranking module 914.

The test identifier 904 is configured to identify runs 905 of test scenarios run by users on software systems that belong to different organizations. Optionally, the users belong to different organizations. Optionally, the runs 905 are identified, at least in part, from activity data 903. In one example, the runs 905 include at least a first run that was run by a first user belonging to a first organization and a second run that was run by a second user belonging to a second organization, and the first organization is not the second organization and the first user is not the second user.

In one embodiment, a test scenario may be characterized as including one or more test steps; running the test scenario involves execution of the one or more test steps, and a run of the test scenario may describe the one or more test steps. Optionally, the test identifier 904 determines for at least some of the runs 905, at least some of the test steps that are executed while miming the test scenarios. Optionally, test steps may identified by a name, code, description, and/or serial number. Optionally, each run of the at least some runs, is associated with at least one subset of test steps that were executed in the run.

The clustering module 906 is configured to cluster the runs 905 of the test scenarios to clusters of similar runs of test scenarios. Optionally, the clustering module 906 is configured to process one or more of the following logged activities: a list of users who ran the test scenarios, an analysis of access to a database, messages returned from executed transactions, values returned by fields, and procedures utilized by a test scenario. Optionally, the clusters may be of various sizes, and include runs of various users belonging to different organizations. Optionally, the clustering module 906 performs processing of the runs 905 prior to clustering; for example, it extracts field values from screens in runs. Optionally, the clustering module 906 may receive the runs 905 after they undergo processing. For example, the runs may be represented as vectors of features on which a clustering algorithm utilized by the clustering module 906 may operate.

The cluster selector 908 is configured to select from the clusters a certain cluster. The selection of a cluster may be done according to various parameters, such as the cluster's size, the number organizations associated with runs belonging to the cluster, and/or attributes of transactions executed in the runs belonging to the cluster. Optionally, the more runs belong to a cluster and/or the larger the number of organizations associated with runs that belong to the cluster, the likelier the cluster selector 908 is to select the cluster to be the certain cluster.

In one embodiment, the certain cluster selected by the cluster selector 908 includes a first run of a first test scenario and a second run of a second test scenario; the first run is associated with a first organization belonging to the different organizations and the second run is associated with a second organization belonging to the different organizations. Additionally, the first run is not identical to the second run, and the first organization is not the second organization. In this embodiment, the fact that the selected cluster includes runs associated from different organizations may be indicative of the fact that the runs test business processes and/or transactions that are likely also used by organizations other than the first and second organizations.

In another embodiment, the cluster selector 908 receives a profile of a certain user and/or a certain organization, and selects the certain cluster based on the profile. Optionally, the profile may indicate usage data of the certain user and/or the certain organization. For example, the profile may indicate certain business processes, transactions, screens, and/or values that appear runs of test scenarios run by the certain user and/or associated with the certain organization. The cluster selector 908 may then select the certain cluster such that the cluster includes runs related to the certain business processes, transactions, screens, and/or values.

The test step analyzer 910 is configured to identify occurrences of potentially unessential test steps in the similar runs of test scenarios. The test step analyzer 910 may base its analysis on data included in the similar runs of test scenarios, such as data related to execution of transactions including input/output values of business processes, screens, and/or transactions. The test step analyzer 910 may also utilize additional resources such as looking up test steps (e.g., according to an identifier, command code) in a database to determine whether they are potentially unessential.

Note, that in this embodiment, a test step may be considered to be a potentially unessential test step if analysis of a run of a test scenario indicates that it is likely to be unessential; additional evidence may be required in order for the test step to be considered a verified unessential test step.

In one embodiment, a potentially unessential test step may be characterized by the fact that when a potentially unessential test step is removed from a certain test scenario, that does not affect main outcome of running the certain test scenario. For example, if a specific test step in a test scenario requires input of certain data that is just stored and not utilized throughout the test, then skipping the specific test step when running the test scenario is not likely to change anything in the outcome. This fact may indicate that the specific test step is potentially unessential.

In another embodiment, the test step analyzer 910 is configured to identify a screen, which does not return a value usable for its calling screen, as an unessential screen that generates a potentially unessential test step. For example, a certain test step may involve entering values into a certain screen. Filling values into the certain screen does not result in the execution of a business process that affects the system (e.g., a read and/or write to a database), but rather just in the return of a generic code. The generic code is not utilized by the screen that came before (called) the certain screen, and is essentially discarded. In this example, the certain screen does not contribute much to the testing of the system and is thus a potentially unessential screen. The certain test step that involves filling in data to the certain screen can thus be considered a potentially unessential test step, since it does not do something useful for testing the system.

In yet another embodiment, the test step analyzer 910 is further configured to identify a test step that generates an error message as a potentially unessential test step. For example, a screen that returns an error message such as invalid zip code entered may correspond to an unessential step (entering the zip code in the screen may be the test step). In this example, the error code may have emerged when attempting to switch between screens, in which case, the entered data is verified by the system. After receiving the error message, it may be assumed that a following corrective step is the right one (e.g., filling in a new and correctly formatted zip code), and thus the previous step (that is corrected by the corrective step) is potentially unessential.

In some embodiments, relying on analysis of test steps to determine whether they are unessential may not be sufficient. There may be considerations that were not taken in to account in the analysis, and thus even though a test step looks like it is unessential (based on the analysis), it is in fact not unessential. Therefore, test steps designated the test step analyzer 910 are labeled only "potentially unessential test steps". The fact that a certain potentially unessential test step is widely performed may serve as evidence that its label as "potentially unessential" may be a mistake, and in fact that analysis of the certain test step may be wrong. Optionally, evidence of a test step being widely performed may involve observing occurrences of the certain test step in numerous runs of test scenarios, by multiple users, and/or by user belonging to different organizations.

Herein, an occurrence of a certain test step in a run of a test scenario refers to there being in the run of the test scenario evidence that the certain test step was performed when the test scenario was executed (as recorded in the run). Optionally, the evidence may be direct (e.g., by specifically mentioning execution of commands from the test step) and/or indirect (e.g., by including in the run a value returned by the certain test step).

In one embodiment, the test step verifier 912 determines how widespread is the use of a certain test step based on runs of test scenarios of users from different organizations. The test step verifier 912 is configured to count, for each potentially unessential test step, number of different users that ran a test scenario that includes the potentially unessential test step. The test step verifier 912 is also configured to label a potentially unessential test step as a verified unessential test step when its corresponding number of different users is below a predetermined threshold. Optionally, the predetermined threshold is proportional to number of users that ran test scenarios with runs in the certain cluster; for example, the predetermined threshold equals 5% of the number of users belonging to the different organizations that ran runs that belong to the certain cluster. Thus, the larger the number of users that ran test scenarios with runs in the certain cluster, the higher the predetermined threshold. In another example, the predetermined threshold is fixed and set to 5 users.

In one embodiment, the test step verifier 912 determines how widespread is the use of a certain test step based on runs of test scenarios associated with different organizations. Optionally, the test step verifier 912 is configured to count, for each potentially unessential test step, the number of different organizations that have a user that belongs to them that ran a test scenario that includes the potentially unessential test step. The test step verifier 912 is also configured to label a potentially unessential test step as a verified unessential test step when its corresponding number of different organizations is below a predetermined threshold. Optionally, the predetermined threshold is proportional to number of the different organizations; for example, the predetermined threshold corresponds to 10% of the number of different organizations. Thus, the larger the number of different organizations, the higher the predetermined threshold. In another example, the predetermined threshold is fixed. For example, the predetermined threshold is two organizations.

In yet another embodiment, the test step verifier 912 determines how widespread is the use of a certain test step based on runs of test scenarios of users from different organizations. The test step verifier 912 is configured to count, for each potentially unessential test step, a first number of different users that ran a test scenario that includes the potentially unessential test step, and a second number of different organizations that have a user that belongs to them that ran a test scenario that includes the potentially unessential test step. The test step verifier 912 is also configured to label a potentially unessential test step as a verified unessential test step when its corresponding first number of different users is above a first predetermined threshold and its corresponding second number of different organizations is above a second predetermined threshold.

Optionally, the first predetermined threshold is proportional to number of users that ran test scenarios with runs that belong the certain cluster; for example, the first predetermined threshold may be set at 10% of the users that have runs in the certain cluster. Alternatively, the first predetermined threshold may be fixed; for example, the first predetermined threshold may be set to be 7. Optionally, the second predetermined threshold is proportional to number of the different organizations; for example, the second predetermined is set to 5% of the number of different organizations. Alternatively, the second predetermined threshold is fixed; for example, the second predetermined threshold is set to be 3.

The ranking module 914 is configured to rank the runs of the test scenarios belonging to the certain cluster based on number of occurrences of verified unessential test steps in the runs, such that a first run, having more occurrences of verified unessential test steps than a second run, is ranked lower than the second run.

As used in here, the verb rank and its derivatives may mean to either induce and order according to some score or to assign a score from which an ordering may be induced. For example, ranking the runs of test scenarios belonging to the certain cluster based on the number of occurrences of verified unessential steps can mean that each run is assigned a score that is a function of the number of verified unessential steps (e.g., the score may be given according to the identity function). This score can then be used to order the runs, so a first run with a lower score than a second run comes before the second run (and is thus ranked lower). Alternatively, ranking the runs of test scenarios belonging to the certain cluster based on the number of occurrences of verified unessential steps can mean that the runs are arranged in an increasing order of their number of verified unessential steps (without specifically assigning each an explicit function-generated score).

In one embodiment, the ranking module 914 generates ranked runs 916 of test scenarios. For example, each of the ranked runs 916 may have an associated rank score attached to it; such that the higher the rank score, the higher the run is ranked. Alternatively or additionally, the ranked runs 916 may have an order assigned to them, based on the ranking. For example, a first run that is ranked higher than a second run may appear ahead of the second run according to the order. Optionally, the ranked runs 916 may include ranking information that may be used to associate runs with their corresponding ranks (e.g., the ranking information may include a table that lists run identifiers and their corresponding ranks). Optionally, the ranked runs 916 may include runs of the test scenarios belonging to the certain cluster augmented by the ranking information. In one example, augmenting runs involves adding a score (e.g., a rank score) to the runs. In another example, augmenting runs involves assigning an order to the runs, such that, based on the order, at least one run appears ahead of another run.

In one embodiment, the ranking module 914 ranks runs belonging to the certain cluster, at least in part, according to a number of users and/or organizations that are associated with test scenarios and/or templates of which the runs are instantiations. A user may be considered associated with a test scenario and/or a template if the user ran an instantiation of the test scenario and/or the template. Additionally, an organization may be considered associated with a test scenario and/or a template if a user belonging to the organization is associated with the test scenario and/or the template. Optionally, the larger the number of users and/or organizations associated with a test scenario and/or a template of which a run of a test scenario is an instantiation, the higher the run is ranked by the ranking module.

In one embodiment, the computer system may optionally include a monitoring module 902 that is configured to monitor the users 900 belonging to the different organizations and to provide the activity data 903 obtained from monitoring the users 900 to the test identifier 904.

In one embodiment, the computer system may optionally include a template generator 918 that is configured to generate the test scenario template based on one or more of the ranked runs 916 of test scenarios belonging to the certain cluster and the ranking of the runs. For example, the template generator 918 may select a run of a test scenario belonging to the certain cluster that is a highest ranked run, and generate the template based on the selected run.

In one embodiment, the template generator 918 is configured to generate the test scenario template based on a first and a second run belonging to the ranked runs 916. Optionally, the first run is associated with a first organization and the second run is associated with a second organization that is not the first organization. Optionally, the template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the computer system may optionally include a user interface 924 configured to suggest to a user to run an instantiation of the test scenario template. Optionally, the user interface 924 may initiate the instantiation of the manipulated test scenario template. For example, the user interface 924 may present a first screen belonging to the test scenario template and prompt a user to take a certain action to advance execution.

In one embodiment, the computer system optionally includes a customization module 922. The customization module 922 is configured to customize the test scenario template for a user by adding to the test scenario template proprietary data relevant to the user. Optionally, the customization module 922 receives a profile of the user and customizes the template based on the profile.

In one embodiment, the computer system optionally includes a data cleaner 920 that is configured to remove from the test scenario template proprietary data associated with at least one of the different organizations. Optionally, the data cleaner is configured to remove proprietary data from the one or more ranked runs based upon which the template was generated. Optionally, most output fields of the one or more runs are removed by the data cleaner 920, and as a result, the test scenario template does not include expected values for most test steps.

It is to be noted that different embodiments may implement components of the computer system illustrated in FIG. 24 and/or FIG. 25 in different ways. For example, in some embodiments one or more of the following may be implemented by the same software module and/or software modules running on the same processor: the monitoring module 902, the test identifier 904, the clustering module 906, the cluster selector 908, the test step analyzer 910, the test step verifier 912, the ranking module 914, the template generator 918, the data cleaner 920, the customization module 922, and the user interface 924. Additionally, one or more of the aforementioned components may be implemented on a remote server, such as a cloud-based server.

In one example, the customization module 922 and/or the data cleaner 920 are both implemented as part of the template generator 918. In another example, the clustering module 906 and the cluster selector 908 are both implemented by the same software module. In yet another example, the test step analyzer 910 and the test step verifier 912 are both implemented by the same software module.

In one embodiment, the test scenario template may undergo customization by the customization module 922 prior to removal of proprietary data from the template by the data cleaner 920. In another embodiment, the order is reversed: proprietary data is removed from the template by the data cleaner 920, and then the template is customized by the customization module 922. In still another embodiment, customizing the template and removing proprietary data from it are performed by the same software module.

In another embodiment, the clustering module 906, cluster selector 908, test step analyzer 910, test step verifier 912, and/or the ranking module 914 are implemented as a cloud-based service that receives runs of test scenarios 905 identified from the activity data 903 of the users 900 belonging to the different organizations, and ranks at least some of the runs 905. Optionally, the template generator 918, the test identified 904, and/or the data cleaner 920 may also may also be part of the cloud-based service.

Figure 26:
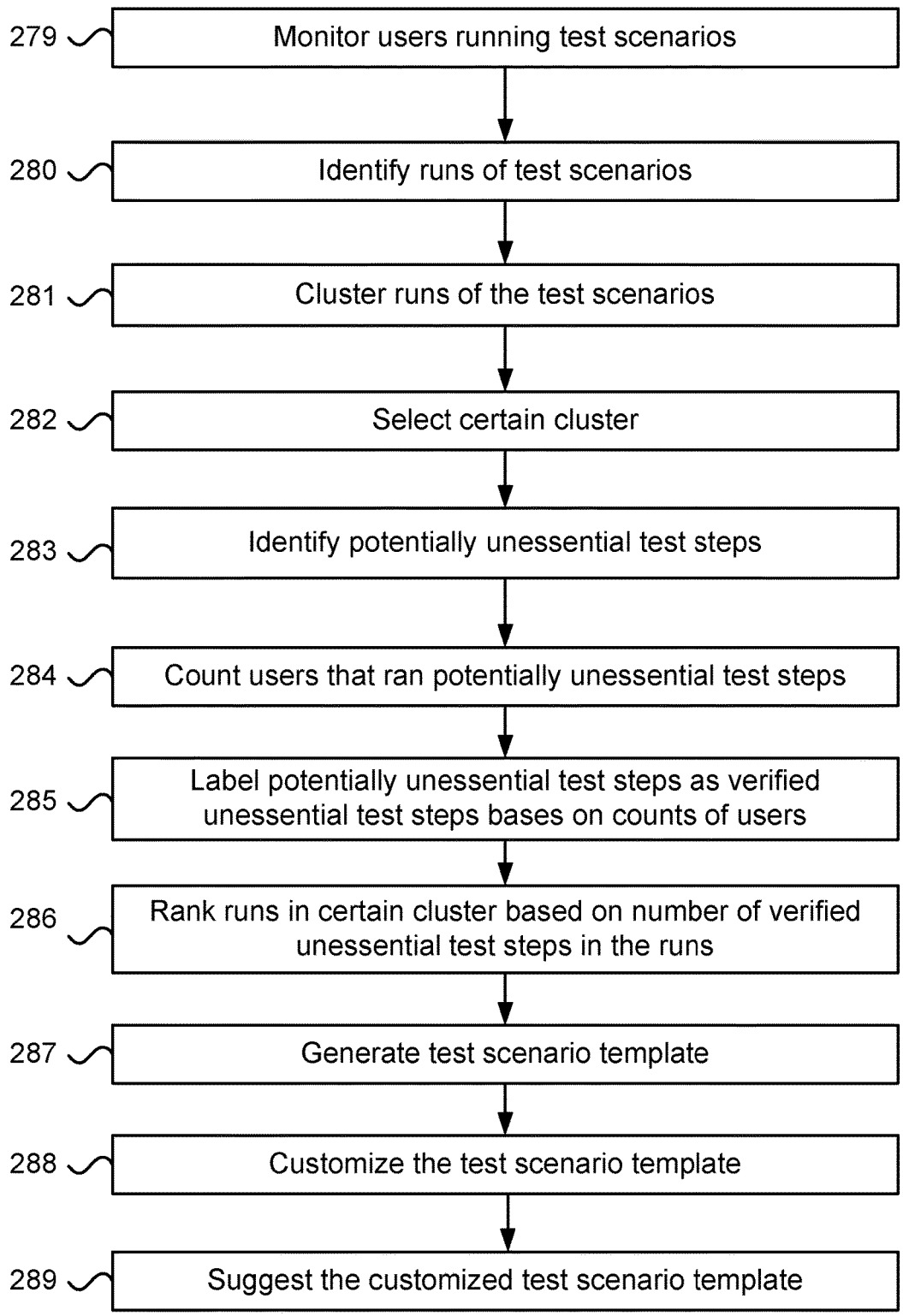
FIG. 26 illustrates one embodiment of a computer implemented method for ranking similar runs of test scenarios based on unessential test steps in the runs.

FIG. 26 illustrates one embodiment of a computer implemented method for ranking similar runs of test scenarios based on unessential test steps in the runs. The illustrated embodiment includes the following steps:

In step 280, identifying runs of test scenarios run by users on software systems that belong to different organizations. A test scenario includes one or more test steps.

In step 281, clustering the runs of the test scenarios to clusters that include similar runs of test scenarios.

In step 282, selecting from the clusters a certain cluster that includes similar runs of test scenarios associated with at least two different organizations.

In step 283, identifying occurrences of potentially unessential test steps in the similar runs of test scenarios. Optionally, identifying an occurrence of an unessential test step in a run of a test scenario is done by analyzing the run in order to determine whether to characterize a test step executed in the run of the test scenario as being a potentially unessential test step. Optionally, there may different ways to characterize a potentially unessential test step. In one example, when a potentially unessential test step is removed from a certain test scenario, that does not affect main outcome of running the certain test scenario. In another example, a screen, which does not return a value usable for its calling screen, may be an unessential screen that generates a potentially unessential test step. In yet another example, a test step that generates an error message may be characterized as a potentially unessential test step. In one embodiment, evidence of one or more of the aforementioned characterizations of a potentially unessential are obtained by analyzing runs of test scenarios belonging to the certain cluster.

In step 284, counting, for each potentially unessential test step, number of different users that ran a test scenario that comprises the potentially unessential test step.

In step 285, labeling some of the potentially unessential test steps as verified unessential test steps. Optionally, a potentially unessential test step is labeled a verified unessential test step when its corresponding number of different users is below a predetermined threshold. Optionally, the predetermined threshold is proportional to the number of various users.

And in step 286, ranking the runs of the test scenarios belonging to the certain cluster based on number of occurrences of verified unessential test steps in the runs, such that a first run, having more verified occurrences of unessential test steps than a second run, is ranked lower than the second run.

In one embodiment, the counting of the number of users in step 284 may be done in order to provide additional evidence that the pattern of usage by users from different organizations supports the fact that indeed certain test steps are unessential. If few users actually utilize a certain potentially unessential test step (e.g., the number of user is below the predetermined threshold), then this may be evidence that the certain potentially unessential test step is indeed unessential; thus it is labeled a "verified unessential test step". However, had there been a large number of users (above the predetermined threshold), then this may be evidence that the test step serves a purpose, and despite being identified as potentially unessential in step 283, it is in fact not unessential.

In another embodiment, a potentially unessential test step may be verified by determining a number of organizations with associated runs that have occurrences of the potentially unessential test step. If the number of organizations is below a predetermined threshold, this may verify that indeed the test step is unessential (the low usage may be evidence of that). Optionally, the predetermined threshold may be proportional to the number of organizations associated with runs in the certain cluster (e.g., the higher the number organizations with runs in the certain cluster, the higher the predetermined threshold).

In yet another embodiment, a potentially unessential test step may be verified by determining both a first number of users that ran test scenarios with the unessential test step and a second number of organizations that are associated with runs that include occurrences of the potentially unessential test step. If both the first number exceeds a first predetermined threshold, and the second number exceeds a second predetermined threshold, the potentially unessential test step may be not be considered a verified unessential test step. In this example, if one of the first predetermined threshold and second predetermined thresholds are not exceeded, the potentially unessential test step in considered to be a verified unessential test step.

In one embodiment, the computer implemented method may include optional step 287 which involves generating a test scenario template representing the certain cluster based on one or more runs of test scenarios belonging to the certain cluster and ranking of at least some of the runs of test scenarios belonging to the certain cluster. Optionally, at least one of the highest ranked runs of the test scenarios belonging to the certain cluster is utilized for generating a test scenario template for the runs of the test scenarios belonging to the certain cluster. Optionally, generating the test scenario template representing the certain cluster is based on a highest ranked run of a test scenario belonging to the certain cluster.

In one embodiment, the computer implemented method illustrated in FIG. 26 may include an optional step of recording a user while running a certain test scenario, identifying that the certain test scenario is similar to the test scenario template, and suggesting the user to run the generated test scenario template.

In another embodiment, the computer implemented method illustrated in FIG. 26 may include an optional step of selecting a value from the test scenario template, and removing the selected value from the test scenario template if the selected value appears in less than a first predetermined number of the runs of test scenarios in the certain cluster or the selected value appears in runs of test scenarios in the selected cluster that are associated with less than a second predetermined number of different organizations. In this embodiment, both the first predetermined number and the second predetermined number are greater than one.

In yet another embodiment, the computer implemented method illustrated in FIG. 26 may include an optional step of involving selecting a value from a run of a test scenario belonging to the certain cluster, testing whether the value appears in at least a first predetermined number of the runs in the certain cluster. Following that, testing whether the value appears in runs in the certain cluster that are associated with at least a second predetermined number of different organizations. If both conditions are positive, enabling the test scenario template to utilize the selected value. Optionally, if at least one of the aforementioned conditions is negative, the computer implemented method illustrated in FIG. 26 may include an optional step involving not enabling the test scenario template to utilize the selected value.

In one embodiment, the computer implemented method includes optional step 288 which involves customizing the test scenario template for a user by adding to the test scenario template proprietary data relevant to the user.

In one embodiment, the computer implemented method may include optional step 289 which involves suggesting to a user to run an instantiation of the customized test scenario template. Optionally, the user interface 278 is utilized to suggest to the user to run the instantiation of the template. Optionally, the template is customized prior to suggesting to the user.

In one embodiment, the computer implemented method may include optional step 279, which involves monitoring the users and providing data obtained from the monitoring for use in the identifying of the runs of test scenarios.

In one embodiment, the computer implemented method illustrated in FIG. 26 optionally includes a step of removing from the test scenario template proprietary data associated with at least one of the different organizations. Additionally or alternatively, the computer implemented method illustrated in FIG. 26 may optionally include a step of removing proprietary data associated with at least one of the different organizations from one or more runs belonging to the certain cluster.

In one embodiment, a non-transitory computer-readable medium stores program code that may be used by a computer to rank similar runs of test scenarios based on unessential test steps in the runs. The computer includes a processor, and the non-transitory computer-readable medium stores the following program code:

Program code for identifying runs of test scenarios run by users on software systems that belong to different organizations. Optionally, a test scenario comprises one or more test steps.

Program code for clustering the runs of the test scenarios to clusters that include similar runs of test scenarios.

Program code for selecting from the clusters a certain cluster that includes similar runs of test scenarios associated with at least two different organizations.

Program code for identifying occurrences of potentially unessential test steps in the similar runs of test scenarios. Optionally, a potentially unessential test step may be characterize by the fact that removing the potentially unessential test step from a certain test scenario does not affect a main outcome of running the certain test scenario.

Program code for counting, for each potentially unessential test step, number of different users that ran a test scenario that includes the potentially unessential test step.

Program code for labeling some of the potentially unessential test steps as verified unessential test steps. Optionally, a potentially unessential test step may be labeled as a verified unessential test step when its corresponding number of different users is below a predetermined threshold.

And program code for ranking the runs of the test scenarios belonging to the certain cluster based on number of occurrences of verified unessential test steps in the runs, such that a first run, having more verified occurrences of unessential test steps than a second run, is ranked lower than the second run.

In one embodiment, the non-transitory computer-readable medium optionally stores program code for monitoring users belonging to different organizations to identify runs of test scenarios run on software systems belonging to the different organizations.

In one embodiment, the non-transitory computer-readable medium optionally stores program code for identifying a screen, which does not return a value usable for its calling screen, as an unessential screen that generates unessential test steps.

In one embodiment, the non-transitory computer-readable medium optionally stores program code for utilizing at least one of the highest ranked recorded test scenarios for generating a test scenario template representing the certain cluster.

Figure 27:
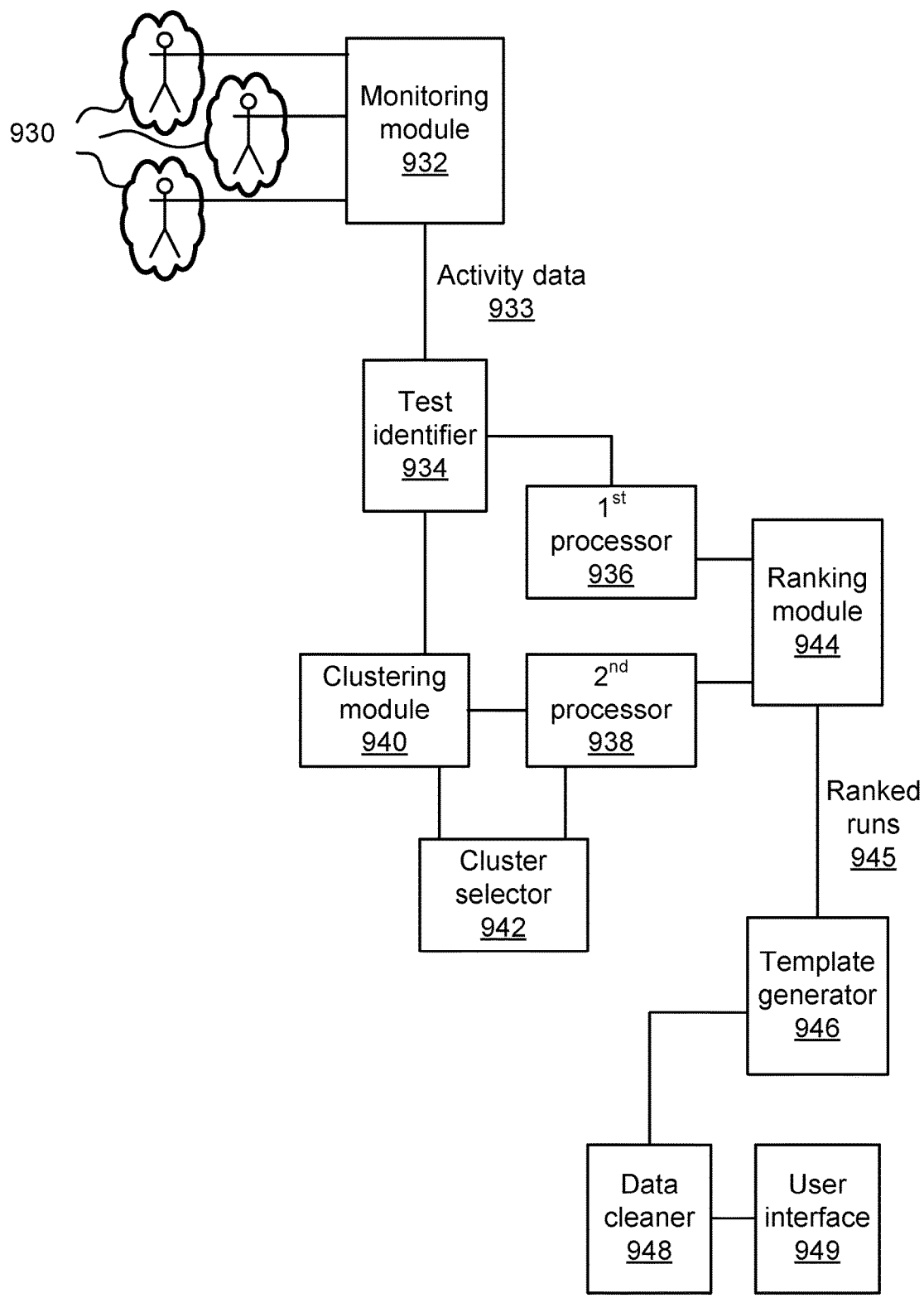
FIG. 27 illustrates one embodiment of a computer system configured to rank runs of test scenarios belonging to a cluster.
Figure 28:
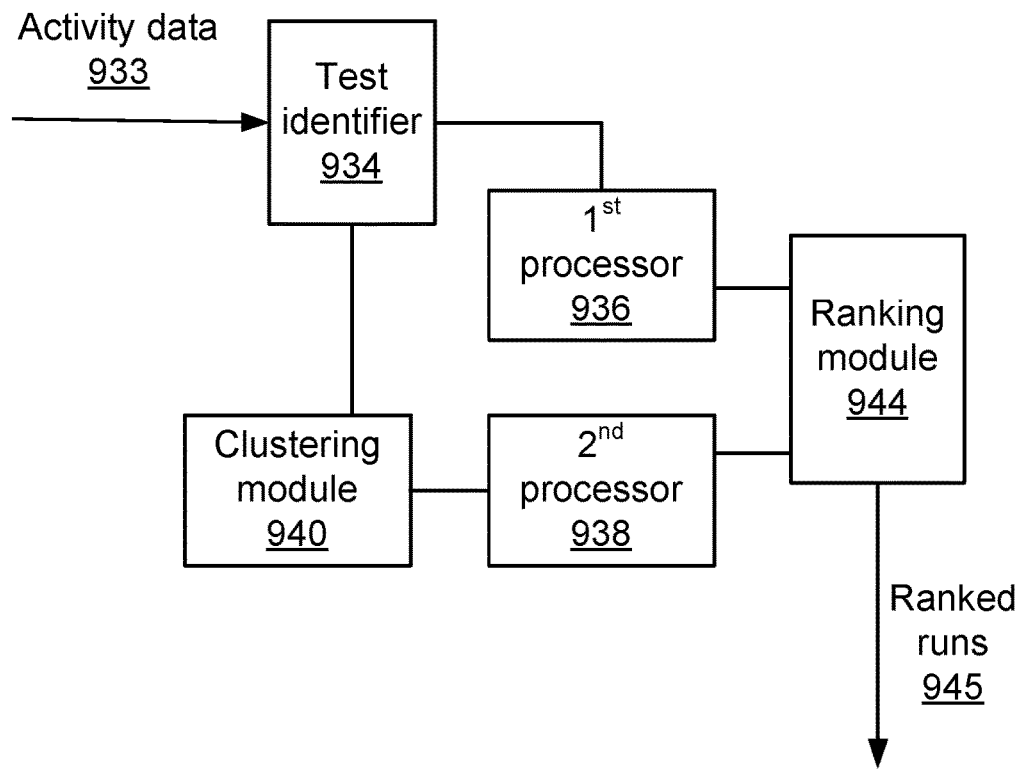
FIG. 28 illustrates one embodiment of a computer system configured to rank runs of test scenarios belonging to a cluster.

FIG. 27 and FIG. 28 illustrate embodiments of a computer system configured to rank runs of test scenarios belonging to a cluster. The illustrated embodiments include at least a test identifier 934, a first processor 936, a clustering module 940, a second processor 938, and a ranking module 944. Optionally, the first processor 291 and the second processor 294 are the same processor.

The test identifier 934 is configured to identify runs of test scenarios run by users belonging to different organizations on software systems that belong to the different organizations. Optionally, the runs are identified based on activity data 933 obtained from monitoring the users. Optionally, each test scenario involves executing at least one transaction, and each transaction is instantiated from a transaction type.

Herein, by stating that a transaction is instantiated from a certain transaction type or that the transaction is an instantiation of a certain transaction type, it is meant that the transaction may be classified as being of the certain transaction type. All transactions that are instantiations of the same transaction type are similar. For example, transactions that are instantiations of the same transaction type may perform similar actions, contain similar code, and/or utilize similar values. Optionally, where clear from the context, a transaction type may be referred to as a "transaction".

In one example, a transaction type involves accepting a customer order. The transaction type defines a certain screen with fields relevant to a customer order (e.g., customer details, product details, and/or payment method). After details of a new customer order are entered, the system may processes the order, e.g., by checking whether entered details is consistent and then forwarding the order to the warehouse. In this example, each time a user enters a new customer order and the system processes, that may be considered an instantiation of the "accepting a customer order" transaction type.

In another example, a transaction type involves calculating salary for an employee. The transaction type may have a screen that requires entry of worker details (e.g., worker ID and number of hours worked in the past month). Each calculation of a salary for a different employee may be considered an instantiation of a "salary calculation" transaction type. Similarly, calculating salaries in a different company on a similar system (which may be customized differently), using a similar screen may also be considered an instantiation of the same "salary calculation" transaction type.

The first processor 936 is configured to receive a selection of a certain transaction type, and to calculate, based on the runs of the test scenarios, a first number of different organizations associated with users that ran test scenarios that involve executing a transaction instantiated from the certain transaction type.

In one embodiment, the first processor 936 analyzes the runs of test scenarios and searches for information identifying which transactions are executed in each run. For each identified transaction in a certain run of a test scenario, the first processor 936 determines whether the transaction is an instantiation of the certain transaction type. If it is, the first processor 936 takes notice of an organization associated the certain run of the test scenario. For example, the first processor 936 determines which user ran the certain run and/or to what organization the user who ran the certain run belongs. The first processor 936 may add the organization to a list of organizations that are associated with runs that involve executing a transaction that is an instantiation of the certain transaction type. Finally, the first processor 936 may determine the number of different organizations that appear in the list. This number may be used as the first number of different organizations associated with users that ran test scenarios that involve executing a transaction instantiated from the certain transaction type.

In another embodiment, the selection of the certain transaction type is done, at least in part, according to a profile of a user and/or a certain organization. Optionally, the profile includes information regarding transactions frequently executed by the user and/or users belonging to the certain organization.

The clustering module 940 is configured to cluster the runs of test scenarios to clusters that include similar runs of test scenarios. Optionally, the clustering module 940 provides the second processor 938 with runs of test scenarios belonging to the certain cluster. For example, after receiving a request for the certain cluster, the clustering module 940 provides the runs of test scenarios belonging to the certain cluster. Additionally or alternatively, the clustering module 940 may provide the second processor 938 with indications identifying runs belonging to the certain cluster (e.g., the indications may be unique identifiers such as database entry numbers or file paths).

The second processor 938 is configured to receive a selection of a certain cluster, selected from among the clusters, and to calculate, based on runs of the test scenarios belonging to the certain cluster, a second number of different organizations associated with users that ran test scenarios involving execution of a transaction instantiated from the certain transaction type.

In one embodiment, the second processor 938 analyzes the runs of test scenarios belonging to the certain cluster and searches for information identifying which transactions are executed in each run. For each identified transaction in a certain run of a test scenario belonging to the certain cluster, the second processor 938 determines whether the transaction is an instantiation of the certain transaction type. If it is, the second processor 938 takes notice of an organization associated with the certain run of the test scenario belonging to the certain cluster. For example, the second processor 938 determines which user generated the certain run and/or to what organization the user who generated the certain run belongs. The second processor 938 may add the organization to a list of organizations that are associated with runs belonging to the certain cluster that involve executing a transaction that is an instantiation of the certain transaction type. Finally, the second processor 938 determines the number of different organizations that appear in the list. This number may be used as the second number of different organizations associated with users that ran test scenarios that involve executing a transaction instantiated from the certain transaction type.

The ranking module 944 is configured to rank runs of test scenarios belonging to the certain cluster according to a function of the first number and the second number. Optionally, the function is a monotonic increasing function, i.e., increasing the value of the first number and/or increasing the value of the second number increases the value returned by the function (and according to which the ranking is performed). In one example, the function is the sum of the first and second numbers. In another example, the function gives higher weight to the second number than it does to the first number (e.g., the function ranks according to the sum of the first number and three times the second number).

In some embodiments, various weights in the function for the first and second numbers may reflect different test strategies that may be used when considering which test scenarios to run. For example, increasing the weight of the first number relative to the second, may be indicative of a global test-strategy that favors testing transactions that are generally used by many organizations (and not focusing on transactions that are prevalent in the certain cluster). However, increasing the weight of the second number, with respect to the first number, may be indicative of a cluster-specific test strategy, which focuses on transactions that are prevalent in runs in the certain cluster.

In one embodiment, the function of the first number and the second number is a monotonic increasing function. Thus, increasing the first number and the second number increases the value of the function of the first number and the second number. Additionally, increasing the first number while the second number remains the same, also increases the value of the function of the first number and the second number. Similarly, increasing the second number while the first number remains the same, also increases the value of the function of the first number and the second number. In one example, a monotonic increasing function of the first number and the second number computes the sum of the first number and the second number. In another example, a monotonic increasing function of the first number and the second number computes the sum of the first number and the second number computes the geometric mean of the first number and the second number.

In one embodiment, the system optionally includes a template generator 946 that is configured to utilize at least one of the highest ranked runs of test scenarios belonging to the certain cluster to generate a test scenario template. Additionally, the computer system may also include a data cleaner 948 that is configured to remove proprietary data from the test scenario template.

In one example, the highest ranked runs test scenarios belong to the top 20% of the runs in the certain cluster. In another example, the highest ranked runs are one or more runs that received the highest value given by the function of the first number and the second number.

In one embodiment a data cleaner 948 may be included in the system. The data cleaner 948 is configured to: select a value from the test scenario template, and remove the selected value from the test scenario template if the selected value appears in less than a first predetermined number of the runs of test scenarios in the certain cluster or the selected value appears in runs of test scenarios in the certain cluster that are associated with less than a second predetermined number of different organizations. Both the first predetermined number and the second predetermined number are greater than one.

In another embodiment, the data cleaner 948 may be configured to: select a value from a run of a test scenario; check whether the value appears in at least a first predetermined number of the runs of the test scenarios, identified by the test identifier 934; check whether the value appears in runs of test scenarios, identified by the test identifier 934, which are associated with at least a second predetermined number of different organizations; and if both conditions are positive, enable the test scenario template to utilize the selected value. Optionally, the data cleaner 948 is also configured not to enable the test scenario template to utilize the selected value if at least one of the conditions is negative.

In one embodiment, the computer system also optionally includes a user interface 949 that is configured to suggest to a user to run an instantiation of the test scenario template.

In one embodiment, the computer system also includes a cluster selector 942. Optionally, the cluster selector 942 provides the second processor 938 with the selection of the certain cluster. Optionally, the cluster selector 942 examines clusters generated by the clustering module 940 in order to make the selection of the certain cluster. In one example, the cluster selector 942 receives a profile of a user and/or an organization, and makes the selection of the certain cluster based on the profile. For example, if the profile indicates that a user utilizes a specific transaction in many tests, that cluster selector 942 may select a cluster that contains runs of test scenarios that also utilize the specific transaction. In another example, the cluster selector 942 selects the certain cluster based on statistical information related to the clusters; for example, the size of the clusters and/or the number of organizations associated with runs belonging to the clusters. Optionally, the certain cluster is a cluster that includes runs run by a large number of users and/or includes runs associated with a large number of organizations. Optionally, the certain cluster is that includes runs run by a largest number of users and/or includes runs associated with a largest number of organizations, from among all the clusters.

In some embodiments, the ranking module 944 is also configured to rank runs belonging to the certain cluster, at least in part, according to their connectivity factors. Optionally, computing connectivity factors takes into account how much elements involved in a computation are prevalent among different organization. For example, if a first screen appears only in runs of test scenarios associated with a single organization, this first screen may make smaller contributions to connectivity factor computations, compared to contribution made by a second screen that is utilized by multiple organizations running test scenarios. The fact that the screen is utilized by multiple organizations means that connectivity factor computations based on it are more likely to be accurate with respect to other organizations.

In one embodiment, connectivity factors of runs of test scenarios are computed with respect to number of organizations associated with runs. Optionally, a function computing connectivity factors employs a threshold number of organizations that need to be associated with an element, for it to make a significant contribution towards the connectivity factor. For example, if an element in a run (e.g., a screen) is utilized by a single organization, it makes a small contribution to a connectivity factor of the run, compared to a contribution it would make had the screen been utilized by multiple organizations. Optionally, elements that are utilized by less than two organizations (e.g., they appear only in runs of a single organization) are not utilized for computation of connectivity factors.

In one embodiment, a connectivity factor of a run of a test scenario utilizes a function that assigns a first run, focused on a first element and which processes variations of the first element in multiple phases, a higher rank than a second run, which processes more elements in fewer corresponding processing phases. Optionally, the function takes into account whether the first element and the elements are utilized by more than two organizations.

In another embodiment, a connectivity factor of a run of a test scenario is computed as a function of associations between a screen and a module, and of number of different organizations that utilized the screen and the module. For example, a connectivity factor of a run computed according to associations between a screen and a module may increase if the screen is utilized by multiple organizations and/or the module is utilized by multiple organizations.

As used herein, if a module is tested by a run of a test scenario associated with an organization, the module may be considered utilized by the organization. Similarly, if a screen appears in a run associated with an organization, the screen may be considered utilized by the organization.

In yet another embodiment, a connectivity factor of a run of a test scenario is computed as a function of an amount of data a certain screen, presented during the run, displays from its previous screen in the run, and of the number of different organizations that utilized the certain screen. For example, the more overlap in the data displayed on the certain and previous screens, the higher the connectivity factor. Additionally, the more organizations utilize the certain screen, the higher the connectivity factor attributed to the run.

In still another embodiment, a connectivity factor of a run of a test scenario is computed as a function of number of keystrokes typed by users while still in a screen and of the number of different organizations that utilized the screen. For example, the more keystrokes entered by users on average on a certain screen, the higher the connectivity factor of a run that displayed the certain screen. Additionally, the more organizations utilize the certain screen, the higher the connectivity factor attributed to the run.

In yet still another embodiment, a connectivity factor of a run of a test scenario is computed by associating programs with modules, logging which programs are executed, and calculating the connectivity factor as a function of jumps between modules and the number of organizations that utilized the modules. For example, the more jumps between modules in the run (as evident by switching between execution of programs associated with different modules), the lower the connectivity factor of the run. Additionally, the more organizations utilize the modules, the higher the connectivity factor attributed to the run.

Monitoring users running test scenarios typically produces a large number of runs of test scenarios that may be utilized, among other uses, to generate test scenario templates. Given the diversity typically observed in runs of test scenarios, it is likely that not all runs will be equally useful for generating test scenario templates. Furthermore, templates generated from different runs may be of varying levels of usefulness for other users. One type of aspect that may provide insight towards the usefulness of a run of a test scenario and/or the usefulness of a template generated from the run is connectivity factor of the test scenario.

A connectivity factor of a test scenario is a property indicative of an extent the test scenario is focused on elements being tested by it. A high connectivity factor indicates that the test scenario focuses primarily on a small set of elements, while a low connectivity factor indicates that the test scenario is spread out, focusing on many elements, but focusing on each of the many elements only to a small degree.

As used herein, a connectivity factor may be attributed to a test scenario and/or to a run of a test scenario. If attributed to the run of the test scenario, then the connectivity factor is computed, at least in part, based on the run of the test scenario (e.g., a number of screens visited by a user during the run). Thus, different runs of a certain test scenario may have different connectivity factors for the certain test scenario, computed based on characteristics of each run. Note that how a connectivity factor for a certain test scenario is computed (see examples below), may influence how susceptible the computation of the connectivity factor is to variations between different runs of the test scenario.

In some embodiments, it is beneficial to generate test scenario templates from runs of test scenarios with high connectivity factors. Having a high connectivity factor means that it is likely that elements tested by a test scenario are well covered by the test scenario, e.g., various aspects of the elements are tested since the test scenario dwells on them relatively a lot. Conversely, having a low connectivity factor means that it is likely that elements tested by a test scenario are only cursorily treated by the test scenario. Thus, in order to effectively and thoroughly test elements, it is better to run test scenarios that cover the elements and have high connectivity factors. Utilizing test scenarios with high connectivity factors also reduces the number of test scenarios that are required to test a certain element, which also reduces that time and/or expense of testing the certain element.

There are various connectivity factors that may be calculated for a test scenario. Each connectivity factor may examine various aspects of the test scenario, a run of the test scenario, and/or the system. Below are some examples of embodiments that calculate connectivity factors.

In one embodiment, a test scenario includes several phases of execution. By examining the test scenario and/or a run of the test scenario, a focus of the test scenario may be determined, for at least some of the phases. Optionally, a phase includes one or more transactions that may involve certain system elements. In one example, connectivity factors are computed by identifying which element (or elements) is being processed during a certain phase of a test, and how many phases of the test are spent on each element or variations of the element. Examples of elements may be business processes and/or screens, or system elements such as databases and/or servers. Thus, a test scenario that is focused around a first element and processes variations of the first element in multiple phases, has a higher connectivity factor than a second test scenario that processes more elements in fewer corresponding processing phases.

In another embodiment, a connectivity factor of a test scenario is computed utilizing a function of associations between screens visited when running the test scenario and system modules. For example, if a certain test scenario involves screens associated with several modules, it may have a lower connectivity factor than another test scenario that involves screens associated with a single system module. In this example, the connectivity factor may relate to how much a test scenario is focused on a small set of modules.

In yet another embodiment, a connectivity factor is a function of amount of data a certain screen displays, which was also displayed in a previously displayed screen. Running a test scenario often involves a user visiting a series of screens. Having a second screen relate to much of the data in a first screen, which appeared previously to the second screen, may be an indication of a high connectivity factor for the test scenario. The fact that there is overlap between the data addressed in screens means that the elements (e.g., fields and/or business processes) to which the data is related are covered in multiple screens. This means that the elements may be tested more thoroughly by such a test scenario, compared to a test scenario in which there is a small amount of data displayed in a second screen that comes from a previously displayed first screen. An example of a function that may be used computing a connectivity factor of a test scenario may be the average number of screens from the test scenario an average field appears in. Another example of a function for a connectivity factor for a test scenario may be the percentage of fields in screens of a test scenario that appear in multiple screens.

In still another embodiment, a connectivity factor of a test scenario is based on monitoring keystrokes of users running the test scenario. The connectivity factor may be a function of the number of keystrokes typed in each screen. For example, a high number of keystrokes, on average per screen, may be attributed a high connectivity factor since it indicates that the test scenario dwells a lot on each screen; thus, if a user dwells on a screen, numerous aspects of the screen may be tested. In contrast, entering a small number of keystrokes per screen, on average, may indicate that few aspects of a screen may be tested; hence, the corresponding test scenario may be awarded a low connectivity factor.

In yet still another embodiment, calculating a connectivity factor involves associating programs to modules, logging which programs are executed, and taking note of switches of programs associated with different modules. For example, the more a running of a test scenario involves running of programs associated with a same module, the higher the connectivity factor of the test scenario may be. If many programs run in the test scenario are associated with the same module, it may mean that various aspects of the module are tested by the test scenario. In contrast, if running a test scenario involves running various programs associated with different modules, this may mean that an individual module is not well covered by the test scenario, and only a small number of aspects of the individual module may be tested.

It is to be noted that different embodiments may implement components of the computer system illustrated in FIG. 27 and/or FIG. 28 in different ways. For example, in some embodiments one or more of the following may be implemented by the same software module and/or software modules running on the same processor: the monitoring module 932, test identifier 934, the clustering module 940, the cluster selector 942, the ranking module 944, the template generator 946, the data cleaner 948, and the user interface 949. Optionally, one or more of the aforementioned components may involve software that runs on the first processor 936 and/or on the second processor 938. Additionally, one or more of the aforementioned components may be implemented on a remote server, such as a cloud-based server. Optionally, the first processor 936 may be the second processor 938. Optionally, the first processor 36 and/or the second processor 938 are located on a remote server that does not belong to any of the different organizations. For example, the remote server may be a cloud-based server.

In one example, the data cleaner 948 is implemented as part of the template generator 946. In another example, the clustering module 940 and the cluster selector 942 are both implemented by the same software module. In yet another example, the clustering module 940 and/or the cluster selector 942 involve software that is executed on the first processor 936 and/or the second processor 938.

In one embodiment, the clustering module 940, cluster selector 942, and/or ranking module 944 are implemented as a cloud-based service that receives runs of test scenarios identified from the activity data 933 of the users 930 belonging to the different organizations, and ranks at least some of the runs 945. Optionally, the template generator 946, the test identifier 934, and/or the data cleaner 948 may also be part of the cloud-based service.

Figure 29:
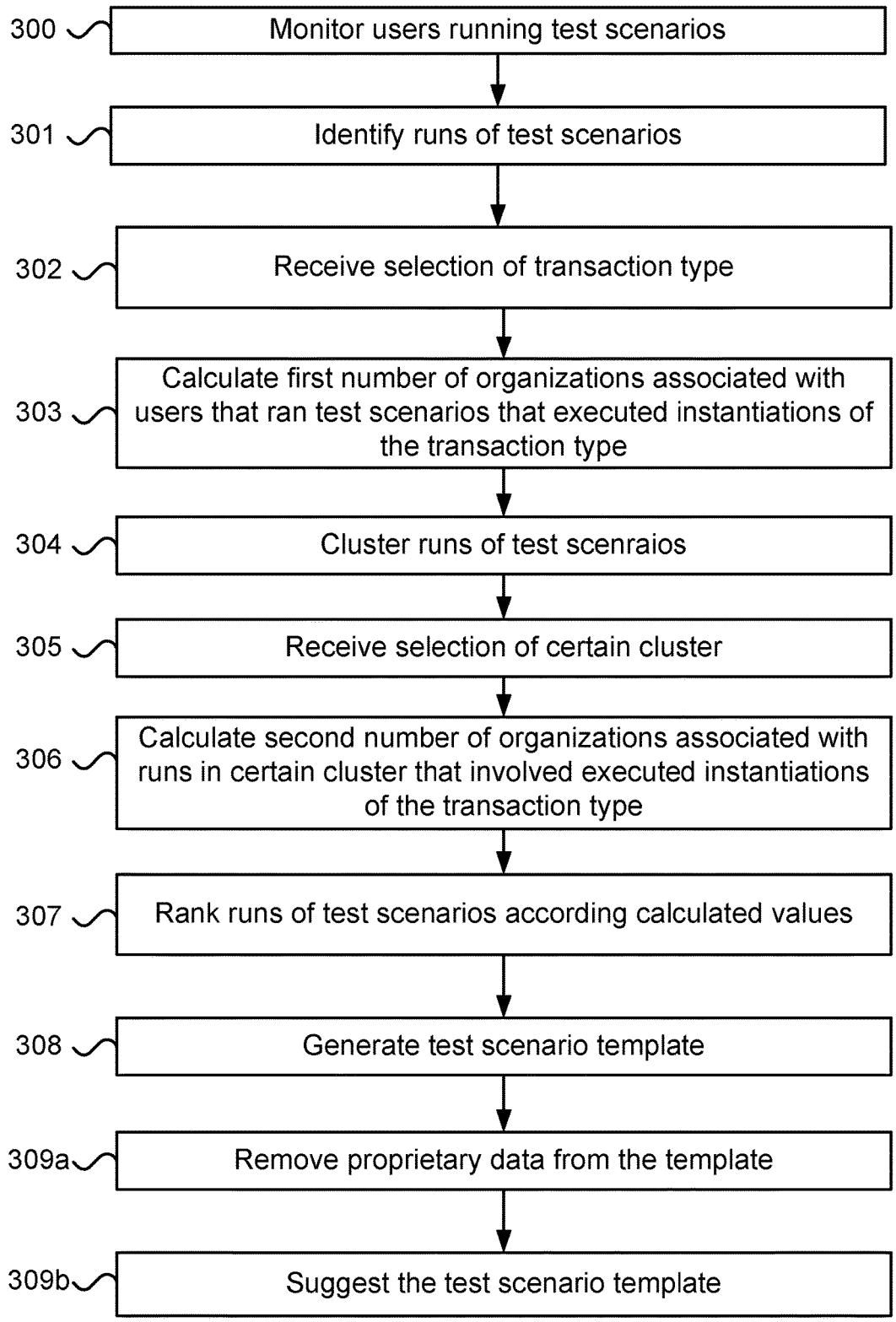
FIG. 29 illustrates one embodiment of a computer implemented method for ranking runs of test scenarios belonging to a cluster of similar runs.

FIG. 29 illustrates one embodiment of a computer implemented method for ranking runs of test scenarios belonging to a cluster of similar runs. The illustrated embodiment includes the following steps:

In step 301, identifying runs of test scenarios run by users belonging to different organizations on software systems belonging to the different organizations. Each test scenario involves running at least one transaction, and each transaction is instantiated from a transaction type.

In step 302, receiving a selection of a certain transaction type.

In step 303, calculating, based on the runs of the test scenarios, a first number of different organizations associated with users that ran test scenarios involving execution of a transaction instantiated from the certain transaction type.

In step 304, clustering the runs of test scenarios to clusters comprising similar runs of test scenarios.

In step 305, receiving a selection of a certain cluster from among the clusters.

In step 306, calculating a second number of different organizations that are associated with users that ran test scenarios that both belong to the certain cluster and involve execution of a transaction instantiated from the certain transaction type.

And in step 307, ranking runs of test scenarios belonging to the certain cluster according to a function of the first number and the second number.

In one embodiment, ranking runs of test scenarios belonging to the certain cluster involves imposing an ordering on at least some of the runs of test scenarios belonging to the certain cluster. This means, that for at least a first run and a second run belonging to the certain cluster, the ranking indicates whether the first run should be ranked higher than the second run, or vice versa. Optionally, the ranking is given in a form of a permutation of some of the runs. Optionally, the ranking is given in a form of ordered pairs of first and second runs, designating for the first and the second runs in the pair that the first run should be ranked higher than the second run.

In another embodiment, ranking runs of test scenarios belonging to the certain cluster involves computing the function of the first number and the second number for at least some of the runs belonging to the certain cluster. Optionally, the function values are computed for a first run and a second run belonging to the certain cluster, such that, based on the computed function values for the first run and the second run, an order may be imposed on the first and second runs. For example, based on the function values, it may be determined that the first run, which has a higher function value than the second run, should be ranked higher than the second run.

Ranking runs of test scenarios need not necessarily involve ranking all the runs belonging to the certain cluster. In some embodiments, ranking runs of test scenarios belonging to the certain cluster involves determining the function value for only some of the runs; thus, for some of the runs a ranking may not be determined. Additionally or alternatively, an order indicated by ranking may be a partial order, which does not resolve for all pairs of runs of test scenarios, which of runs in a pair should be ranked higher. In some embodiments, multiple runs belonging to the certain cluster may receive an identical function value, indicating that they are ranked the same.

In one embodiment, the computer implemented method includes optional step 308 which involves utilizing at least one of the highest ranked runs of test scenarios for generating a test scenario template that represents similar runs of test scenarios in the certain cluster. In one example, the highest ranked runs test scenarios belong to the top 20% of the runs in the certain cluster. Optionally, the computer implemented method also includes optional steps involving recording a user while running a certain test scenario; identifying that the certain test scenario is similar to the generated test scenario template; and suggesting the user to run an instantiation of the test scenario template. Optionally, the computer implemented method also includes an optional steps involving selecting a value from the test scenario template, and removing the selected value from the test scenario template if the selected value appears in less than a first predetermined number of runs in the selected cluster or the selected value appears in description of runs in the selected cluster that are associated with less than a second predetermined number of different organizations. Both the first predetermined number and the second predetermined number are greater than one. Optionally, the computer implemented method also includes optional steps involving selecting a value from a description of run in the selected cluster, testing whether the value appears in at least a first predetermined number of runs in the selected cluster, testing whether the value appears in description of runs in the selected cluster that are associated with at least a second predetermined number of different organizations, and if both conditions are positive, enabling the test scenario template to utilize the selected value. Optionally, the computer implemented method also includes optional step involving not enabling the test scenario template to utilize the selected value if at least one of the aforementioned conditions is negative.

In one embodiment, the computer implemented method includes optional step 300, which involves monitoring the users belonging to different organizations and providing data collected in the monitoring to be used for the identifying of the runs of test scenarios.

In one embodiment, the computer implemented method illustrated in FIG. 29 includes an optional step which involves customizing the test scenario template for a user by adding to the test scenario template proprietary data relevant to the user.

In one embodiment, the computer implemented method includes optional step 309a which involves removing proprietary data from the template by selecting a value from the test scenario template, and removing the selected value from the test scenario template if the selected value appears in less than a first predetermined number of runs in the selected cluster or the selected value appears in description of runs in the selected cluster that are associated with less than a second predetermined number of different organizations. Optionally, both the first predetermined number and the second predetermined number are greater than one.

In one embodiment, the computer implemented method includes step 309b which involves suggesting to a user to run an instantiation of the test scenario template. Optionally, the user interface 949 is utilized to suggest to the user to run the instantiation of the template. Optionally, the template is customized prior to suggesting to the user.

In one embodiment, ranking the runs of test scenarios belonging to the certain cluster is done according to connectivity factors of the runs, computed with respect to number of organizations associated with runs. Optionally, the ranking abides by a principal that a first run, focused on a first element, which processes variations of the first element in multiple phases, and is utilized by at least two different organizations, receives a higher rank than a second run, which processes more elements in fewer corresponding processing phases, and the elements are utilized by at least two different organizations. Optionally, calculating the connectivity factor is a function of associations between a screen and a module and number of different organizations that utilized the screen and the module. Optionally, calculating the connectivity factor is a function of amount of data a certain screen displays from its previous screen and number of different organizations that utilized the certain screen. Optionally, calculating the connectivity factor is a function of number of keystrokes typed by users while in a certain screen, and of number of different organizations that utilized the certain screen. Optionally, calculating the connectivity factor involves associating programs with modules, logging which programs are executed, and calculating the connectivity factor as a function of jumps between modules and the number of organizations that utilized the modules In one embodiment, a non-transitory computer-readable medium stores program code that may be used by a computer to rank runs of test scenarios belonging to a cluster. The computer includes a processor, and the non-transitory computer-readable medium stores the following program code:

Program code for identifying runs of test scenarios run by users belonging to different organizations on software systems belonging to the different organizations.

Program code for a receiving selection of a certain transaction type.

Program code for calculating, based on the runs of the test scenarios, a first number of different organizations associated with users that ran test scenarios involving execution of a transaction instantiated from the certain transaction type.

Program code for clustering the runs of test scenarios to clusters comprising similar runs of test scenarios.

Program code for receiving a selection of a certain cluster from among the clusters.

Program code for calculating a second number of different organizations that are associated with users that ran test scenarios that both belong to the certain cluster and involve execution of a transaction instantiated from the certain transaction type.

And program code for ranking runs of test scenarios belonging to the certain cluster according to a function of the first number and the second number.

In one embodiment, the non-transitory computer-readable medium stores program code for utilizing at least one of the highest ranked runs of test scenarios for generating a test scenario template that represents similar runs of test scenarios in the certain cluster.

In one embodiment, the non-transitory computer-readable medium stores program code for monitoring the users belonging to different organizations and providing data collected in the monitoring to be used for the identifying of the runs of test scenarios.

In one embodiment, the non-transitory computer-readable medium stores program code for customizing the test scenario template for a user by adding to the test scenario template proprietary data relevant to the user.

In one embodiment, the non-transitory computer-readable medium stores program code for removing proprietary data from the template by selecting a value from the test scenario template, and removing the selected value from the test scenario template if the selected value appears in less than a first predetermined number of runs in the selected cluster or the selected value appears in description of runs in the selected cluster that are associated with less than a second predetermined number of different organizations. Optionally, both the first predetermined number and the second predetermined number are greater than one.

In one embodiment, the non-transitory computer-readable medium stores program code for suggesting to a user to run an instantiation of the test scenario template.

Figure 30:
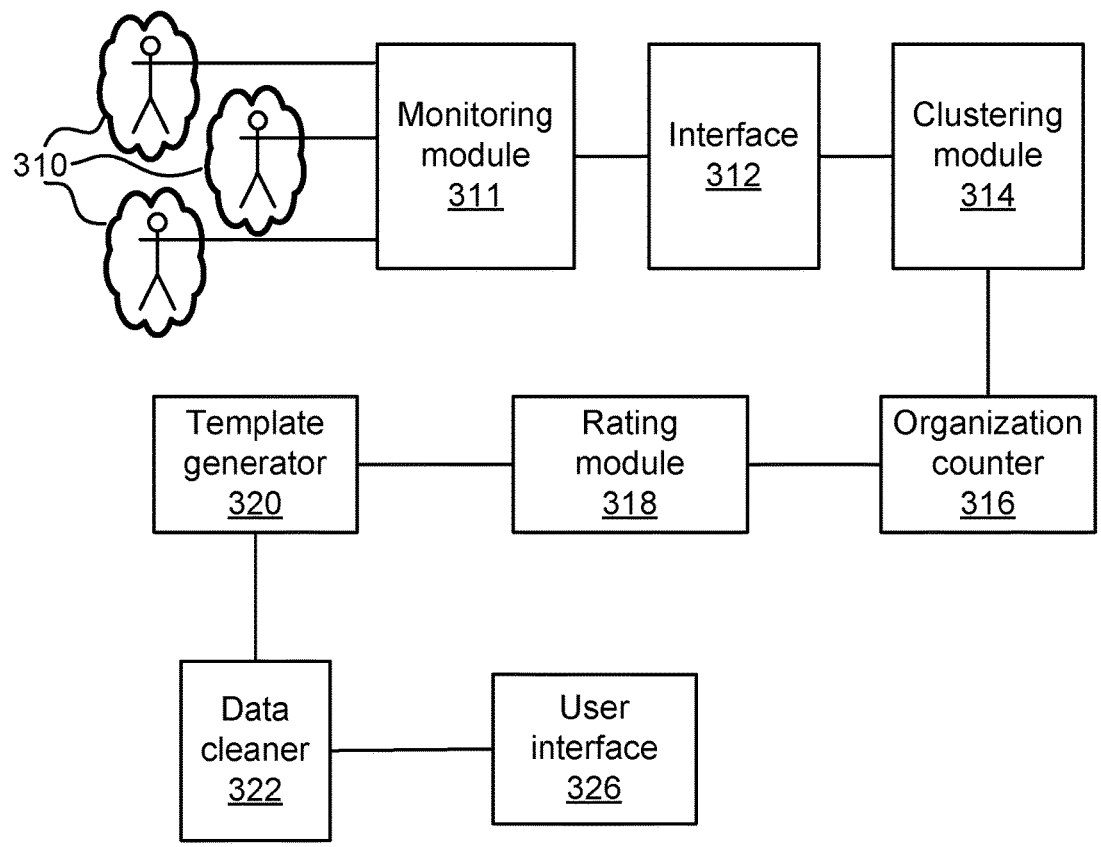
FIG. 30 illustrates one embodiment of a computer system configured to rate popularity of a cluster of runs of test scenarios.

FIG. 30 illustrates one embodiment of a computer system configured to rate popularity of a cluster of runs of test scenarios. The illustrated embodiment includes at least interface 312, a clustering module 314, an organization counter 316, and a rating module 318.

The interface 312 is configured to receive runs of test scenarios run by users belonging to different organizations essentially on same packages of software systems. Herein, the limitation "essentially on same packages of software systems" covers packages of the same type which may or may not feature different customizations, such as SAP setup files, and/or Oracle customization code.

The clustering module 314 is configured to cluster the runs into clusters that include similar runs of test scenarios. Optionally, the clustering module is configured to process one or more of the following logged activities: list of users who ran the test scenarios, analysis of access to a database, messages returned from executed transactions, values returned by fields, and procedures utilized by a test scenario.

The organization counter 316 is configured to count a number of different organizations associated with a cluster; an organization is considered associated with a certain cluster if the certain cluster includes a run of a test scenario run by a user belonging to the organization.

And the cluster rating module 318 configured to compute popularity ratings of at least some of the clusters based on the number of different organizations associated with the clusters. The computed popularity ratings follow a rule that the higher the number of different organizations associated with a cluster, the higher the popularity rating of the cluster.

In one embodiment, the cluster rating module 318 is also configured to count number of common input fields in a cluster. A common input field in a cluster is an input field used by at least a predetermined percentage of the runs in the cluster. The cluster rating module 318 is also configured to adjust the popularity rating of a cluster to reflect the percentage of common input fields in the cluster; the more common input fields in runs belonging to a cluster, the higher the popularity rating of the cluster.

In one embodiment, computing popularity ratings of at least some of the clusters results in imposing an ordering of at least some of the clusters. This means that for at least a first cluster and a second cluster, the popularity ratings indicate whether the first cluster should be rated higher than the second cluster, or vice versa. Optionally, the popularity rating is given in a form of a permutation of some of the clusters. Optionally, the popularity rating is given in a form of ordered pairs of first and second clusters, designating for a first cluster and a second cluster in a pair, that the first cluster should be placed higher than the second cluster.

In another embodiment, popularity ratings of at least some clusters are given as function values associated with the at least some of the clusters. Optionally, a popularity rating of a cluster is a function of the number of different organizations associated with the cluster. Optionally, the popularity ratings are computed for a first cluster and a second cluster, such that, based on the computed values for the first cluster and the second cluster, an order may be imposed on the first and the second clusters. For example, based on the values, it may be determined that the first cluster, which has a higher value than the second cluster, should be placed higher than the second cluster.

Computing popularity rating of clusters need not necessarily involve computing popularity rating for all the clusters generated by the clustering module 314. For example, some clusters may be ignored due to their size and/or association of their runs with too few organizations. Optionally, computing popularity ratings of clusters is done only for some of the clusters. Optionally, multiple clusters may have an identical popularity rating value, indicating that they are rated the same.

In one embodiment, the computer system includes an optional template generator 320 that is configured to generate a test scenario template based on at least one run of a test scenario from a cluster with a high popularity rating. Optionally, the computer system may include a user interface 326 that is configured to suggest to a user to run an instantiation of the test scenario template. The test scenario template may identify a transaction used by the at least one run of a test scenario belonging to the cluster with a high popularity rating, and possible values for running the transaction. Optionally, the template generator 320 is configured to generate the test scenario template based on at least two runs of test scenarios belonging to the cluster with the highly popularity rating. Additionally, the at least two runs were run by users associated with different organizations. Optionally, the test scenario template includes a combination of the possible values, and the combination does not appear in any of the at least two runs of test scenarios.

In one embodiment, the computer system includes an optional data cleaner 322 that is configure to select a value from the test scenario template, and remove the selected value from the test scenario template if the selected value appears in less than a first predetermined number of runs belonging to the cluster with the high popularity rating, or runs belonging to the cluster with the high popularity rating that include the selected value are associated with less than a second predetermined number of different organizations. Additionally, both the first predetermined number and the second predetermined number are greater than one.

In another embodiment, the data cleaner 322 is configured to select a value from a run of a test scenario in the cluster with the high popularity rating, and test whether the value appears in at least a first predetermined number of runs of test scenarios in the cluster with the high popularity rating. Additionally, the data cleaner 322 is configured to also test whether the value appears in runs in the cluster with the high popularity rating that are associated with at least a second predetermined number of different organizations. If both conditions are positive, the data cleaner 322 is to enable the test scenario template to utilize the selected value. Optionally, value if at least one of the conditions is negative, the data cleaner 322 is configured not to enable the test scenario template to utilize the selected value.

In one embodiment, the computer system also includes a monitoring module 311. The monitoring module is configured monitor the users 310 belonging to the different organizations and to identify the runs of the test scenarios of the users 310 belonging to different organizations, essentially on same packages of software systems. Optionally, the runs of the test scenarios are provided to the interface 312.

It is to be noted that different embodiments may implement components of the computer system illustrated in FIG. 30 in different ways. For example, in some embodiments one or more of the following may be implemented by the same software module and/or software modules running on the same processor: the monitoring module 311, the interface 312, the clustering module 314, the organization counter 316, the rating module 318, the template generator 320, the data cleaner 322, and the user interface 326. Optionally, one or more of the aforementioned components may be implemented on a remote server, such as a cloud-based server.

In one example, the data cleaner 322 is implemented as part of the template generator 320. In another example, the clustering module 314 and the organization counter 316 are both implemented by the same software module. In yet another example, the rating module 318 is implemented as part of the clustering module 314.

In one embodiment, the interface 312, the clustering module 314, the organization counter 316, and/or rating module 318, are implemented as a cloud-based service that receives runs of test scenarios identified from monitoring of the users 310 belonging to the different organizations, and rates at least some of the clusters. Optionally, the template generator 320 and/or the data cleaner 322 may also be part of the cloud-based service.

Figure 31:
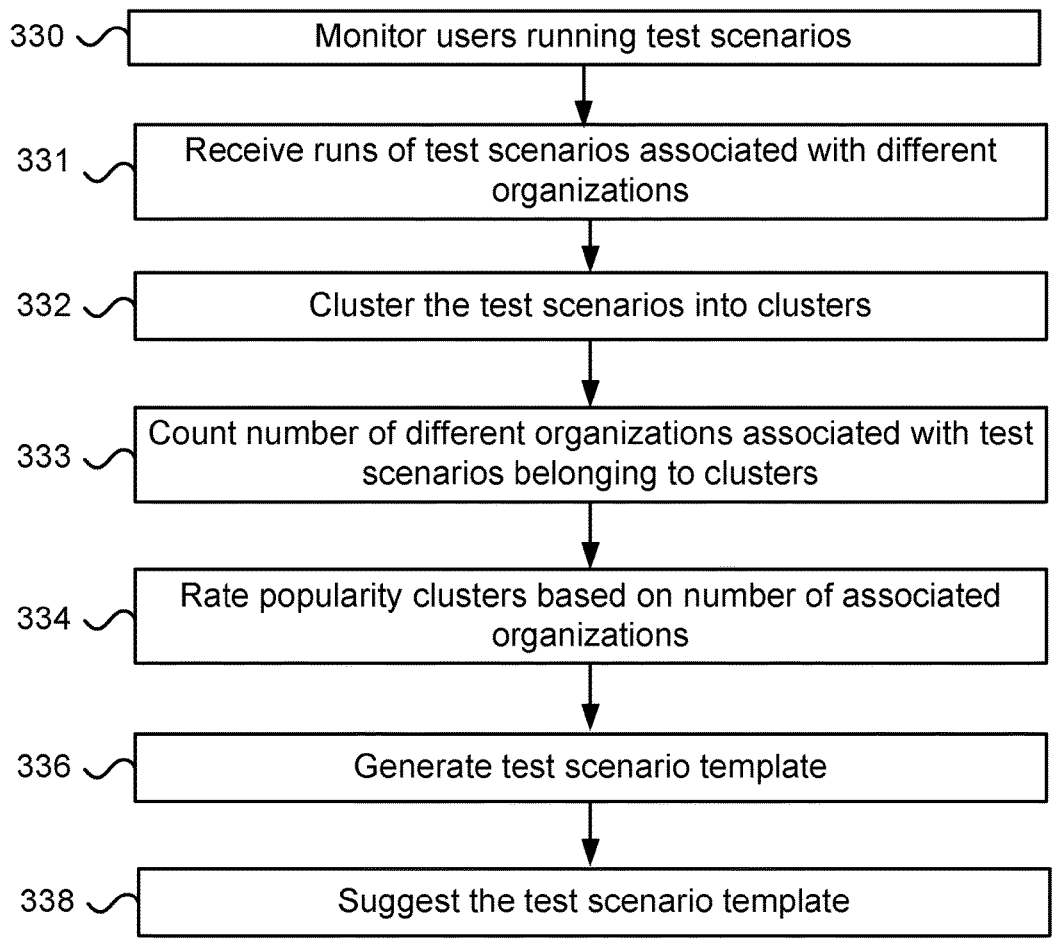
FIG. 31 illustrates one embodiment of a computer implemented method for rating popularity clusters of runs of test scenarios.

FIG. 31 illustrates one embodiment of a computer implemented method for rating popularity clusters of runs of test scenarios. The illustrated embodiment includes the following steps:

In step 331, receiving runs of test scenarios run by users from different organizations essentially on same packages of software systems.

In step 332, clustering the runs into clusters comprising similar runs of test scenarios.

In step 333, counting number of different organizations associated with the clusters; an organization is associated with a cluster if a user belonging to the organization runs a test scenario belonging to the cluster.

And in step 334, computing popularity ratings of at least some of the clusters based on number of different organizations associated with each of the clusters; wherein the higher the number of different organizations associated with a cluster, the higher the popularity rating of the cluster.

In one embodiment, the computer implemented method includes optional step 330 which involves monitoring the users running the test scenarios on the software systems that belong to the different organizations in order to identify the runs of the test scenarios. Optionally, the runs of the test scenarios are received by the interface 312.

In one embodiment, the computer implemented method includes optional step 336 which involves generating a test scenario template based on at least one run of a test scenario from a cluster with a high popularity rating. Optionally, the test scenario template identifies a transaction used by the at least one run of a test scenario belonging to the cluster with the high popularity rating, and possible values for running the transaction. In one example, a high popularity rating is a popularity rating that places a cluster in the top 20% of the clusters, i.e., 80% of the clusters have a lower popularity rating. In another example, a high popularity rating is the highest popularity rating value given to any of the clusters.

In one embodiment, generating the test scenario template in optional step 336 is based on at least two runs of test scenarios belonging to the cluster with the high popularity rating. Optionally, the at least two runs are run by users associated with different organizations. Optionally, the test scenario template identifies a transaction used by the at least one of the at least two runs of test scenarios, and possible values for running the transaction. Additionally, the test scenario template may include a combination of the possible values, and the combination does not appear in any of the at least two runs of test scenarios.

In one embodiment, the computer implemented method illustrated in FIG. 31 includes an optional step involving selecting a value from the test scenario template, and removing the selected value from the test scenario template if the selected value appears in less than a first predetermined number of runs of test scenarios in the cluster with the high popularity rating. Additionally or alternatively, the optional step involves removing the selected value from the test scenario template if the selected value appears in runs of test scenarios in the cluster with the high popularity rating that are associated with less than a second predetermined number of different organizations. Optionally, both the first predetermined number and the second predetermined number are greater than one.

In another embodiment, the computer implemented method illustrated in FIG. 31 includes an optional step involving selecting a value from a run of a test scenario in the cluster with the high popularity rating, testing whether the value appears in at least a first predetermined number of runs of test scenarios in the cluster with the high popularity rating. Additionally, the step involves testing whether the value appears in runs in the cluster with the high popularity rating that are associated with at least a second predetermined number of different organizations, and if both conditions are positive, enabling the test scenario template to utilize the selected value. Optionally, if at least one of the conditions is negative the test scenario template is not allowed to utilize the selected value.

In one embodiment, the computer implemented method includes step 338 which involves suggesting to a user to run an instantiation of the test scenario template. Optionally, the user interface 298 is utilized to suggest to the user to run the instantiation of the template. Optionally, the template is customized prior to suggesting to the user.

In one embodiment, the computer implemented method illustrated in FIG. 31 includes an optional step that involves counting a number of common input fields in clusters. A common input field in a cluster is an input field used by at least a predetermined percentage of the runs in the cluster. Additionally, the computer implemented method illustrated in FIG. 31 includes an optional step that involves adjusting the popularity rating of a cluster to reflect the percentage of common input fields in the cluster. The more common input fields in runs in a cluster, the higher the popularity rating of the cluster. In one example, the popularity rating of a cluster is multiplied by the percentage of common input fields in the cluster.

In one embodiment, a non-transitory computer-readable medium stores program code that may be used by a computer to rate popularity of clusters of runs of test scenarios. The computer includes a processor, and the non-transitory computer-readable medium stores the following program code:

Program code for receiving runs of test scenarios run by users from different organizations essentially on same packages of software systems.

Program code for clustering the runs into clusters comprising similar runs of test scenarios.

Program code for counting number of different organizations associated with the clusters; an organization is considered associated with a cluster if a user belonging to the organization runs a test scenario belonging to the cluster.

And program code for rating popularity of the clusters based on number of different organizations associated with each of the clusters; the higher the number of different organizations associated with a cluster, the higher the popularity rating of the cluster.

In one embodiment, the non-transitory computer-readable medium also stores program code for monitoring the users running the test scenarios on the software systems that belong to the different organizations in order to identify the runs of the test scenarios.

In one embodiment, the non-transitory computer-readable medium also stores program code for generating a test scenario template based on at least one run of a test scenario from a cluster with a high popularity rating. Optionally, the test scenario template identifies a transaction used by the at least one run of a test scenario belonging to the cluster with the high popularity rating, and possible values for running the transaction.

Optionally, the non-transitory computer-readable medium also stores program code for generating of the test scenario template based on at least two runs of test scenarios belonging to the cluster with the high popularity rating; and wherein the at least two runs were run by users associated with different organizations. Optionally, the test scenario template identifies a transaction used by the at least one of the at least two runs of test scenarios, and possible values for running the transaction; and wherein the test scenario template includes a combination of the possible values, and the combination does not appear in any of the at least two runs of test scenarios.

In one embodiment, the non-transitory computer-readable medium also stores program code for selecting a value from the test scenario template, and removing the selected value from the test scenario template if the selected value appears in less than a first predetermined number of runs of test scenarios in the cluster with the high popularity rating or the selected value appears in runs of test scenarios in the cluster with the high popularity rating that are associated with less than a second predetermined number of different organizations. Optionally, both the first predetermined number and the second predetermined number are greater than one.

In one embodiment, the non-transitory computer-readable medium also stores program code for suggesting to a user to run an instantiation of the test scenario template.

In one embodiment, the non-transitory computer-readable medium also stores program code for counting number of common input fields in the selected cluster. A common input field in a cluster is an input field used by at least a predetermined percentage of the runs in the cluster. Additionally, the non-transitory computer-readable medium also stores program code for adjusting the popularity rating of a cluster to reflect the percentage of common input fields in the cluster; the more common input fields in runs in a cluster, the higher the popularity rating of the cluster.

Figure 32:
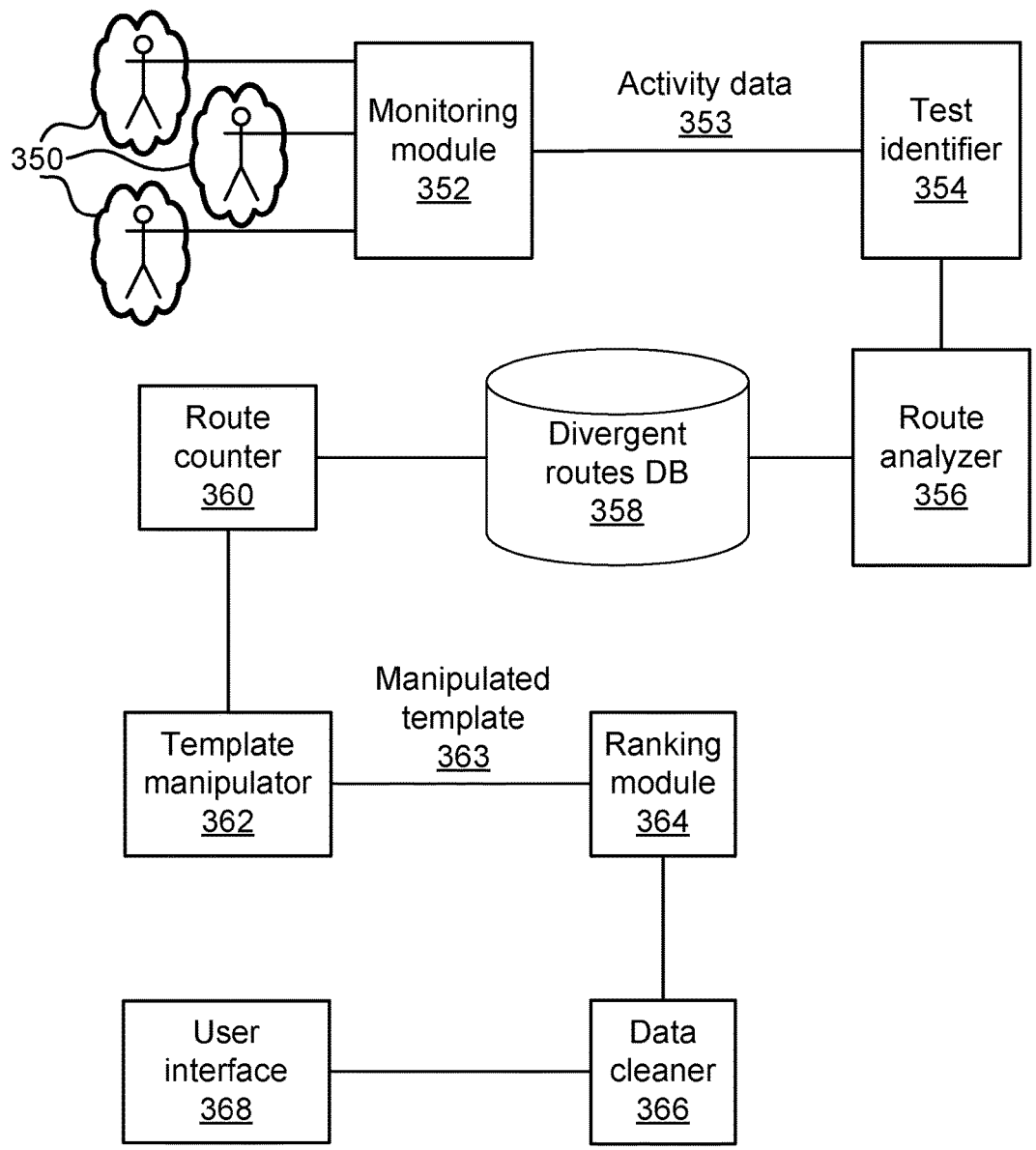
FIG. 32 illustrates one embodiment of a computer system configured to utilize runs of test scenarios run by users belonging to different organizations to manipulate a test scenario template according to divergent routes in the runs.
Figure 33:
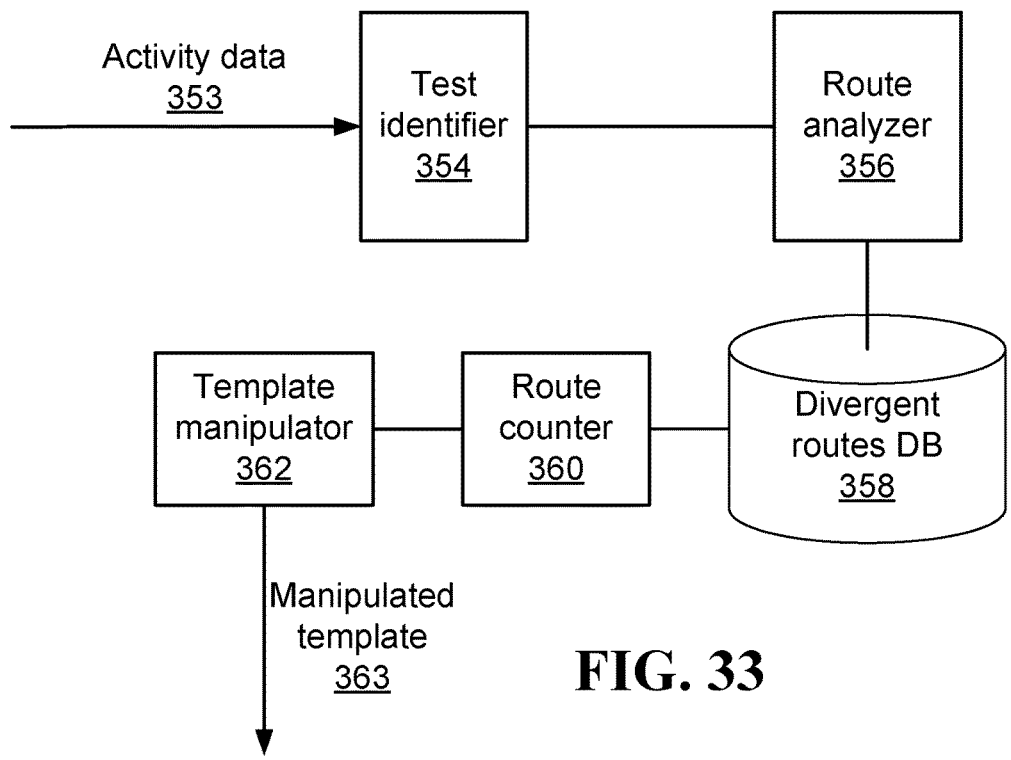
FIG. 33 illustrates one embodiment of a computer system configured to utilize runs of test scenarios run by users belonging to different organizations to manipulate a test scenario template according to divergent routes in the runs.

FIG. 32 and FIG. 33 illustrate embodiments of a computer system configured to utilize runs of test scenarios run by users belonging to different organizations to manipulate a test scenario template according to divergent routes in the runs. The illustrated embodiments include at least a test identifier 354, a route analyzer 356, a database 358, a route counter 360, and a template manipulator 362.

Herein, a route defines a sequence of one or more elements involved in a run of a test scenario; an element may be a test step, a transactions, or a screen. Additionally, a test scenario template may define a template route that instantiations of the template are supposed to follow. Thus, a run of a test scenario based on a template is expected to reflect the template route; for example, the run may describe screens and/or transactions included in the template route.

The test identifier 354 is configured to identify runs of test scenarios run by users belonging to different organizations on software systems associated with the different organizations. Optionally, the runs are identified based on activity data 353 obtained from monitoring the users.

In one embodiment, the route analyzer 356 is configured to receive a certain run of a test scenario instantiated from a test scenario template. Optionally, the route analyzer 356 may be configured to receive many runs of test scenarios; the description below describes examples of what may happen with the certain run. In one example, the certain run was run by a user after being suggested the template via a user interface. Optionally, the certain run of the test scenario was run on a software system associated with a certain organization that does not belong to the different organizations. Optionally, the different organizations and the certain organization are associated with different fields of operation (e.g., the different organizations are in the insurance field, while the certain organization is in the field of automobile manufacture). Alternatively, the different organizations and the certain organization are associated with a same field of operation.

The test scenario template defines a template route that instantiations of the template are supposed to follow. That is, each run of a test scenario instantiated from the template is supposed to reflect a certain sequence of elements, as defined by the template route. Optionally, a divergent route that diverges from a template route is characterized by a different sequence of elements compared to sequence of elements defined by the template route.

In one embodiment, based on the elements identified in the certain run, the route analyzer 356 characterizes a route followed by the certain run. The route analyzer 356 is also configured to identify that the certain run follows a certain divergent route that diverges from the template route. For example, the route analyzer 356 may compare elements in the template route with elements identified in the certain run in order to determine whether the elements are similar and/or appear in the same order as the elements in the template route.

In one embodiment, the route analyzer 356 is configured to identify divergent routes that diverge from the template route and later on converge back to the template route. Additionally or alternatively, the route analyzer 356 is also configured to identify divergent routes that diverge from the template route and do not converge back to the template route. Additionally or alternatively, the route analyzer is also configured to identify divergent routes that merge with the template route.

In one embodiment, if there is an essential difference between the certain route and the template route the template route it is considered a divergent route. For example, an essential difference may be a single element that differs between the certain route and the template route (e.g., a screen in the certain route that is not in the template route, a transaction in the template route that is not executed when following the certain route). Optionally, an essential difference involves at least a certain number of elements and/or a certain proportion of elements. For example, there may be an essential difference between the certain route and the template route if they differ on at least 5 elements and/or 15% of the elements.

In one embodiment, the database 358 is configured to store the certain divergent route identified by the route analyzer 356. Optionally, the database 358 may be configured to store many divergent routes; the examples listed below describe various possibilities for how the database 358 may handle the certain divergent route.

In one example, each time a divergent route is identified in a run of a test scenario, the divergent route is stored in the database 358. Optionally, storing a divergent route involves storing elements included in the divergent route, a run of a test scenario that follows the divergent route, information pertaining to a user that ran a test scenario that followed the divergent route, and/or information pertaining to an organization associated with a run of a test scenario that followed the divergent route.

In another example, each time a divergent route is identified in a run of a test scenario, the route analyzer 356 and/or the database 358 determine whether a route essentially the same as the divergent route has been already stored. If no essentially same divergent route has been stored, the divergent route is stored.

In one embodiment, routes that are essentially the same include the same sequence of screens. Optionally, routes that are essentially the same have a same sequence of screens but with different user keys. Optionally, routes that are essentially the same have a same sequence of screens but utilize different default values for at least some of the fields displayed on the screens.

Optionally, if an essentially same route has already been stored once, then a certain counter associated to the divergent route is incremented. Optionally, such a counter may be a counter corresponding to runs following the divergent route, a counter corresponding to users that ran runs following the divergent route, and/or a counter corresponding to organizations associated with runs following the divergent route.

In one embodiment, the route counter 360 is configured to count number of divergent routes stored in the database 358 that are essentially the same as the certain divergent route. Optionally, the route counter 360 queries and/or searches the database 358. Optionally, by processing results returned by the search and/or query the route counter 360 is able to return the number of number of divergent routes that are essentially the same as the certain divergent route. For example, the route counter 360 counts the number of divergent routes returned in the search and/or query. Optionally, the route counter 360 bases the number of divergent routes that are essentially the same as the certain divergent route on one or more values returned by counters associated to divergent routes. For example, given the certain divergent route, the route counter 360 returns a sum of counters associated with divergent routes that are essentially the same as the certain divergent route.

The template manipulator 362 is configured to manipulate the test scenario template according to the divergent routes in the database 358 that are essentially the same as the certain divergent route, generating a manipulated template 363. In one embodiment, the template manipulator 362 manipulates the template only if the number of divergent routes stored in the database 358 that are essentially the same as the certain divergent route reaches a predetermined threshold.

In one embodiment, the predetermined threshold is selected to have a certain value that signifies a likelihood of general usefulness of a certain divergent route; thus, the fact that the divergent routes essentially the same as the certain divergent route have a sufficiently large utilization (as indicated by reaching the predetermined threshold), indicates that the divergent routes are likely to be useful for other organizations too In one embodiment, the predetermined threshold may be a fixed value. For example, two divergent routes, i.e., two different runs of test scenarios need to have been identified as containing the essentially the same route as the certain divergent route in order for the predetermined threshold to be reached.

In another embodiment, the predetermined threshold may be proportional to various factors such as the number of the runs of the test scenarios, the number of users that ran the test scenarios, and/or the number of organizations associated with the runs of the test scenarios. In one example, the predetermined threshold increases with the number of different organizations, thus for instance, if there are 10 different organizations the predetermined threshold may be 3, but if there are 100 different organizations, the predetermined threshold may be 10.

In one embodiment, manipulating a test scenario template by the template manipulator 362 involves updating the template so the manipulated template 363 is different from the template prior to the updating. In one example, updating the test scenario template may involve adding one or more elements found in the divergent routes to the test scenario template. In another example, updating the test scenario template may involve removing one or more elements found in the test scenario template that are not found in the divergent routes. In yet another, updating the test scenario template may involve changing order of one or more elements found in the test scenario template, according to an order of elements found in the divergent routes.

In another embodiment, manipulating a test scenario template by the template manipulator 362 involves generating a new test scenario template based on the test scenario template and one or more of the divergent routes, which is considered the manipulated template 363. Thus, the manipulated template 363 may refer to an updated template or a newly generated template, depending on what manipulation the template manipulator 362 is configured to perform.

Figure 34:
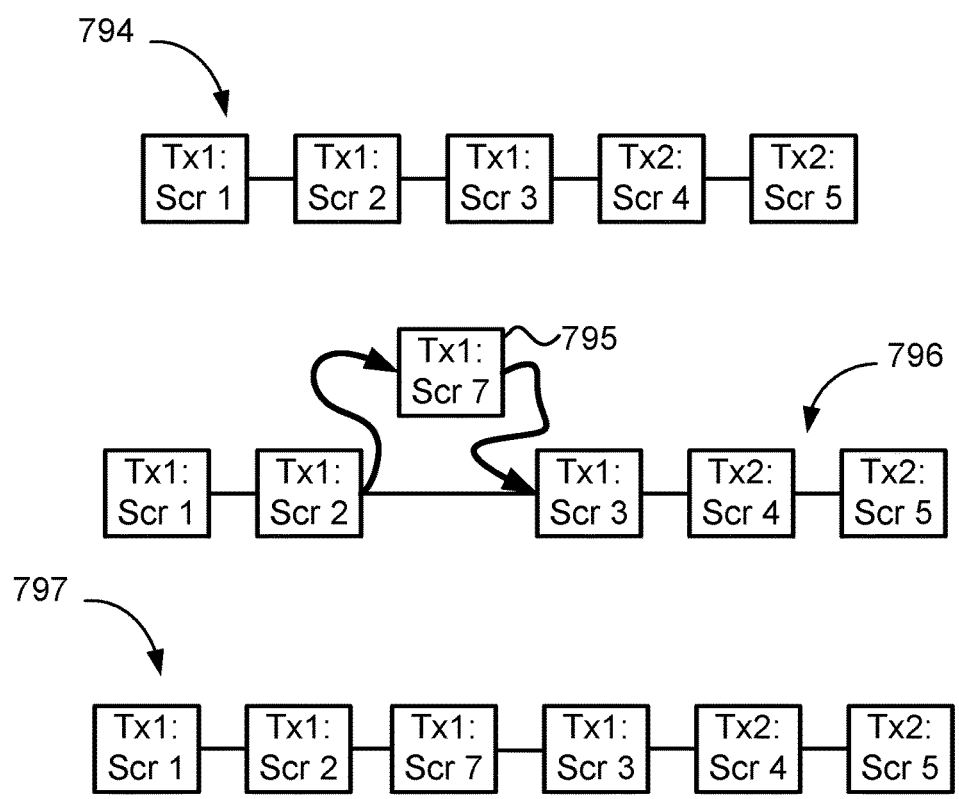
FIG. 34 illustrates updating of a test scenario template according to divergent routes.

In one example, the test scenario template 794 illustrated in FIG. 34 is updated according to divergent routes. In this example, template 794 involves two transactions (denoted "Tx1" and "Tx2" in FIG. 34) which include five screens (denoted "Scr 1" to "Scr 5" in FIG. 34). Based on runs of test scenarios by different users from different organizations, it may be determined that there is a route 796 that diverges from the route of the template 794. According to the divergent route, many users run an additional screen 795 belonging to Tx1 (the screen 795 denoted by "Scr 7" in FIG. 34). Therefore, the template 794 may be manipulated to create a manipulated template 797 which includes the screen 795 in the appropriate place. Optionally, the manipulated template 797 replaces the template 794. Alternatively, the manipulated template 797 may be created in addition to the template 794.

In one embodiment, the computer system optionally includes a data cleaner 366 configured to select a value from the manipulated test scenario template 363, and remove the selected value from the manipulated template 363 if the selected value does not appear in runs of test scenarios that follow at least two divergent routes that are essentially the same as the certain divergent route. Optionally, the data cleaner 366 is also configured to check that the at least two divergent routes are associated with at least two different organizations. For example, there is at least a first run of a test scenario that follows a first registered divergent route that is essentially the same as the certain divergent route; there is at least a second run of a test scenario that follow a first divergent route that is essentially the same as the certain divergent route that follows a second registered divergent route that is essentially the same as the certain divergent route; and a first organization is associated with the first run, and a second different organization, is associated with the second run.

In another embodiment, the computer system optionally includes a ranking module 364 configured to rank templates, such as, the manipulated test scenario template 363. Optionally, ranking the manipulated template 363 is done according to the number of its corresponding divergent routes. For example, the more divergent routes corresponding to a manipulated template 363, the higher the manipulated template 363 is ranked. In one example, ranking involves ordering templates according to number of their corresponding divergent routes. In another example, ranking involves assigning templates scores proportional to the number of their corresponding divergent routes. In still another example, ranking involves ordering templates according to number of different organizations corresponding to the divergent routes. The larger the number of organizations associated with runs that had divergent routes found to be essentially the same as a route corresponding to the manipulated template 363, the higher the rank of the manipulated template 363.

In one embodiment, the computer system optionally includes a monitoring module 352 that is configured to monitor the users 350 belonging to the different organizations and to the activity data 353 obtained from monitoring the users 350 to the test identifier 354.

In another embodiment, the computer system optionally includes a user interface 368 configured to suggest to a user to run an instantiation manipulated test scenario template. Optionally, the user interface 368 may initiate the instantiation of the manipulated test scenario template; for example, the user interface 368 may present a first screen belonging to the manipulated test scenario template and prompt a user to take a certain action to advance execution.

In one embodiment, the route analyzer 356 is configured to receive a run of a test scenario this is instantiated from a first test scenario template. The first test scenario template defines a first template route that instantiations of the first test scenario template are supposed to follow. The route analyzer 356 is also configured to determine whether the run follows a certain divergent route that diverges from the first template route. Optionally, if the it is determined that the run does follow the certain divergent route, the certain divergent route is stored in the database 358.

In one embodiment, the route counter 360 is configured to receive a second template route belonging to a second test scenario template. For example, there is a second run of a test scenario that is an instantiation of the second test scenario template; the second run follows a second template route defined by the second test scenario template. Optionally, the second test scenario template is associated with a certain organization that does not belong to the different organizations; for example, a user belonging to the certain organization ran the run of the second test scenario. Optionally, the route counter 360 is also configured to count number of divergent routes in the database 358 that are similar to second template route.

In one embodiment, the template manipulator 362 is configured to manipulate the second test scenario template according to the divergent routes in the database that are similar to the second template route. Optionally, the template manipulator 362 performs the manipulation if the number of divergent routes reaches a predetermined threshold. Optionally, the template manipulator 362 is also configured not to manipulate the second test scenario template according to the divergent routes if the number does not reach the predetermined threshold.

In one example, the software systems are screen based, and similar divergent routes start from, and end with, the same screens. In another example, the software systems are screen based, and similar divergent routes have the same chain of screens but with different user keys. In still another example, similar divergent routes have the same sequence of screens, but possibly utilize different default values for at least some fields displayed on the screens.

It is to be noted that different embodiments may implement components of the computer systems illustrated in FIG. 32 and/or FIG. 33 in different ways. For example, in some embodiments one or more of the following may be implemented by the same software module and/or software modules running on the same processor: the monitoring module 352, the test identifier 354, the route analyzer 356, the database 358, the route counter 360, the template manipulator 362, the ranking module 364, the data cleaner 366, and the user interface 368. Optionally, one or more of the aforementioned components may be implemented on a remote server, such as a cloud-based server.

In one example, the route analyzer 356 and/or the route counter 360 are implemented, at least in part, as part of the database 358. For example, they may involve software modules that belong to the database 358. In another example, the route analyzer 356 and the route counter 360 are implemented by the same software module that interacts with the database 358. In yet another example, the ranking module 364 is implemented as part of the template manipulator 362.

In one embodiment, the test identifier 354, the route analyzer 356, the database 358, the route counter 360, and/or the template manipulator are implemented as a cloud-based service that receives the activity data 353 of the users and manipulates templates to better suit the needs of the users. For example, the manipulated routes may test elements in a new and/or different way. Optionally, the ranking module 364 and/or the data cleaner 366 may also be part of the cloud-based service.

Figure 35:
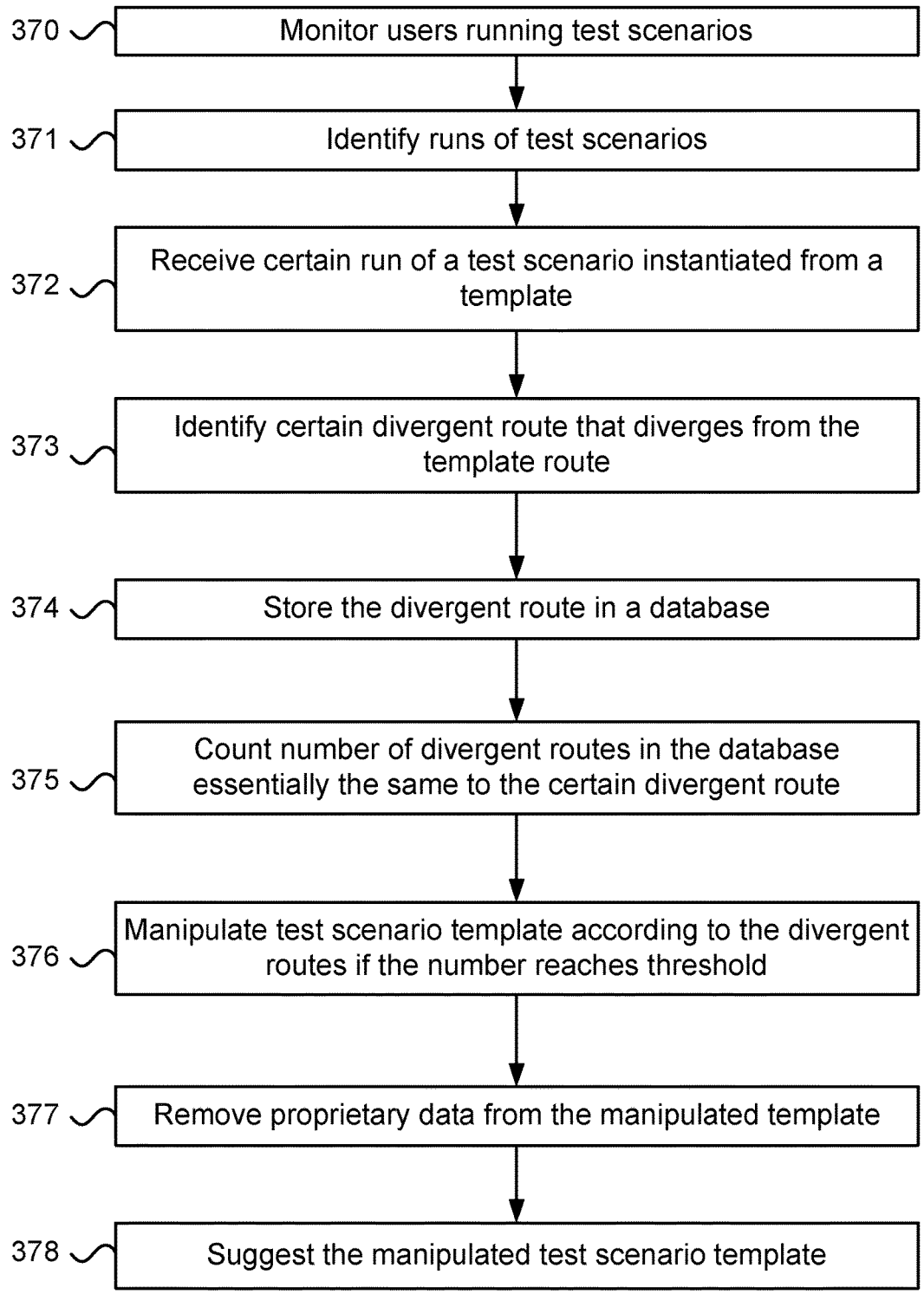
FIG. 35 illustrates one embodiment of a computer implemented method for utilizing divergent routes identified in runs of test scenarios to manipulate a test scenario template.

FIG. 35 illustrates one embodiment of a computer implemented method for utilizing divergent routes identified in runs of test scenarios to manipulate a test scenario template. The illustrated embodiment includes the following steps:

In step 371, identifying runs of test scenarios run by users belonging to the different organizations on software systems associated with the different organizations.

In step 372, receiving a certain run of a test scenario instantiated from a test scenario template; the certain run of the test scenario was run on a software system associated with a certain organization that is not one of the different organizations. Optionally, the different organizations and the certain organization are associated with different fields of operation. Alternatively, the different organizations and the certain organization are associated with a same field of operation.

Optionally, the test scenario template defines a template route that instantiations of the template are supposed to follow. Optionally, the template route includes a sequence of one or more elements involved in running an instantiation of the template. Optionally, an element may be a test step, a transaction, or a screen.

In step 373, identifying that the certain run follows a certain divergent route that diverges from the template route. Optionally, a divergent route is characterized by a different sequence of elements compared to sequence of elements defined by the template route.

In step 374, storing the certain divergent route in the database 358.

In step 375, counting number of divergent routes in the database 358 that are essentially the same as the certain divergent route.

And in step 377, if the number reaches a predetermined threshold, manipulating the test scenario template according to the divergent routes in the database that are essentially the same as the certain divergent route. Optionally, the predetermined threshold is selected such that reaching the predetermined threshold indicates that the essentially the same divergent routes are also likely to be useful for other organizations. Optionally, the predetermined threshold is at least two divergent routes.

Optionally, if the number does not reach the predetermined threshold, step 377 involves refraining from manipulating the test scenario template according to the divergent routes. Not reaching the predetermined threshold indicates that the divergent routes are not likely to be a suitable option for an organization associated with runs that follow the certain divergent route. Additionally, a number that does not reach the predetermined threshold may indicate that the divergent routes are too specific, and are likely useful primarily for the organizations that ran them.

In one embodiment, manipulating the test scenario template according to the divergent routes involves updating the test scenario template according to one or more of the divergent routes; for example, a new screen belonging to the divergent routes, which did not appear in the template, is added to the test scenario template.

In another embodiment, manipulating the test scenario template according to the divergent routes involves generating a new test scenario template based on the test scenario template and one or more of the divergent routes. For example, elements from the divergent routes are combined with elements in the existing test scenario template in order to generate a new template with a combination of elements that is not possessed by the test scenario template and possibly any of the divergent routes.

In one embodiment, identifying in the runs divergent routes in step 373 involves identifying divergent routes that diverge from the template route and later on converge back to the template route. Additionally or alternatively, identifying in the runs divergent routes in step 373 involves identifying divergent routes that diverge from the template route and do not converge back to the template route. Additionally or alternatively, identifying in the runs divergent routes in step 373 involves identifying divergent routes that merge with the template route.

In one embodiment, the computer implemented method includes an additional optional step 378 involving suggesting to a user to run an instantiation of the updated test scenario template. For example, the user interface 368 may be utilized to present the updated template to the user.

In one embodiment, the computer implemented method includes an optional step 370, which involves monitoring the users and providing data obtained from the monitoring for use in the identifying of the runs of test scenarios.

In another embodiment, the computer implemented method includes an optional step 377 that involves selecting a value from the manipulated test scenario template, and removing the selected value from the manipulated test scenario template if the selected value does not appear in runs that follow at least two of the divergent routes. Optionally, step 377 also involves testing that the at least two of the divergent routes are associated with at least two different organizations.

In one embodiment, the computer implemented method illustrated in FIG. 35 includes an optional step of ranking the manipulated test scenario template according to the number of the divergent routes. Additionally or alternatively, ranking the manipulated test scenario template may be according to the number of different organizations associated with the divergent routes.

Figure 36:
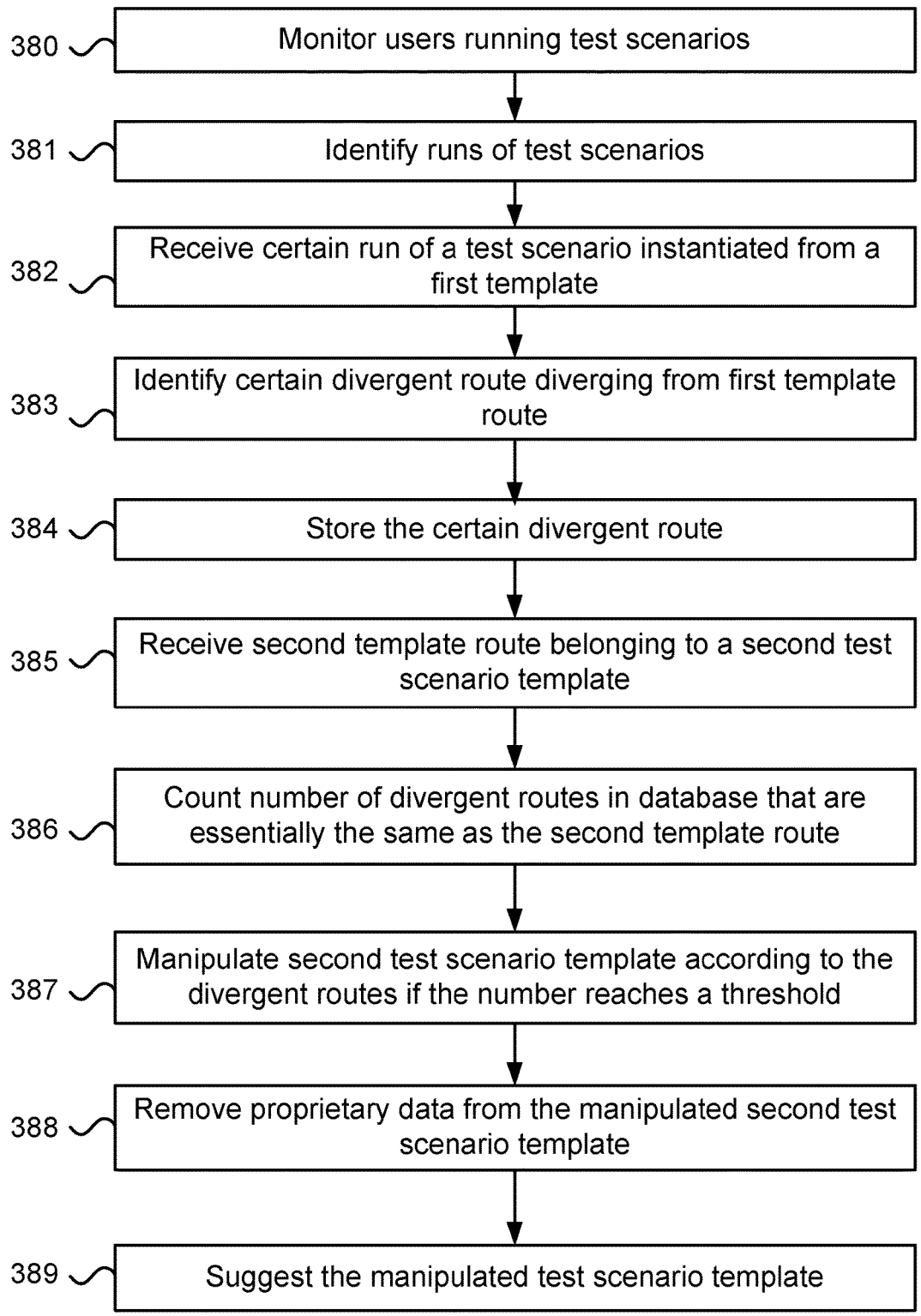
FIG. 36 illustrates one embodiment of a computer implemented method for utilizing divergent routes identified in runs of test scenarios to manipulate a test scenario template.

FIG. 36 illustrates another embodiment of a computer implemented method for utilizing divergent routes identified in runs of test scenarios to manipulate a test scenario template. The illustrated embodiment includes the following steps:

In step 381, identifying runs of test scenarios run by users belonging to the different organizations on software systems associated with the different organizations.

In step 382, receiving a certain run of a test scenario instantiated from a first test scenario template; the first test scenario template defines a first template route that instantiations of the first test scenario template are supposed to follow. Optionally, the first template route includes a sequence of one or more elements involved in running an instantiation of the first template. Optionally, an element may be a test step, a transaction, or a screen.

In step 383, identifying that the certain run follows a certain divergent route that diverges from the first template route. Optionally, a divergent route is characterized by a different sequence of elements compared to sequence of elements defined by the template route.

In step 384, storing the certain divergent route in the database 358.

In step 385, receiving a second template route belonging to a second test scenario template; the second test scenario template is associated with an organization that does not belong to the different organizations. Optionally, receiving the second template route involves receiving elements included in the second template route. Additionally or alternatively, receiving the second template route may involve receiving the second test scenario template that defines the second template route. Additionally or alternatively, receiving the second template route may involve receiving a run of a test scenario that follows the second template route, such as a run that is an instantiation of the second template route.

In step 386, counting number of divergent routes in the database 358 that are essentially the same as the second template route.

And in step 387, if the number reaches a predetermined threshold, manipulating the test scenario template according to the divergent routes in the database that are essentially the same as the second template route. Optionally, the predetermined threshold is selected such that reaching the predetermined threshold indicates that the essentially the divergent routes are also likely to be useful for other organizations. Optionally, the predetermined threshold is at least two divergent routes.

Optionally, if the number does not reach the predetermined threshold, step 387 involves refraining from manipulating the test scenario template according to the divergent routes. Not reaching the predetermined threshold indicates that the divergent routes are not likely to be a suitable option for an organization associated with runs that follow the certain divergent route. Additionally, a number that does not reach the predetermined threshold may indicate that the divergent routes are too specific, and are likely useful primarily for the organizations that ran them.

In one embodiment, identifying in the runs divergent routes in step 383 involves identifying divergent routes that diverge from the template route and later on converge back to the template route. Additionally or alternatively, identifying in the runs divergent routes in step 383 involves identifying divergent routes that diverge from the template route and do not converge back to the template route. Additionally or alternatively, identifying in the runs divergent routes in step 383 involves identifying divergent routes that merge with the template route.

In one embodiment, the computer implemented method includes an additional optional step 389 involving suggesting to a user to run an instantiation of the updated test scenario template. For example, a user interface may be utilized to present the updated template to the user.

In one embodiment, the computer implemented method includes an optional step 380, which involves monitoring the users and providing data obtained from the monitoring for use in the identifying of the runs of test scenarios.

In another embodiment, the computer implemented method includes an optional step 388 that involves selecting a value from the manipulated test scenario template, and removing the selected value from the manipulated test scenario template if the selected value does not appear in runs that follow at least two of the divergent routes. Optionally, step 388 also involves testing that the at least two of the divergent routes are associated with at least two different organizations.

In one embodiment, the computer implemented method illustrated in FIG. 36 includes an optional step of ranking the manipulated test scenario template according to the number of the divergent routes. Additionally or alternatively, ranking the manipulated test scenario template may be according to the number of different organizations associated with the divergent routes.

In one embodiment, a non-transitory computer-readable medium stores program code that may be used by a computer to utilize divergent routes identified in runs of test scenarios to manipulate a test scenario template. The computer includes a processor, and the non-transitory computer-readable medium stores the following program code:

Program code for identifying runs of test scenarios run by users belonging to the different organizations on software systems associated with the different organizations.

Program code for receiving a certain run of a test scenario run on a software system associated with a certain organization that does not belong to the different organizations; the certain run is instantiated from a test scenario template and the test scenario template defines a template route that instantiations of the test scenario template are supposed to follow.

Program code for identifying that the certain run follows a certain divergent route that diverges from the template route.

Program code for storing the certain divergent route in a database.

Program code for counting number of divergent routes in the database that are essentially the same as the certain divergent route.

And program code for manipulating the test scenario template according to the divergent routes in the database that are essentially the same as the certain divergent route if the number reaches a predetermined threshold.

In one embodiment, the program code for manipulating the test scenario template according to the divergent routes includes program code for updating the test scenario template according to one or more of the divergent routes.

In another embodiment, the program code for manipulating the test scenario template according to the divergent routes include program code for generating a new test scenario template based on the test scenario template and one or more of the divergent routes.

In one embodiment, the program code stored in the non-transitory computer-readable medium optionally includes program code for refraining from manipulating the test scenario template according to the divergent routes if the number does not reach the predetermined threshold. Not reaching the predetermined threshold indicates that the divergent routes are not likely to be a suitable alternative to the second template route, for other organizations.

In one embodiment, the program code stored in the non-transitory computer-readable medium optionally includes program code for selecting a value from the manipulated test scenario template, and removing the selected value from the manipulated test scenario template if the selected value does not appear in runs that follow at least two of the divergent routes. Optionally, the program code also involves testing that the at least two of the divergent routes are associated with at least two different organizations.

In another embodiment, a non-transitory computer-readable medium stores program code that may be used by a computer to utilize divergent routes identified in runs of test scenarios to manipulate a test scenario template. The computer includes a processor, and the non-transitory computer-readable medium stores the following program code:

Program code for identifying runs of test scenarios run by users belonging to the different organizations on software systems associated with the different organizations.

Program code for receiving a certain run of a test scenario; the certain run is instantiated from a first test scenario template and the first test scenario template defines a first template route that instantiations of the first test scenario template are supposed to follow.

Program code for identifying that the certain run follows a certain divergent route that diverges from the first template route.

Program code for storing the certain divergent route in a database.

Program code for receiving a second template route belonging to a second test scenario template. The second test scenario template is associated with an organization that does not belong to the different organizations.

Program code for counting number of divergent routes in the database that are essentially the same as the second template route.

And program code for manipulating the second test scenario template according to the divergent routes in the database that are essentially the same as the second template route if the number reaches a predetermined threshold.

In one embodiment, the program code for manipulating the second test scenario template according to the divergent routes includes program code for updating the second test scenario template according to one or more of the divergent routes.

In another embodiment, the program code for manipulating the second test scenario template according to the divergent routes includes program code for generating a new test scenario template based on the second test scenario template and one or more of the divergent routes.

In one embodiment, the program code stored in the non-transitory computer-readable medium optionally includes program code for refraining from manipulating the second test scenario template according to the divergent routes if the number does not reach the predetermined threshold. Not reaching the predetermined threshold indicates that the divergent routes are not likely to be a suitable alternative to the second template route, for other organizations.

In one embodiment, the program code stored in the non-transitory computer-readable medium optionally includes program code for selecting a value from the manipulated second test scenario template, and removing the selected value from the manipulated second test scenario template if the selected value does not appear in runs that follow at least two of the divergent routes. Optionally, the program code also involves testing that the at least two of the divergent routes are associated with at least two different organizations.

Figure 37:
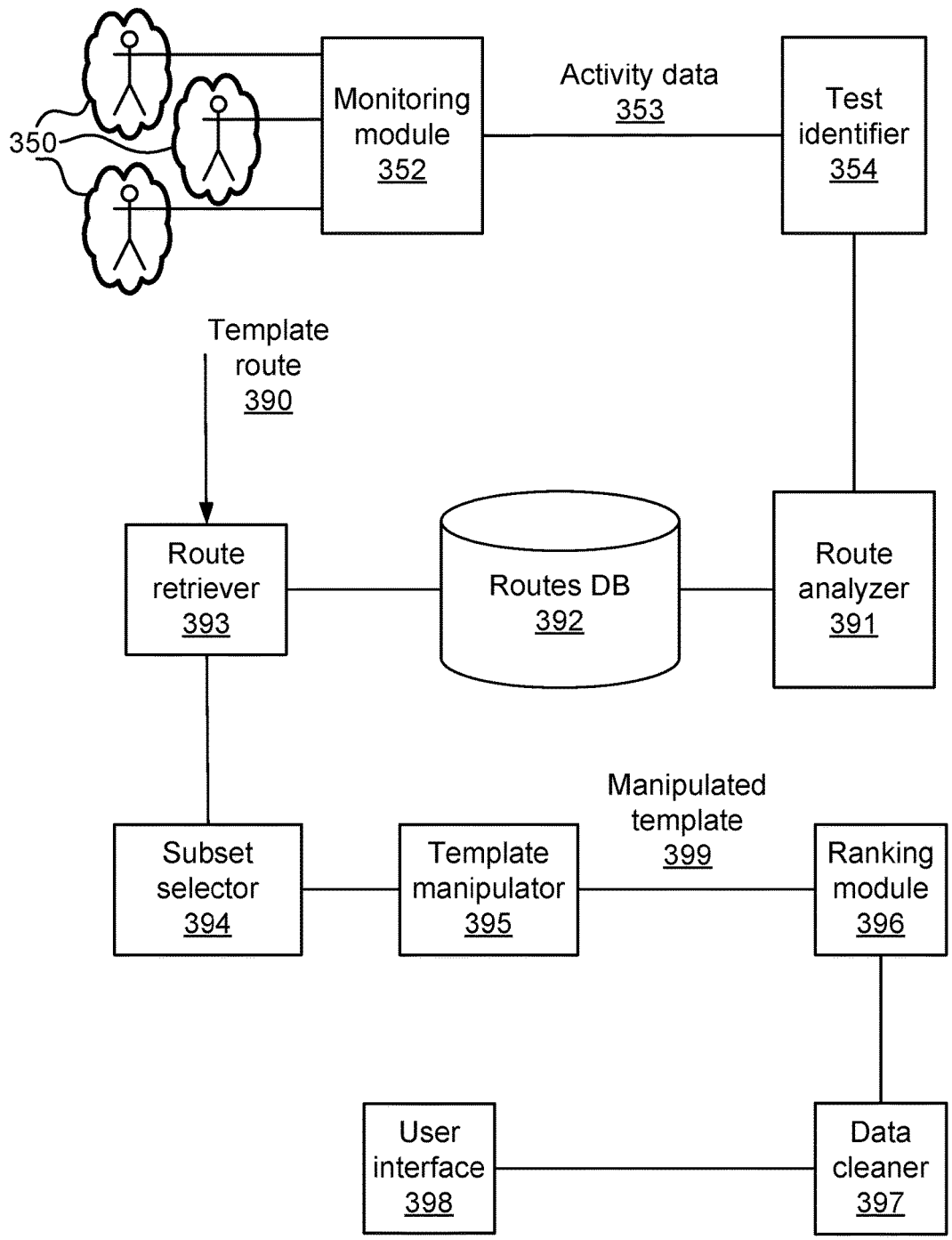
FIG. 37 illustrates one embodiment of a computer system configured to utilize routes followed by runs of test scenarios to manipulate a test scenario template.
Figure 38:
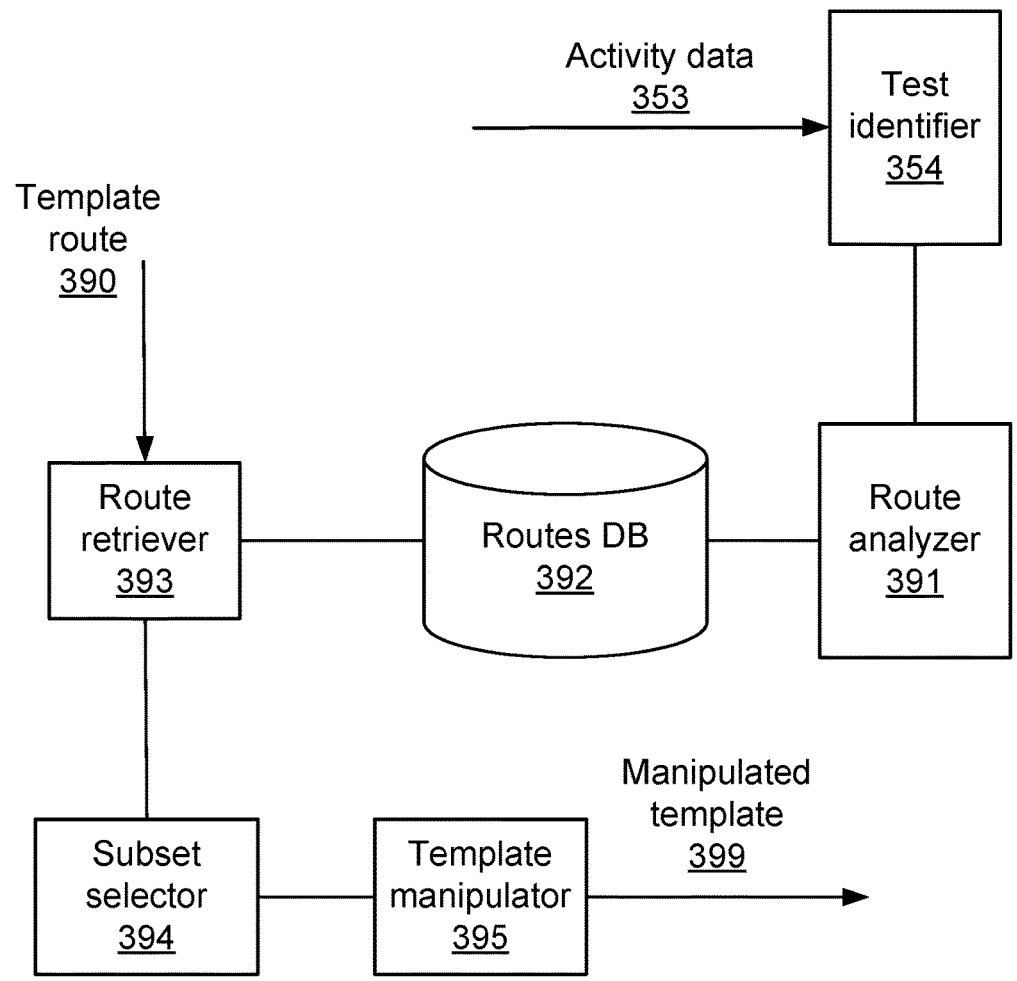
FIG. 38 illustrates one embodiment of a computer system configured to utilize routes followed by runs of test scenarios to manipulate a test scenario template.

FIG. 37 and FIG. 38 illustrate embodiments of a computer system configured to utilize routes followed by runs of test scenarios to manipulate a test scenario template. The illustrated embodiments include at least a test identifier 354, a route analyzer 391, a database 392, a route retriever 393, a subset selector 394, and a template manipulator 395.

Herein, a route defines a sequence of one or more elements involved in a run of a test scenario; an element may be a test step, a transactions, or a screen. Additionally, a test scenario template may define a template route that instantiations of the template are supposed to follow. Thus, a run of a test scenario based on a template is expected to reflect the template route; for example, the run may describe screens and/or transactions included in the template route.

The test identifier 354 is configured to identify runs of test scenarios run by users belonging to different organizations on software systems associated with the different organizations. Optionally, the runs are identified from activity data 353 obtained from monitoring the users.

In one embodiment, the route analyzer 391 is configured to receive a run of a test scenario and to identify a route that the run follows; the run may be one of the runs identified by the test identifier 354. Optionally, the route analyzer 391 identifies in the run certain elements that may include test steps executed while running the test scenario, transactions and/or businesses executed while running the test scenario, and/or screens presented to a user running the test scenario. The certain elements may also be used to describe the route. In this case, the run may be referred to as "following the route".

Optionally, the route analyzer 391 may identify multiple routes that the run follows. For example, the multiple routes may contain different types of elements; e.g., a first route may include screens, while a second route may include transactions. Thus, the run be referred to as following both routes. Additionally or alternatively, the route analyzer 391 may include in a route a subset of the elements identified in the run. For example, the route analyzer 391 may exclude certain screens from a route if those screens are utilized only by one organization and/or contain primarily proprietary data.

In one embodiment, the database 392 is configured to store the routes identified by the route analyzer 391. Optionally, at least some of the functionality of the route analyzer 391 is performed by the database 392; for example, part of the identification of routes is performed by software and/or hardware that is part of the database (e.g., running on a server belonging to the database 392), and/or is controlled by the database (e.g., a module of the database 392 may control some of the processes performed by the route analyzer 391).

In one example, each time a route is identified in a run of a test scenario, the route is stored in the database 392. Optionally, storing a route involves storing elements included in the route, a run of a test scenario that follows the route, information pertaining to a user that ran a test scenario that followed the route, and/or information pertaining to an organization associated with a run of a test scenario that followed the divergent route.

In another example, each time a route is identified in a run of a test scenario, the route analyzer 391 and/or the database 392 determine whether another route essentially the same as the route has been already stored. If no essentially same route has already been stored, the route is stored in the database 392.

Optionally, if another essentially same route has already been stored, then a certain counter associated to the already stored route is incremented. Optionally, such a counter may be a counter corresponding to runs following the stored route, a counter corresponding to users that ran runs following the stored route, and/or a counter corresponding to organizations associated with runs following the stored route.

The route retriever 393 is configured to receive a certain template route 390 belonging to a test scenario template and to retrieve from the database 392 divergent routes that diverge from the template route 390. The test scenario template defines the template route, which is a route that instantiations of the template are supposed to follow. That is, each run of a test scenario instantiated from the template is supposed to reflect a certain sequence of elements, as defined by the route. Optionally, the route retriever 393 receives the test scenario template to which the route 390 belongs, and derives the route 390 from the template. Additionally and or alternatively, the route retriever 393 may receive a representation of the template route 390.

In one embodiment, at least some of the functionality of the route retriever 393 is performed by the database 392; for example, part of the identification of divergent routes is performed by software and/or hardware that is part of the database (e.g., miming on a server belonging to the database 392), and/or is controlled by the database (e.g., a module of the database 392 may control some of the processes performed by the route retriever 393).

In one embodiment, the test scenario template received by the route retriever 393 is associated with a certain organization that does not belong to the different organizations. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization. Optionally, the different organizations and the certain organization are associated with different fields of operation (e.g., the different organizations are in the insurance field, while the certain organization is in the field of automobile manufacture). Alternatively, the different organizations and the certain organization are associated with a same field of operation.

Based on the elements included in the template route 390, the route retriever 393 may identify in the database 392 routes that diverge from the template route 390, and as such are considered divergent routes with respect to the template route 390. Optionally, a divergent route that diverges from a template route 390 is characterized by a different sequence of elements compared to sequence of elements defined by the template route 390. For example, the route retriever 393 may compare elements in the template route 390 with elements belonging to runs in the database 392 in order to determine whether some elements being compared are similar and/or appear in the same order as the elements in the template route 390.

In one embodiment, the route retriever 393 is configured to identify divergent routes that diverge from the template route 390 and later on converge back to the template route 390. Additionally or alternatively, the route retriever 393 may also be configured to identify divergent routes that diverge from the template route 390 and do not converge back to the template route 390. Additionally or alternatively, the route retriever 393 may be also configured to identify divergent routes that merge with the template route 390.

In one embodiment, an essentially exhaustive search is performed in the database to identify the divergent routes. Optionally, essentially all routes stored in the database 392 are evaluated and/or considered when searching for the divergent routes.

In another embodiment, searching for the divergent routes in the database 392 involves evaluating and/or considering a portion of the routes stored in the database (e.g., randomly selecting 10% of the routes in the database 392 and examining them to identify the divergent routes). Optionally, at least some routes belonging to the portion of the routes represent other routes (e.g., they are representatives of groups of related routes). Thus, if a representative route is deemed a divergent route, or close to being a divergent route, other routes in its group may be evaluated too.

In another embodiment, searching for the divergent routes in the database 392 involves filtering routes in the database according to elements in the template route 390. For example, the database 392 may be queried for routes that include a certain element belonging to the template route 390, and only routes containing the certain element are evaluated.

The subset selector 394 is configured to select from the divergent routes retrieved by the route retriever 393 a subset of divergent routes that are similar to each other. Optionally, the routes belonging to the subset are essentially the same. Optionally, the subset includes all the divergent routes retrieved by the route retriever 393. Alternatively, the subset includes at least one of the divergent routes, and at least one divergent route is not included in the subset. Optionally, the subset includes exactly one divergent route; alternatively, the subset may include two or more divergent routes.

In one embodiment, the subset includes divergent routes that are similar to each other, according to some measure of similarity. Optionally, the divergent routes in the subset are less similar to other divergent routes not in the subset, according the measure of similarity. In one example, the software systems are screen based, and similar divergent routes start from, and end with, the same screens. In another example, the software systems are screen based, and similar divergent routes have the same chain of screens but with different user keys. In still another example, similar divergent routes have the same changes in relation to the template route from which they arrived.

In one example, divergent routes belonging to the subset have a certain number of elements in common. For example, all divergent routes in the subset share a number of common screens. In another example, divergent routes belonging to the subset all have a minimal pairwise similarity between pairs of divergent routes in the subset. For example, the angle between a vector representation of any two divergent routes in the subset is smaller than a certain threshold. In yet another example, divergent routes returned by the route retriever 393 are clustered and the subset selector 394 selects a certain cluster of divergent routes as the subset.

In one embodiment, the subset selector 394 compares the divergent routes retrieved by the route retriever 393 to the template route 390, and includes in the subset only divergent routes that show at least a certain level of similarity to the template route 390. For example, all divergent routes must share a certain number of elements with the template route 390 (in addition to being similar to each other).

The template manipulator 395 is configured to manipulate the test scenario template according to the subset of divergent routes if the size of the subset reaches a predetermined threshold. A result of the manipulation may be a manipulated template 399. Optionally, the template manipulator 395 is also configured not to manipulate the test scenario template according to subset if the size of the subset does not reach the predetermined threshold.

In one embodiment, the predetermined threshold is selected to have a certain value that signifies a likelihood of general usefulness of divergent routes belonging to the subset; thus, the fact that the divergent routes in the subset have a sufficiently large utilization (as indicated by the size of the subset), indicates that the divergent routes in the subset are likely to be useful for other organizations too. If the subset is too small, this may indicate that the routes in the subset are utilized by a small number of users and/or organizations, and thus are not likely useful for other organizations.

In one embodiment, the predetermined threshold may be a fixed value. For example, a subset of at least two divergent routes. In another embodiment, the predetermined threshold may be proportional to various factors such as the number of the runs of the test scenarios, the number of users that ran the test scenarios, and/or the number of organizations associated with the runs of the test scenarios. In one example, the predetermined threshold increases with the number of different organizations, thus for instance, if there are 10 different organizations the predetermined threshold may be a subset of at least size 3, but if there are 100 different organizations, the predetermined threshold may be a subset of at least 10 divergent routes.

In one embodiment, manipulating a test scenario template by the template manipulator 395 involves updating the template so the manipulated template 399 is different from the template prior to the updating. In one example, updating the test scenario template may involve adding one or more elements found in the divergent routes in the subset to the test scenario template. Optionally, the one or more elements that are added are part of at least a predetermined proportion of the divergent routes belonging to the subset (e.g., the added elements appear in at least 50% of the divergent routes in the subset). Optionally, the one or more elements that are added are part of all the divergent routes belonging to the subset. In another example, updating the test scenario template may involve removing one or more elements found in the test scenario template that are not found in the divergent routes in the subset. Optionally, the one or more elements that are removed are not part of at least a predetermined proportion of the divergent routes belonging to the subset (e.g., the added elements appear in less than 50% of the divergent routes in the subset). Optionally, the one or more elements that are remove do not appear in any of the divergent routes belonging to the subset. In yet another, updating the test scenario template may involve changing order of one or more elements found in the test scenario template, according to an order of elements found in the divergent routes in the subset.

In another embodiment, manipulating a test scenario template by the template manipulator 395 involves generating a new test scenario template based on the test scenario template and one or more of the divergent routes in the subset. For example, the new template may include at least some of the elements from the test scenario template and at least some elements from divergent routes belonging to the subset. Optionally, the new template is generated by copying a pervious template and updating the copy.

In one embodiment, the computer system may optionally include a data cleaner 397 configured to select a value from the manipulated template 399, and remove the selected value from the manipulated template 399 if the selected value does not appear in runs of test scenarios that follow at least two divergent routes that are essentially the same as the certain divergent route. Optionally, the data cleaner 397 is also configured to check that the at least two divergent routes are associated with at least two different organizations. For example, there is at least a first run of a test scenario that follows a first registered divergent route that is essentially the same as the certain divergent route; there is at least a second run of a test scenario that follow a first divergent route that is essentially the same as the certain divergent route that follows a second registered divergent route that is essentially the same as the certain divergent route. Additionally, a first organization is associated with the first run, and a second different organization, is associated with the second run. Optionally, the manipulated template 399 may refer to an updated template or a newly generated template, depending on what manipulation the template manipulator 395 is configured to perform.

In one embodiment, the computer system may also optionally include a monitoring module 352 that is configured to monitor the users 350 belonging to the different organizations and to provide the activity data 353 obtained from monitoring the users 350 to the test identifier 354.

In another embodiment, the computer system may also optionally include a user interface 398 configured to suggest to a user to run an instantiation manipulated test scenario template. Optionally, the user interface 398 may initiate the instantiation of the manipulated test scenario template; for example, the user interface 398 may present a first screen belonging to the manipulated test scenario template and prompt a user to take a certain action to advance execution.

In another embodiment, the computer system may also optionally include a ranking module 396 configured to rank templates, such as, the manipulated template 399. Optionally, ranking the manipulated template 399 is done according to the size of the subset of divergent routes selected by the subset selector 394; for example, the larger the subset, the higher the manipulated template 399 is ranked. In one example, ranking involves ordering templates according to size of their corresponding subset of divergent routes. In another example, ranking involves assigning templates scores proportional to the size of their corresponding subset of divergent routes. In still another example, ranking involves ordering templates according to number of different organizations associated with routes belonging to their corresponding subsets. The larger the number of organizations associated with runs that followed divergent routes in a subset, the higher the rank of the manipulated template 399.

It is to be noted that different embodiments may implement components of the computer systems illustrated in FIG. 37 and/or FIG. 38 in different ways. For example, in some embodiments one or more of the following may be implemented by the same software module and/or software modules running on the same processor: the monitoring module 352, the test identifier 354, the route analyzer 391, the database 392, the route retriever 393, the subset selector 394, the template manipulator 395, the ranking module 396, the data cleaner 397, and the user interface 398. Optionally, one or more of the aforementioned components may be implemented on a remote server, such as a cloud-based server.

In one example, the route analyzer 391, the route retriever 393, and/or the subset selector 394 may be implemented, at least in part, as part of the database 392. For example, they may involve software modules that belong to the database 392. In another example, the route analyzer 391, the route retriever 393, and/or the subset selector 394 may be implemented by the same software module that interacts with the database 392. In yet another example, the ranking module 396 and/or the data cleaner 397 are implemented as part of the template manipulator 395.

In one embodiment, the test identifier 354, the route analyzer 391, the database 392, the route retriever 393, the subset selector 394, and/or the template manipulator 395, are implemented as a cloud-based service that receives the activity data 353 of the users and manipulates templates to better suit the needs of the users. For example, the manipulated routes may test elements in a new and/or different way. Optionally, the ranking module 396 and/or the data cleaner 397 may also be part of the cloud-based service.

Figure 39:
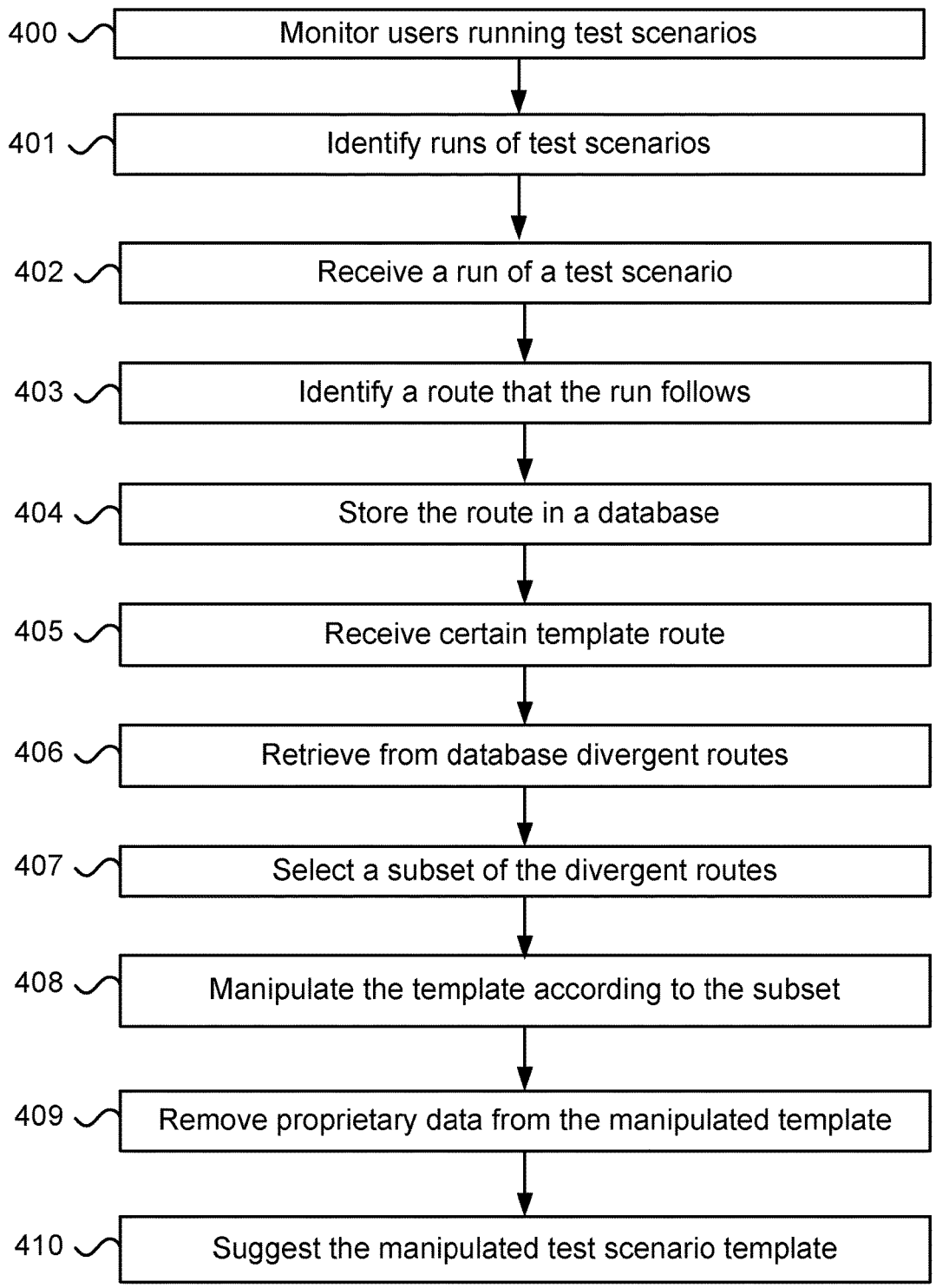
FIG. 39 illustrates one embodiment of a computer implemented method for utilizing routes followed by runs of test scenarios to manipulate a test scenario template.

FIG. 39 illustrates one embodiment of a computer implemented method for utilizing routes followed by runs of test scenarios to manipulate a test scenario template. The illustrated embodiment includes the following steps:

In step 401, identifying runs of test scenarios run by users belonging to different organizations on software systems associated with the different organizations.

In step 402, receiving a certain run of a test scenario; the certain run may be one of the runs identified in step 401.

In step 403, identifying a route that the certain run follows. Optionally, a route defines a sequence of one or more elements involved in running a test scenario. Optionally, an element is selected from the group consisting of test steps, transactions, and screens.

In step 404, storing route in the database 392.

In step 405, receiving a certain template route belonging to a test scenario template; the test scenario template is associated with a certain organization that does not belong to the different organizations. Optionally, the different organizations and the certain organization are associated with different fields of operation. For example, the certain organization is in the travel business, while the different organizations are in finances, health services, or automobile manufacturing. Alternatively, the different organizations and the certain organization are associated with a same field of operation. For example, they all operate in the field of internet commerce.

In step 406, retrieving from the database 392 divergent routes that diverge from the template route. Optionally, a divergent route is characterized by a different sequence of elements compared to sequence of elements defined by the template route. Optionally, the divergent routes involve identifying routes that diverge from the template route and later on converge back to the template route. Additionally or alternatively, retrieving the divergent routes may involve identifying routes that diverge from the template route and do not converge back to the template route. Additionally or alternatively, retrieving the divergent routes may involve identifying divergent routes that merge with the template route.

In step 407, selecting from the divergent routes a subset of divergent routes that are similar to each other.

And in step 408, if the size of the subset reaches a predetermined threshold, manipulating the test scenario template according to the subset. Optionally, the predetermined threshold is selected such that reaching the predetermined threshold indicates that the essentially the divergent routes belonging to the subset are also likely to be useful for other organizations. Optionally, the predetermined threshold is at least two divergent routes.

Optionally, if the size of the subset does not reach the predetermined threshold, step 408 involves refraining from manipulating the test scenario template according to the subset. Not reaching the predetermined threshold indicates that the divergent routes are not likely to be a suitable option for an organization associated with runs that follow the certain divergent route. Additionally, a number that does not reach the predetermined threshold may indicate that the divergent routes are too specific, and are likely useful primarily for the organizations that ran them.

In one embodiment, manipulating the test scenario template according to the subset involves updating the test scenario template according to one or more of the divergent routes in the subset; for example, a new screen belonging to the divergent routes in the subset, which did not appear in the template, is added to the test scenario template.

In another embodiment, manipulating the test scenario template according to the subset involves generating a new test scenario template based on the test scenario template and one or more of the divergent routes belonging to the subset. For example, elements from the divergent routes in the subset are combined with elements in the existing test scenario template in order to generate a new template with a combination of elements that is not possessed by the test scenario template and possibly any of the divergent routes in the subset.

In one embodiment, the computer implemented method includes an additional optional step 410 involving suggesting to a user to run an instantiation of the updated test scenario template. For example, the user interface 398 may beutilized to present the updated template to the user.

In one embodiment, the computer implemented method includes an optional step 400, which involves monitoring the users and providing the activity data 353 obtained from the monitoring for use in the identifying of the runs of test scenarios.

In another embodiment, the computer implemented method includes an optional step 409 that involves selecting a value from the manipulated test scenario template, and removing the selected value from the manipulated test scenario template if the selected value does not appear in runs that follow at least two of the divergent routes belonging to the subset. Optionally, step 409 also involves testing that the at least two of the divergent routes are associated with at least two different organizations.

In one embodiment, the computer implemented method illustrated in FIG. 39 includes an optional step of ranking the manipulated test scenario template according to the number of the divergent routes belonging to the subset. Additionally or alternatively, ranking the manipulated test scenario template may be done according to the number of different organizations associated with the divergent routes belonging to the subset.

In one embodiment, a non-transitory computer-readable medium stores program code that may be used by a computer to utilize routes followed by runs of test scenarios to manipulate a test scenario template. The computer includes a processor, and the non-transitory computer-readable medium stores the following program code:

Program code for identifying runs of test scenarios run by users belonging to different organizations on software systems associated with the different organizations.

Program code for receiving a certain run of a test scenario.

Program code for identifying a route that the run follows.

Program code for storing the route in a database.

Program code for receiving a certain template route belonging to a test scenario template. Optionally, the test scenario template is associated with a certain organization that does not belong to the different organizations.

Program code for retrieving from the database divergent routes that diverge from the template route.

Program code for selecting from the divergent routes a subset of divergent routes that are similar to each other.

And program code for manipulating the test scenario template according to the subset if the size of the subset reaches a predetermined threshold.

In one embodiment, the program code for manipulating the test scenario template according to the subset includes program code for updating the test scenario template according to one or more of the divergent routes belonging to the subset.

In another embodiment, the program code for manipulating the test scenario template according to the subset includes program code for generating a new test scenario template based on the test scenario template and one or more of the divergent routes belonging to the subset.

In one embodiment, the program code stored in the non-transitory computer-readable medium optionally includes program code for refraining from manipulating the test scenario template according to the subset if the size of the subset does not reach the predetermined threshold. Not reaching the predetermined threshold indicates that the divergent routes belonging to the subset are not likely to be a suitable alternative to the template route, for other organizations.

In one embodiment, the program code stored in the non-transitory computer-readable medium optionally includes program code for selecting a value from the manipulated test scenario template, and removing the selected value from the manipulated test scenario template if the selected value does not appear in runs that follow at least two of the divergent routes belonging to the subset. Optionally, the program code also involves testing that the at least two of the divergent routes are associated with at least two different organizations.

Figure 40:
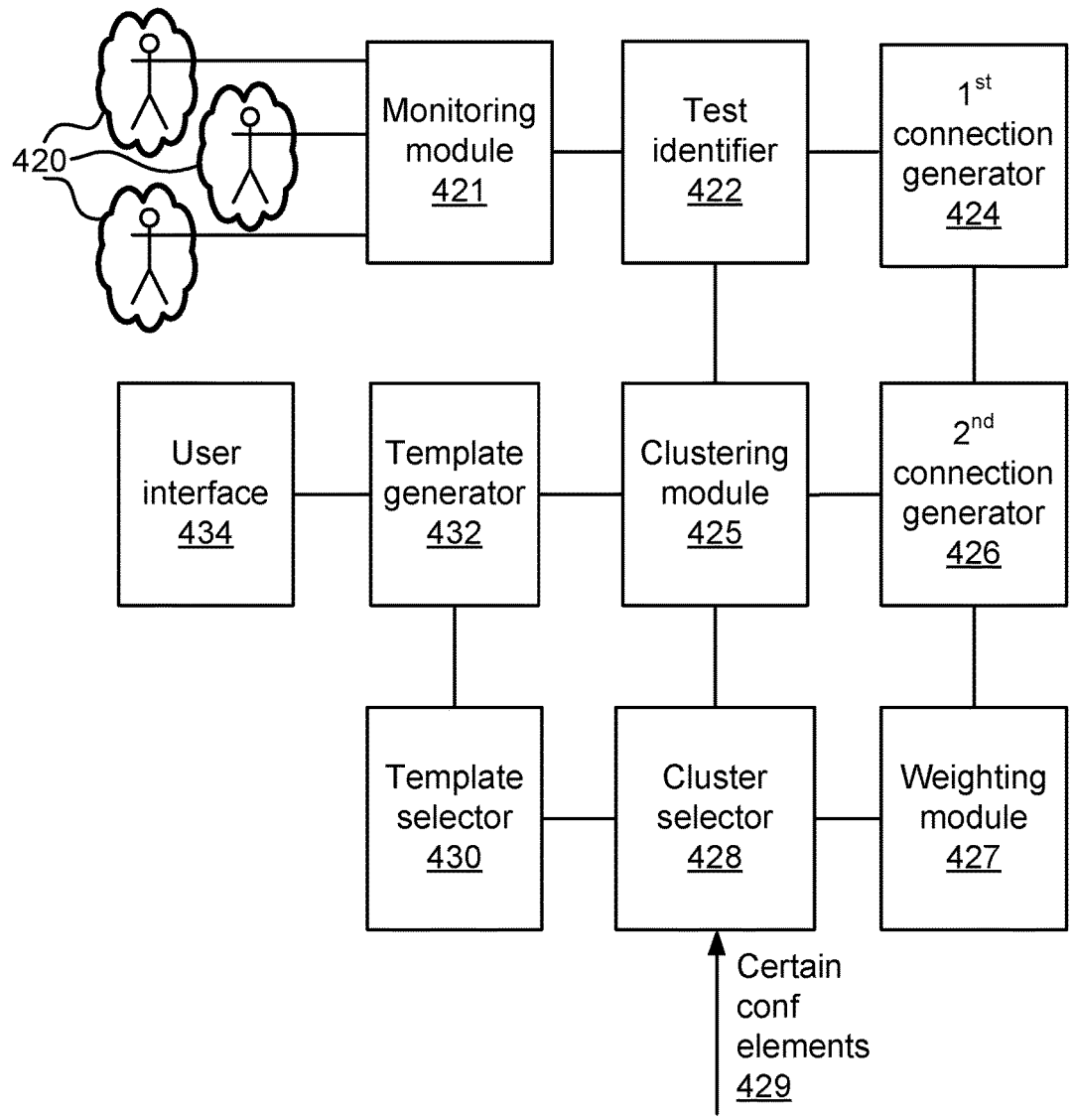
FIG. 40 illustrates one embodiment of a computer system configured utilize data collected from users belonging to different organizations to select a test scenario template relevant for testing configuration elements.

FIG. 40 illustrates one embodiment of a computer system configured utilize data collected from users belonging to different organizations to select a test scenario template relevant for testing configuration elements. The illustrated embodiment includes at least a test identifier 422, a first connection generator 424, a clustering module 425, a second connection generator 426, a weighting module 427, a cluster selector 428, and a template selector 430.

The test identifier 422 is configured to identify runs of test scenarios by users 420 belonging to different organizations on software systems belonging to the different organizations. Optionally, running the test scenarios is useful for testing configuration elements of the software systems. For example, following a system update, many configuration elements may undergo a change of value. To test the influence of the update, users may run test scenarios in order that test various aspects of the many configuration elements.

The first connection generator 424 is configured to generate first connections between the configuration elements and the runs of the test scenarios identified by the test identifier 422. Optionally, a connection between a configuration element and a run of a test scenario indicates that running the test scenario may have been useful for testing the configuration element.

In one embodiment, the first connection generator 424 receives information indicating, for some of the configuration elements, which runs of test scenarios are related to the configuration elements. In one example, runs of test scenarios may include data fields indicating which configuration elements they are intended to test. Optionally, the data fields are added by a designer of the test scenario. In another example, the first connection generator 424 receives a table that lists identifiers of runs of test scenarios that were run to test each configuration element.

In another embodiment, the first connection generator 424 analyzes runs of test scenarios, and from the analysis the first connection generator 424 is able to learn of one or more configuration elements that may have been involved and/or affected the system during the running of the test scenarios. These identified elements may be connected, by first connections, to the runs in which they were found.

In one example, the first connection generator 424 utilizes text analysis of a run of a test scenario, such as analyzing code belonging to a test scenario being run, input provided for running the test scenario, and/or output files, such as log files, generated when running the test scenario. The text analysis searches for certain names and/or values that are part of configuration elements (e.g., file paths, business process names). If such names and/or values are found, the corresponding configuration elements may be connected with the run of the test scenario with first connections.

In another example, the first connection generator 424 utilizes static analysis of code utilized for running a test scenario in order to identify one or more configuration elements that may be tested by running the test scenario. The static analysis may reveal if certain business processes, programs, and/or transactions are to be executed in various control flows of the code. If the certain business processes, programs, and/or transactions are linked to the one or more configuration elements, then the one or more configuration elements may be linked to runs of the test scenario with first connections. For example, a configuration element may indicate that a certain transaction should be performed if updating a database fails; if static analysis reveals that a test scenario may perform the certain transaction under certain conditions, a first connection may be made between the configuration element and a run of the test scenario.

In yet another example, the first connection generator 424 utilizes dynamic analysis of performed while running a test scenario in order to identify one or more configuration elements that may be tested by running the test scenario. Optionally, a run of the test scenario includes data collected while the dynamic analysis was performed. Analyzing the dynamic analysis data may reveal which transactions, business processes, and/or system resources were involved in the run of the test scenario. If the transactions, business processes, and/or system resources correspond to specific configuration elements, the specific configuration elements are connected to the run of the test scenario via first connections.

The clustering module 425 is configured to cluster the runs of test scenarios identified by the test identifier 422 into clusters comprising similar runs of test scenarios. Optionally, the clustering is based on similarity between the runs of the test scenarios. Optionally, the clustering is based on similarity between configuration elements associated with the runs of the test scenarios. For example, the clustering may utilize similarities between configuration files of systems on which the test scenarios were run, in order to help determine a placement of runs into clusters.

The second connection generator 426 is configured to generate, based on the first connections, second connections between the configuration elements and the clusters. For example, if a first connection exists between a certain configuration element and a certain run, and in addition, the certain run belongs to a certain cluster, then the second connection generator 426 may generate a second connection between the certain configuration element and the certain cluster.

Figure 42:
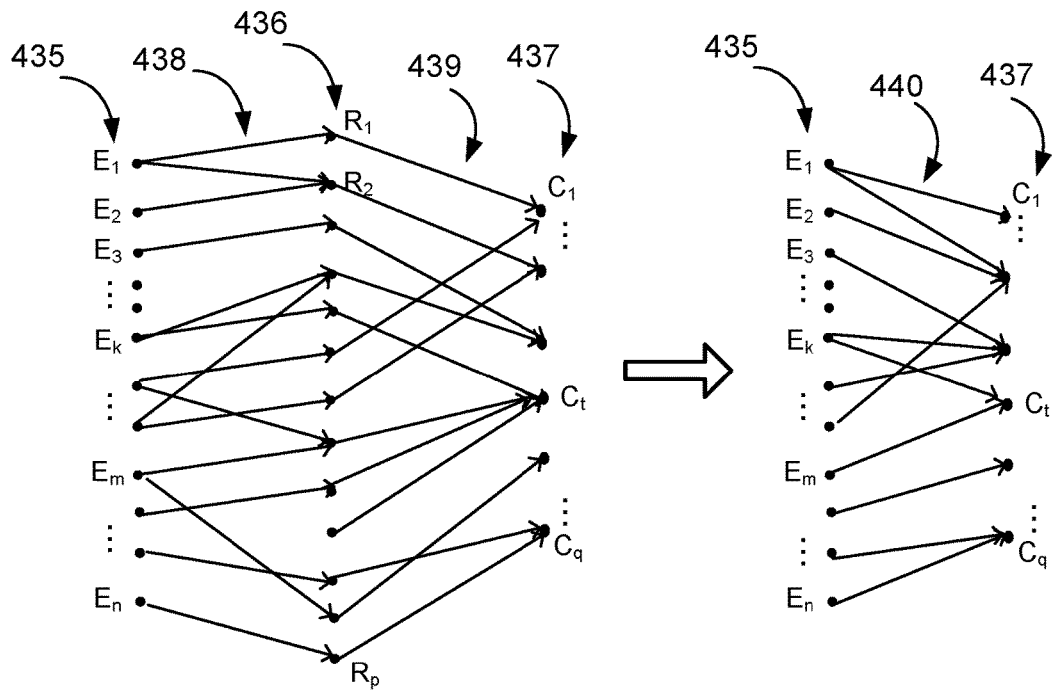
FIG. 42 illustrates a process in which second connections are generated from first connections and results of clustering.

FIG. 42 illustrates a process in which second connections are generated by the second connection generator from first connections and results of clustering. The first connection generator generates first connections 438 between n configuration elements 435 ($E_1, \ldots, E_n$) and p runs of test scenarios 436 ($R_1, \ldots, R_p$). Additionally, clustering the runs 436 yields q clusters 437 ($C_1, \ldots, C_q$). In the figure, the assignments of runs to clusters are denoted by arrows 439. Thus, the runs 436 serve as linkers between the configuration elements 435 and the clusters 437. The second connection generator removes these linker, and makes direct second connections 440 between the configuration elements 435 and the clusters 437.

In one embodiment, a second connection is made between a configuration element and a cluster, if there exists at least one first connection between the configuration element and a certain run, and certain run belongs to the cluster. For example, in FIG. 42, a second connection may be made between a configuration element of the elements 435 and a cluster from the clusters 437 if there is an arrow between the configuration element and a certain run from the runs 436, and another arrow between the certain run and the cluster.

In one embodiment, in order to form a second connection between a configuration element and a cluster, the configuration element needs to be linked to the cluster via a number of different runs that reaches a threshold. For example, in FIG. 42, a second connection may be made between a configuration element of the elements 435 and a cluster from the clusters 437 if the number of runs in the set 436 that have both arrows from the element to them, and arrows from them to the cluster, reaches the threshold. Optionally, the threshold depends on the size of the cluster, e.g., the larger the size of the cluster, the higher the threshold.

In one embodiment, the weighting module 427 is configured to weight the second connections based on number of different users that acted according to each second connection. As used herein, a user is said to act according to a second connection, between a configuration element and a cluster, if there is a run of a test scenario that links between the configuration element and the cluster. A run is considered to link between a certain configuration element and a certain cluster if the certain configuration element is connected to the run via a first connection, and the run belongs to the certain cluster.

Additionally or alternatively, for the purpose of weighting, the weighting module 427 may take into account the number of organizations that are associated with a second connection. An organization may be considered associated with a second connection between a configuration element and a cluster, if a user that belonging to the organization ran a test scenario that produced a run that links between the configuration element and the cluster.

In one embodiment, the weighting module 427 is configured to weight the second connections according to an increasing weight scale that depended on the number of users that acted according to each second connection.

Herein, it is said that a user acts according to a second connection, if the second connection is between a certain configuration element and a certain cluster, and the user ran a test scenario that links between the certain configuration element and the certain cluster. Optionally, the weighting module 427 assigns a first instance of a second connection, with a number of users that acted according to it that is greater than number of users that acted according to a second instance of a second connection, a weight that is not lower than weight assigned to the second instance of a second connection. The higher the weight of a second connection between a configuration element and a cluster, the higher likelihood that the cluster contains a run relevant for testing the certain configuration element.

The cluster selector 428 is configured to receive certain configuration elements 429 associated with a certain software system, which are to be tested by a certain user. For example, the certain user needs to run test scenarios to evaluate the effect of the certain configuration elements 429 on the certain software elements. In one example, the certain configuration element involves 429 a change to a certain value, and the test scenarios are to be run in order to verify that there are not adverse effects due to the change Optionally, the certain software system is associated with a certain organization that does not belong to the different organizations.

In one embodiment, the certain configuration elements 429 are selected from the configuration elements for which second connections were generated. Optionally, the certain configuration elements 429 include all the configuration elements for which second connections were generated. Optionally, the certain configuration elements 429 include at least one configuration element for which a second connection was generated, i.e., there is at least one second connection linking an element from the certain elements with a cluster.

The cluster selector 428 is configured to select a certain cluster of runs of test scenarios, based on a subset of the certain configuration elements 429 and the second connections.

The size of the subset of the certain configuration elements 429 may vary. In one example, the size of the subset is one, i.e., the subset contains a single configuration element. In another example, the subset contains all of the certain configuration elements 429. In yet another example, the subset includes some of the certain configuration elements 429, but not all of them.

Selecting the certain cluster based on a subset of multiple elements may have advantages in some embodiments. For example, configuration elements and/or values of elements are often related, correlated, and/or typically used together. Thus, being able to select a cluster based on multiple elements belonging to the subset, may enable a selection of a cluster that has runs that address combinations of elements as they may be typically used. Another advantage of selecting the certain cluster according to a subset that includes multiple elements is a reduction in the work and time required for testing. In one example, a cluster selected according to a subset may be assumed to test some aspects of all elements in the subset; thus, each instantiation of a template representing that cluster may simultaneously test multiple configuration elements. This can help reduce the number of test scenarios that need to be run in order to test the certain configuration elements.

In one embodiment, it is required for there to be one or more second connections between elements belonging to the subset of the certain configuration elements 429 and the certain cluster, for the cluster selector 428 to be able to select the certain cluster. Additionally, each element belonging to the subset should be connected to the certain cluster by at least one second connection. Alternatively, in another embodiment, there needs to be at least one second connection between one of the elements belonging to the subset and the certain cluster.

In one embodiment, the subset of certain configuration elements includes an element whose value has changed, and there is at least one second connections between the element whose value has changed and the certain cluster. For example, the certain cluster contains a run of a test scenario that was utilized to test effects the element whose value has changed on performance of a computer system.

In one embodiment, selecting the certain cluster by the cluster selector 428 involves determining that second connections between the elements belonging to the subset and the certain cluster meet a certain criterion. Optionally, if the subset contains a single element, the connections between the elements belonging to the subset and the certain cluster may consist of a single second connection.

The criterion may be derived from various factors such the size of the certain cluster, the number of elements in the subset, the number of second connections between elements in the subset and the certain cluster, and/or the weight of the second connections between elements in the subset and the certain cluster.

In one embodiment, the certain cluster is selected if the sum of weights second connections, connecting between elements in the subset and the certain cluster, reaches a threshold. Optionally, the threshold is a predetermined threshold, e.g., the value of the threshold and/or logic used to compute the threshold is known a priori. Optionally, the value of the threshold depends on the size of the certain cluster; for example, the larger the cluster, the higher is the threshold. Optionally, the value of the threshold may depend on the size of the subset; for example, the larger the subset, the higher is the threshold.

In one embodiment, the threshold represents at least two different users that acted according to at least one of the second connections connecting between elements in the subset and the certain cluster. That is, for the purpose of computing the sum of the weights of second connections connecting between elements in the subset and the certain cluster, each user is counted only once. Thus, there needs to be among second connections connecting between elements in the subset and the certain cluster, at least a first instance of a second connection which a first user acted upon, and at least a second instance of a second connection that a second user acted upon. Note that the first instance may be the same second connection as the second instance, but the first user is not the second user.

In another embodiment, the threshold represents at least two different users, associated with at least two different organizations, that acted according to at least one of the second connections connecting between elements in the subset and the certain cluster. That is, for the purpose of computing the sum of the weights of the second connections connecting between elements in the subset and the certain cluster, each user is counted only once, and each organization is counted only once. Thus, there needs to be among the second connections connecting between elements in the subset and the certain cluster, at least a first instance of a second connection which a first user, belonging to a first organization, acted upon, and at least a second instance of a second connection that a second user, belonging to a second organization, acted upon. Note that the first instance may be the same second connection as the second instance, but the first user is not the second user, and the first organization is not the second organization.

One advantage of having the sum of weights of the second connections connecting between elements in the subset and the certain cluster reach the threshold is that reaching the threshold may indicate a desired level of usage. A high weight of a second connection between an element and a cluster may be indicative, in some embodiments, of a large number of users and/or large number of users from different organizations, that utilize runs in the cluster to test the connection. Thus, high weights of second connections between a subset and a cluster may be indicative of the fact that the cluster is widely used to test elements in the subset. This may be indicative of the general usefulness of the cluster; such a cluster is likely to be useful for other organizations too.

In another embodiment, the certain cluster is selected according to other criteria that involve weights of second connections between elements in the subset and the certain cluster. In one example, there is threshold regarding a minimal weight that all second connections between elements in the subset and the certain connection need to exceed.

While performing its selection, the cluster selector may utilize an objective function that evaluates a subset of the certain configuration elements with respect to a cluster. For example, the objective function may be the sum of weights of second connections that exist between Optionally, the certain cluster that is selected is one for which a subset exists, such that the objective function for the subset and the certain cluster is maximal compared to objective function values obtained when using other subsets and/or other clusters. Optionally, the certain cluster that is selected is one for which a subset exists, such that the objective function for the subset and the certain cluster exceeds a certain threshold.

Figure 43:
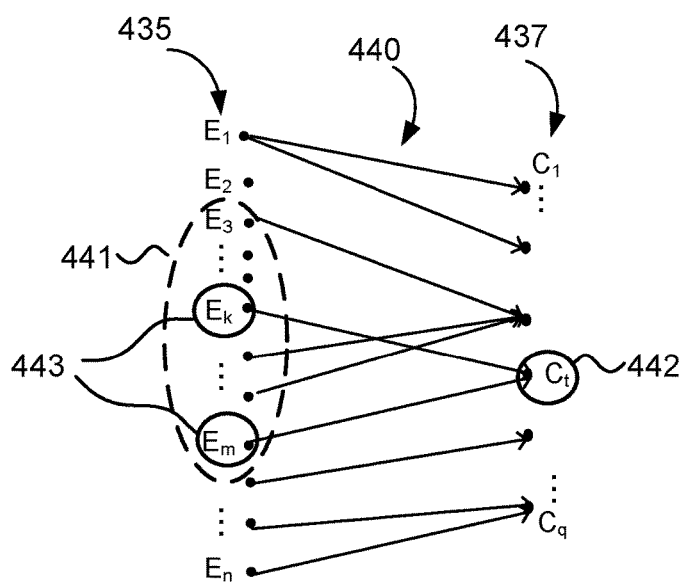
FIG. 43 illustrates a selection of the certain cluster.

FIG. 43 illustrates a selection of the certain cluster. The certain configuration elements 441 include multiple configuration elements (including the subset 443 that includes the elements $E_k$ and $E_m$. The second connection 440 connect between configuration elements 435 (that include the certain configuration elements 441), and the clusters 437. A certain cluster $C_t$ 442 is found such that the subset 443 that contains the elements $E_k$ and $E_m$, has connections between the elements of the subset 443 and the certain cluster 442 for which the sum of weights reaches a threshold. As illustrated in FIG. 43, the sum of the weight of the connection between element $E_k$ and the certain cluster $C_t$ and the weight of the connection between element $E_m$ and the certain cluster $C_t$, reaches the threshold.

In one embodiment, there may be a specific element belonging to the certain configuration elements 429 for which there is no second connection that connects between the specific element and any cluster. Optionally, the specific element may be marked as lacking a cluster from which a template may be suggested.

In another embodiment, there is a specific second connection between a specific object an the certain cluster; however, no subset of the certain configuration elements 429 may be found that both includes the specific element, and the sum of weights of the specific second connection and possibly one or more other second connections, connecting between elements in the subset and the certain cluster, reaches the threshold. Optionally, the specific element may be marked as being non-associated or "not covered" by the certain cluster.

Selecting the certain cluster may involve a search that needs to be performed among the clusters, among the possible subsets of the certain configuration elements 429, and/or in the space of possible pairs that include a subset and a cluster. Optionally, the search utilizes an objective function whose value depends on a subset and cluster being evaluated. Optionally, the search is guided by an attempt to find a cluster and subset that together maximize the objective function value. Those skilled in the art may recognize, that there are various algorithmic approaches that may be used in this optimization problem, such as, exhaustive search, forward or backward selection algorithms, genetic algorithms, simulated annealing, branch-and-bound searches, integer programming, or other convex optimization approaches.

In one embodiment, the cluster selector 428 selects the certain cluster to achieve a desired coverage of tests related to the certain configuration elements 429. For example, each element of the certain configuration elements 429 may require a certain number and/or combination of test scenarios to be run in order to verify the effects of the element on the system. Thus, the selection of the certain cluster may be guided by the desire to run the required test scenarios for as many elements. In one example, the cluster selector is more likely to select a subset that includes elements for which a requirement of test scenarios has not been met. Additionally or alternatively, once the requirement of test scenarios has been met for an element, it is less likely to be part of the subset considered by the cluster selector when selecting the certain cluster. Optionally, details regarding extent at which testing requirements of elements have been met are factored in to an objective function that is used by the cluster selector 428 to evaluate subsets and clusters when selecting the certain cluster.

In one embodiment, the certain cluster includes runs associated with different organization. For example, the certain cluster includes a first run associated with a first organization belonging to the different organizations and a second run associated with a second organization belonging to the different organizations. Additionally, the first organization is not the second organization. Optionally, having runs from multiple organizations is indicative of wide use of the cluster, and high likelihood that a template representing the cluster may be useful for other organizations. Additionally, having runs associated with multiple organizations may assist in selecting default values for a template generated based on the runs in the cluster, and/or it may assist in detecting and/or removing proprietary data from the template.

The template selector 430 is configured to select for the certain user a test scenario template representing the certain cluster. Optionally, usage information received by the template selector indicates numbers of users and/or organizations that utilized templates representing the certain cluster; thus, the template selector 430 may be able to select a template known to be utilized by a large number of users and/or organizations. Optionally, the template selector 430 may receive a profile of the certain user and select an appropriate template based on the profile.

In one embodiment, selecting the test scenario template for the certain user is guided by impact of elements in the subset of the certain configuration elements 429 on runs of test scenarios belonging to the certain cluster. Optionally, impact of elements in the subset is determined by ability influence of the elements on an outcome of running test scenarios. For example, changing a value of a certain configuration element may alter the control flow of the execution (e.g., cause different transaction to be executed).

In another example, a new configuration element may cause a system error, which may dramatically change the outcome of a run. Optionally, the impact may be determined by static analysis of the test scenarios and/or runs of test scenarios that belong to the certain cluster. For example, static analysis may help determine if there are transactions in the test scenarios that depend on the configuration elements in the subset and/or the extent of the dependence. Optionally, the impact may be determined by dynamic analysis of runs of the test scenarios belonging to the certain cluster. For example, the control flow and/or data flow of the runs may be examined to generate a list of system components, transactions, and/or programs that are involved in each run; by comparing the list with the subset, it may be determined which runs are impacted by which elements belonging to the subset.

In one embodiment, the template selector 430 receives information regarding which runs of test scenarios were utilized to generate templates representing the certain cluster. Based on this information, along with information regarding impact of elements from the subset on runs belonging to the certain cluster, a template representing the certain cluster that is likely to be impacted by elements in the subset is selected.

In one embodiment, the computer system optionally includes a template generator 432 that is configured to generate the test scenario template based on one or more runs of test scenarios belonging to the certain cluster. Optionally, the template selector 430 selects the test scenario template for the certain user from among templates generated by the template generator 432. Optionally, the template selector 430 and the template generator 432 are implemented, in least in part, by the same software component. Optionally, the template generator 432 relies on information obtained from the template selector 430 to determine which templates to generate.

In one embodiment, the template generator 432 receives information regarding impact of elements from the subset on runs belonging to the certain cluster. Based on the information, the template generator 432 selects one or more runs from the certain cluster to be utilized in order to generate the template representing the certain cluster. Thus, template representing the certain cluster is one that is likely to be impacted by elements belonging to the subset. For example, changing values of configuration elements in the subset may have a noticeable impact on the running of instantiations of template representing the certain cluster.

In one embodiment, the computer system includes a monitoring module 421 that is configured to monitor the users 420 running the test scenarios on the software systems that belong to the different organizations and to provide data obtained from the monitoring to the test identifier 422.

In another embodiment, the computer system includes a user interface 434 configured to suggest to the certain user to run an instantiation of the test scenario template.

In one embodiment, the template selector 430 is configured to provide the certain user an indication of the number of different users who acted according to second connections between elements in the subset and the certain cluster. Optionally, the indication is provided via the user interface 434. Optionally, the more different users acted according the second connections, the higher the likelihood that the certain cluster is relevant to the certain user.

In another embodiment, the template selector 430 is configured to provide the certain user an indication of the number of different users who acted according to a specific second connection between a specific element in the subset and the certain cluster. Optionally, the indication is provided via the user interface 434. Optionally, the more different users acted according the specific second connection, the higher the likelihood that the certain cluster is relevant to the certain user.

In one embodiment, the certain software system is a SAP ERP. Optionally, the configurations elements involve database tables. Monitoring the users involves monitoring executed transactions (e.g., queries and returned values). The first connections are connections between database tables and SQL statements, executed in runs of the test scenarios, which access the database tables.

In another embodiment, the certain software system is an Oracle ERP. Optionally, the configuration elements involve customization code. Monitoring the users involves monitoring executed procedures. The first connections are connections between customization code and runs of test scenarios that execute the customization code.

In one embodiment, the template selector 430 is also configured to rank the test scenario template. For example, ranking the template may involve assigning the template a score and/or positioning the template in a certain ordering of templates. Optionally, ranking the template is done according to the sum of the weights of the second connections connecting between the subset and the certain cluster; the higher the sum, the higher the template is ranked. Optionally, ranking the template is done according to the number of different organizations associated with the second connections between the subset and the certain cluster; the larger the number of different organizations, the higher the template is ranked.

It is to be noted that different embodiments may implement components of the computer system illustrated in FIG. 40 in different ways. For example, in some embodiments one or more of the following may be implemented by the same software module and/or software modules running on the same processor: the monitoring module 421, the test identifier 422, the first connection generator 424, the clustering module 425, the second connection generator 426, the weighting module 427, the cluster selector 428, the template selector 430, and the template generator 432. Optionally, one or more of the aforementioned components may be implemented on a remote server, such as a cloud-based server.

In one example, the first connection generator 424 is implemented as part of the test identifier 422. In another example, the weighting module 427 is implemented as part of the second connection generator. In another example, the cluster selector 428 and the template selector 430 are implemented, at least in part, by the same software module.

Figure 41:
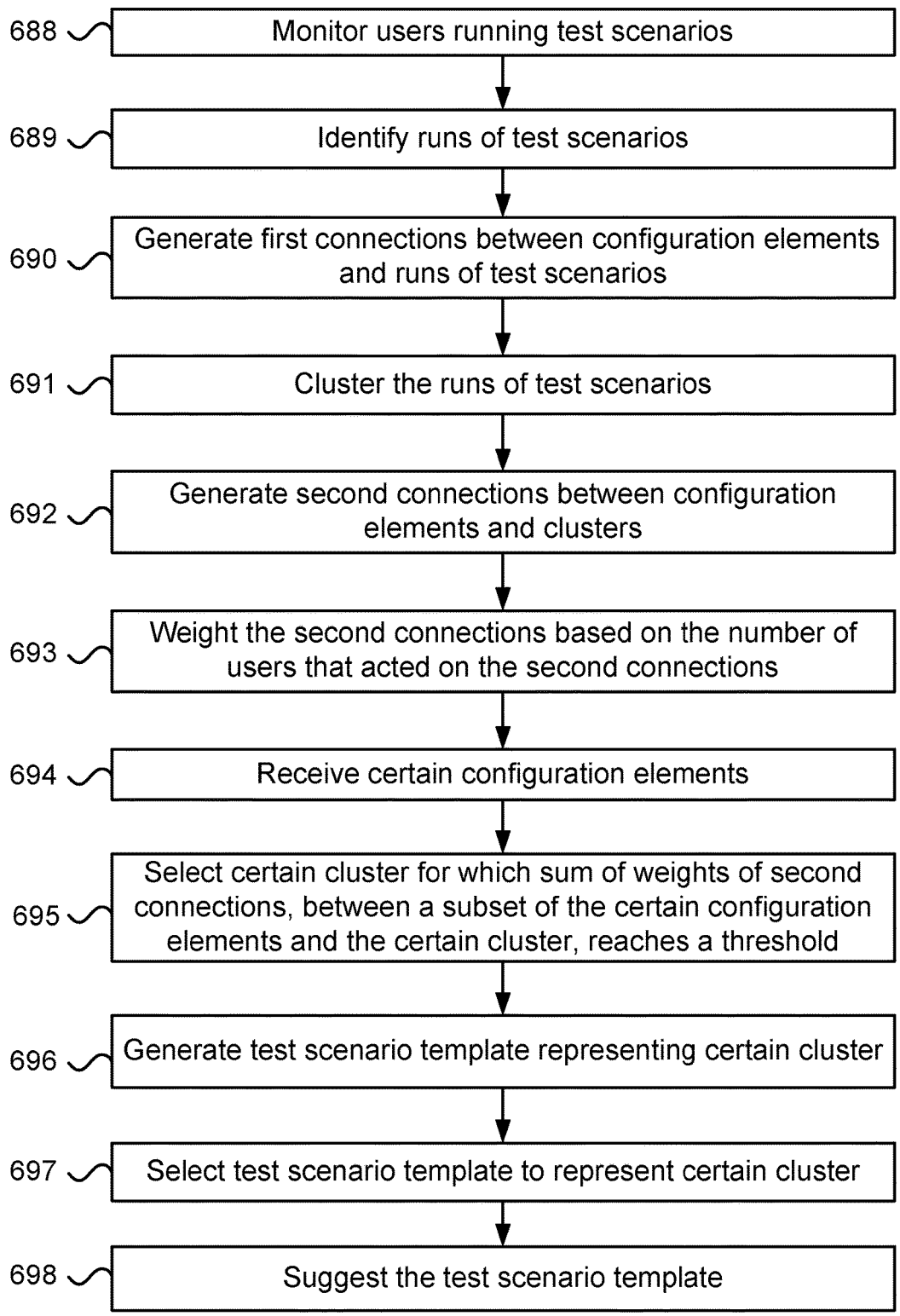
FIG. 41 illustrates one embodiment of a computer implemented method for utilizing data collected from users belonging to different organizations to select a test scenario template relevant for testing configuration elements.

FIG. 41 illustrates one embodiment of a computer implemented method for utilizing data collected from users belonging to different organizations to select a test scenario template relevant for testing configuration elements. The illustrated embodiment includes the following steps:

In step 689, identifying runs of test scenarios run by users belonging to different organizations on software systems belonging to the different organizations; running the test scenarios is useful for testing configuration elements of the software systems.

In step 690, generating first connections between the configuration elements and the runs.

In step 691, clustering the runs of test scenarios to clusters comprising similar runs. Optionally, the clustering is done at least in part, according to configuration elements associated with the runs (as indicated by the first connections).

In step 692, generating, based on the first connections, second connections between the configuration elements and the clusters.

In step 693, weighting the second connections based on number of different users that acted according to each second connection; the larger the number of users that acted according to a connection, the higher the weight of the connection and the higher the likelihood that the connection is relevant for checking its associated configuration element.

Optionally, weighting the second connections is done according to an increasing weight scale which assigns a first instance of a second connection, with a number of users that acted according to it that is greater than number of users that acted according to a second instance of a second connection, a weight that is not lower than weight assigned to the second instance of a second connection; the higher the weight of a second connection between a configuration element and a cluster, the higher likelihood that the cluster contains a run relevant for testing the certain configuration element.

In step 694, receiving the certain configuration elements 429, which are associated with a certain software system, and which are to be tested by a certain user. Optionally, the certain software system is associated with a certain organization that does not belong to the different organizations.

In step 695, selecting a certain cluster based on a subset of the certain configuration elements and the second connections. Optionally, selecting the certain cluster also involves identifying the subset. The selection of the certain subset is based on weights of the second connections. For the certain cluster, sum of weights of second connections, between elements in the subset and the certain cluster, must reach a threshold. Optionally, the threshold is proportional to the number of configuration elements in the subset.

Additionally, each element in the subset should be connected to the certain cluster by a second connection. Optionally, the certain cluster includes a first run associated with a first organization belonging to the different organizations and a second run associated with a second organization belonging to the different organizations. Additionally, the first organization is not the second organization.

And in step 697, selecting for the certain user a test scenario template representing the certain cluster.

In one embodiment, the threshold represents at least two different users that acted according to at least one of the second connections connecting between elements in the subset and the certain cluster. Alternatively or additionally, the threshold may represent at least two different users, associated with at least two different organizations, that acted according to at least one of the second connections connecting between elements in the subset and the certain cluster.

In one embodiment, the computer implemented method may include optional step 688 which involves monitoring the users 420 running the test scenarios on the software systems that belong to the different organizations and providing data obtained from the monitoring to be used for the identifying of the runs.

In one embodiment, the computer implemented method may include optional step 698 which involves suggesting to the certain user to run an instantiation of the test scenario template. For example, suggesting may be done via the user interface 434.

In one embodiment, the computer implemented method includes optional step 696 which involves generating the test scenario template based on one or more runs of test scenarios belonging to the certain cluster. Optionally, the template is generated from one or more runs of test scenarios that are selected from the certain cluster. Optionally, selecting the one or more runs is based on received information relating to impact of configuration elements belonging to the subset on runs of test scenarios belonging to the certain cluster.

In one embodiment, the subset of the certain configuration elements includes an element whose value has changed, and at least one of the second connections connecting between elements in the subset and the certain cluster corresponds to the element whose value has changed.

In one embodiment, the subset contains a single configuration element. Additionally or alternatively, the subset may include all the configuration elements associated with the certain software system.

In one embodiment, the method includes an optional step of providing the certain user an indication of the number of different users who acted according to second connections between elements in the subset and the certain cluster. Optionally, the indication is provided via the user interface 434. Optionally, the more different users acted according the second connections, the higher the likelihood that the certain cluster is relevant to the certain user.

In another embodiment, the method includes an optional step of providing the certain user an indication of the number of different users who acted according to a specific second connection between a specific element in the subset and the certain cluster. Optionally, the indication is provided via the user interface 434. Optionally, the more different users acted according the specific second connection, the higher the likelihood that the certain cluster is relevant to the certain user.

In one embodiment, the clustering of the runs involves clustering the runs according to configuration elements associated with the runs. That is, at least some portion of notion of similarity between two runs of test scenarios is determined according to configuration elements associated with each of the two runs. In one example, the configuration elements associated with each of the two runs are configuration files belonging to the systems on which the respective test scenarios were run. In another embodiment, clustering of the runs involves clustering according to input or output values in the runs, which are directly or indirectly related to the configuration elements.

In one embodiment, weighting the second connections is based on number of different organizations that have users that both belong to the organizations and have acted according to the second connections. For example, second connection that have users from many organizations that acted according to them, receive a higher weight than second connections with the same number of users that acted according to them, but the user come from fewer organizations.

In one embodiment, the computer implemented method includes an optional step of ranking the test scenario template in proportion to the sum of the weights of the second connections connecting between elements in the subset and the certain cluster.

In another embodiment, the computer implemented method includes an optional step of ranking the test scenario template in proportion to number of different organizations associated with the certain second connection.

In one embodiment, a non-transitory computer-readable medium stores program code that may be used by a computer to utilize data collected from users belonging to different organizations to select a test scenario template relevant for testing configuration elements. The computer includes a processor, and the non-transitory computer-readable medium stores the following program code:

Program code for identifying runs of test scenarios run by users belonging to different organizations on software systems belonging to the different organizations. Optionally, running the test scenarios is useful for testing configuration elements of the software systems.

Program code for generating first connections between the configuration elements and the runs of the test scenarios.

Program code for clustering the runs to clusters that include similar runs.

Program code for generating, based on the first connections, second connections between the configuration elements and the clusters.

Program code for weighting the second connections based on number of different users that acted according to each second connection.

Program code for receiving certain configuration elements associated with a certain software system, which are to be tested by a certain user. Optionally, the certain software system is associated with a certain organization that does not belong to the different organizations Program code for selecting a certain cluster based on a subset of the certain configuration elements and the second connections; each element in the subset is connected to the certain cluster by a second connection and sum of weights of second connections, connecting between elements in the subset and the certain cluster, reaches a threshold.

Optionally, the certain cluster includes a first run associated with a first organization belonging to the different organizations and a second run associated with a second organization belonging to the different organizations. Additionally, the first organization is not the second organization.

And program code for selecting for the certain user a test scenario template representing the certain cluster.

In one embodiment, the non-transitory computer-readable medium optionally stores program code for monitoring the users running the test scenarios on the software systems that belong to the different organizations and program code for providing data obtained from the monitoring to be used for the identifying of the runs.

In one embodiment, the non-transitory computer-readable medium optionally stores program code for suggesting to the certain user to run an instantiation of the test scenario template.

In one embodiment, the non-transitory computer-readable medium optionally stores program code for generating the test scenario template based on the second connections connecting between elements in the subset and the certain cluster.

In one embodiment, the non-transitory computer-readable medium optionally stores program code for providing the certain user an indication of the number of different users who acted according to the second connections connecting between the subset and the certain cluster. Optionally, the more different users acted according to the second connections connecting between elements in the subset and the certain cluster, the higher the likelihood that the second connections connecting between elements in the subset and the certain cluster are relevant to the certain user.

In one embodiment, the non-transitory computer-readable medium optionally stores program code for weighting the second connections based on number of different organizations which have users that belong to them that acted according to the second connections.

In one embodiment, the non-transitory computer-readable medium optionally stores program code for ranking the test scenario template in proportion to the weight of the second connections connecting between elements in the subset and the certain cluster.

Figure 44:
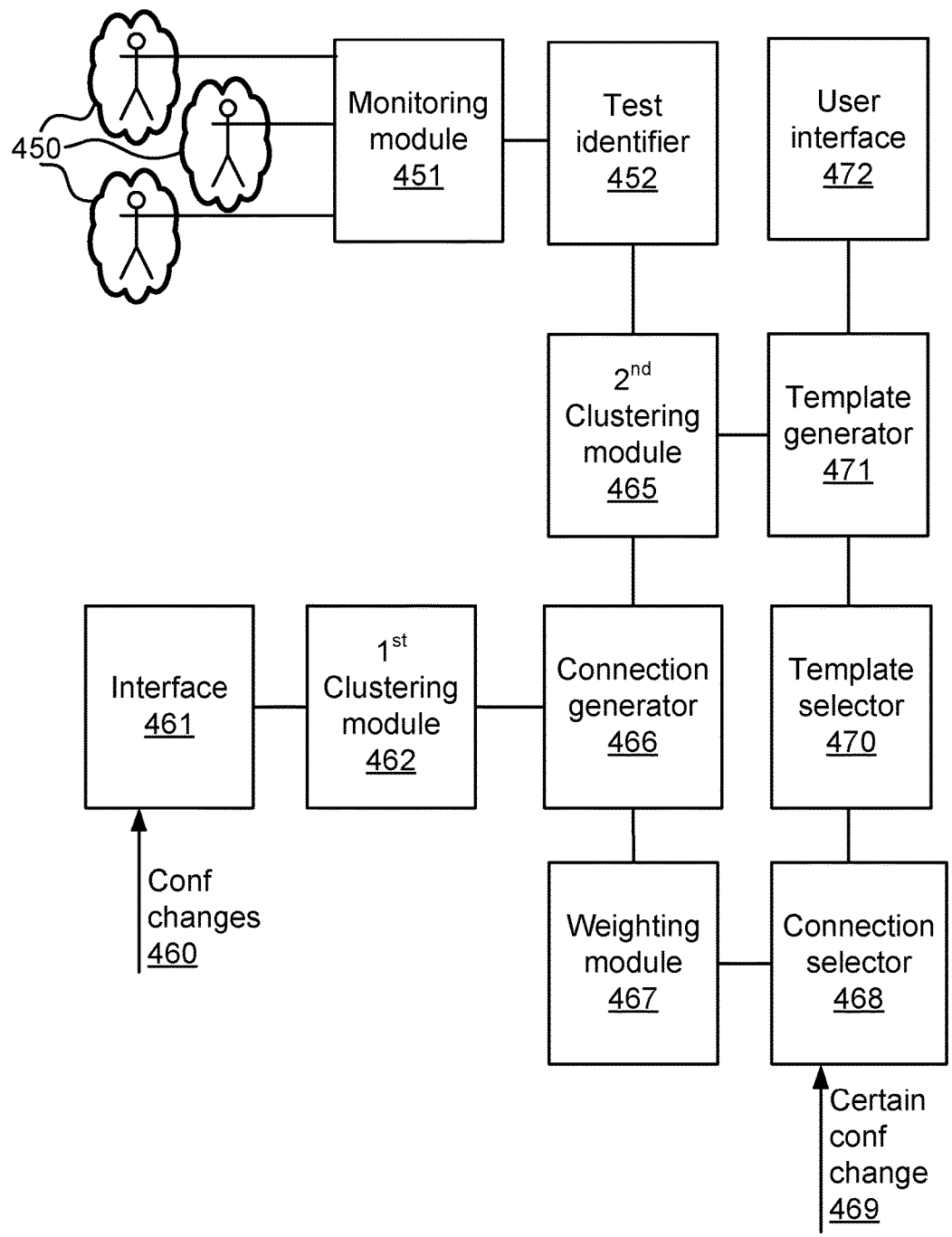
FIG. 44 illustrates one embodiment of a computer system configured select a test scenario template relevant for testing a configuration change.

FIG. 44 illustrates one embodiment of a computer system configured select a test scenario template relevant for testing a configuration change. The illustrated embodiment includes at least a test identifier 452, and interface 461, a first clustering module 462, a second clustering module 465, a connection generator 466, a weighting module 467, a connection selector 468, and a template selector 470.

The test identifier 452 is configured to identify runs of test scenarios by users 450 belonging to different organizations on software systems belonging to the different organizations. Optionally, running the test scenarios is useful for testing configuration changes to the software systems. For example, following configuration changes configuration elements may undergo a change of value. To test the influence of the configuration changes, users may run test scenarios in order that test various aspects of the related software systems and/or behaviors of the software system under various conditions.

The interface 461 is configured to receive data 460 indicative of configuration changes made to the software systems of the different organizations. Optionally, the received data 460 includes a list of configuration changes, such as a list of configuration elements and/or values related elements. Optionally, the data includes configuration elements along with their new values.

In one embodiment, the data 460 received by the interface 461 includes a new configuration file. By comparing the new configuration file to a previous configuration file, the configuration changes are deduced.

In one embodiment, each data item the interface 461 receives relates to configuration changes of a single organization belonging to the different organizations. For example, a data item may be a configuration file associated with a software system belonging to one organization of the different organizations.

The first clustering module 462 is configured to cluster the configuration changes into clusters of similar configuration changes. Optionally, clusters of similar configuration changes include configuration changes that deal with the same, or similar, configuration elements. Optionally, clusters of similar configuration changes include configuration changes that are associated with similar values (e.g., the values are related to certain configuration elements). Optionally, clusters of similar configuration changes include configuration changes that are associated with the same, or similar, configuration elements and also are associated with same, or similar, values.

The second clustering module 465 is configured to cluster the runs to clusters that include similar runs. Optionally, the clustering is based on similarity between the runs of the test scenarios. Optionally, the clustering is based on similarity between configuration elements associated with the runs of the test scenarios. For example, the clustering may utilize similarities between configuration files of systems on which the test scenarios were run, in order to help determine a placement of runs into clusters.

In one embodiment, each of the clusters of similar runs contains runs associated with at least a predetermined number of organizations. For example, each cluster includes runs from at least two different organizations.

The connection generator 466 is configured to generate connections between the clusters of similar configuration changes and the clusters of similar runs. Optionally, the connections are generated, at least in part, based on information indicating for at least some of the runs of test scenarios which configuration changes they are intended to test. In one example, a connection between a cluster of similar configuration changes and a cluster of similar runs may be made if there is a run of a test scenario belonging to the cluster of runs that was run to test a configuration change belonging to the cluster of similar configuration changes. In another example, a connection between a cluster of configuration changes and a cluster of runs may be made if there are at least a predetermined number of runs belonging to the cluster of runs that were run to test one or more configuration changes belonging to the cluster of configuration changes. In yet another example, a connection between a cluster of configuration changes and a cluster of runs may be made if there are one or more runs belonging to the cluster of runs that were run to test a predetermined number of configuration changes belonging to the cluster of configuration changes.

In one embodiment, the connection generator 466 receives information indicating, for some of the configuration changes, which runs of test scenarios are related to the configuration changes (e.g., which runs were run to test which changes). In one example, runs of test scenarios may include data fields indicating which configuration changes they are intended to test. Optionally, the data fields may be added (e.g., automatically generated) by a designer of the test scenario. In another example, the connection generator 466 receives a table that lists identifiers of runs of test scenarios that were run to test a configuration change.

In another embodiment, the connection generator 466 analyzes runs of test scenarios, and from the analysis the connection generator 466 is able to learn of one or more configuration elements that have changed, and may have been involved in the running of the test scenarios.

In one example, the connection generator 466 utilizes text analysis of a run of a test scenario, such as analyzing code belonging to a test scenario being run, input provided for running the test scenario, and/or output files, such as log files, generated when running the test scenario. The text analysis searches for certain names and/or values that are part of configuration elements (e.g., file paths, business process names) that may have undergone a change.

In another example, the connection generator 466 utilizes static analysis of code utilized for running a test scenario in order to identify one or more configuration changes that may have been tested by running the test scenario. The static analysis may reveal if certain business processes, programs, and/or transactions are to be executed in various control paths of the code. If the certain business processes, programs, and/or transactions are linked to the one or more configuration changes, then the one or more configuration changes may be linked to runs of the test scenario. For example, a configuration change may indicate that a certain transaction should be performed if updating a database fails; if static analysis reveals that a test scenario may perform the certain transaction under certain conditions, a connection may be made between the configuration change and a run of the test scenario.

In yet another example, the connection generator 466 utilizes dynamic analysis performed while running a test scenario in order to identify one or more configuration changes that may be being tested by running the test scenario. Optionally, a run of the test scenario includes data collected while the dynamic analysis was performed. Analyzing the dynamic analysis data may reveal which transactions, business processes, and/or system resources were involved in the run of the test scenario. If the transactions, business processes, and/or system resources correspond to specific configuration changes, then the connection generator 466 may connect the specific configuration changes to the run of the test scenario.

In one embodiment, the connection generator 466 receives indications regarding one or more configuration changes of interest at a given point of time (e.g., one or more elements that have been added or changed not long before the point of time). Operating under the assumption that runs of test scenarios that were run directly after the point of time are done in order to test the one or more configuration changes, the connection generator 466 connects between the one or more configuration changes and the runs of the test scenarios that were run directly after the point of time.

In one embodiment, the weighting module 467 is configured to weight the connections generated by the connection generator 466 based on number of different organizations associated with each of the connections. An organization may be considered associated with a connection between a cluster of similar configuration changes and a cluster of similar runs if a run of a test scenario, from the cluster of similar runs, is run by a user belonging to the organization to test a configuration change from the cluster of similar configurations changes. In one example, the more organizations associated with a connection, the higher the connection is weighted by the weighting module 467.

In another embodiment, the weighting module 467 may weight connections, at least in part, according to the number of users associated with each of the connections. A user may be considered associated with a connection if the user ran a test scenario, with a corresponding run that belongs to the cluster of similar runs, in order to test a configuration change belonging to the cluster of configuration changes.

It is to be noted that by stating that weighting is done at least in part according to a certain factor it is meant that the weight may be a function of the factor and possibly other factors. For example, the weighting module 467 may compute a weight based both on the number of organizations associated with connections and the number of users associated with the connections.

In yet another embodiment, the weighting module 467 may weight connections, at least in part, according to the number of configuration elements belonging to the cluster of configuration changes that have a corresponding run in the cluster of similar runs (e.g., the corresponding run was run to test one or more of the configuration changes in the cluster). For example, the more configuration changes with corresponding runs in the cluster of similar runs, the higher the weight given to the connection between the cluster of similar runs and the cluster of configuration changes.

In still another embodiment, the weighting module 467 may weight connections, at least in part, according to the number of runs in the cluster of similar runs that were run to test at least one configuration change belonging to the cluster of configuration changes. For example, the more runs in the cluster of similar runs that were run to test one or more configuration changes (belonging to the cluster of similar configuration changes), the higher the connection weight.

The connections selector 468 is configured to receive a certain configuration change 469 of a certain software system. Optionally, the certain software system is associated to a certain organization that does not one of the different organizations. Optionally, the certain configuration change 469 is intended to be tested by a certain user. For example, the certain user needs to run a test scenario that tests effects the certain configuration change 469 may have on the certain software system.

The connection selector 468 is also configured to select a certain connection, weighted above a threshold, between a cluster of similar configuration changes, to which the certain configuration change 469 corresponds, and a certain cluster of similar runs of test scenarios. Optionally, the certain connection that is selected is a connection with maximal weight among connections involving a cluster of similar configuration changes to which the certain configuration change 469 corresponds.

In one example, the certain configuration change 469 may be considered to correspond to a certain cluster of similar configuration changes if the cluster contains the certain configuration change 469. For example, the cluster may contain a configuration element and corresponding value, and the certain configuration change 469 also involves the same element and the same value. In another example, the certain configuration change 469 may be considered to correspond to a certain cluster of similar configuration changes if it is similar to one or more configuration changes belonging to the certain cluster. Optionally, the similarity of the certain configuration change 469 to one or more configuration changes may be determined according to a similarity function which relies on similarities of text and/or values. In yet another example, the certain configuration change 469 may be considered to correspond to a cluster of similar configuration changes, if the first clustering module 462 would have placed the certain configuration change 369 in the cluster had the certain configuration change 469 been among the configuration changes clustered by the first clustering module 462.

In one embodiment, the threshold is a predetermined threshold, e.g., the value of the threshold and/or logic used to compute the threshold are known a priori. Optionally, the value of the threshold depends on the size of the cluster of similar configuration changes corresponding to the certain connection. For example, the larger the cluster, the higher is the threshold. Optionally, the value of the threshold depends on the size of the certain cluster of similar runs. For example, the larger the cluster of the similar runs (i.e., the more runs belong to the cluster), the higher is the threshold.

In one embodiment, the threshold represents at least two different users that acted according to the certain connection. That is, for the purpose of computing the weight of connections, each user is counted only once. Thus, for the certain connection to reach the threshold there needs to be at least a first user that acted upon the certain connection, and at least a second user that acted according to the certain connection. Note that the first user is not the second user.

Herein, a user may said to "act according to a connection" or "act upon a connection", with reference to a connection between a certain cluster of configuration changes and a certain cluster of runs. This means that there is at least one run of a test scenario, which was run by the user and which belongs to the certain cluster of runs. Additionally, the run of the test scenario was run by the user to test at least one configuration change that belongs to the certain cluster of configuration changes.

In another embodiment, the threshold represents at least two different users, associated with at least two different organizations, that acted according to the certain connection. That is, for the purpose of computing the weight of connections, each user is counted only once, and each organization is counted only once. Thus, for the certain connection to reach the threshold there needs to be at least a first user, belonging to a first organization, that acted upon the certain connection, and at least a second user, belonging to the second organization, that acted according to the certain connection. Note that the first user is not the second user, and the first organization is not the second organization.

One advantage of having the weight of the certain connection reach the threshold is that reaching the threshold may indicate a desired level of usage. A high weight of a connection between a cluster of similar configuration changes and a cluster of similar runs may be indicative, in some embodiments, of a large number of users and/or large number of users from different organizations, that utilize runs from the cluster of similar runs to test the similar configuration changes. This may be indicative of the general usefulness of the cluster of similar runs for other organizations too.

The template selector 470 is configured to select, for the certain user, a test scenario template representing the certain cluster. Optionally, usage information received by the template selector 470 indicates numbers of users and/or organizations that utilized templates representing the certain cluster. Thus, the template selector 470 may be able to select a template known to be utilized by a large number of users and/or organizations. Optionally, the template selector 470 may receive a profile of the certain user and select an appropriate template based on the profile. Optionally, the certain cluster of similar runs includes a first run associated with a first organization belonging to the different organizations and a second run associated with a second organization belonging to the different organizations. Additionally, the first organization is not the second organization.

In one embodiment, the template selector 470 may be also configured to provide the certain user an indication of the number of users belonging to the different organizations who acted according to the certain connection. The more users acted according to the certain connection, the higher the likelihood that the certain connection is relevant to the certain user. Additionally or alternatively, the template selector 470 may be also configured to provide the certain user an indication of the number of different organizations that are associated with the certain connection. The more organizations associated with the certain connection, the higher the likelihood that the certain connection is relevant to the certain user.

In another embodiment, the template selector 470 is optionally configured to rank the test scenario template in proportion to the weight of the certain connection. For example, the higher the weight of the certain connection, the higher the test scenario template is ranked. Ranking the template may involve assigning the template a score and/or positioning the template in a certain ordering of templates.

In one embodiment, the computer system optionally includes a template generator 471 that is configured to generate the test scenario template based on one or more runs of test scenarios belonging to the certain cluster. Optionally, the template selector 470 selects the test scenario template representing the certain user from among templates generated by the template generator 471. Optionally, the template selector 470 and the template generator 471 are implemented, in least in part, by the same software component. Optionally, the template generator 471 relies on information obtained from the template selector 470 to determine which templates to generate.

In one embodiment, the computer system includes an optional monitoring module 451 that is configured to monitor the users 450 belonging to the different organization, running the test scenarios on the software systems that belong to the different organizations, and to provide data obtained from the monitoring to the test identifier 452. Optionally, at least some of the test scenarios run by the users 450 are run to test how the configuration changes 460 affect the software systems belonging to the different organizations. Optionally, the monitoring module may be used to monitor users belonging to the certain organization.

In another embodiment, the computer system includes an optional user interface 472 configured to suggest to the certain user to run an instantiation of the test scenario template.

In one embodiment, the certain software system is a SAP ERP. Optionally, the configurations involve database tables. Monitoring the users may involve monitoring of executed transactions (e.g., queries to the database and/or values returned from the database). The connections are connections between clusters of database tables and clusters comprising runs of test scenarios that include SQL statements which access the database tables.

In another embodiment, the certain software system is an Oracle ERP. Optionally, the configurations are customization code. Monitoring the users may involve monitoring executed procedures. The connections are between clusters of customization code and clusters of runs of test scenarios that execute the customization code.

It is to be noted that different embodiments may implement components of the computer system illustrated in FIG. 44 in different ways. For example, in some embodiments one or more of the following may be implemented by the same software module and/or software modules running on the same processor: the monitoring module 451, the test identifier 452, the first clustering module 462, the second clustering module 465, the weighting module 467, the connection selector 468, the template selector 470, and the template generator 471. Optionally, one or more of the aforementioned components may be implemented on a remote server, such as a cloud-based server.

In one example, the weighting module 467 is implemented, at least in part, by software modules belonging to the connection selector 468 and/or the connection generator 466. In another example, the connection generator 466 is implemented, at least in part, by software modules belonging to the first clustering module 462 and/or the second clustering modules 465. In another example, the template selector 470 and the template generator 471 are implemented, at least in part, by the same software module.

Figure 45:
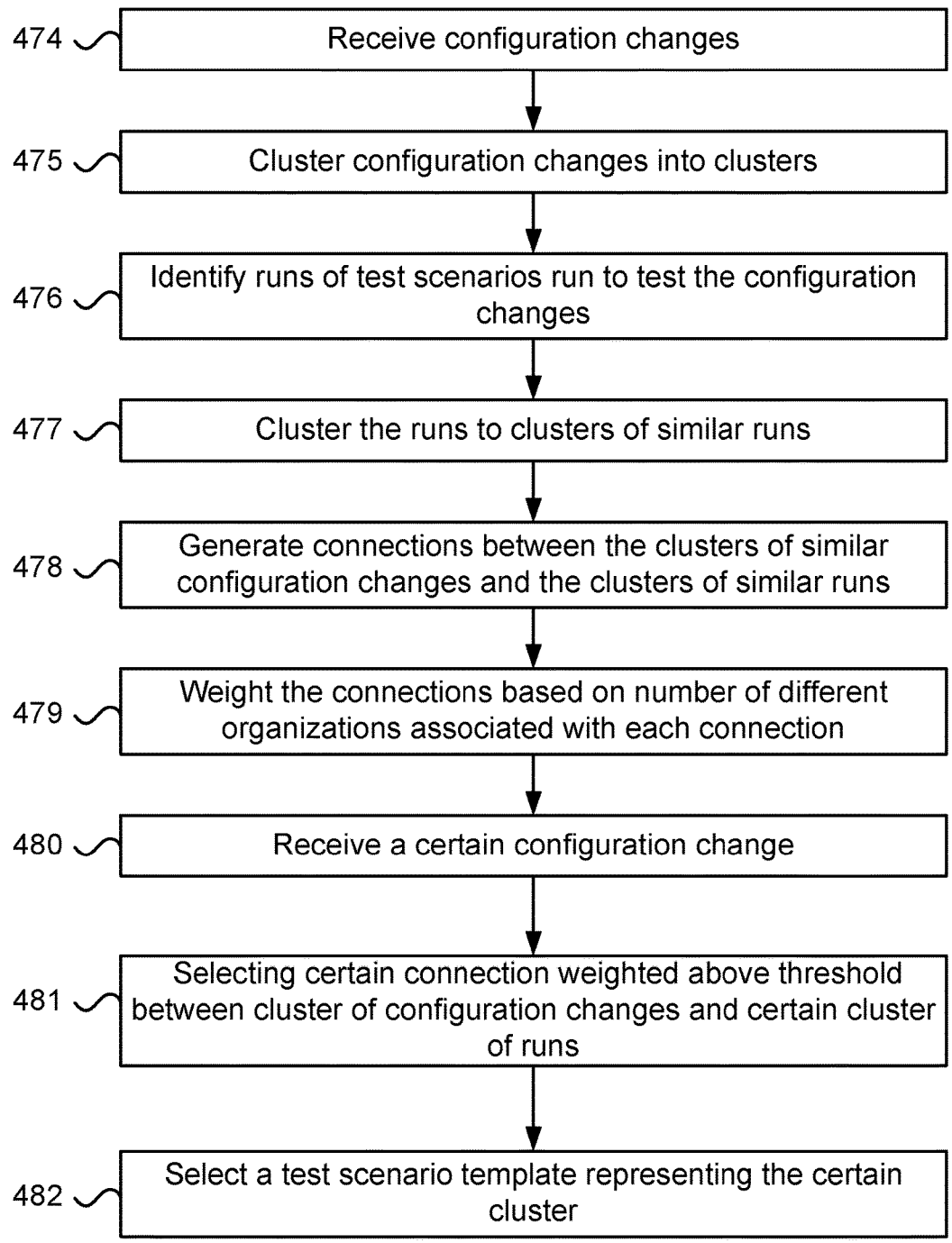
FIG. 45 illustrates one embodiment of a computer implemented method for selecting a test scenario template relevant to a configuration change.

FIG. 45 illustrates one embodiment of a computer implemented method for selecting a test scenario template relevant to a configuration change. The illustrated embodiment includes the following steps:

In step 474, receiving data indicative of configuration changes made to software systems of different organizations.

In step 475, clustering the configuration changes into clusters of similar configuration changes.

In step 476, identifying runs of test scenarios run by users belonging to the different organizations on software systems belonging to the different organizations. Optionally, running the test scenarios is useful for testing configuration elements of the software systems. Optionally, identifying the runs also involves identifying which configuration changes the runs are intended to test.

In step 477, clustering the runs to clusters comprising similar runs.

In one embodiment, the clustering of the runs involves clustering the runs according to configuration changes and/or configuration elements that are associated with the runs. That is, at least some portion of notion of similarity between two runs of test scenarios is determined according to configuration changes and/or configuration elements associated with each of the two runs. In one example, the configuration changes associated with each of the two runs are described in configuration files belonging to the systems on which the respective test scenarios were run.

In step 478, generating connections between the clusters of similar configuration changes and the clusters of similar runs.

In step 479, weighting the connections based on number of different organizations associated with each of the connections. An organization is associated with a connection between a cluster of similar configuration changes and a cluster of similar runs if a run of a test scenario, from the cluster of similar runs, is run by a user belonging to the organization to test a configuration change from the cluster of similar configurations changes. Additionally or alternatively, weighting the connections may be based on other factors. For example, such factors may be the number of users associated with each connection, the size of the cluster of similar configuration changes, and/or the size of the cluster of similar runs.

In step 480, receiving a certain configuration change of a certain software system to be tested by a certain user. Optionally, the certain software is associated with a certain organization that is not one of the different organizations.

In step 481, selecting a certain connection, weighted above a threshold, between a cluster of similar configuration changes, to which the certain configuration change corresponds, and a certain cluster of similar runs of test scenarios.

And in step 482, selecting for the certain user a test scenario template representing the certain cluster of similar runs. Optionally, the certain cluster of similar runs includes a first run associated with a first organization belonging to the different organizations and a second run associated with a second organization belonging to the different organizations. Additionally, the first organization is not the second organization.

In one embodiment, the computer implemented method illustrated in FIG. 45 may include an optional step of monitoring the users 450 running the test scenarios on the software systems that belong to the different organizations and providing data obtained from the monitoring to be used for the identifying of the runs.

In one embodiment, the computer implemented method illustrated in FIG. 45 may include an optional step of suggesting to the certain user to run an instantiation of the test scenario template. Optionally, suggesting may done via the user interface 472.

In another embodiment, the computer implemented method illustrated in FIG. 45 may include an optional step of generating the test scenario template based on one or more runs of test scenarios belonging to the certain cluster. Optionally, the template is generated from one or more runs of test scenarios that are selected from the certain cluster. Optionally, selecting the one or more runs is based on received information relating to an impact of configuration changes belonging to the cluster of similar configuration changes on runs of test scenarios belonging to the certain cluster. Optionally, the one or more runs based upon which the template is generated are runs that are highly impacted by configuration changes belonging to the cluster of similar configuration changes.

In one embodiment, the computer implemented method illustrated in FIG. 45 may include an optional step of providing the certain user an indication of the number of different users who acted according to certain connection. Optionally, the indication is provided via the user interface 472. Optionally, the more different users acted according the certain connection, the higher the likelihood that the certain connection is relevant to the certain user. Additionally or alternatively, the certain user may be provided an indication of the number of different organizations associated with the certain connection. Optionally, the indication is provided via the user interface 472. Optionally, the more organizations are associated with the certain connection, the higher the likelihood that the certain connection is relevant to the certain user.

In one embodiment, the computer implemented method illustrated in FIG. 45 includes an optional step of ranking the test scenario template in proportion to the weight of the certain connection. Optionally, the higher the weight of the certain connection, the higher the test scenario template is ranked. Optionally, ranking the template may involve assigning the template a score and/or positioning the template in a certain ordering of templates.

In one embodiment, the computer implemented method illustrated in FIG. 45 includes an optional step of marking the certain configuration change 460 as missing test scenario template if the certain configuration change 460 does not have a certain connection weighted above a threshold.

In one embodiment, a non-transitory computer-readable medium stores program code that may be used by a computer to select a test scenario template relevant to a configuration change. The computer includes a processor, and the non-transitory computer-readable medium stores the following program code:

Program code for receiving data indicative of configuration changes made to software systems of different organizations.

Program code for clustering the configuration changes into clusters of similar configuration changes.

Program code for identifying runs of test scenarios run by users belonging to the different organizations on the software systems belonging to the different organizations; running the test scenarios is useful for testing at least some of the configuration changes.

Program code for clustering the runs to clusters comprising similar runs.

Program code for generating connections between the clusters of similar configuration changes and the clusters of similar runs.

Program code for weighting the connections based on number of different organizations associated with each of the connections. An organization is associated with a connection between a cluster of similar configuration changes and a cluster of similar runs if a run of a test scenario, from the cluster of similar runs, is run by a user belonging to the organization to test a configuration change from the cluster of similar configurations changes.

Program code for receiving a certain configuration change of a certain software system to be tested by a certain user.

Program code for selecting a certain connection, weighted above a threshold, between a cluster of similar configuration changes, to which the certain configuration change corresponds, and a certain cluster of similar runs of test scenarios. Optionally, the certain cluster of similar runs includes a first run associated with a first organization belonging to the different organizations and a second run associated with a second organization belonging to the different organizations. In addition, the first organization is not the second organization.

And program code for selecting for the certain user a test scenario template representing the certain cluster of similar runs.

In one embodiment, the non-transitory computer-readable medium optionally stores program code for providing the certain user an indication of the number of users belonging to different organizations who acted according to the certain connection; the more users acted according to the certain connection, the higher the likelihood that the certain connection is relevant to the certain user.

In one embodiment, the non-transitory computer-readable medium optionally stores program code for monitoring the users belonging to the different organization running the test scenarios on the software systems that belong to the different organizations and providing data obtained from the monitoring to be used for the identifying of the runs.

In one embodiment, the non-transitory computer-readable medium optionally stores program code for suggesting to the certain user to run an instantiation of the test scenario template representing the certain cluster of similar runs.

In one embodiment, the non-transitory computer-readable medium optionally stores program code for generating the test scenario template representing the certain cluster of similar runs based on one or more runs of test scenarios belonging to the certain cluster of similar runs.

Figure 46:
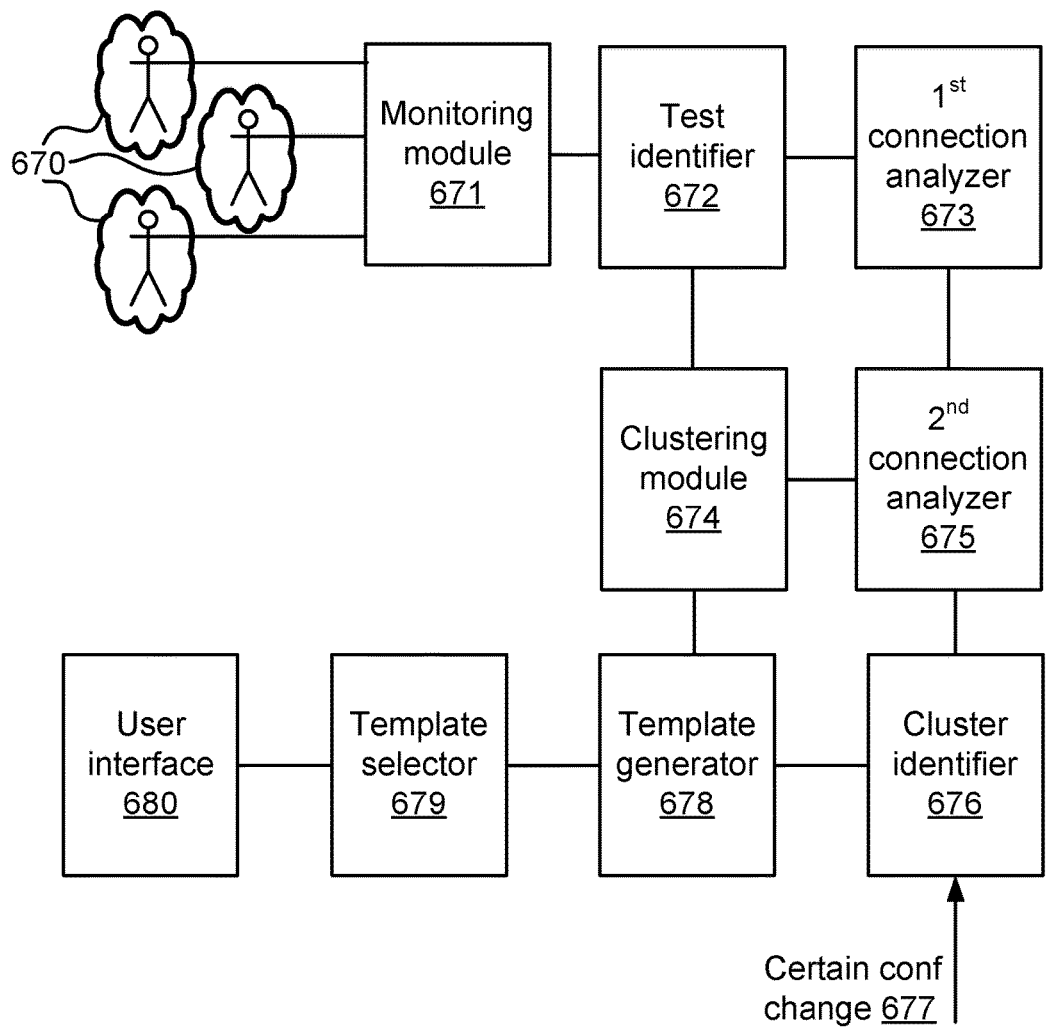
FIG. 46 illustrates one embodiment of a computer system configured select a test scenario template relevant for testing a configuration change.

FIG. 46 illustrates one embodiment of a computer system configured select a test scenario template relevant for testing a configuration change. The illustrated embodiment includes at least a test identifier 672, a first connection analyzer 673, a clustering module 674, a second connection analyzer 675, a cluster identifier 676, a template generator 678, and a template selector 679.

The test identifier 672 is configured to identify runs of test scenarios run by users that belonging to the different organizations and implementing configuration changes on software systems belonging to the different organizations. Optionally, running the test scenarios is useful for testing at least some of the configuration changes. In one example, many configuration elements may undergo a change of value as a result of configuration changes. To test the influence of the configuration changes, users may run test scenarios in order that test various aspects and/or behaviors of their software system in various conditions.

The first connection analyzer 673 is configured to identify first connections between the configuration changes and the runs. Optionally, a connection between a configuration change and a run of a test scenario indicates that running the test scenario may have been useful for testing the configuration change.

In one embodiment, the first connection analyzer 673 receives information indicating, for some of the configuration changes, which runs of test scenarios are related to the configuration changes. In one example, runs of test scenarios may include data fields indicating which configuration changes they are intended to test. Optionally, the data fields are added by a designer of the test scenario. In another example, the first connection analyzer 673 receives a table that lists identifiers of runs of test scenarios that were run to test each configuration change.

In another embodiment, the first connection analyzer 673 analyzes runs of test scenarios, and from the analysis the connection analyzer 673 is able to learn of one or more configuration changes that may have affected a system. For example, the runs may contain evidence indicating that the one or more configuration changes affected the system. Consequently, the one or more configuration changes may be connected, by first connections, to the runs in which they were found.

In one example, the first connection analyzer 673 utilizes text analysis of a run of a test scenario, such as analyzing code belonging to a test scenario being run, input provided for running the test scenario, and/or output files, such as log files, generated when running the test scenario. The text analysis searches for certain names and/or values that are part of configuration changes (e.g., file paths, business process names, and/or values associated with configuration elements). If such names and/or values are found, the corresponding configuration changes may be connected with the run of the test scenario with first connections.

In another example, the first connection analyzer 673 utilizes static analysis of code utilized for running a test scenario in order to identify one or more configuration changes that may be tested by running the test scenario. The static analysis may reveal if certain business processes, programs, and/or transactions are to be executed in various control flows of the code. If the certain business processes, programs, and/or transactions are linked to the one or more configuration changes, then the one or more configuration changes may be connected to runs of the test scenario with first connections. For example, a configuration change may indicate that a certain default transaction should be performed if updating a database fails. If static analysis reveals that a test scenario may perform the certain default transaction under certain conditions, a first connection may be made between the configuration change and a run of the test scenario.

In yet another example, the first connection analyzer 673 utilizes dynamic analysis performed while running a test scenario in order to identify one or more configuration changes that may be tested by running the test scenario. Optionally, the run of the test scenario includes data collected while the dynamic analysis was performed. Analyzing the dynamic analysis data may reveal which transactions, business processes, and/or system resources were involved in the run of the test scenario. If the transactions, business processes, and/or system resources correspond to specific configuration changes (e.g., identifiers of the transaction appear as values related to the specific configuration changes), then the specific configuration changes may be connected to the run of the test scenario via first connections.

In one embodiment, the first connection analyzer 673 receives indications regarding one or more configuration changes of interest at a given point of time. Operating under the assumption that runs of test scenarios which were run directly after the point of time (but within a predefined time frame such as a few hours) are done in order to test the one or more configuration changes, the first connection analyzer 673 may connect between the one or more configuration changes and the runs of the test scenarios with first connections.

The clustering module 674 is configured to cluster the runs of test scenarios identified by the test identifier 672 into clusters comprising similar runs of test scenarios. Optionally, the clustering is based on similarity between the runs of the test scenarios. Optionally, the clustering is based on similarity between configuration elements and/or configuration changes associated with the runs of the test scenarios. For example, the clustering may utilize similarities between configuration files of systems on which the test scenarios were run, in order to help determine a placement of runs into clusters.

The second connection analyzer 675 is configured to generate, based on the first connections, second connections between the configuration changes and the clusters of similar runs. For example, if a first connection exists between a certain configuration change and a certain run, and in addition, the certain run belongs to a certain cluster, then the second connection analyzer 675 may generate a second connection between the certain configuration change and the certain cluster.

In one embodiment, a second connection is made between a configuration change and a cluster, if there exists at least one first connection between the configuration change and a certain run, and certain run belongs to the cluster. Optionally, in order to generate a second connection between a configuration change and a cluster, the configuration change needs to be linked to the cluster via a number of different runs that reaches a threshold. Optionally, the threshold depends on the size of the cluster, e.g., the larger the size of the cluster, the higher the threshold.

The cluster identifier 676 is configured to receive a certain configuration change 677 of a certain user, and to identify a certain cluster of similar runs which correspond to the certain configuration change 677. The cluster identifier 676 identifies the certain cluster by comparing the certain configuration change 677 with configuration changes that take part in the second connections. Optionally, at least one of the second connections involves the certain cluster. Optionally, the certain configuration change 677 is related to a software system on which the certain user may run test scenarios. Optionally, the certain user is tasked with running a test scenario that is intended to test the certain configuration change 677. Optionally, the certain cluster of similar runs includes a first run associated with a first organization belonging to the different organizations and a second run associated with a second organization belonging to the different organizations. Additionally, the first organization is not the second organization.

In one embodiment, the certain cluster of similar runs corresponds to the certain configuration change 677 if there exists a second connection between the certain configuration change 677 and the certain cluster. Additionally or alternatively, the certain cluster may correspond to the certain configuration change 677 if there exists at least one first connection between the certain configuration change 677 and a run belonging to the certain cluster. Optionally, the certain cluster may correspond to the certain configuration change 677 if there exists at least a predetermined number of first connections between the certain configuration change 677 and one or more runs belonging to the certain cluster.

In another embodiment, the certain cluster of similar runs corresponds to the certain configuration change 677 if there exists a second connection between a configuration change similar to the certain configuration change 677 and the certain cluster. In one example, a configuration change may be considered similar to the certain configuration change 677 if both configuration changes involve the same configuration element, possibly with different values associated with the respective changes. In another example, a configuration change may be considered similar to the certain configuration change 677 if they are determined to be similar according to a similarity function which relies on similarities of text and/or values. In yet another example, a configuration change may be considered similar to the certain configuration change 677, if both would have been placed in a same cluster by a clustering algorithm that clusters configuration changes. Additionally or alternatively, the certain cluster may correspond to the certain configuration change 677 if there exists at least one first connection between a configuration change similar to the certain configuration change and a run belonging to the certain cluster. Optionally, the certain cluster may correspond to the certain configuration change 677 if there exists at least a predetermined number of first connections between one or more configuration changes similar to the certain configuration change 677 and one or more runs belonging to the certain cluster.

The template generator 678 is configured to generate test scenario templates based on runs belonging to the certain cluster. Optionally, the template generates one or more templates, where each template is generated from one or more runs belonging to the certain cluster.

The template selector 679 is configured to select, based on the number of different organizations associated with the templates, a representative test scenario template to represent the certain cluster. Optionally, an organization may be considered associated with a template if a run of a test scenario that was used to generate the template was run by a user belonging to the organization. Optionally, an organization may be associated with a template if a user belonging to the organization runs an instantiation of the template.

In one embodiment, the template selector 679 receives usage information that may indicate numbers of users and/or organizations that utilized templates representing the certain cluster. Based on the received usage information, the template selector 679 may be able to select a template known to be utilized by a large number of users and/or organizations. Optionally, the template selector 679 may receive a profile of the certain user and select an appropriate template based on the profile. For example, the template may include transactions indicated in the profile to be utilized by the certain user.

In one embodiment, the representative test scenario template is generated based on a first run associated with a first organization belonging to the different organizations and a second run associated with a second organization belonging to the different organizations. Additionally, the first organization is not the second organization. Optionally, the certain user does not belong to the first organization and does not belong to the second organization.

In one embodiment, selecting the representative test scenario template for the certain user is guided, at least in part, by impact of the certain configuration change 677 on runs of test scenarios belonging to the certain cluster. Optionally, impact of the certain configuration change 677 is determined, at least in part, according to its influence on an outcome of running test scenarios. For example, if the certain configuration change 677 alters the control flow of the execution of a run (e.g., causes different transactions to be executed), its impact may be considered to be high. In another example, a certain configuration change 677 may cause a system error, which may dramatically change the outcome of a run; in this case too, the impact of the certain configuration change 677 may be considered to be high. In another example, the certain configuration change 677 does not alter the control flow of the execution of a test scenario; in this case, the impact of the certain configuration change on 677 may be considered low. Optionally, the impact of the certain configuration change 677 may be determined by static analysis of test scenarios and/or runs of test scenarios that belong to the certain cluster. For example, static analysis may help determine if there are transactions in the test scenarios that depend on a configuration element involved in the certain configuration change 677 and/or the extent of the dependence. Optionally, the impact may be determined by dynamic analysis of runs of the test scenarios belonging to the certain cluster. For example, the control flow and/or data flow of the runs may be examined to generate a list of system components, transactions, and/or programs that are involved in each run; by comparing the list with the certain configuration change 677, it may be determined which runs are impacted by the certain configuration change 677.

In one embodiment, the template selector 679 may be also configured to provide the certain user an indication of the number of users belonging to the different who ran instantiations of the representative test scenario template; the more users belonging to different organizations that run instantiations of the representative test scenario template, the higher the likelihood that the representative test scenario template is relevant for the certain user. Additionally or alternatively, the template selector 679 may be also configured to provide the certain user an indication of the number of different organizations associated with the representative test scenario template; the more organizations associated with the representative test scenario template, the higher the likelihood that the representative test scenario template is relevant for the certain user. Optionally, indications regarding the number of users that ran instantiations of the representative test scenario template and/or indications of the number of organizations associated with the representative test scenario template are given via the user interface 680.

In another embodiment, the template selector 679 is optionally configured to rank the representative test scenario template in proportion to the number of organizations associated with it. For example, the higher the number of organizations associated with the representative test scenario template, the higher the representative test scenario template is ranked. Ranking the representative test scenario template may involve assigning the representative template a score and/or positioning the representative template in a certain ordering of templates.

In one embodiment, the computer system includes an optional monitoring module 671 that is configured to monitor the users 670 belonging to the different organization, running the test scenarios on the software systems that belong to the different organizations, and to provide data obtained from the monitoring to the test identifier 672.

In another embodiment, the computer system includes an optional user interface 680 configured to suggest to the certain user to run an instantiation of the representative test scenario template.

In one embodiment, the certain configuration change 677 is associated with a certain software system (e.g., the certain configuration change 677 affects the certain software system). Optionally, the certain software system is associated with an organization that is not one of the different organizations. In one example, the certain software system is a SAP ERP, configurations involve database tables, and configuration changes may involve changes to entries in database tables. Monitoring the users involves monitoring executed transactions (e.g., queries and returned values). The second connections are connections between database tables and clusters of runs of test scenarios that include SQL statements which access the database tables. In another example, the certain software system is an Oracle ERP, configurations are customization code, and configuration changes may involve changes to customization code. Monitoring the users involves monitoring executed procedures. The connections are between clusters of customization code and clusters of runs of test scenarios that execute the customization code.

It is to be noted that different embodiments may implement components of the computer system illustrated in FIG. 46 in different ways. For example, in some embodiments one or more of the following may be implemented by the same software module and/or software modules running on the same processor: the monitoring module 671, the test identifier 672, the clustering module 674, the first connection analyzer 673, the second connection analyzer 675, the cluster identifier 676, the template generator 678, and the template selector 679. Optionally, one or more of the aforementioned components may be implemented, at least in part, on a remote server, such as a cloud-based server.

In one example, the first connection analyzer 673 and the test identifier 672 utilize some of the same software modules and/or are realized by the same software components. In another example, the second connection analyzer 675 is implemented at least in part by the cluster identifier 676 and/or the clustering module 674. In another example, the template selector 670 and the template generator 678 are implemented, at least in part, by the same software module.

Figure 47:
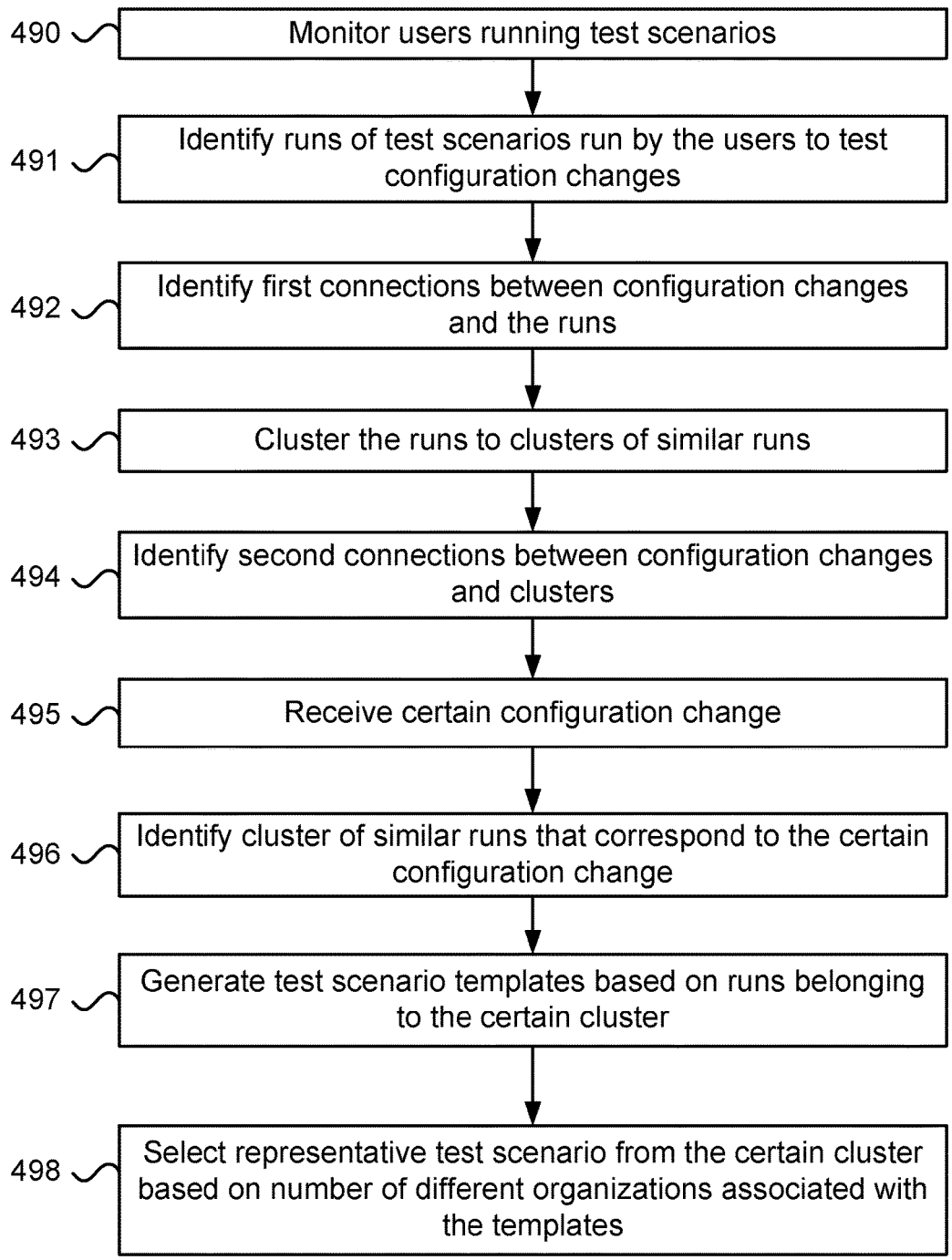
FIG. 47 illustrates one embodiment of a computer implemented method for selecting a test scenario template useful for testing a configuration change.

FIG. 47 illustrates one embodiment of a computer implemented method for selecting a test scenario template useful for testing a configuration change. The illustrated embodiment includes the following steps:

In step 491, identifying runs of test scenarios run by users belonging to different organizations. The users are implementing configuration changes on software systems belonging to the different organizations. Running the test scenarios may be useful for testing at least some of the configuration changes being implemented. For example, running a test scenario on a software system may assist in determining the impact of a configuration change on the software system. Optionally, the impact may indicate whether the configuration change alters a control flow of the test scenario and/or whether an outcome of running the test scenario changes due to implementing the configuration change. In step 492, identifying first connections between configuration changes and the runs.

Optionally, there may be a configuration change that has more than one first connection between the configuration change and one or more runs. Optionally, there may be a configuration change with no first connection between the configuration change and a run.

In step 493, clustering the runs into clusters of similar runs. Optionally, the clustering is done at least in part, according to configuration elements associated with the runs and/or configuration changes associated with the runs. Optionally, the clustering is done, at least in part, based on data included in the runs. Herein, by stating that the clustering is done "at least in part" according to a certain factor, it may mean that similarity of runs is determined in part according to the certain factor. For example, a similarity function used to compute similarity between runs may make its computations according to several factors, of which the certain factor is one.

In step 494, identifying, from the first connections and the clustering (e.g., assignments of runs to clusters), second connections between configuration changes and the clusters. Optionally, a second connection is identified between a configuration change and a cluster if there is at least one first connection between the configuration change and a run belonging to the cluster. Optionally, a second connection is identified between a configuration change and a cluster if there at least a predetermined number of first connections between the configuration change and runs belonging to the cluster. Optionally, a second connection is identified between a configuration change and a cluster if first connections between the configuration change and run belong to the cluster are associated with at least a predetermined number of organizations. A first connection between a configuration change and a run may be considered associated with an organization if a user belonging to the organization ran the run. Optionally, identifying the second connections involves storing the second connections for future used. For example, storing the second connections may involve storing linking information that may link between the at least some of the configuration changes and at least some of the clusters.

In step 495, receiving a certain configuration change of a certain user. Optionally, the certain user belongs to a certain organization that is not one of the different organizations. Optionally, the certain configuration change is to be performed on a software system belonging to the certain organization. Additionally, the certain organization is not one of the different organizations.

In step 496, identifying a certain cluster of similar runs which correspond to the certain configuration change by comparing the certain configuration change with configuration changes that take part in the second connections. A configuration change is considered to take part in a second connection if the second connection is between the configuration change and a cluster of similar runs. Optionally, the certain cluster corresponds to the certain configuration change if there is a second connection between the certain configuration change and the certain cluster. Optionally, the certain cluster corresponds to the certain configuration change if there is a second connection between a configuration change, which is similar to the certain configuration change, and the certain cluster. Optionally, the certain cluster of similar runs includes a first run associated with a first organization belonging to the different organizations and a second run associated with a second organization belonging to the different organizations. In addition, the first organization is not the second organization.

In step 497, generating test scenario templates based on runs of test scenarios belonging to the certain cluster. Optionally, the templates identify transactions executed while running the test scenarios and/or possible values that may be used to execute the transactions.

And in step 498, selecting, based on number of different organizations associated with the templates, a representative test scenario template to represent the certain cluster.

In one embodiment, the representative test scenario is a template is selected such that, from among the templates that may represent the certain cluster, it is associated with a highest number of organizations. That is, there is no other template among the templates that is associated with more organizations than the number of organizations the representative template is associated with.

In another embodiment, selecting the representative test scenario template is done, at least in part, according to the number of users that ran test scenarios belonging to the certain cluster. For example, the representative template is a template with a highest number of different users that ran instantiations of the template. That is, there is no other template with a number of users that ran its instantiations that is larger than the number of users that ran instantiations of the representative template. In another example, the representative template is a template which was generated from runs of test scenarios run by a largest number of users. That is, there is no other template generated by runs, belonging to the certain cluster, which were run by more users that the number of users that ran the runs from which the representative template was generated.

In one embodiment, the computer implemented method illustrated in FIG. 47 may include optional step 490 which involves monitoring the users running the test scenarios on the software systems that belong to the different organizations and providing data obtained from the monitoring to be used for the identifying of the runs.

In one embodiment, the computer implemented method illustrated in FIG. 47 may include an optional step of suggesting to the certain user to run an instantiation of the representative test scenario template. For example, suggesting may done via the user interface 680.

In one embodiment, the computer implemented method illustrated in FIG. 47 may include an optional step of providing the certain user an indication of number of users belonging to different organizations who ran instantiations of the representative test scenario template; the more users belonging to different organizations that run instantiations of the representative test scenario template, the higher the likelihood that the representative test scenario template is relevant for the certain user. Alternatively or additionally, the computer implemented method illustrated in FIG. 47 may include an optional step of providing the certain user an indication of number of different organizations associated with the representative test scenario template; the more organizations associated with the representative test scenario template, the higher the likelihood that the representative test scenario template is relevant for the certain user.

In one embodiment, the certain cluster is a cluster with a number of second connections with the certain configuration change that is maximal; i.e., there is no other cluster for which the number of second connections between the certain configuration change and the other cluster is larger. Alternatively or additionally, the certain cluster may be a cluster with a number of second connections with a configuration change similar to the certain configuration change that is maximal; i.e., there is no other cluster for which the number of second connections between a configuration change similar to the certain configuration change and the other cluster is larger.

In another embodiment, the certain cluster is a cluster, from among clusters that have at least one second connection between the certain configuration change and them, which is associated with the most organizations. That is, there is no other cluster for which there is a second connection between the certain configuration change and the other cluster, and other cluster contain runs associated with more organizations than the number of organizations associated with runs included in the certain cluster. Alternatively or additionally, the certain cluster may be a cluster, selected from among clusters that have at least one second connection between the configuration change similar to the certain configuration change and them, which is associated with the most organizations. That is, there is no other cluster for which there is a second connection between a configuration change similar to the certain configuration change and the other cluster, and other cluster contain runs associated with more organizations than the number of organizations associated with runs included in the certain cluster.

In one embodiment, the computer implemented method illustrated in FIG. 47 may include an optional step of receiving information related to impact of the certain configuration change on runs of test scenarios belonging to the certain cluster and selecting, based on the information related to the impact, the representative test scenario template. For example, the representative test scenario template that is selected is a template impacted the highest by the certain configuration change, from among the templates that represent the certain cluster.

In another embodiment, the computer implemented method illustrated in FIG. 47 may include an optional step of ranking the representative test scenario template in proportion to the number of different organizations associated with the representative test scenario template.

In yet another embodiment, the computer implemented method illustrated in FIG. 47 may include an optional step of marking a configuration change that does not have a second connection as missing a test scenario template.

In one embodiment, a non-transitory computer-readable medium stores program code that may be used by a computer to select a test scenario template useful for testing a configuration change. The computer includes a processor, and the non-transitory computer-readable medium stores the following program code:

Program code for identifying runs of test scenarios run by users belonging to the different organizations implementing configuration changes on software systems belonging to the different organizations. Optionally, running the test scenarios is useful for testing at least some of the configuration changes.

Program code for identifying first connections between configuration changes and the runs.

Program code for clustering the runs into clusters of similar runs.

Program code for identifying, from the first connections and the clustering, second connections between configuration changes and the clusters.

Program code for receiving a certain configuration change of a certain user.

Program code for identifying a certain cluster of similar runs which correspond to the certain configuration change by comparing the certain configuration change with configuration changes that take part in the second connections. Optionally, the certain cluster of similar runs includes a first run associated with a first organization belonging to the different organizations and a second run associated with a second organization belonging to the different organizations. In addition, the first organization is not the second organization.

Program code for generating test scenario templates based on runs belonging to the certain cluster.

And program code for selecting, based on number of different organizations associated with the templates, a representative test scenario template to represent the certain cluster. Optionally, the representative test scenario template is a test scenario template that is associated with the highest number of different organizations.

In one embodiment, the non-transitory computer-readable medium optionally stores program code for selecting the representative test scenario template according to the number of users that run test scenarios belonging to the certain cluster.

In another embodiment, the non-transitory computer-readable medium optionally stores program code for monitoring the users belonging to the different organization running the test scenarios on the software systems that belong to the different organizations and providing data obtained from the monitoring to be used for the identifying of the runs.

In still another embodiment, the non-transitory computer-readable medium optionally stores program code for suggesting to the certain user to run an instantiation of the representative test scenario template representing the certain cluster of similar runs.

In yet another embodiment, the non-transitory computer-readable medium optionally stores program code for providing the certain user an indication of number of users belonging to different organizations who ran instantiations of the representative test scenario template; the more users belonging to different organizations that run instantiations of the representative test scenario template, the higher the likelihood that the representative test scenario template is relevant for the certain user. Additionally or alternatively, the non-transitory computer-readable medium may optionally store program code for providing the certain user an indication of number of different organizations associated with the representative test scenario template; the more organizations associated with the representative test scenario template, the higher the likelihood that the representative test scenario template is relevant for the certain user.

Code Elements

Software systems on which user may run test scenarios often involve large amounts of computer code (e.g., one SAP ERP code base includes about 60,000 compilation units which are linked together into approximately 9,000 programs). It is therefore often required to be able to relate to certain portions of the code (e.g., a portion of code may be one or more lines of code). Herein, a portion of code that may be utilized by a software system is referred to as a code element.

In some embodiments, code elements may be identified by at least one of the following: procedures without specific invocations, classes without specific invocations, database triggers, stored procedures, screens, and/or tables in a database.

In one example, a database trigger is procedural code that is automatically executed in response to certain events on a particular table or view in a database. For example, when a new record (representing a new worker) is added to the employees table, new records should also be created in the tables of the taxes, vacations and salaries. In this example, the new records are created via a database trigger associated with the employee table that caused the automatic creation of the new records in the tables of the taxes, vacations and salaries.

In one example, code elements may include stored procedures. Optionally stored procedures may include code executed by the procedures and/or data related to invocations of the stored procedures, such as locations in the code where the stored procedures are to be invoked and/or values involved in the invocation.

In another example, code elements may include screens, such as data that describes screens presented to a user. The description of screens may include fields presented on the screens, values corresponding to fields, logic executed by interacting with screens (e.g., logic that is executed when a button is pressed), order of presentation of screens, and/or logic that controls presentation of screens to the user.

In yet another example, code elements may include tables in a database, such as data that describes the tables. The description may include column names and/or column types, values in the tables, and/or actions that may be applied to the tables (e.g., statements that operate on the tables).

In one embodiment, the code elements may be delimited by scope. For example, a code element encompasses a certain function, procedure, screen, database table, or program. Alternatively, the code elements may be delimited by size. Thus, for example, code corresponding to a certain transaction may be partitioned into several code elements corresponding to the various functions, procedures, or programs.

In another embodiment, each of the code elements may include code with similar functionality. For example, a certain transaction may have code that includes code with different functionalities, such as handling user input and output (e.g., code corresponding to a screen), code for querying a database, and code for processing information retrieved from the database. The code of the certain transaction may be partitioned into several code elements based on the functionality of the elements; therefore, the code that handles the user input and output may be divided to one or more code elements. Similarly, the code for querying the database may be placed in one or more additional code elements, and the code for processing the retrieved information may be placed in other code elements.

Figure 48:
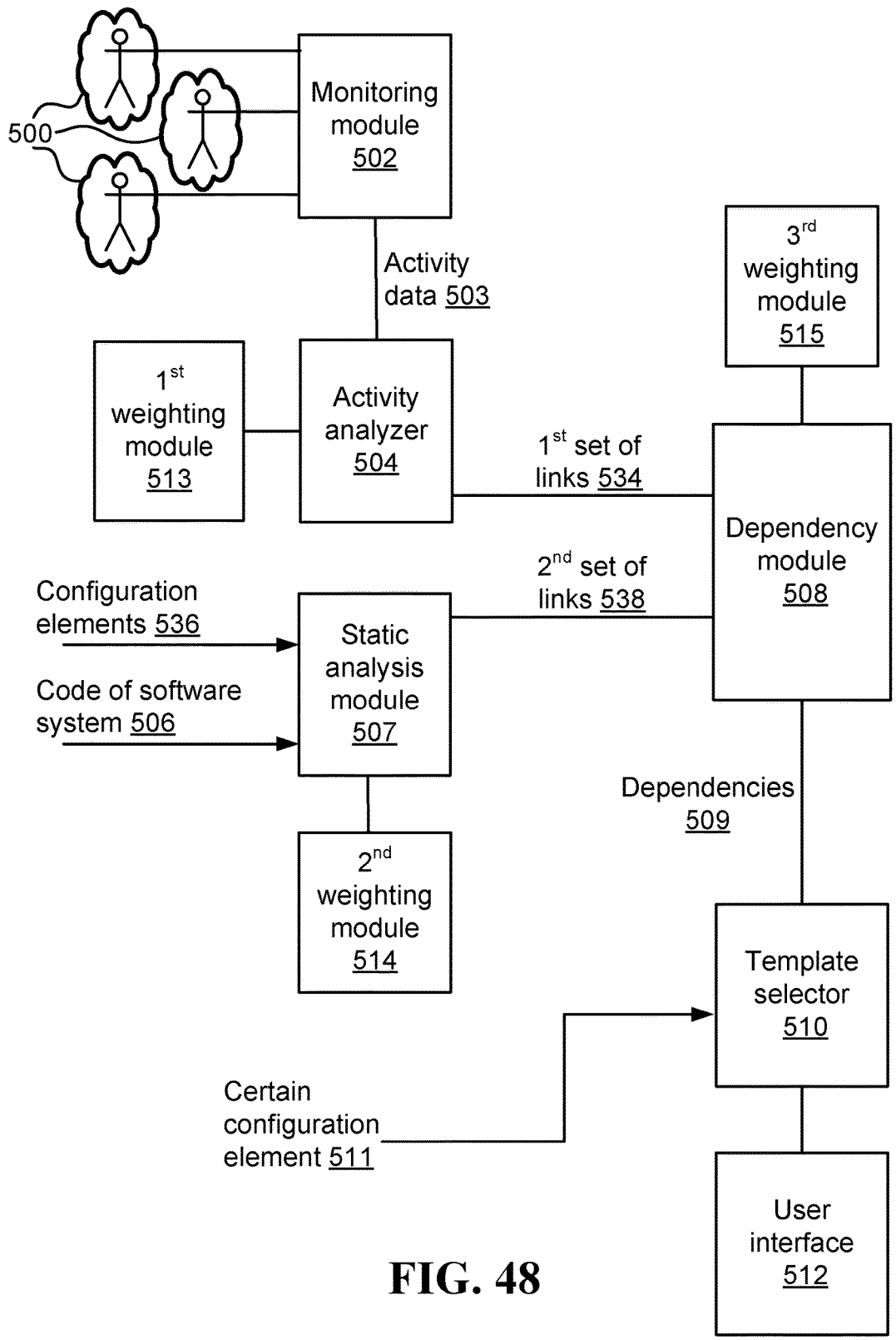
FIG. 48 illustrates one embodiment of a computer system configured to identify dependencies between configuration elements and transactions.
Figure 49:
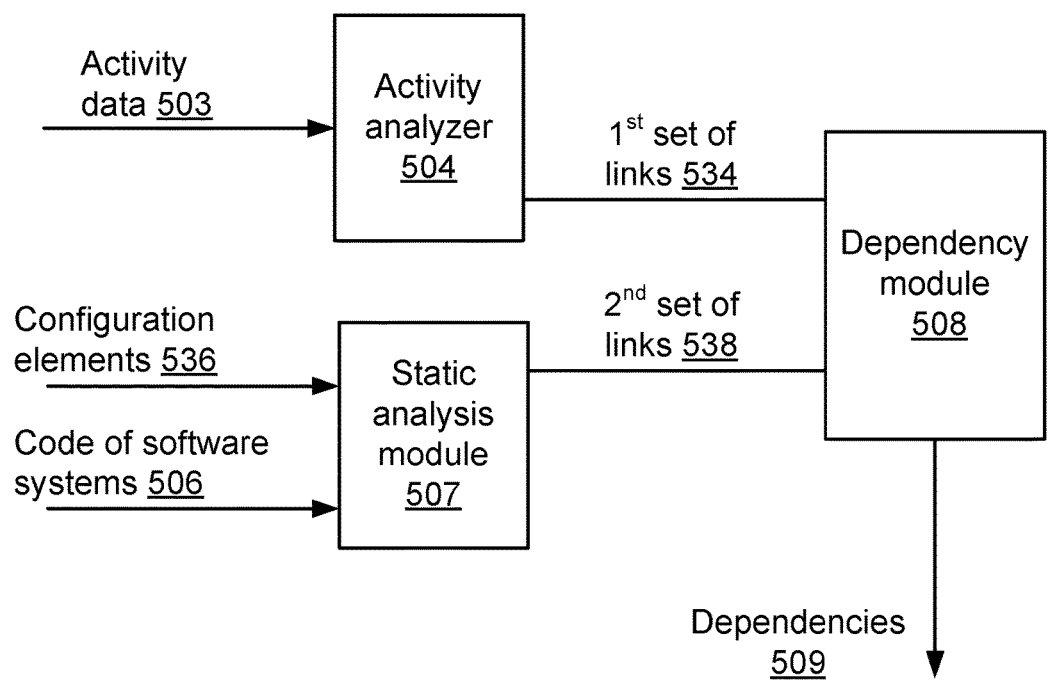
FIG. 49 illustrates one embodiment of a computer system configured to identify dependencies between configuration elements and transactions.

FIG. 48 and FIG. 49 illustrate embodiments of a computer system configured to identify dependencies between configuration elements and transactions. The illustrated embodiments include at least an activity analyzer 504, a static analysis module 507, and a dependency module 508.

The activity analyzer 504 is configured receive activity data 503 obtained by monitoring activity of users belonging to different organizations. Optionally, the activity of the users involves operating software systems associated with the different organizations. In one example, at least some of the activity data 503 may be related to running of test scenarios on the software systems by the users, e.g., the activity data may include run of test scenarios.

In one embodiment, the software systems enable identification of at least some of the transactions executed on the software systems. For example, a log-keeping procedure of a software system may record identifying information regarding transactions performed by a user on the software system. Additionally, at least some of the configuration elements related to the system are identifiable. For example, at least some of the configuration elements are accessible to a user via a menu and/or configuration file in which the presence of certain configuration elements, and/or associated values of the configuration elements, may be determined. Additionally, as explained below, at least some of the configuration elements may be connected to at least some of the transactions via code elements. For example, a certain code element may be linked both to a certain transaction and to a certain configuration element, thus connecting between the certain transaction and the certain configuration element.

The activity analyzer 504 is also configured to generate, based on the activity data 503, a first set of links between the transactions and code elements associated with the transactions; each link in the first set, between a certain transaction and one or more code elements, is based on activity data obtained from at least two different organizations. For example, at least two users from two different organizations were monitored while executing the one or more code elements associated with the certain transaction.

In one embodiment, the activity data 503 includes a list of business processes and/or transactions executed by the users. In one example, the business process and/or transactions may be identified according to their names, identifier codes, and/or descriptions (e.g., a list of fields in a screen involved in a transaction). In another example, the activity data may indicate that a certain group of transactions was executed; e.g., by mentioning that a certain protocol was tested (e.g., adding and removing an employee), it may be inferred that all the transactions involved in the protocol were executed. Optionally, the activity data 503 may include indications of code executed by the users. For example, the indications may be in the form of names of programs, portions of code, hash values of code, and/or outputs that are typically generated by certain code (and thus may indicate that the certain code was executed). Optionally, the activity data 503 includes data that enables synchronization. For example, the activity data may include time stamps and/or program counters (indicating a position in code).

Based on the activity data 503, the activity analyzer 504 can pair between transaction executed by a user at a certain time and corresponding code executed at the time. In one example, the activity data 503 indicates a certain transaction by name that was executed by a user. The activity analyzer 504 receives (as part of the activity data 503 and/or from another source) code corresponding to the certain transaction, and is thus able to form a link between the certain transaction and the code of the certain transaction. Optionally, a single link is formed between the certain transaction and the code of the certain transaction. Alternatively, multiple links may be formed, such as multiple links formed between the certain transaction and various portions of the code of the certain transaction.

In one embodiment, the code elements include data of at least one of the following types: procedures without specific invocations, classes without specific invocations, database triggers, stored procedures, screens, and tables in a database.

The static analysis module 507 is configured to receive the configuration elements 536 and code of a software system 506 which includes code that corresponds to at least one of the following: procedure invocations, user interface statements, and database access statements. Optionally, the code 506 includes statements written in a programming language that define a set of syntactical elements that are analyzed by static analysis tools.

In one embodiment, procedure invocation may include any call to a function, procedure and/or program by a calling program. Optionally, the procedure invocation may include an invocation statement that includes information such as the name of the procedure and/or arguments provided for an invocation of the procedure (e.g., values placed on a stack in memory, to be utilized by the procedure). Additionally or alternatively, the procedure invocation may include code corresponding to the procedure, such as code to be executed by the invoked procedure.

In one embodiment, user interface statements may include any commands and/or programs that result in retrieval, generation, and/or presentation of data to a user via a user interface. Additionally or alternatively, user interface statements may include any commands and/or programs that result in receiving, recording and/or processing of data provided by a user to a system via a user interface. Additionally or alternatively, user interface statements may include data provided by a user to a system via the user interface and/or any data provided by a system to a user via the user interface. Optionally, the user interface may include one or more apparatuses that may receive information from a user, such as a keyboard, touch screen, mouse, microphone, motion tracking apparatus, and/or eye tracking apparatus. Additionally or alternatively, the user interface may include one or more apparatuses that may provide information to a user, such as a screen, an augmented and/or virtual reality display, a speaker, a printer, and/or a haptic feedback device.

In one embodiment, database access statements may include commands and/or programs that result in reading data from a database, writing data to a database, and/or modifying data in a database. Additionally or alternatively, database access statements may include commands and/or programs that change attributes of a database, such as altering columns in a database and/or changing access permissions to certain data in a database. In one example, database access statements may include SQL statements that operate on one or more tables in a database. In another example, database access statements may include CGI scripts that cause a system to retrieve data from a database.

The static analysis module 507 is also configured to generate, based on static analysis of the code 506, a second set of links between 538 the configuration elements 536 and code elements from the code of the software system 506, which are influenced by the configuration elements 536. Optionally, the static analysis module 507 may receive code of multiple software systems and perform static analysis on the code of the multiple software systems in addition to, or as part of, static analysis of the code 506.

There are several approaches that may be utilized by one skilled in the art for performing static analysis in order to identify the links between the configuration elements and code elements influenced by the configuration elements. In one embodiment, data flow analysis is used to detect certain code elements that may be affected by certain configuration elements and/or involve certain configuration elements. For example, if according to the data flow analysis it is determined that a value of a configuration element may be utilized at some point, or under certain conditions, by a code element, the static analysis module 507 may determine that the configuration element influences the code element. Accordingly, a link may be formed by the static analysis module 507 between the code element and the configuration element. In another embodiment, control flow analysis may be utilized to detect certain code elements that may be affected by certain configuration elements. For example, flow analysis of code may reveal that access to a configuration element, and/or a value of the configuration element, may affect the program in certain ways, such as causing certain statements to be executed. Thus, the static analysis module 507 may determine, based on the flow analysis, that the configuration element influences the code corresponding to the certain statements. Based on that determination, the static analysis module 507 may generate links between code elements corresponding to the certain statements and the configuration element.

In some embodiments, the number of configuration elements received by the static analysis module 507 may be very large and/or the code of the software system 506 may be quite extensive. Performing static analysis of the entire body of code 506 with respect to all the configuration elements may be prohibitive. Therefore, in some cases, the static analysis module 507 may perform analysis primarily of a subset of the code 506 and/or consider a subset of the configuration elements. For example, analysis effort may primarily focus on the subset of code and/or the subset of the configuration elements.

In one example, the configuration elements include one or more elements with associated values that have changed. Optionally, determining which elements have associated values that have changed may be done by comparing a current version of configuration elements (e.g., a configuration file) with a previous version of the configuration elements. Optionally, the static analysis module 507 may direct a relatively larger portion of the analysis effort towards elements whose associated value has changed, compared to analysis effort devoted to other configuration elements. Optionally, based on determining which elements have associated values that have changed, the static analysis module 507 can determine which subsets of the code 506 are likely to be affected by the elements with associated values that have changed, and perform its analysis primarily on those subsets of code.

In another example, the static analysis module 507 receives a certain field of operation of a certain organization (e.g., the field of operation may be banking or automotive industry). Based on the field of operation, the static analysis module 507 may determine a subset of the configuration elements that are typically used by organizations that are in the same field of operation. Alternatively or additionally, the static analysis module 507 may determine subsets of the code 506 that are typically utilized by organization in the field of operation. The static analysis module 507 may then focus analysis efforts more on the subset of elements and/or subsets of code.

The dependency module 508 is configured to utilize the first set of links 534 and the second set of links 538 to identify dependencies 509 between the transactions and the configuration elements. Optionally, the dependency module 508 is configured to identify a dependency between a certain transaction and a certain configuration element by identifying a certain code element that is common both to a link from the second set, between the certain configuration element and the certain code element, and a link from the first set, between the certain code element and the certain transaction.

Figure 51:
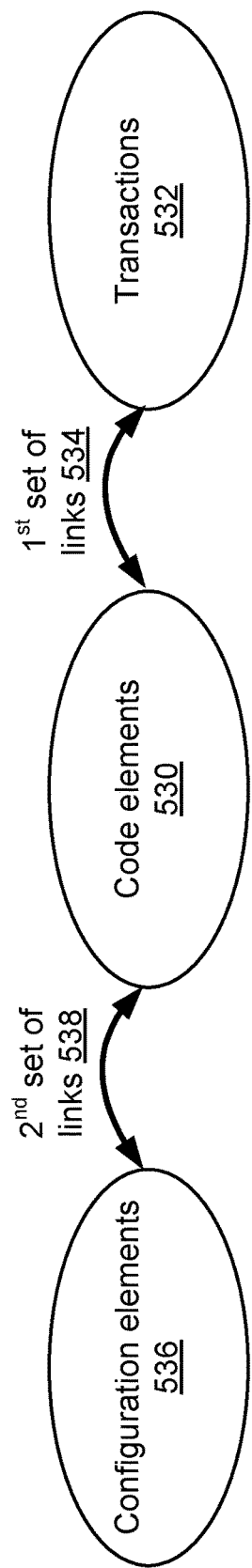
FIG. 51 illustrates one way of forming dependencies between transactions and configuration elements.

FIG. 51 provides a schematic illustration of one way for forming the dependencies between the transactions 532 and the configuration elements 536. In one embodiment, a dependency between a certain transaction and a certain configuration element relies on chaining links involving the second set of links 538 and the first set of links 534. There needs to be at least one link from the second set 538 between a certain configuration element, from among the configuration elements 536, and a certain code element, from among the code elements 530. Additionally, there needs to be at least one link from the first set of links 534 between the certain code element and a certain transaction from the transactions 532. If both links exist, then a dependency between the certain transaction and the certain configuration element may be formed.

In one embodiment, the software systems belonging to the different organizations are SAP ERP system. Optionally, configurations involve database tables, and configuration elements may involve entries and/or attributes in database tables. Monitoring the users involves monitoring of the transactions and indicating which code elements are executed. The second set of links may include links between code elements and SQL statements which access the database tables.

In another embodiment, the software systems belonging to the different organizations are Oracle ERP systems. Optionally, configurations involve customization code. Monitoring the users involves monitoring executed procedures. The second set of links may include links between the executed procedures and the calls to the customization code.

In still another embodiment, the software systems belonging to the different organizations run Java Virtual Machines (JVM). The JVMs enable associations at run-time between Java code and transactions executed on the systems.

In one embodiment, the computer system optionally includes a monitoring module 502 configured to monitor the activity of the users 500 belonging to the different organizations and to provide the activity data 503 to the activity analyzer 504.

In one embodiment, the computer system optionally includes a template selector 510. The template selector 510 is configured to receive a certain configuration element 511 and to select a test scenario template suitable for testing a transaction that is dependent on the certain configuration element 511. Optionally, the certain configuration element 511 relates to a software system belonging to a different organization than one or more organization to which belongs the software system related to the code 506.

The selection by the template selector 510 may be based on the dependencies 509 generated by the dependency module 508. For example, the template that is selected is one that includes a transaction, which according to a dependency described in the dependencies 509 is dependent on the certain configuration element 511. Optionally, the template selector 510 is configured to select the test scenario template based on weight of dependencies. For example, the template that is selected is one that includes a transaction, which according to a dependency described in the dependencies 509 is dependent on the certain configuration element 511, and additionally has the highest weight among dependencies between the certain configuration element 511 and transactions. Additionally, the computer system may include an optional user interface 512 that is configured to suggest to a user to run an instantiation of the test scenario template.

In one embodiment, the template selector 510 selects the test scenario template suitable for testing a transaction that is dependent on the certain configuration element 511 from among templates generated from the activity data 503. Optionally, the templates are generated from runs of test scenarios identified from the activity data 503. Optionally, the runs are clustered into clusters of similar runs, and each template is generated from one or more runs belonging to a same cluster. Optionally, the selection of the template at least in part on the number of different users and/or different organizations associated with runs belonging to the clusters.

In one embodiment, the configuration elements include an element whose value has changed, and the dependency module 508 is configured to identify dependencies between at least one of the transactions and the element whose value has changed. Optionally, the static analysis module 507 determines a change in the behavior of the software system as a result of change of value of the element whose value has changed. For example, the static analysis module 507 may determine if different values of the element may lead to different expected control flows for a program and/or to a different expected data flows for the program. Thus, the static analysis module 507 may determine which code elements are impacted by the configuration element whose value has changed.

In one embodiment, the computer system optionally includes a first weighting module 513 that is configured to weight a link from the first set of links 534, between a code element and a transaction, according to the number of different organizations associated with the link. An organization may be considered associated with a link between a transaction and a code element, if a user belonging to the organization executed the transaction and during execution of the transaction the code element was executed on a system belonging to the organization. Optionally, the larger the number of organizations associated with a link, the higher the weight of the link when used to identify dependencies between transactions and configuration elements. Optionally, the first weighting module 513 may be implemented as part of the activity analyzer 504, e.g., the first weighting module 513 is a software module that is part of the software modules that the activity analyzer 504 utilizes. Additionally or alternatively, the first weighting module 513 may operate on the first set of links 534 generated by the activity analyzer 504. For example, the first weighting module 513 assigns a weight to at least some of the links, while other links may have a default weight. Optionally, the first set of links 534 may be filtered according weights assigned by the first weighting module 513. For example, links that have a weight below a predetermined threshold are not considered by the dependency module 508. A large number of organizations associated with a link may indicate that the link is one that is likely to be true for other organizations (e.g., they are also likely have users that run the same transaction and execute the same code element).

In one embodiment, the first weighting module 513 is configured to weight a link from the first set of links 534, between a code element and a transaction, according to the number of users monitored while having an interaction with the code element that is part of the transaction. Optionally, the larger the number of users having the interaction with the code element, the higher the weight of the link when used to identify dependencies between transactions and configuration elements. A large number of users having an interaction with the code element that is part of the transaction may indicate that other users are also likely to interact with the same code element as part of their executing the transaction.

In one embodiment, the computer system optionally includes a second weighting module 514 that is configured to weight a link from the second set 538, between a configuration element and a code element. Optionally, the link is weighted according to the number of different organizations associated with the link. In this embodiment, an organization may be considered associated with a link between a configuration element and a code element, if a system belonging to the organization is both configured according to the configuration element and executes the code element. For example, the configuration element may be taken from a configuration file belonging to the organization. Additionally, the code element may be taken from the code base of the organization, such as code of a certain software system used by the organization. Optionally, the larger the number of organizations associated with a link, the higher the weight of the link when used to identify dependencies between transactions and configuration elements. A large number of organizations associated with a link may indicate that the link is one that is likely to be true for other organizations (e.g., they are likely to run the same code element involved in the link and/or apply the same configuration element involved in the link). Optionally, the second weighting module 514 may be implemented as part of the static analysis module 507, e.g., the second weighting module 514 is a software module that is part of the software modules that the static analysis module 507 utilizes. Additionally or alternatively, the second weighting module 514 may operate on the second links generated by the static analysis module 507. For example, the second weighting module 514 assigns a weight to at least some of the links, while other links may have a default weight. Optionally, the second links may be filtered according weights assigned by the second weighting module 514. For example, links that have a weight below a predetermined threshold are not considered by the dependency module 508.

In one embodiment, the computer system optionally includes a third weighting module 515 that is configured to weight at least some of the dependencies 509 identified by the dependency module 508. In one example, a dependency between a transaction and a configuration element is to be weighted. The dependency is based on a first link from the first set between the configuration element and a code element, and on a second link from the second set between the code element and the transaction. Optionally, the weight of the dependency may be assigned according to at least one of weight of the first link (e.g., as assigned by the first weighting module 513) and weight of the second link (e.g., as assigned by the second weighting module 514). Optionally, if the first link is missing a weight it is assigned a default weight. Similarly, if the first link is missing a weight it is assigned a default weight. Optionally, the weight assigned to the dependency is a function of the weight of the first link and the weight of the second link. For example, the weight of the dependency is the sum of the weights of the first link and the weight of the second link. In another example, the weight of the dependency is the maximum of the weights of the first link and the weight of the second link. Optionally, the third weighting module 515 may be implemented as part of the dependency module 508, e.g., the third weighting module 515 is a software module that is part of the software modules that the dependency module 508 utilizes. Additionally or alternatively, the third weighting module 515 may operate on the dependencies 509 generated by the dependency module 508.

In one embodiment, a business process includes at least two transactions, and the activity analyzer is configured to generate, based on the activity data 503, a first set of links between business processes and code elements associated with the business processes. Additionally, dependencies identified by the dependency module may be between business processes and the configuration elements.

It is to be noted that different embodiments may implement components of the computer systems illustrated in FIG. 48 and FIG. 49 in different ways. For example, in some embodiments one or more of the following may be implemented by the same software module and/or software modules running on the same processor: the activity analyzer 504, the static analysis module 507, and the dependency module 508. Optionally, one or more of the aforementioned components may be implemented on a remote server, such as a cloud-based server. Optionally, the cloud-based service suggests test scenario templates suitable for users to test certain configuration elements. Optionally, the monitoring module 502 and the template selector 510 are also realized, at least in part, by modules of the cloud-based service that run on cloud-based servers.

Figure 50:
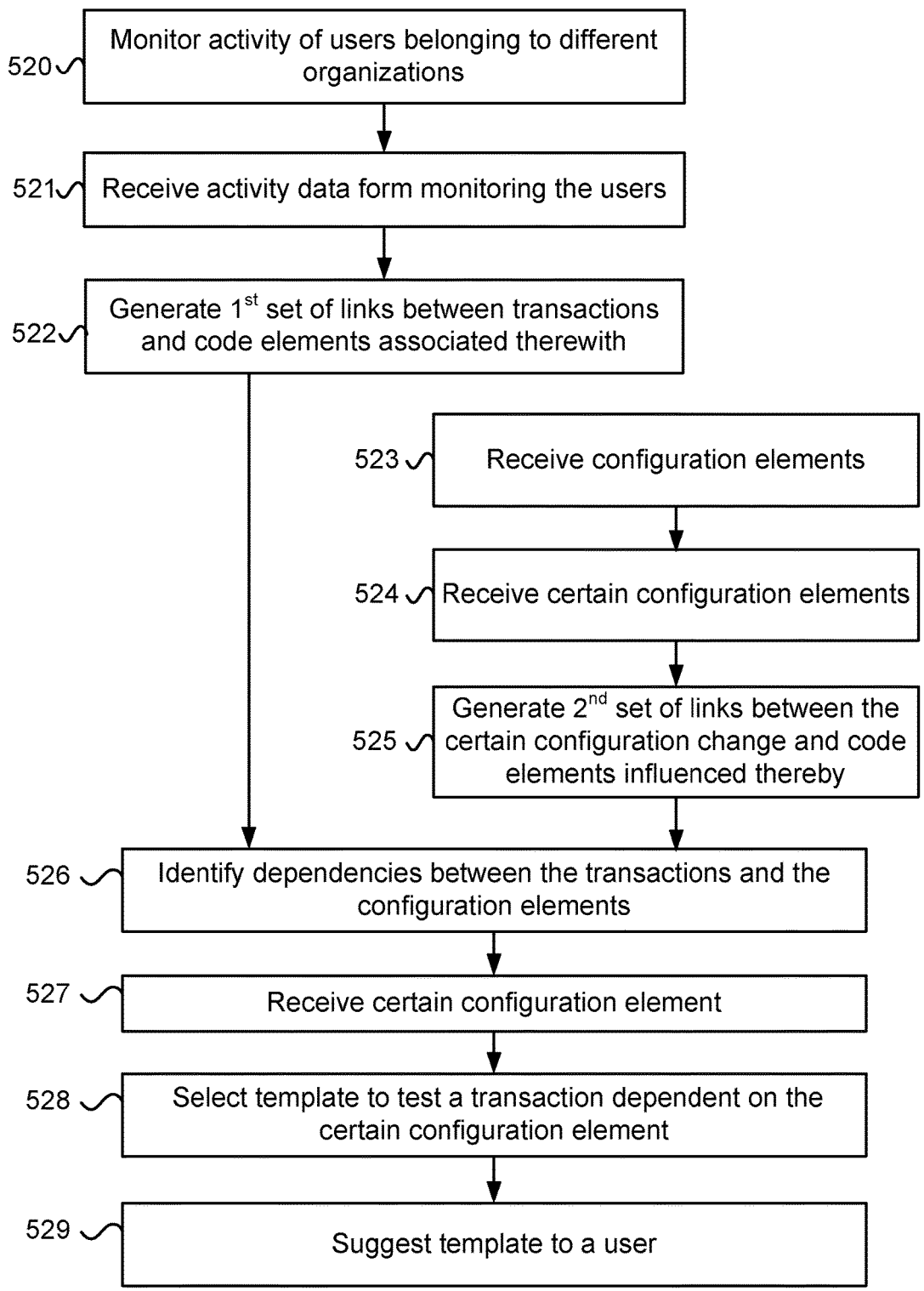
FIG. 50 illustrates one embodiment of a computer implemented method for identifying dependencies between configuration elements and transactions.

FIG. 50 illustrates one embodiment of a computer implemented method for identifying dependencies between configuration elements and transactions. The illustrated embodiment includes the following steps:

In step 521, receiving activity data obtained by monitoring activity of users belonging to different organizations; the users operate software systems associated with the different organization. Optionally, the software systems enable identification of at least some of the transactions executed on the software systems. Additionally, at least some of the configuration elements related to the system are identifiable. This may enable connection between at least some of the configuration elements and at least some of the transactions via code elements.

In step 522, generating, based on the activity data, a first set of links between the transactions and code elements associated with the transactions; each link in the first set is based on activity data obtained from at least two different organizations. Optionally, the code elements include data of at least one of the following types: procedures without specific invocations, classes without specific invocations, database triggers, stored procedures, screens, and tables in a database. Optionally, a business process comprises at least two transactions, and the first set of links corresponds to connections between code elements and business processes.

In step 523, receiving the configuration elements.

In step 524, receiving code of a software system which includes at least one of the following: procedure invocations, user interface statements, and database access statements.

In step 525, generating, based on static analysis of the code, a second set of links between the configuration elements and code elements influenced by the configuration elements. Optionally, the second set of links is generated utilizing static analysis of the code of the software system. Optionally, the static analysis receives as input at least one of the following: procedure invocations, and SQL statements.

And in step 526, identifying dependencies between the transactions and the configuration elements by utilizing the first set of links and the second set of links.

In one embodiment, the configuration elements include an element whose value has changed, and identifying dependencies between the transactions and the configuration elements involves identifying dependencies between one or more of the transactions and the element whose value has changed.

In one embodiment, identifying a dependency between a certain transaction and a certain configuration element is achieved by identifying a certain code element that is common both to a link from the second set, between the certain configuration element and the certain code element, and to a link from the first set, between the certain code element and the certain transaction.

In one embodiment, the computer implemented method illustrated in FIG. 50 includes an optional step of weighting links in the first set according to number of different organizations associated with the links. An organization is associated with a link between a transaction and a code element, if a user belonging to the organization executed the transaction and during execution of the transaction the code element was executed on a system belonging to the organization. The larger the number of different organizations associated a link, the higher the weight of the link when used for the identifying of the certain transaction impacted by the certain configuration change.

In another embodiment, the computer implemented method illustrated in FIG. 50 includes an optional step of weighting a link between a code element and a transaction according to number of users monitored while having an interaction with the code element that is part of the transaction. The larger the number of users having the interaction with the code element, the higher the weight of the link when used for the identifying of the certain transaction impacted by the certain configuration change.

In yet another embodiment, the computer implemented method illustrated in FIG. 50 includes an optional step of weighting a link from the second set, between a configuration element and a code element, according to number of different organizations associated with the link. Optionally, an organization is considered associated with a link between a configuration element and a code element, if a system belonging to the organization is both configured according to the configuration element and executes the code element. Optionally, the larger the number of organizations associated with a link, the higher the weight of the link when used to identify dependencies between transactions and configuration elements.

In still another embodiment, the computer implemented method illustrated in FIG. 50 includes an optional step of weighting a dependency between a transaction and a configuration element, which is based on a first link from the first set between the configuration element and a code element, and on a second link from the second set between the code element and the transaction. Optionally, the weight of the dependency is assigned according to at least one of weight of the first link and weight of the second link.

In one embodiment, the computer implemented method includes optional step 520 which involves monitoring the users belonging to the different organizations in order to obtain the activity data.

In one embodiment, the computer implemented method includes optional step 527 which involves receiving the certain configuration element. Optionally, the computer implemented method also includes step 528 which involves selecting a test scenario template suitable for testing a transaction that is dependent on the certain configuration element received in step 527. Optionally, the test scenario template is selected, at least in part, according to weights of the dependencies. Optionally, the computer implemented method includes optional step 529 which involves suggesting to a user to run an instantiation of the test scenario template. Optionally, the suggestion is made via the user interface 512.

In one embodiment, a non-transitory computer-readable medium stores program code that may be used by a computer to identify dependencies between configuration elements and transactions. The computer includes a processor, and the non-transitory computer-readable medium stores the following program code:

Program code for receiving activity data obtained by monitoring activity of users, belonging to different organizations, running software systems in which the transactions and the configuration elements are identifiable and can be connected via code elements.

Program code for generating, based on the activity data, a first set of links between the transactions and code elements associated with the transactions; each link in the first set is based on activity data obtained from at least two different organizations. Optionally, the code elements include data from at least one of the following types: procedures without specific invocations, classes without specific invocations, database triggers, stored procedures, screens, and tables in a database. Optionally, a business process comprises at least two transactions, and the first set of links corresponds to connections between code elements and business processes.

Program code for receiving the configuration elements.

Program code for receiving code of a software system which comprises at least one of the following: procedure invocations, user interface statements, and database access statements.

Program code for generating, based on static analysis of the code, a second set of links between the configuration elements and code elements influenced by the configuration elements. Optionally, the second set of links is generated utilizing static analysis of the code of the software system. Optionally, the static analysis receives as input at least one of the following: procedure invocations, and SQL statements. Optionally, the configuration elements include an element whose value has changed, and identifying dependencies between the transactions and the configuration elements involves identifying dependencies between one or more of the transactions and the element whose value has changed.

And program code for identifying dependencies between the transactions and the configuration elements by utilizing the first set of links and the second set of links.

In one embodiment, the non-transitory computer-readable medium optionally stores program code for identifying a dependency between a certain transaction and a certain configuration element by identifying a certain code element that is common both to a link from the second set, between the certain configuration element and the certain code element, and a link from the first set, between the certain code element and the certain transaction.

In one embodiment, the non-transitory computer-readable medium optionally stores program code for weighting links in the first set according to number of different organizations associated with the links. An organization may be considered associated with a link between a transaction and a code element if a user belonging to the organization executed the transaction and during execution of the transaction the code element was executed on a system belonging to the organization. The larger the number of different organizations associated a link, the higher the weight of the link for the identifying of the certain transaction impacted by the certain configuration change.

In one embodiment, the non-transitory computer-readable medium optionally stores program code for weighting a link between a code element and a transaction according to number of users monitored while having an interaction with the code element that is part of the transaction. The larger the number of users having the interaction with the code element, the higher the weight of the link for the identifying of the certain transaction impacted by the certain configuration change.

In one embodiment, the non-transitory computer-readable medium optionally stores program code for weighting a link from the second set, between a configuration element and a code element, according to number of different organizations associated with the link. Optionally, an organization is associated with a link between a configuration element and a code element, if a system belonging to the organization is both configured according to the configuration element and executes the code element. The larger the number of organizations associated with a link, the higher the weight of the link when used to identify dependencies between transactions and configuration elements.

In one embodiment, the non-transitory computer-readable medium optionally stores program code for weighting a dependency between a transaction and a configuration element, which is based on a first link from the first set between the configuration element and a code element, and on a second link from the second set between the code element and the transaction. Optionally, the weight of the dependency is assigned according to at least one of weight of the first link and weight of the second link.

In one embodiment, the non-transitory computer-readable medium optionally stores program code for monitoring the users belonging to the different organizations for obtaining the activity data.

In one embodiment, the non-transitory computer-readable medium optionally stores program code for receiving a certain configuration element and selecting a test scenario template suitable for testing a transaction that is dependent on the certain configuration element. Additionally, the non-transitory computer-readable medium may optionally store program code for selecting the test scenario template based on weights of dependencies. Optionally, the non-transitory computer-readable medium may store program code for suggesting to a user to run an instantiation of the test scenario template.

Figure 52:
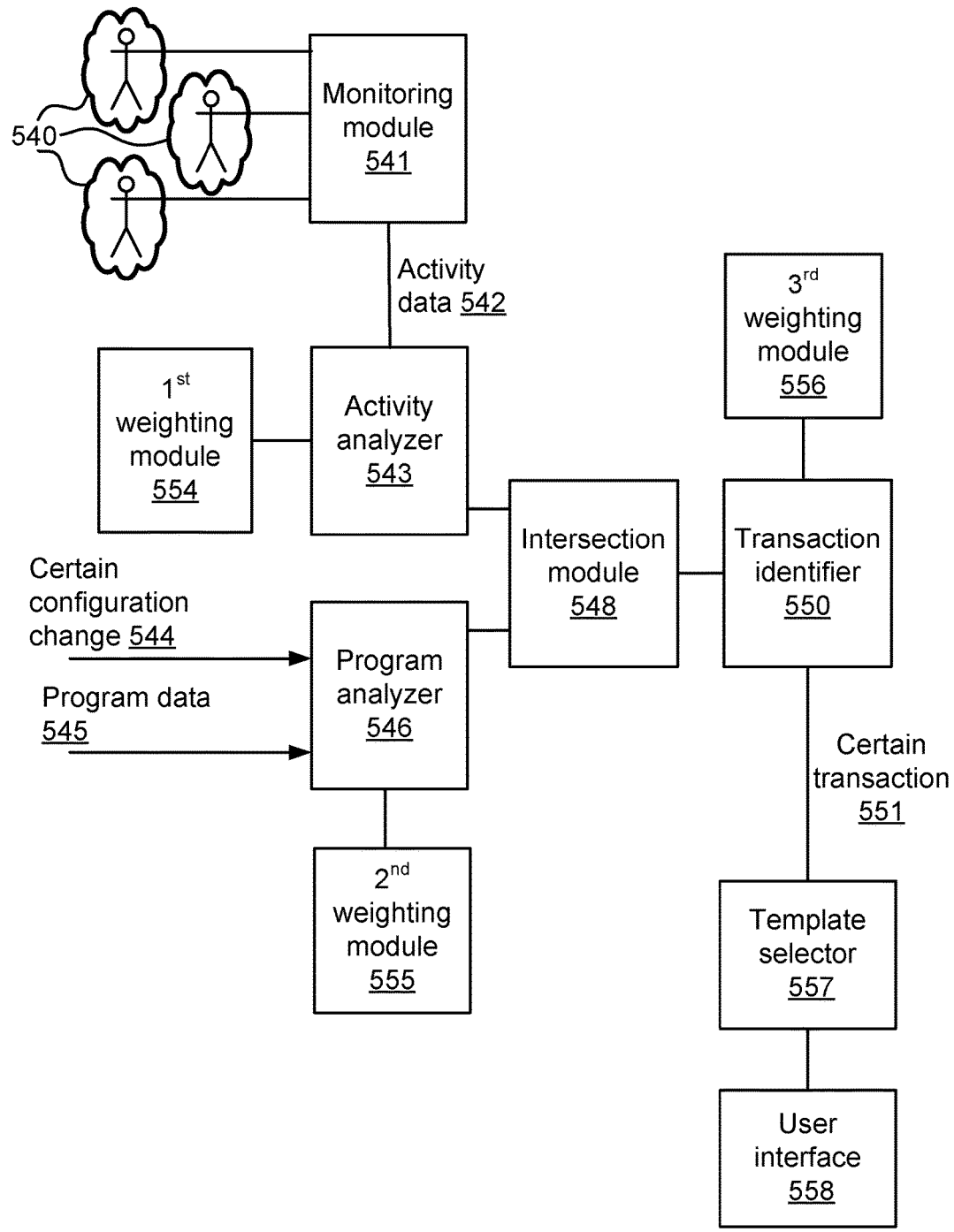
FIG. 52 illustrates one embodiment of a computer system configured to identify a certain transaction likely to be impacted by a certain configuration change.
Figure 53:
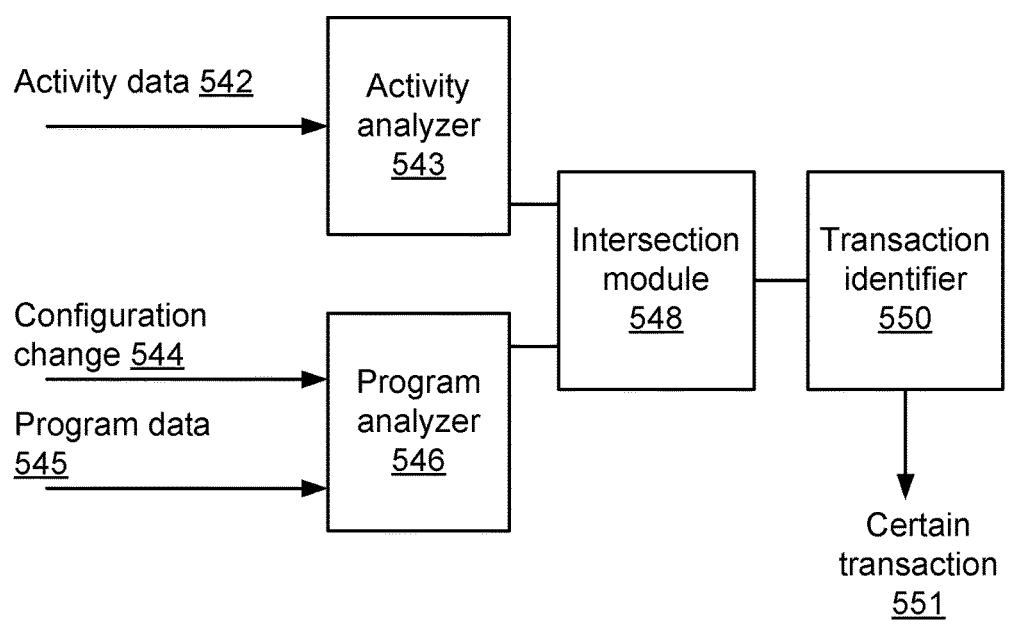
FIG. 53 illustrates one embodiment of a computer system configured to identify a certain transaction likely to be impacted by a certain configuration change.

FIG. 52 and FIG. 53 illustrate embodiments of a computer system configured to identify a certain transaction likely to be impacted by a certain configuration change. The illustrated embodiments include at least an activity analyzer 543, a program analyzer 546, an intersection module 548, and a transaction identifier 550.

The activity analyzer 543 is configured to receive activity data 542 obtained by monitoring activity of users 540 belonging to different organizations. The activity of the users involvers operating software systems associated with the different organizations. Optionally, the activity data 542 includes runs of test scenarios. Optionally, some of the test scenarios were run to test impact of configuration changes on the software systems.

In one embodiment, the software systems enable identification of at least some of the transactions executed on the software systems. For example, a log-keeping procedure may record identifying information regarding transactions performed by a user. Additionally, at least some of the code elements executed by interaction with the system are identifiable. For example, at least some of the code elements involve are run using an interpreter and/or a system that enables association between binary code and/or byte code run on the system and native "high-level" code. In one example, the system may provide access to debug information In one example, the software systems belonging to the different organizations are SAP ERP systems. Optionally, configurations involve database tables, and configuration changes may involve changes to entries and/or attributes in database tables. Monitoring the users involves monitoring of the executed transactions (e.g., queries and returned values).

In another example, the software systems belonging to the different organizations are Oracle ERP systems. Optionally, configuration changes involve customization code and monitoring the users involves monitoring executed procedures.

In still another example, the software systems belonging to the different organizations run Java Virtual Machines (JVM). The JVMs enable associations at run-time between Java code and transactions executed on the systems.

The activity analyzer 543 is also configured to identify, based on the activity data 542, a first set of code elements associated with transactions; each code element in the first set is referred to in activity data of users belonging to at least two different organizations. That is, for each code element in the first set, there are at least two users, each user from a different organization, for which their respective activity data includes an indication that the code element was executed. For example, there is a mentioning in a log file that a certain transaction was run (where the transaction is known to include the code element), or the activity data includes a result that is generated by the code element.

In one embodiment, the activity data 542 includes a list of business processes and/or transactions executed by the users 540. In one example, the business process and/or transactions may be identified according to their names, identifier codes, and/or descriptions (e.g., a list of fields in a screen involved in a transaction). In another example, the activity data 542 may indicate that a certain group of transactions was executed; e.g., by mentioning that a certain protocol was tested (e.g., adding and removing an employee), it may be inferred that all the transactions involved in the protocol were executed. Optionally, the activity data 542 may include indications of code executed by the users 540. For example, the indications may be in the form of names of programs, portions of code, hash values of code, and/or outputs that are typically generated by certain code (and thus may indicate that the certain code was executed). Optionally, the activity data 542 includes data that enables synchronization. For example, the activity data may include time stamps and/or program counters (indicating a position in code).

Based on the activity data 542, the activity analyzer 543 can pair between transaction executed by a user at a certain time and corresponding code elements executed at the time.

In one example, the activity data 542 indicates a transaction by name that was executed by a user. The activity analyzer 543 receives (as part of the activity data 542 and/or from another source) code corresponding to the transaction, and from the code, is able to identify code elements to be associated with the transaction. Optionally, a single code element is associated with each transaction. Alternatively, multiple code elements may be associated with a transaction (e.g., each function executed in a transaction is associated with a different code element). Additionally or alternatively, a single code element may be associated with multiple different transactions. For example, a code element corresponding to a certain function may be associated with each different transaction that involves running the certain function.

In one embodiment, the activity analyzer 543 generates data indicative of associations between transactions and the code elements. In one example, the data that associates between transactions and the code elements includes a record for each code element indicating transactions associated with it. In another example, the data that associates transactions and the code elements includes a record for each transaction indicating code elements associated with it. Optionally, code elements may be identified by their actual code, by identifiers (e.g., path and/or file name, function name), and/or by hash values of their code.

In one embodiment, the code elements are include data of at least one of the following types: procedures without specific invocations, classes without specific invocations, database triggers, stored procedures, screens, and tables in a database.

The program analyzer 546 is configured to receive the certain configuration change 544 and program data 545 (also referred to as program code 545) that includes a description of at least one of the following: procedure invocations, user interface statements, and database access statements. Optionally, the program data 545 is received from the monitoring module Optionally, the certain configuration element 544 relates to a software system belonging to a different organization than organizations to which software systems related to the program code 545 belong. Alternatively, the certain configuration change 544 may related to a software system to which some of the program data 545 belongs.

In one embodiment, procedure invocation may include any call to a function, procedure and/or program by a calling program. Optionally, a description of the procedure invocation may include an invocation statement that includes information such as the name of the procedure and/or arguments provided for an invocation of the procedure (e.g., values placed on a memory stack to be utilized by the procedure). Additionally or alternatively, a description of the procedure invocation may include code corresponding to the procedure, such as code to be executed by the invoked procedure.

In one embodiment, user interface statements may include any commands and/or programs that result in retrieval, generation, and/or presentation of data to a user via a user interface. Additionally or alternatively, user interface statements may include any commands and/or programs that result in receiving, recording and/or processing of data provided by a user to a system via a user interface. Additionally or alternatively, user interface statements may include data provided by a user to a system via the user interface and/or any data provided by a system to a user via the user interface. Optionally, a description of user interface statements may include the statements in a similar format to a format in which they are provided to a computer system and/or received from the computer system. Optionally, a description of user interface statements may include a summary of the statements and/or certain information extracted from the statements. Optionally, the user interface may include one or more apparatuses that may receive information from a user, such as a keyboard, touch screen, mouse, microphone, motion tracking apparatus, and/or eye tracking apparatus. Additionally or alternatively, the user interface may include one or more apparatuses that may provide information to a user, such as a screen, an augmented and/or virtual reality display, speaker, printer, and/or a haptic feedback device.

In one embodiment, database access statements may include commands and/or programs that result in reading data from a database, writing data to a database, and/or modification of data in a database. Additionally or alternatively, database access statements may include commands and/or programs that change attributes of a database, such as altering columns in a database and/or changing access permissions to certain data in a database. In one example, database access statements may include SQL statements that operate on one or more tables in a database. In another example, database access statements may include CGI scripts that cause a system to retrieve data from a database. Optionally, a description of database access statements may include the statements in a similar format to a format in which they are provided to a computer system and/or received from it. Optionally, a description of database access statements may include a summary of the statements and/or certain information extracted from the statements.

The program analyzer 546 is also configured to identify, based on the program data 545, a second set of code elements that are influenced by the certain configuration change 544. Optionally, the program data 545 includes data related to multiple software systems that may belong to one or more different organizations. Optionally, the program analyzer 546 is configured to receive as input the certain configuration change 544 and program data 545 that includes code of a software system, and to perform static analysis in order to identify the second set of code elements. Optionally, the static analysis determines a change in the behavior of the software system as a result of the certain configuration change 544.

Determining which code elements may be influenced by a certain configuration change may be done using various computational approaches. In some embodiments, static analysis methods may be utilized by the program analyzer 546 in order to identify the second set of code elements that may be influenced by configuration changes.

In one embodiment, a code element may be said to be influenced by a configuration change if due to the configuration change, the code element is executed differently on a software system. Optionally, the configuration change involves a certain configuration element whose associated value has changed. Optionally, if an execution of the code element after the configuration change is different than a previous execution of the code element, which took place when the certain configuration element had a different value, then the code element may be considered to be influenced by the configuration change Optionally, substantial differences, between the execution of the code and the previous execution of the code, are due to the configuration change. For example, in both executions the same input values are provided by a user to a system executing the code element, however, due to the configuration change, the outcomes were different.

In one embodiment, two executions of a code element may be considered different if they follow a different control path, i.e., there is a certain command that is executed in one execution that was not executed in the other. Optionally, two executions of a code element may be considered different if they generate different values, i.e., there is a certain value generated in one execution which was not generated in the other.

There are several approaches that may be utilized by one skilled in the art for performing static analysis in order to identify code elements that may be influenced by a configuration change. In one embodiment, data flow analysis is used to detect certain code elements that may be affected by a configuration change. For example, according to the data flow analysis it may be determined that a configuration element whose value has changed may be utilized at some point, or under certain conditions, by a code element. Consequently, the program analyzer 546 may determine that the configuration element and/or a configuration change that changes a value associated with the configuration element, may influence the code element. In another embodiment, control flow analysis may be utilized to detect certain code elements that may be affected by certain configuration changes. For example, flow analysis of code may reveal that a configuration change, which involves a new value to a configuration element, may affect the program in certain ways; for example, causing the program to access the new value may cause certain new statements to be executed. Thus, the program analyzer 546 may determine, based on the flow analysis, that the configuration change influences code elements corresponding to the certain statements. Additional details and examples of the use of static analysis for determining impact of configuration changes may be found in Dor et al. "Customization change impact analysis for ERP professionals via program slicing", in the Proceedings of the 2008 international symposium on Software testing and analysis, ACM, 2008.

In some embodiments, the program analyzer 546 identifies multiple code elements that may be influenced by the certain configuration change 544. For example, by using static and/or dynamic analysis methods the program analyzer 546 may generate a large list of code elements that may to varying degrees be influenced by the certain configuration change 544. The list may need to undergo additional refinement, e.g., by external software and/or human experts in order to select a subset of code elements that are influenced by the certain configuration change 544.

In some embodiments, the amount of program data 545 may be very large and/or the number of configuration changes and/or the number of configuration elements involved in the configuration changes may be large. Analyzing the entire body of program code 545 with respect to the configuration changes may be prohibitive. Therefore, in some cases, the program analyzer 546 may perform analysis primarily of a subset of the program code 545 and/or consider a subset of the configuration changes.

In one example, the program analyzer 546 may focus a relatively larger portion of the analysis effort towards configuration elements corresponding to the certain configuration change 544. This may be done as opposed to investing essentially similar efforts towards configuration elements that have not changed. Optionally, based on determining which configuration elements have associated values that have changed (e.g., they are involved in the certain configuration change 544), the program analyzer 546 can determine which subsets of the program code 545 are likely to be affected by the certain configuration change 544, and perform analysis primarily on the subsets of code.

In another example, the program analyzer 546 receives a certain field of operation of a certain organization (e.g., the field of operation may be banking or automotive industry). Based on the field of operation, the program analyzer 546 may determine a subset of the code elements that are typically used by organizations that are in the same field. The program analyzer 546 may then focus analysis efforts more on the subset of the code.

In one embodiment, the program analyzer 546 generates data that associates between the certain configuration change 544 and code elements influenced by it. In one example, data that associates between configuration changes and code elements includes a record for each code element indicating configuration changes that influence it. In another example, data that associates between configuration changes and code elements includes a record for each configuration change indicating code influenced by it. Optionally, code elements may be identified by their actual code, by identifiers (e.g., path and/or file name, function name), and/or by hash values of their code.

The intersection module 548 is configured to calculate an intersection between the first set of code elements and the second set of code elements. Optionally, the intersection is computed explicitly. For example, the code elements in the first set are compared to the code elements in the second set, and code elements common to both sets are placed in the intersection. In another example, the intersection is calculated by comparing identifiers and/or hash values of the code elements in the first and second sets. Optionally, the intersection module 548 receives data that associates between the certain configuration change 544 and code elements influenced by it and/or data indicative of associations between transactions and the code elements.

In one embodiment, an intersection between the first and second sets of code elements is computed as needed. For example, given a code element in the first set, the second set may be examined in order to determine whether the code element also appears in it. In one example, code elements are identified by identifiers and/or hash values of the code elements; thus, looking up a certain code element in one of the sets may be done efficiently.

The transaction identifier 550 is configured to identify the certain transaction 551 likely to be impacted by the certain configuration change based on a common code element belonging to the intersection. Optionally, the common code element is a code element that is associated with the certain transaction 551, based on analysis of the activity analyzer 543. Additionally, the common code element is influenced by the certain configuration change 544, according to analysis of the program analyzer 546. Thus, based on the common code element, it may be inferred that the certain transaction 551 is likely to be influenced by the certain configuration change 544.

In one embodiment, the intersection module 548 and transaction identifier 550 are realized by the same software module. For example, the intersection may be computed implicitly by the transaction identifier 550 according to data received from the activity analyzer 543 and/or the program analyzer 546; the transaction identifier 550 may generate a list of transactions likely to be influenced by the certain configuration 544 (e.g., a list of widely used transactions), and further refine the list based on information related to common code elements received from the activity analyzer 543 and/or the program analyzer 546.

In one embodiment, the computer system optionally includes a monitoring module 541 configured to monitor the activity of the users 540 belonging to the different organizations and to provide the activity data 542 obtained from the monitoring to the activity analyzer 543.

In one embodiment, the computer system optionally includes a template selector 557. The template selector 557 is configured to receive the transaction 551 and to select a test scenario template suitable for testing the certain transaction 551. Optionally, the selection by the template selector 557 may be based on weight assigned to code elements belonging to the first set, the second set, and/or the intersection. Optionally, the weight is assigned to the code element by a first weighting module 554, a second weighting module 555, and/or a third weighting module 556. For example, the template selector 557 may a template which includes a code element that receives a high weight.

In one embodiment, the template selector 557 selects the test scenario template suitable for testing the certain transaction 551 from among templates generated from the activity data 542. Optionally, the templates are generated from runs of test scenarios identified from the activity data 542. Optionally, the runs are clustered into clusters of similar runs, and each template is generated from one or more runs belonging to a same cluster. Optionally, the selection of the template at least in part on the number of different users and/or different organizations associated with runs belonging to the clusters.

In one embodiment, the computer system optionally includes a first weighting module 554 that is configured to weight code elements in the first set according to a number of users monitored while having an interaction with the code element as part of a transaction (e.g., users that ran a class, accessed a screen, or updated a database). The larger the number of users having an interaction with a code element, the higher the weight of the code element when used to identify the certain transaction likely to be impacted by the certain configuration change Optionally, a large weight of a code element may indicate that the code element is widely used by many users, and thus is likely to be relevant to other users.

In one embodiment, the first weighting module 554 is configured to weight code elements in the first set according to a number of different organizations associated with the code elements. An organization may be considered associated with a code element, if a user belonging to the organization interacts with the code element on a system belonging to the organization. The larger the number of different organizations associated a code element, the higher the weight of the code element when used to identify the certain transaction likely to be impacted by the certain configuration change Optionally, a large weight of a code element may indicate that the code element is widely used by many organizations, and thus is likely to be relevant to other organizations.

In one embodiment, the first weighting module 554 may be implemented as part of the activity analyzer 543, the intersection module 548, and/or the transaction identifier 550. For example, the first weighting module 554 is a software module that is part of software modules utilized by the activity analyzer 543, the intersection module 548, and/or the transaction identifier 550. Optionally, the code elements of the first set may be filtered according weights assigned by the first weighting module 554. For example, code elements that have a weight below a predetermined threshold are not considered by the intersection module 548.

In one embodiment, the computer system optionally includes a second weighting module 555 configured to weight code elements in the second set according to number of different organizations associated with the code elements. Optionally, an organization may be considered associated with a code element, if program data associated with the organization includes the code element. The larger the number of different organizations associated a code element, the higher the weight of the code element when used to identify the certain transaction likely to be impacted by the certain configuration change Optionally, a large weight of a code element may indicate that the code element is widely used by many organizations, and thus is likely to be relevant to other organizations. Optionally, the second weighting module 555 may be implemented as part of the program analyzer 546, the intersection module 548, and/or the transaction identifier 550. For example, the second weighting module 555 is a software module that is part of software modules utilized by the program analyzer 546, the intersection module 548, and/or the transaction identifier 550. Optionally, the code elements of the second set may be filtered according weights assigned by the second weighting module 555. For example, code elements that have a weight below a predetermined threshold are not considered by the intersection module 548.

In one embodiment, the computer system optionally includes a third weighting module 556 that is configured to weight code elements belonging to the intersection based on at least one of weights of code elements in the first set and weights of code elements in the second set. Optionally, the weight assigned to a code element belonging to the intersection is a function of a first weight assigned to the code element by the first weighting module 554 and/or a second weight assigned to the code element by the second weighting module 555. For example, the weight of the code element may be the sum of the first and second weights. In another example, the weight of the code element is the maximum of the first and second weights. Optionally, the third weighting module 556 may be implemented as part of the intersection module 548 and/or the transaction identifier 550. For example, the third weighting module 556 is a software module that is part of software modules utilized by the intersection module 548 and/or the transaction identifier 550.

In one embodiment, a business process includes at least two transactions, and the activity analyzer 543 is configured to identify, based on the activity data 542, a first set of code elements associated with the business processes. Additionally, transaction identifier 550 may identify a certain business process that is likely to be impacted by the certain configuration change 544.

Figure 54:
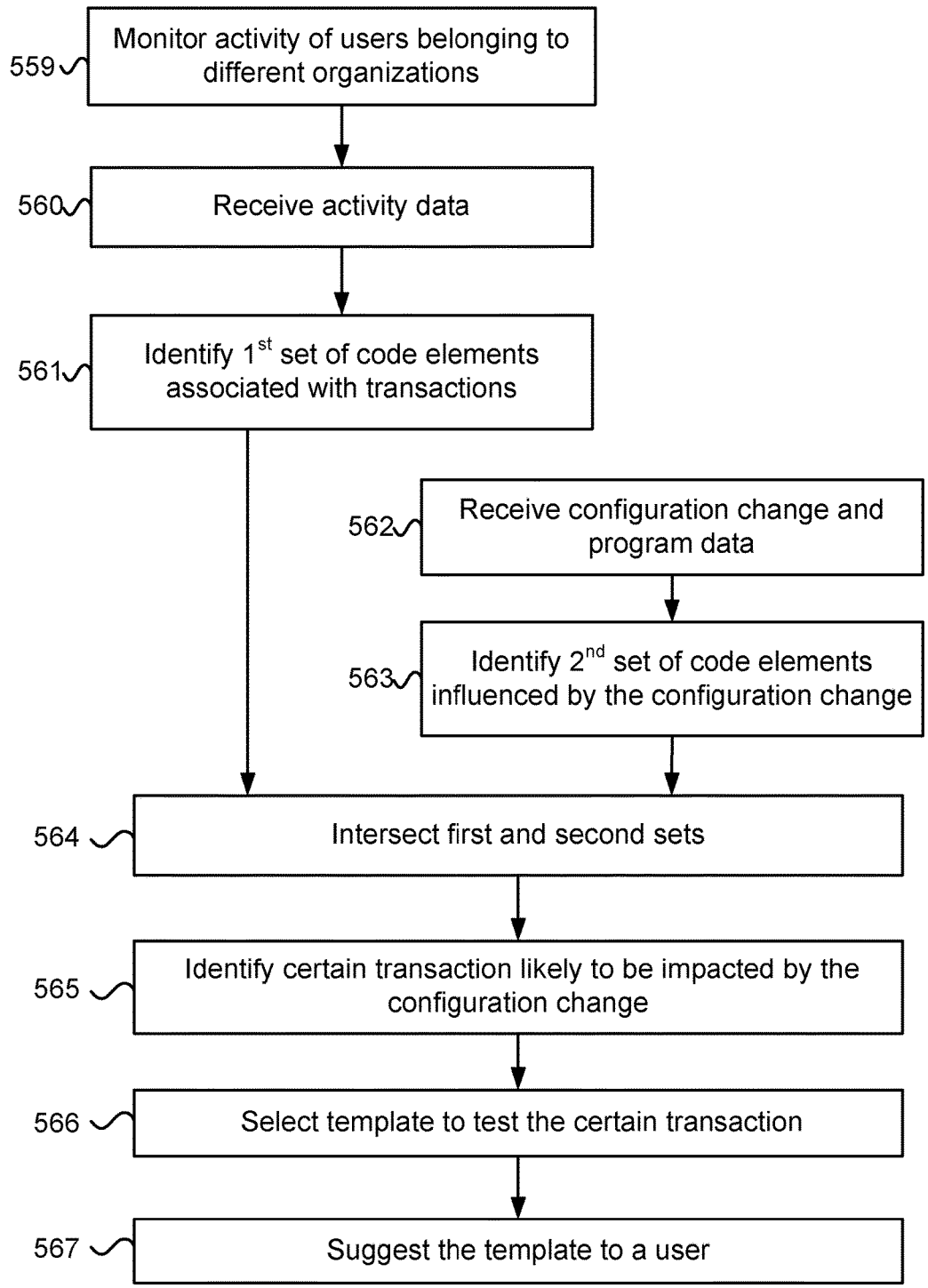
FIG. 54 illustrates one embodiment of a computer implemented method for identifying a certain transaction likely to be impacted by a certain configuration change.

FIG. 54 illustrates one embodiment of a computer implemented method for identifying a certain transaction likely to be impacted by a certain configuration change. The illustrated embodiment includes the following steps:

In step 560, receiving activity data of users belonging to different organizations. The users operate software systems associated with the different organizations, and at least part of the activity data is related to the operation of the software systems by the users. Optionally, the software systems enable identification of at least some of the transactions executed on the software systems. Additionally, at least some code elements executed by interaction with the system are identifiable. For example, at least some of the code elements involve are run using an interpreter and/or a system that enables association between binary code and/or byte code run on the system and native "high-level" code.

In step 561, identifying, based on the activity data, a first set of code elements associated with transactions. Each code element in the first set is referred to in activity data of users belonging to at least two different organizations.

In step 562, receiving the certain configuration change and program data that includes a description of at least one of the following: procedure invocations, user interface statements, and database access statements.

In step 563, identifying, based on the program data, a second set of code elements that are influenced by the certain configuration change.

In one embodiment, the first and second sets of code elements comprise code elements of at least one of the following types: procedures without specific invocations, classes without specific invocations, database triggers, stored procedures, screens, and tables in a database.

In one embodiment, the identifying of the second set of code elements involves running static analysis on the certain configuration change and code of a software system. Optionally, the static analysis determines a change in the behavior of the software system as a result of the certain configuration change.

In step 564, intersecting between the first set of code elements and the second set of code elements, And in step 565, identifying the certain transaction likely to be impacted by the certain configuration change based on a common code element belonging to the intersection.

In one embodiment, the computer implemented method illustrated in FIG. 54 includes an optional step of weighting code elements in the first set according to number of different organizations associated with the code elements. Optionally, an organization is associated with a code element, if a user belonging to the organization executed the code element on a system belonging to the organization. Optionally, the larger the number of different organizations associated with a code element, the higher the weight of the code element for the identifying of the certain transaction impacted by the certain configuration change.

In another embodiment, the computer implemented method illustrated in FIG. 54 includes an optional step of weighting code elements in the first set according to number of users monitored having an interaction with the code elements as part of transactions. The larger the number of users having the interaction with the code elements, the higher the weight of the code element for the identifying of the certain transaction impacted by the certain configuration change.

In yet another embodiment, the computer implemented method illustrated in FIG. 54 includes an optional step of weighting code elements in the second set according to number of different organizations associated with the code elements. Optionally, an organization is associated with a code element, if program data associated with the organization includes the code element. The larger the number of different organizations associated a code element, the higher the weight of the code element for the identifying of the certain transaction impacted by the certain configuration change.

In still another embodiment, the computer implemented method illustrated in FIG. 54 includes an optional step of weighting code elements belonging to the intersection based on at least one of weights weight code elements in the first set and weights of code elements in the second set.

In one embodiment, the computer implemented method includes optional step 566 which involves selecting a test scenario template suitable for testing the at least one of the transactions. Additionally, the computer implemented method may include optional step 567 which involves suggesting to a user to run the selected test scenario template.

In one embodiment, the computer implemented method includes optional step 559 which involves monitoring the activity of the users belonging to the different organizations in order to obtain the activity data.

In one embodiment, a non-transitory computer-readable medium stores program code that may be used by a computer to identify a certain transaction impacted by a certain configuration change. The computer includes a processor, and the non-transitory computer-readable medium stores the following program code:

Program code for receiving activity data of users belonging to different organizations; the users operate software systems associated with the different organizations.

Program code for identifying, based on the activity data, a first set of code elements associated with transactions; each code element in the first set is referred to in activity data of users belonging to at least two different organizations.

Program code for receiving the certain configuration change and program data includes a description of at least one of the following: procedure invocations, user interface statements, and database access statements.

Program code for identifying, based on the program data, a second set of code elements that are influenced by the certain configuration change.

Program code for intersecting between the first set of code elements and the second set of code elements.

And program code for identifying the certain transaction impacted by the certain configuration change based on a common code element belonging to the intersection.

In one embodiment, the non-transitory computer-readable medium optionally stores program code for weighting code elements in the first set according to number of different organizations associated with the code elements. An organization may be considered associated with a code element, if a user belonging to the organization executed the code element on a system belonging to the organization. Optionally, the larger the number of different organizations associated with a code element, the higher the weight of the code element for the identifying of the certain transaction impacted by the certain configuration change.

In one embodiment, the non-transitory computer-readable medium optionally stores program code for weighting code elements in the first set according to number of users monitored while having an interaction with the code elements as part of transactions. Optionally, the larger the number of users having the interaction with the code elements, the higher the weight of the code element for the identifying of the certain transaction impacted by the certain configuration change.

In one embodiment, the non-transitory computer-readable medium optionally stores program code for weighting code elements in the second set according to number of different organizations associated with the code elements. An organization may be associated with a code element, if program data associated with the organization comprises the code element. Optionally, the larger the number of different organizations associated a code element, the higher the weight of the code element for the identifying of the certain transaction impacted by the certain configuration change.

In one embodiment, the non-transitory computer-readable medium optionally stores program code for weighting code elements belonging to the intersection based on at least one of weights weight code elements in the first set and weights of code elements in the second set.

In one embodiment, the non-transitory computer-readable medium optionally stores program code for selecting a test scenario template suitable for testing the at least one of the transactions, and program code for suggesting to a user to run the selected test scenario template.

In one embodiment, the non-transitory computer-readable medium optionally stores program code for monitoring the activity of the users belonging to the different organizations in order to obtain the activity data.

Figure 55:
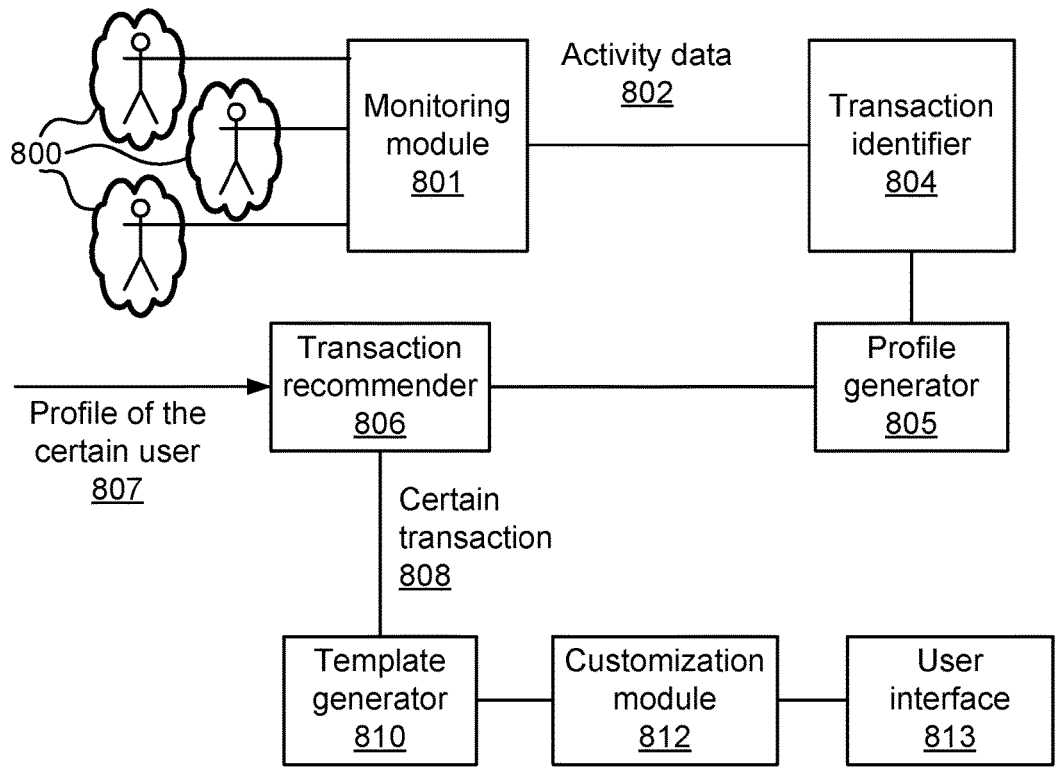
FIG. 55 illustrates one embodiment of a computer system configured to select a transaction for a certain user based on similarity of a profile of the certain user to profiles of users belonging to different organizations.

FIG. 55 illustrates one embodiment of a computer system configured to select a transaction for a certain user based on similarity of a profile of the certain user to profiles of users belonging to different organizations. The illustrated embodiment includes at least a transaction identifier 804, a profile generator 805, and a transaction recommender 806.

The transaction identifier 804 is configured receive activity data 802 obtained by monitoring activity of the users on software systems belonging to the different organizations. Optionally, the activity data 802 is obtained from monitoring the users 800. The transaction identifier 804 is also configure to identify from the activity data 802 transactions that are run by the users. Optionally, the transactions are run as part of tests. Optionally, the transaction identifier 804 also identifies possible values that may be used by the transactions. Optionally, the users belong to the different organizations, i.e., each user belongs to an organization of the different organizations.

The profile generator 805 is configured to generate profiles of the users based on the transactions. Optionally, each profile of a user indicates transactions executed by the user. Optionally, an indication of the transactions in the profile of the user may be direct. For example, the profile of the user includes identifiers of transactions and/or includes the transactions themselves (e.g., commands or code of the transactions). Optionally, the indication of transactions in the profile of the user may be indirect. For example, the profile may list test scenarios and/or templates utilized by the user. Optionally, the test scenarios and/or templates may be known to involve certain transactions. For example, a description of a test scenario and/or template may include a description of transactions that are to be executed when running the test scenario and/or running an instantiation of the template.

The transaction recommender 806 is configured to receive a profile 807 of the certain user. The transaction recommender 806 is also configured to select, based on at least some of the profiles of the users and the profile 807 of the certain user, a certain transaction 808 from among transactions that are indicated in the profiles of the users, which is appropriate for the certain user. Optionally, the certain user belongs to a certain organization that is not one of the different organizations. Optionally, the certain transaction 808 is indicated in a profile of at least one user with a similar profile to the profile 807 of the certain user. Additionally or alternatively, the certain transaction 808 was executed by at least one user with a similar profile to the profile 807 of the certain user.

In one embodiment, the certain transaction 808 was not executed by the certain user and/or does not appear in the profile 807 of the certain user. Optionally, the certain transaction 808 was not executed by a user belonging to the certain organization and/or does not appear in a profile of a user belonging to the certain organization.

In one embodiment, the profile 807 of the certain user indicates transactions executed by the certain user. Additionally or alternatively, the profile 807 may indicate runs of test scenarios run by the certain user, clusters of runs, and/or templates which were utilized by the certain user (e.g., the certain user ran instantiations of the template). By comparing the profile of the certain user to profiles of the users, it is possible to identify profiles of users that are similar to the profile 807 of the certain user. For example, at least some of the transactions executed by the certain user were also executed by users that have similar profiles to the profile 807 of the certain user.

In one embodiment, the profile 807 is generated by the profile generator 805. Optionally, the profile 807 is generated based on activity data of the certain user that is provided to the transaction identifier 804.

In one embodiment, both the profiles of the users and the profile 807 of the certain user may contain the same type of data. For example, both the profiles of the users and the profile 807 of the certain user may contain indications of transaction that were executed (e.g., by listing identifiers of the transactions and/or commands that execute the transactions). In such a case, a comparison between profiles may be straightforward. For example, counting the number and/or proportion of transactions that are common to two profiles. In another example, having the same type of data in the profiles makes it easy to convert them to vectors in the similar space, and then to utilize similarity functions that may be applied to vectors (e.g., vector dot-product or Pearson correlation).

In one embodiment, the profiles of the users and the profile 807 of the certain user may contain different types of data. Thus, comparing between a profile of a user and a profile 807 of the certain user may require additional actions that convert a representation of a profile that uses one type of data to a representation using another type of data. In one example, the profile 807 of the certain user may include templates of test scenarios run by the certain user and the profiles of the users may include indications of transactions executed by the users. In such a case, it may be necessary to determine which transactions are involved when running instantiations of the templates listed in the profile 807 in order to be able to compare the profile 807 with the profiles of the users.

In one embodiment, the certain user is a generic user of the certain organization. For example, the profile 807 of the certain user may indicate transactions executed by one or more users from the certain organization. Additionally or alternatively, the profile 807 may list transactions suggested to be utilized by users of the certain organization. Optionally, the computer system may utilize collaborative filtering to suggest additional transactions that may be utilized by users of the certain organization.

There are several ways in which the transaction recommender 806 can utilize the profiles of the users and the profile 807 of the certain user in order to select the certain transaction 808. One approach that may be used by the transaction recommender 806 is to find profiles among the profiles of the users that are similar to the profile 807, and to select the certain transaction 808 based on transactions indicated by the similar profiles. In one example, if a profile of a user that is similar to the profile 807 lists transactions executed by the user, then the certain transaction 808 may be one of the listed transactions. In another example, if a profile of a user that is similar to the profile 807 lists templates utilized by the user, then the certain transaction 808 may be a transactions executed when running an instantiation of one of the listed templates.

In one example, the transaction recommender 806 identifies transactions that are indicated in at least one profile of a user that is similar to the profile 807. From amongst the transactions, the transaction recommender 806 may select the certain transaction 808 based on the number of different users that executed the transactions. For example, the certain transaction 808 may be a transaction that is indicated as executed in at least one profile of a user that is similar to the profile 807 and is a transaction that was executed by a largest number of users. That is, there is no other transaction that was executed by a larger number of users which is also indicated as executed in a profile that is similar to the profile 807. Optionally, the fact that the certain transaction 808 was executed by many users is indicative of the fact that it is likely to be a transaction that may be utilized by the certain user.

In another example, the transaction recommender 806 identifies transactions that are indicated in at least one profile of a user that is similar to the profile 807; from amongst the transactions, the transaction recommender 806 may select the certain transaction 808 based on the number of different organizations that have users that executed the transactions. For example, the certain transaction 808 may be a transaction that is indicated as executed in at least one profile of a user that is similar to the profile 807 and is a transaction that was executed by users belonging to a largest number of organizations. That is, there is no other transaction that was executed by the users belonging to a larger number of organizations, which is also indicated as executed in a profile that is similar to the profile 807. Optionally, the fact that the certain transaction 808 was executed by users belonging to many organizations is indicative of the fact that it is likely to be a transaction that may be utilized by the certain user.

In yet another example, the transaction recommender 806 identifies profiles of users that are similar to the profile 807 of the certain user. For example, the profiles are embedded in a metric space, and the transaction recommender 806 finds profiles that are closest to the profile 807 in the metric space. From one or more profiles closest to the profile of the certain user, the transaction recommender 806 selects the certain transaction 808. Optionally, the certain transaction 808 has not been executed by the certain user (as indicated by the profile 807). Optionally, the certain transaction 808 is indicated as utilized in a profile that is most similar to the profile 807.

In one embodiment, the transaction recommender 806 utilizes a collaborative filtering algorithm, such as a memory-based algorithm, a model-based algorithm, or a hybrid approach. Optionally, the collaborative filtering algorithm selects the certain transaction 808 based on one or more profiles found by the collaborative filtering algorithm to be similar to the profile 807 of the certain user. Optionally, recommendations of the collaborative filtering algorithm are filtered to exclude transaction that have already been executed by the certain user.

In one embodiment, the transaction recommender 806 may select the certain transaction 808 by providing an identifier of the certain transaction 808 (e.g., a transaction identification number). Alternatively or additionally, selecting the certain transaction 808 is done by the transaction recommender 806 by providing one or more test scenarios and/or templates that involve the certain transaction 808. Optionally, the one or more test scenarios and/or templates may be used to test execution of the certain transaction.

In one embodiment, the computer system optionally includes a template generator 810, which is configured to generate a test scenario template that involves execution of the certain transaction 808. Optionally, the template generator 810 is configured to generate the test scenario template based on transactions executed by one or more users with similar profiles to the profile of the certain user. For example, the template may include several transactions that appear in a profile of a user that is similar to the profile 807.

The computer system may also optionally include a customization module 812 that is configured to customize the test scenario template for the certain user by adding to the test scenario template proprietary data relevant to the certain user. Optionally, at least some of the proprietary data is obtained from the profile 807. Additionally, the computer system may optionally include a user interface 813 configured to suggest to the certain user to run an instantiation of the test scenario template.

Figure 56:
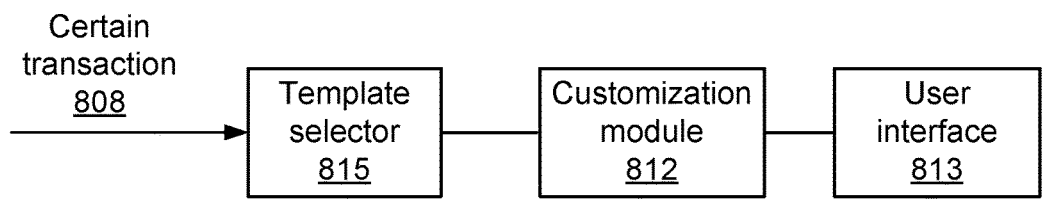
FIG. 56 illustrates one embodiment in which a transaction is provided to a template selector.

FIG. 56 illustrates one embodiment in which the certain transaction 808 is provided to a template selector 815. Optionally, the template selector is configured to select a test scenario template that involves execution of the certain transaction 808. Optionally, the test scenario template may be used to test whether the certain transaction 808 is executed correctly on a software system. Optionally, the test scenario template may be customized by the customization module 812 for the certain user by adding to the test scenario template proprietary data relevant to the certain user. Optionally, at least some of the proprietary data is obtained from the profile 807. Additionally, the template may be suggested to the certain user via the user interface 813.

In one embodiment, the computer system optionally includes the monitoring module 801 which is configured to monitor activity of the users 800. Optionally, the users 800 are running test scenarios on the software systems of the different organizations. Optionally, the monitoring module 801 is configured to provide data obtained from the activity data 802 to the transaction identifier 804.

It is to be noted that different embodiments may implement components of the computer system illustrated in FIG. 55 and/or FIG. 56 in different ways. For example, in some embodiments one or more of the following may be implemented by the same software module and/or software modules running on the same processor: the monitoring module 801, the transaction identifier 804, the profile generator 805, the transaction recommender 806, the template generator 810, the template selector 815, the customization module 812, and the user interface 813. Additionally, one or more of the aforementioned components may be implemented on a remote server, such as a cloud-based server.

Figure 57:
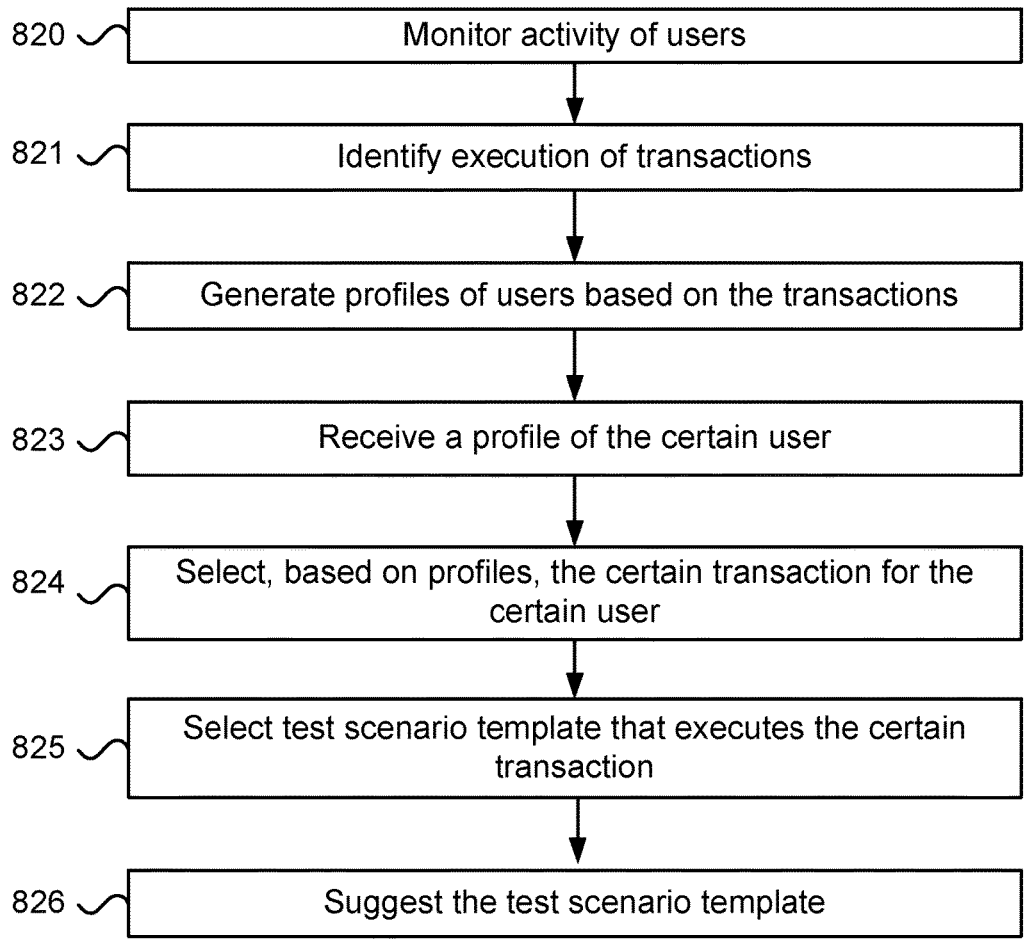
FIG. 57 illustrates one embodiment of a computer implemented method for selecting a transaction for a certain user based on similarity of a profile of the certain user to profiles of users belonging to different organizations.

FIG. 57 illustrates one embodiment of a computer implemented method for selecting a transaction for a certain user based on similarity of a profile of the certain user to profiles of users belonging to different organizations. The illustrated embodiment includes the following steps:

In step 821, receiving activity data obtained by monitoring activity of the users on software systems belonging to the different organizations.

In step 822, identifying transactions executed by the users on the software systems.

In step 823, generating profiles of the users based on the transactions; a profile of a user indicates transactions executed by the user.

In step 824, receiving a profile of the certain user; the certain user belongs to a certain organization that is not one of the different organizations. The profile of the certain user indicates transactions executed by the certain user on a software system belonging to the certain organization.

And in step 825 selecting, based on similarity of at least some of the profiles of the users to the profile of the certain user, a certain transaction. The certain transaction is a transaction that was executed by a user with a similar profile to the profile of the certain user. Optionally, the certain transaction was not executed by the certain user. Optionally, the certain transaction was not executed by a user belonging to the certain organization. Optionally, the certain transaction was executed by a user with a profile that is most similar, amongst the profiles of the users, to the profile of the certain user.

In one embodiment, selecting the certain transaction in step 825 is based on the number of different users that executed the transactions. For example, the certain transaction may be a transaction that is indicated as executed in at least one profile of a user that is similar to the profile of the certain user, and is a transaction that was executed by a largest number of users.

In another embodiment, selecting the certain transaction in step 825 is based on the number of different organizations with users that executed the transactions. For example, the certain transaction may be a transaction that is indicated as executed in at least one profile of a user that is similar to the profile of the certain user, and is a transaction that was executed by users belonging to a largest number of organizations.

In one embodiment, the computer method optionally includes step 820 that involves monitoring the activity of the users belonging to the different organizations and providing the activity data for the identifying of the transactions.

In one embodiment, the computer method illustrated in FIG. 57 optionally includes a step involving generating a test scenario template based on the certain transaction. Additionally, the computer method may optionally include a step involving generating the test scenario template based on transactions executed by one or more users with similar profiles to the profile of the certain user. Additionally, the computer method may optionally include a step involving customizing the test scenario template for the certain user by adding to the test scenario template proprietary data relevant to the certain user.

In one embodiment, the computer method optionally includes step 826 which involves selecting a test scenario template that involves execution of the certain transaction. Additionally, the computer method may optionally include step 827, which involves suggesting to the certain user to run an instantiation of the test scenario template.

In one embodiment, a non-transitory computer-readable medium stores program code that may be used by a computer to select a transaction for a certain user based on similarity of a profile of the certain user to profiles of users belonging to different organizations. The computer includes a processor, and the non-transitory computer-readable medium stores the following program code:

Program code for receiving activity data obtained by monitoring activity of the users on software systems belonging to the different organizations.

Program code for identifying transactions executed by the users on the software systems.

Program code for generating profiles of the users based on the transactions; a profile of a user indicates transactions executed by the user.

Program code for receiving a profile of the certain user; the certain user belongs to a certain organization that is not one of the different organizations. The profile of the certain user indicates transactions executed by the certain user on a software system belonging to the certain organization.

And program code for selecting, based on similarity of at least some of the profiles of the users to the profile of the certain user, a certain transaction; the certain transaction was executed by a user with a similar profile to the profile of the certain user. Optionally, the certain transaction was not executed by the certain user. Optionally, the certain transaction was not executed by a user belonging to the certain organization.

In one embodiment, the non-transitory computer-readable medium optionally stores program code for selecting the certain transaction based on number of different users that executed the transactions.

In one embodiment, the non-transitory computer-readable medium optionally stores program code for selecting the certain transaction based on number of different organizations with users that executed the transactions.

wherein the certain transaction was executed by a user with a profile that is most similar, amongst the profiles of the users, to the profile of the certain user.

In one embodiment, the non-transitory computer-readable medium optionally stores program code for monitoring the activity of the users belonging to the different organizations and providing the activity data for the identifying of the transactions.

In one embodiment, the non-transitory computer-readable medium optionally stores program code for generating a test scenario template based on the certain transaction. Additionally, the non-transitory computer-readable medium may optionally store program code for generating the test scenario template based on transactions executed by one or more users with similar profiles to the profile of the certain user. Additionally, the non-transitory computer-readable medium may optionally store program code for customizing the test scenario template for the certain user by adding to the test scenario template proprietary data relevant to the certain user.

In one embodiment, the non-transitory computer-readable medium optionally stores program code for selecting a test scenario template that comprises execution of the certain transaction. Additionally, the non-transitory computer-readable medium may optionally store program code for suggesting to the certain user to run an instantiation of the test scenario template.

Figure 58:
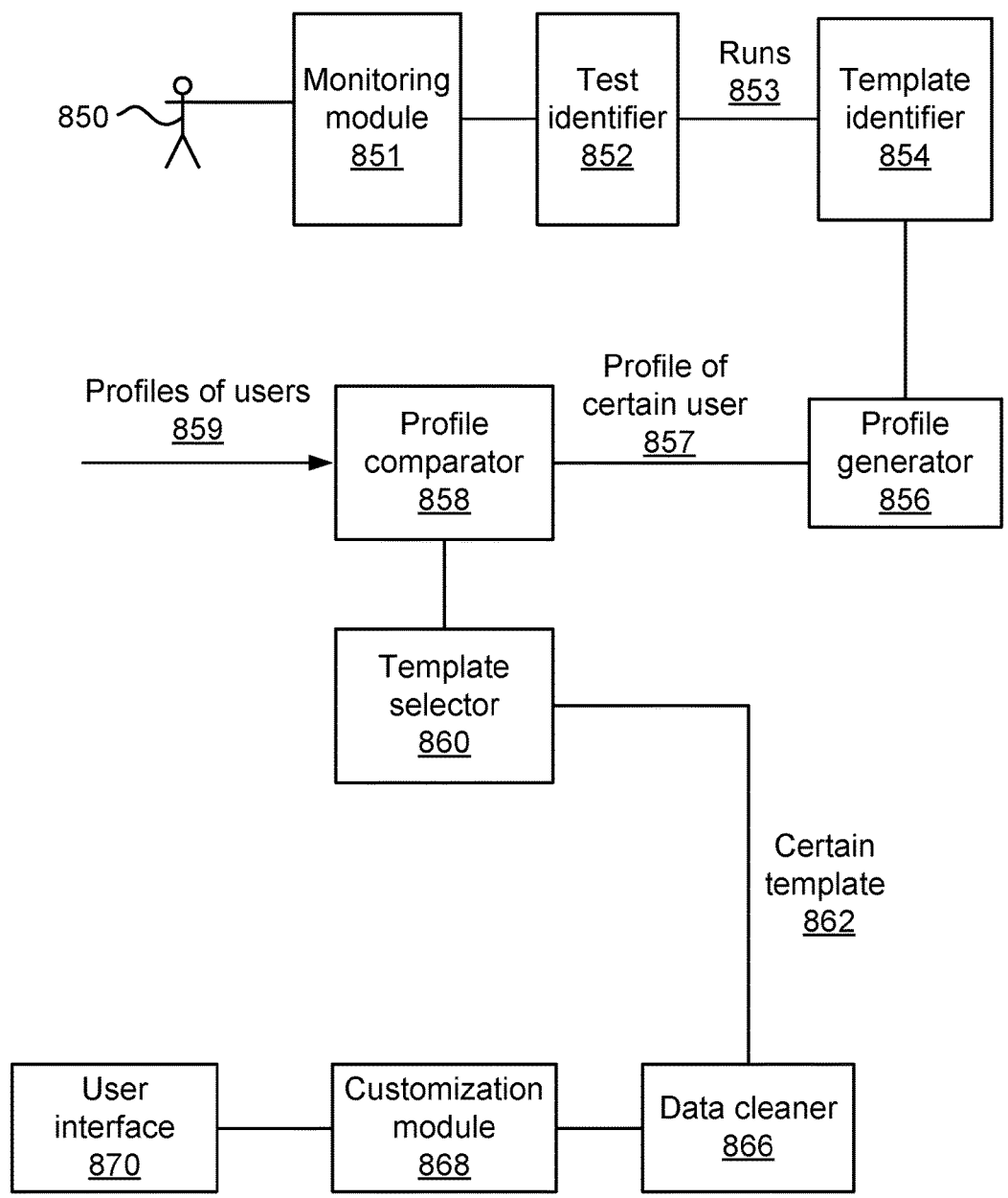
FIG. 58 illustrates one embodiment of a computer system configured to select a test scenario template for a certain user based on similarity of a profile of template utilization by the certain user to profiles of template utilization by other users.
Figure 59:
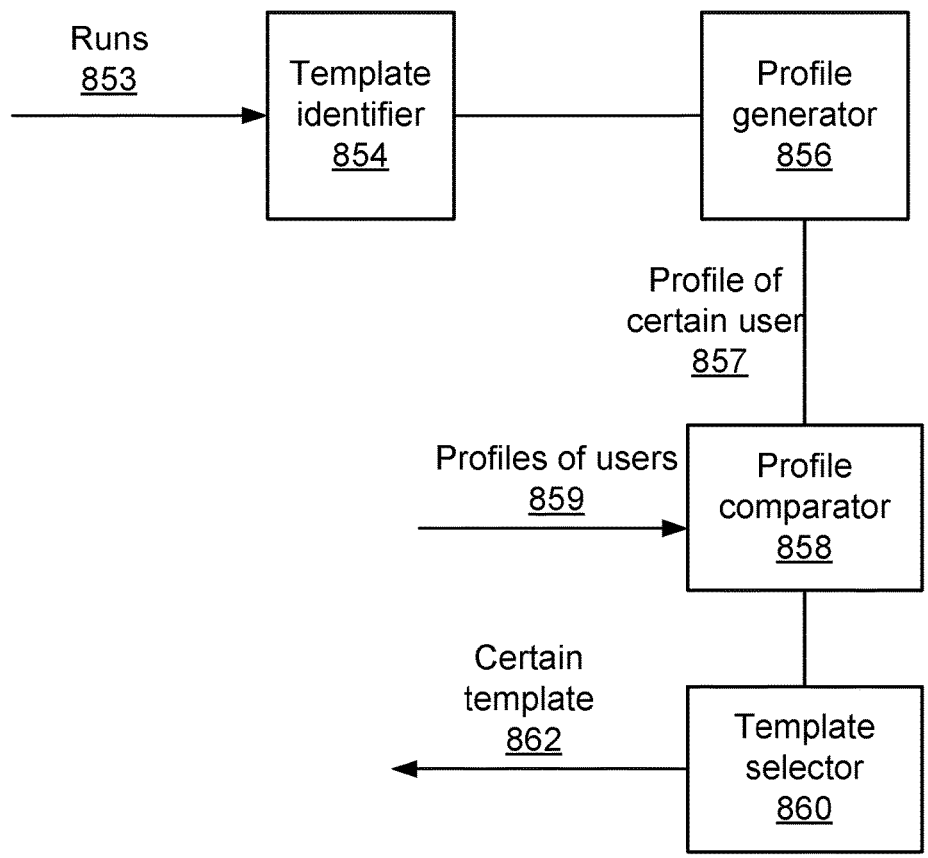
FIG. 59 illustrates one embodiment of a computer system configured to select a test scenario template for a certain user based on similarity of a profile of template utilization by the certain user to profiles of template utilization by other users.

FIG. 58 and FIG. 59 illustrate embodiments of a computer system configured to select a test scenario template for a certain user based on similarity of a profile of template utilization by the certain user to profiles of template utilization by other users. The illustrated embodiments include at least a template identifier 854, a profile generator 856, a profile comparator 858, and a template selector 860.

The template identifier 854 is configured to receive runs of test scenarios, run by a certain user belonging to a certain organization on a software system belonging to the certain organization. The template identifier 854 is also configured to identify, from the runs, test scenario templates utilized by the certain user. Optionally, a template may be considered utilized by a user if the user runs an instantiation of the template. For example, if the certain user ran an instantiation of a template on the software system belonging to the certain organization, the template may be considered to be utilized by the certain user. Optionally, the runs of the test scenarios may include scripts and/or commands from which the template identifier 854 may determine templates that correspond to the runs.

In one embodiment, the runs of the test scenarios include information that indicates for each run of a test scenario a template from which the test scenario was instantiated. For example, the run may include an identifier of the template and/or code corresponding to the template. The template identifier 854 utilizes the information to identify the templates utilizes by the certain user. For example, each template indicated in a run as being a template from which the run was instantiated is considered by the template identifier 854 to be a template utilized by the certain user.

In another embodiment, the runs of the test scenarios are associated with clusters of runs of test scenarios. For example, the runs that may be assigned to the clusters (e.g., by a clustering algorithm or by a classifier). Optionally, each of the clusters may be represented by at least one test scenario template. Thus, the test identifier 854 may utilize the cluster associations, along with identifications of templates that represent the clusters, in order to identify the templates utilized by the certain user. For example, a template utilized by the certain user may be a template representing a cluster to which a run of the certain user belongs.

In yet another embodiment, the runs of the test scenarios may be compared to various templates in order to identify templates that are similar to the runs. The test identifier 854 may utilize information regarding similarity of templates to runs in order to identify the templates utilized by the certain user. For example, the test identifier 854 may consider a template that has similarity to a run that exceeds a predetermined threshold to be utilized by the certain user. Optionally, in order to compare a run and template, the run is compared to another run instantiated from the template. Optionally, comparing a run to a template takes into account similar data in the run and the template. For example, a comparison between a run and a template may take into account field names that appeared in screens in the run and screens in the template, but the comparison may ignore user input that is recorded in the run which may not be part of the template.

The profile generator 856 is configured to generate a profile 857 of the certain user based on the test scenario templates. The profile 857 includes indications of test scenario templates utilized by the certain user. Thus, the profile 857 may be considered a profile of utilization of templates. Optionally, indications of the templates utilized by the certain user may be direct indications. For example, the profile 857 includes identifiers of templates and/or the templates themselves (e.g., code of the templates). Optionally, the indications of the templates utilized by the certain user may be indirect indications. For example, the profile may list runs of test scenarios instantiated from the templates.

The profile comparator 858 is configured to receive the profile 857 of the certain user and profiles 859 of users belonging to different organizations. Optionally, the certain organization is not one of the different organizations. Optionally, the profiles indications of test scenario templates utilized by the users. Optionally, the indications may be direct indications and/or indirect indications.

In one embodiment, the template identifier 854 may be utilized to identify templates from runs of test scenarios run by the users belonging to the different organizations on software systems belonging to the different organizations. Optionally, the runs of test scenarios may be included in the profiles 859. Additionally or alternatively, the profile generator 856 may be utilized, at least in part, to generate the profiles 859 of the users.

The profile comparator 858 is also configured to compare between the profile 857 of the certain user and the profiles 859 of the users, and to identify at least one profile of a user, from among the profiles 859, which is similar to the profile 857.

In some embodiments, determining whether two profiles are similar and/or degree of similarity of the two profiles requires comparison of templates belonging to each of the two profiles. The comparison may identify pairs of templates that are identical in the two profiles (e.g., a first template from a first profile that is identical to a second template from a second profile). Additionally, the comparison may involve identifying pairs of templates that are similar from the two profiles, and/or degree of similarity of pairs of templates from the two profiles. Determining identity and/or similarity of pairs of templates may be done in various ways.

In one example, two test scenario templates may be considered identical if they are identified by a same identifier (e.g., template identification number), contain the same code, involve the same screens, are based on the same script, are generated from the same runs of test scenarios and/or involve execution of the same transactions.

In one example, two test scenario templates may be considered similar if they involve similar elements. For example, the two templates contain similar elements such as similar code (e.g., they share a certain portion of code, but other portions are different), similar screens (e.g., screens that have some of the same fields), and/or involve execution of at least some of the same transactions. Optionally, similarity of two templates is computed by comparing elements in each template. For example, similarity of two templates is computed according to the number and/or portion of similar transactions in each of the two templates. Optionally, if a number and/or portion of elements that are similar in two templates reaches a predetermined threshold, the two templates are considered similar, otherwise, they are not considered similar.

In another example, two templates that are generated from one or more same runs of test scenarios are considered similar. Optionally, two templates that are generated from one or more runs from a same cluster of similar runs are considered similar. Optionally, two templates that instantiate test scenarios that produce runs of test scenarios that are considered similar, are considered similar templates.

In one example, templates are represented by vectors, and determining similarity of templates may utilize similarity functions that may be used with vectors (e.g., dot-product, Pearson correlation). Optionally, if a similarity value returned by a function computing similarity of two vectors that represent two templates reaches a predetermined threshold, the two templates are considered similar; otherwise, the two templates are not considered similar.

The comparison of the profile 857 of the certain user and the profiles 859 of the users profile may be done in various ways. Optionally, the profiles may be represented in various ways. For example, a vector representation may be used (e.g., representing which templates were utilized), or a profile may contain a collection and/or listing of utilized templates.

In one embodiment, a comparison of profiles involves identifying which templates in the profiles are identical and/or similar. Optionally, if the number of identical and/or similar templates reaches a predetermined threshold, the profiles may be considered identical and/or similar. Similarly, if the portion of templates that are similar and/or identical reaches a predetermined threshold the profiles may be considered similar and/or identical. Optionally, thedecision on whether the profiles are similar or identical may be determined according to the number and/or portion of templates that are similar and/or identical. For example, if the number of templates that are identical in the profiles reaches a first predetermined threshold, the profiles are considered similar; however, if the number reaches a second predetermined threshold that is higher than the first, the profiles may be considered identical. Optionally, a degree of similarity between the profiles is determined based on the number and/or portion of templates that are similar and/or identical in the profiles. For example, the larger the number portion of similar templates in the profiles, the more similar they are considered.

In another embodiment, the profiles 859 of the users and the profile 857 of the certain user are converted to vectors. For example, each profile may be converted to a binary vector where each position in the vector corresponds to a different template. A vector of a profile may have 1 in a certain position that corresponds to a template if the profile indicates that the user to whom the profile corresponds utilized the template; otherwise, the vector may be 0 at the certain position. Given a vector representation, the profile comparator 858 may utilize various approaches to find profiles of users that are similar to the profile 857. In one example, the profile comparator 858 may perform pairwise comparisons and utilize a similarity metric such as a dot-product or Pearson correlation. In another example, the profile comparator 858 may utilize nearest neighbor searching or locality-sensitive hashing to find a vector representing a profile of a user that is similar to the vector representing the profile 857.

In yet another embodiment, the profile comparator 858 compares the profile 857 of the certain user to the profiles 859 of the users by identifying pairs of similar and/or identical templates in profiles being compared. For example, when comparing the profile 857 to a profile of a user, the profile comparator 858 may form pairs of similar templates by examining each template indicated as utilized in the profile 857 and pairing it with a most similar template indicated as utilized in the profile of the user that could be found. The similarity of the profile 857 to the profile of the user may be determined according to the pairs of similar templates that were found and the corresponding similarity levels of the pairs. For example, the similarity may be proportional to the number and/or proportion of the pairs of similar templates that have a corresponding similarity that exceeds a predetermined threshold.

The template selector 860 is configured to select a certain template 862 that is appropriate for the certain user. The certain template 862 is selected from among candidate templates which are templates indicated as utilized in the at least one profile of a user identified by the profile comparator 858 as being similar to the profile 857 of the certain user. Optionally, at least some of the candidate templates were generated from runs of test scenarios run by the users belonging to the different organizations. In one example, the runs of test scenarios of the users were clustered into clusters of similar runs. In this example, at least some of the candidate templates were generated from runs belonging to the clusters and/or may represent the clusters. Optionally, the profile 857 does not include an indication that the certain user utilized the certain template 862; thus, the certain template 862 may be a new template to the certain user. Optionally, the certain template 862 is utilized by at least two different users belonging to two different organizations of the different organizations.

There are various approaches that may be utilized by the template selector 860 to select the certain template 862 from among the candidate templates. Optionally, the template selector may take into consideration factors such as degree of utilization of the candidate templates by the users and/or the different organizations. Additionally or alternatively, the template selector 860 may take into account similarity of the candidate templates to templates utilized by the certain user.

In one embodiment, selecting the certain template 862, from among templates that are indicated as utilized in the at least one profile (i.e., the candidate templates), is based on the number of different users that utilized the templates. For example, the certain template 862 may be one of the candidate templates that was utilized by a large number of users (from among all the users with profiles). In this example, utilization of a template by a large number of users may indicate a general popularity of the template, and thus it may also be useful for the certain user. In another example, the certain template 862 may be one of the candidate templates that was utilized by a large number of users with similar profiles to the profile 857 of the certain user. In this example, utilization of a template by a large number of users with similar profiles to the profile 857 may indicate that the template is popular with users that are similar to the certain user and is thus likely to be more suitable for the certain user than another template that is only utilized by a small number of users that are similar to the certain user. Optionally, a large number of users is a number of users that places the template in the upper half of templates when ranking them according to the number of users that utilized them. Alternatively, a large number of users is a number of users that may place the template in the top of a list of templates ranked according to the number of users that utilized them.

In another embodiment, selecting the certain template 862, from among the candidate templates is based on the number of different organizations with users that utilized the templates. For example, the certain template 862 may be one of the candidate templates that was utilized by users coming from the largest number of different organizations. In this example, utilization of a template by users coming from a large number of organizations indicates a general popularity of the template across organizations; thus, the template may be more likely to be useful for the certain organization to which the certain user belongs. In another example, the certain template 862 may be one of the candidate templates that was utilized by users with similar profiles to the profile 857, which come from a large number of organizations. In this example, utilization of a template by users with similar profiles from a large number of organizations may indicate that the template is popular with organizations that may be similar to the certain organization (since they all have users that belong to them that have similar profiles); thus, the template is likely to be more suitable for the certain user (and the certain organization) than another template that is only utilized by users with similar profiles to the profile 857, that belong to a small number of organizations. Optionally, a large number of organizations is a number of organizations that places the template in the upper half of templates when ranking them according to the number of organizations that have users belong to them that utilized the templates. Alternatively, a large number of organizations is a number of organizations that may place the template in the top of a list of templates ranked according to the number of organizations that have users that utilized the templates.

In yet another embodiment, selecting the certain template 862, from among the candidate templates is based on similarity of the candidate templates to templates utilized by the certain user. In one example, the template selector 860 may select the certain template 862 to be a candidate template that has a high similarity to other templates already utilized by the certain user. This may be done in order to suggest to the certain user templates cover additional aspects, or slight variations, of elements that have already been tested by the certain user; this may enable more complete coverage of the elements. In another example, the template selector 860 may select the certain template 862 to be a candidate template that has a low similarity to other templates already utilized by the certain user. This may be done in order to suggest to the certain user templates cover new elements that have not been tested by the certain user; however, since these elements were tested by other users with similar profiles, it may be likely that the certain user should also test those elements.

In one embodiment, the comparisons of the profile 857 of the certain user to the profiles of the users are performed by a collaborative filtering algorithm which is utilized by the profile comparator 858. Alternatively or additionally, selection of the certain template is performed by a collaborative filtering algorithm which is utilized by the template selector 860. Alternatively or additionally, the profile comparator 858 and/or the template selector 860 may be modules utilized by a collaborative filtering algorithm to perform its task. For example, the collaborative filtering algorithm may utilize the profile comparator to identify one or more profiles of users that are similar to the profile 857. The collaborative filtering algorithm may also utilize the template selector 860 to select the certain template 862. Optionally, both the profile comparator 858 and the template selector 860 are realized by the same module, that is capable of both identifying the similar profiles and selecting the certain template 862.

In one embodiment, the computer system optionally includes a customization module 868 that is configured to customize the test scenario template for the certain user by adding to the test scenario template proprietary data relevant to the certain user.

In one embodiment, the computer system optionally includes a user interface 870 that is configured to suggest to the certain user to run an instantiation of the certain template 862. Additionally or alternatively, the user interface 870 may be configured to indicate that no template is selected for the certain user if at least one of the following occurs: no profile from among the profiles of the users is identified as similar to the profile of the certain user, and no template is identified which is both appropriate for the certain user and the profile of the certain user does not comprise an indication that the template was utilized by the certain user.

In one embodiment, the computer system optionally includes a data cleaner 866 configured to remove proprietary data from the certain template 862.

In one embodiment, the computer system optionally includes a test identifier 852 configured to receive data obtained from monitoring the certain user 850 running test scenarios on a software system that belongs to certain organization and to identify the runs of test scenarios from the data. Optionally, the test identifier 852 is also configured to identify runs of test scenarios run by the users on software systems that belong to the different organizations.

In one embodiment, the computer system may optionally include a monitoring module 851 configured to monitor the certain user 850 running the test scenarios on the software system that belongs to the certain organization. Optionally, the monitoring module 851 is also configured to monitor the users belonging to the different organizations, running the test scenarios on the software systems that belong to the different organizations. Optionally, the monitoring module 851 is also configured to provide data obtained from the monitoring to the test identifier 852.

It is to be noted that different embodiments may implement components of the computer system illustrated in FIG. 58 and/or FIG. 59 in different ways. For example, in some embodiments one or more of the following may be implemented by the same software module and/or software modules running on the same processor: the monitoring module 851, the test identifier 852, the template identifier 854, the profile generator 856, the profile comparator 858, the template selector 860, the data cleaner 866, the customization module 868, and the user interface 870 Additionally, one or more of the aforementioned components may be implemented on a remote server, such as a cloud-based server. Optionally, one or more of the aforementioned modules may be part of a service which receives the runs 853 of test scenarios of the certain user, and suggest to the user a certain template 862 that may be useful for the user based on the profiles 859 of the users.

In one embodiment, the test identifier 852 and the template identifier 854 are realized by a same software module that both identifies the runs 853 and identifies the templates from which the runs 853 were instantiated. In another embodiment, the template identifier 854 and the profile generator 856, are both implemented, at least in part by a same software module that both identifies templates from which the runs 853 were instantiated, and generates the profile 857 of the certain user.

Figure 60:
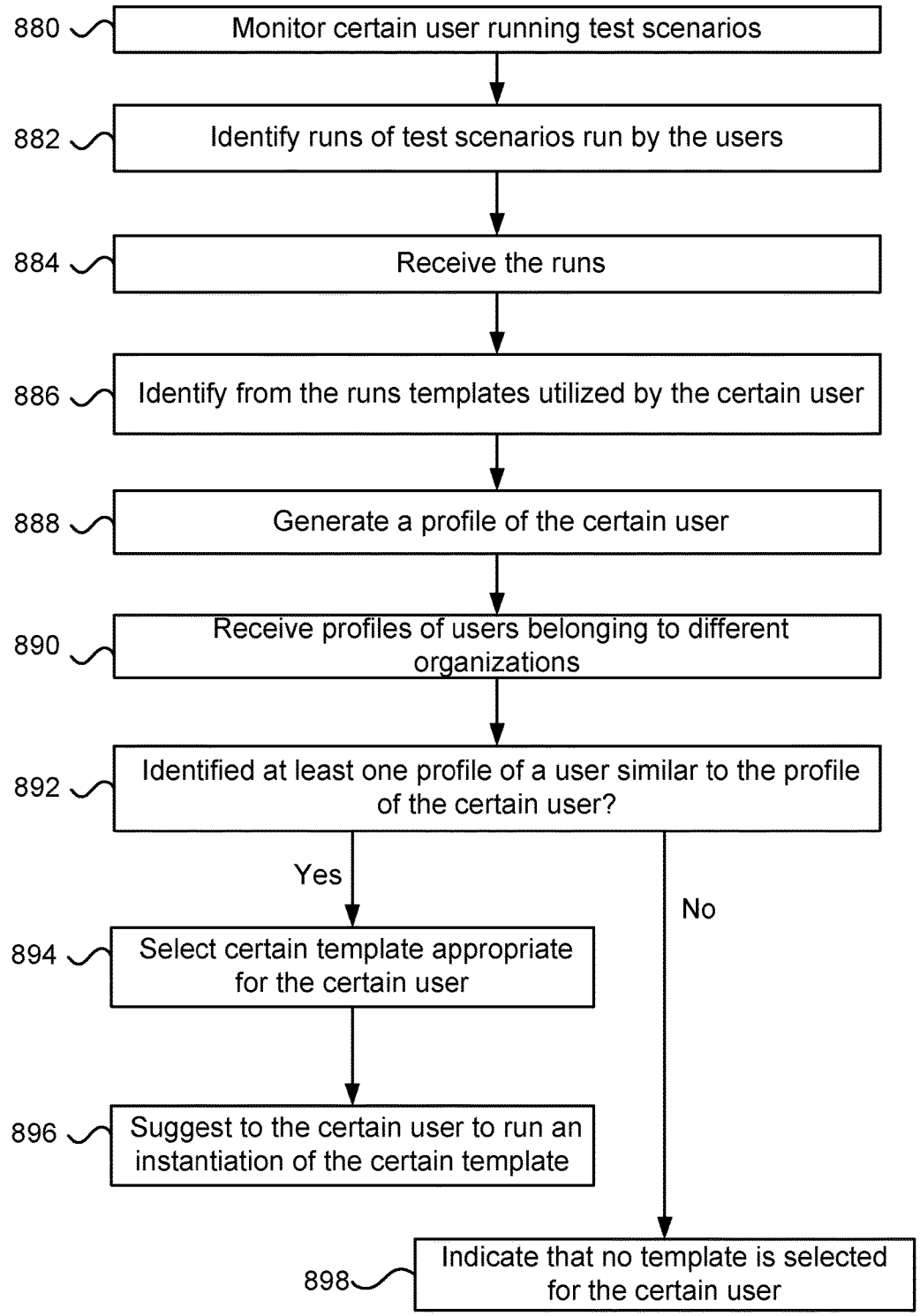
FIG. 60 illustrates one embodiment of a computer implemented method for selecting a test scenario template for a certain user based on similarity of a profile of template utilization by the certain user to profiles of template utilization by other users.

FIG. 60 illustrates one embodiment of a computer implemented method for selecting a test scenario template for a certain user based on similarity of a profile of template utilization by the certain user to profiles of template utilization by other users. The illustrated embodiment includes the following steps:

In step 884, receiving runs of test scenarios, run by a certain user belonging to a certain organization on a software system belonging to the certain organization.

In step 886, identifying, from the runs, test scenario templates utilized by the certain user. Optionally, a template may be considered utilized by a user if the user runs an instantiation of the template.

In step 888, generating a profile of the certain user based on the test scenario templates. The profile indicates test scenario templates utilized by the certain user.

In step 890, receiving profiles of users belonging to different organizations. The certain organization is not one of the different organizations, and the profiles indicate test scenario templates utilized by the users belonging to the different organizations.

In step 892, comparing between the profile of the certain user and the profiles of the users and identifying at least one profile of a user, from among the profiles of the users, which is similar to the profile of the certain user.

In step 894, following the "Yes" branch from step 892, selecting a certain template from among templates indicated as utilized in the at least one profile. Optionally, the profile of the certain user does not include an indication that the certain user utilized the certain template. Optionally, the certain template is utilized by at least two different users belonging to two different organizations of the different organizations.

In one embodiment, the computer implemented method may include optional step 896 which involves suggesting to the certain user to run an instantiation of the certain test scenario template.

In one embodiment, selecting the certain template, from among templates that are indicated as utilized in the at least one profile, may be based on the number of different users that utilized the templates. For example, the certain template may be a template utilized by the largest number of users. Additionally or alternatively, selecting the certain template, from among templates that are indicated as utilized in the at least one profile, may be based on the number of different organizations with users that utilized the templates. For example, the certain template may be a template utilized by the users belonging to the largest number of organizations.

In some embodiments, the computer implemented method may include optional step 898, which follows the "No" branch from step 892, and involves indicating that no template is selected for the certain user if at least one of the following occurs: no profile from among the profiles of the users is identified as similar to the profile of the certain user, and no template is identified which is both appropriate for the certain user and the profile of the certain user does not comprise an indication that the template was utilized by the certain user.

In one embodiment, the computer implemented method includes optional step 880 which involves monitoring the certain user running the test scenarios on the software system that belongs to the certain organization. Additionally or alternatively, the computer implemented method may include optional step 882 which involves identifying the runs of test scenarios run by the certain user on a software system that belongs to the certain organization from data obtained from monitoring the certain user. Optionally, the runs are identified from data obtained by the monitoring.

In one embodiment, the computer implemented method illustrated in FIG. 60 includes an optional step of customizing the certain template for the certain user by adding to the certain template proprietary data relevant to the certain user.

In one embodiment, a non-transitory computer-readable medium stores program code that may be used by a computer to select a test scenario template for a certain user based on similarity of a profile of template utilization by the certain user to profiles of template utilization by other users. The computer includes a processor, and the non-transitory computer-readable medium stores the following program code:

Program code for receiving runs of test scenarios, run by a certain user belonging to a certain organization on a software system belonging to the certain organization.

Program code for identifying, from the runs, test scenario templates utilized by the certain user. Optionally, a template may be considered utilized by a user if the user runs an instantiation of the template.

Program code for generating a profile of the certain user based on the test scenario templates. The profile indicates test scenario templates utilized by the certain user.

Program code for receiving and profiles of users belonging to different organizations. The certain organization is not one of the different organizations, and the profiles indicate test scenario templates utilized by the users belonging to the different organizations.

Program code for comparing between the profile of the certain user and the profiles of the users and identifying at least one profile of a user, from among the profiles of the users, which is similar to the profile of the certain user.

And program code for selecting a certain template, from among templates indicated as utilized in the at least one profile, which is appropriate for the certain user. The profile of the certain user does not comprise indication that the certain user utilized the certain template. Optionally, the certain template is utilized by at least two different users belonging to two different organizations of the different organizations.

In one embodiment, the non-transitory computer-readable medium optionally stores program code for selecting the certain template, from among templates that are indicated as utilized in the at least one profile, based on number of different users that utilized the templates.

In another embodiment, the non-transitory computer-readable medium optionally stores program code for selecting the certain template, from among templates that are indicated as utilized in the at least one profile, based on number of different organizations with users that utilized the templates.

In one embodiment, the non-transitory computer-readable medium optionally stores program code for customizing the certain template for the certain user by adding to the certain template proprietary data relevant to the certain user.

In one embodiment, the non-transitory computer-readable medium optionally stores program code for suggesting to the certain user to run an instantiation of the certain test scenario template.

In one embodiment, the non-transitory computer-readable medium optionally stores program code for removing proprietary data from the certain template.

In one embodiment, the non-transitory computer-readable medium optionally stores program code for identifying the runs of test scenarios run by the certain user on a software system that belongs to the certain organization from data obtained from monitoring the certain user.

In one embodiment, the non-transitory computer-readable medium optionally stores program code for monitoring the certain user running the test scenarios on the software system that belongs to the certain organization. Optionally, the same module of program code performs both the monitoring and the identifying of the runs of test scenarios run by the certain user.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user miming test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Configuration Elements and Changes

In one embodiment, the software systems may include many modules that can be configured to suit an organization's needs. Configuring a system may involve various aspects of a software system, modules belonging to the software system, and/or business processes run on the software system. Optionally, in some embodiments, configuring a system is done, at least in part, using configuration files, setup file, and/or customization code that are read by the system and may be altered by an organization to suit the organization's needs. In one example, configuring a SAP ERP system involves entering, editing, and/or removing values from configuration tables. Optionally, the tables may define various aspects of fields (e.g., name and type) for certain data tables users may access via the ERP system. In another example, an Oracle™ database system is configured using Oracle form personalization, which is a standard feature provided by Oracle™ and supported by Oracle™ to customize the forms. Forms personalization enables changing properties of fields, such as hiding fields, making fields mandatory, creating zoom functionality, and/or dynamic changes of lists of values. In one embodiment, customizations refer to user-generated code, such as "user exit" in SAP, and customization code in Oracle.

In some embodiments, a configuration element is one or more details (e.g., a line in a configuration file, a field name, a function name), which can be used to configure behavior of a software system. In one example, a configuration element may define certain aspects of data structures used by the system (e.g., column names in a table) and/or type of values in a column belonging to a table. In another example, a configuration element may determine behavior of a system, such as defining what functions should be called under certain conditions (e.g., what to do with a printing job).

In one embodiment, a change to a configuration element may be referred to as a "configuration change". Optionally, a configuration change may include one or more actions that involve adding a configuration element, deleting a configuration element, and/or editing a configuration element. Optionally, a configuration change may require running one or more test scenarios in order to verify that the configuration change caused a desired effect and/or in order to verify that the configuration change did not cause an undesired effect.

In one embodiment, a configuration element may have an associated value. For example, a configuration element called "default field width" may have an associated value 20. Optionally, a change to an associated value of a configuration element may be referred to as a "configuration change". Optionally, a configuration change may involve adding an associated value to a configuration element, deleting an associated value from a configuration element, and/or editing an associated value of a configuration element.

In some embodiments, there may be various ways in which configuration elements and/or configuration changes may be identified. Identifying a configuration element enables a software system and/or a user to determine what configuration element is being referred to. Similarly, identifying a configuration change enables the software system and/or a user to determine what configuration element being changed and/or what change is done to an associated value of the configuration element.

In one example, a configuration change is identified by a code, such as a hash code or an identification number. Optionally, the code also identifies an associated value of the configuration element and/or a change to an associated value of the configuration element. In another example, a configuration change and/or a configuration element may be characterized by a new configuration file (e.g., a new setup file for the system). Optionally, a comparison between a new configuration file and a previous configuration file may characterize configuration changes, that involve changes to configuration elements and/or associated values of configuration elements.

In one embodiment, configuration elements and/or configuration changes may be clustered into clusters of similar configuration elements and/or configuration changes. Optionally, clusters of similar configuration elements include configuration elements that deal with the same, or similar, system modules, business processes and/or database tables. Optionally, clusters of similar configuration changes include configuration changes that deal with the same, or similar, configuration elements. Optionally, clusters of similar configuration changes include configuration changes that are associated with similar values.

In one embodiment, configuration elements and/or configuration changes are clustered utilizing text clustering approaches. For example, clustering is performed on configuration files that include the configuration elements and/or configuration changes. Those skilled in the art may identify various text clustering algorithms that may be utilized to cluster configuration elements into clusters of similar configuration elements. Optionally, configuration elements and/or configuration changes may be considered similar if configuration files that include the configuration elements and/or the configuration changes are considered similar (e.g., they belong to a same cluster).

In another embodiment, clustering configuration elements and/or configuration changes may be done based on values associated with the configuration elements. Optionally, clusters of similar configuration elements and/or configuration changes may include same or similar configuration elements and/or configuration changes, which have similar associated values in several ways. In one example, portions of configuration files that include multiple configuration elements and/or configuration changes are converted to vector representation; each vector dimension corresponds to a certain configuration element and the value entered in the vector dimension corresponds to an associated value of the certain configuration element. Those skilled in the art may recognize various algorithmic approaches that may be utilized to cluster vectors representing the portions of the configuration files (e.g., k-means or hierarchical clustering).

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied—permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations. Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of "age" may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user. Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

Collaborative Filtering

In one embodiment, a profile of a certain user may be indicative of transactions run by the certain user, and/or clusters containing runs of test scenarios run by the certain user that use these transactions. Thus, the profile is indicative of a usage pattern of the user (actual usage and/or expected usage). Optionally, in order to suggest additional test scenarios, test scenario templates, and/or clusters for the user, collaborative filtering methods, which rely on usage patterns of other users, may be used.

Collaborative filtering is an algorithmic approach generally used for making automatic predictions (filtering) about the interests of a user by collecting preferences or taste information from many users (collaborating). For example, by detecting similarities between the profile of the certain user and profiles other users, it may be possible to suggest to the certain user a template that was utilized by the other users, but has not yet been utilized by the certain user. The underlying assumption is that since the certain user and the other users utilized some of the same templates (as evident from the similarity of their respective profiles), it is likely that a template that was utilized by the other users may be useful for the certain user.

There are many algorithmic collaborative filtering approaches that may be utilized by those skilled in the art to make recommendations for a user based on similarities of a profile of a certain user to profiles of other users. For example, memory-based methods may be used to select a profile similar to the profile of the certain user, such as using nearest-neighbor searches. In another example, model based algorithms may rely on the profiles of the other users to generate a model of test scenarios, templates, and/or clusters suitable for the certain user. The model generation may utilize many algorithmic approaches such as Bayesian networks, latent semantic models, singular value decomposition (and/or other forms of matrix factorization), and/or clustering. In still another example, a combination of the memory-based and the model-based collaborative filtering algorithms may be used. In some cases, a hybrid approach that combines memory-based and model-based approaches may help overcome shortcomings of the individual approaches.

In one embodiment, a first profile of a first user is considered similar to a second profile of a second user if the first and second profiles indicate that both profiles have a certain number of transactions, clusters, and/or templates in common, and the certain number reaches a predetermined threshold. Additionally or alternatively, the first and second profile may be considered similar if the first and second profiles have a certain proportion of transactions, clusters, and/or templates in common, and the certain proportion reaches a predetermined threshold.

In another embodiment, a first profile of a first user is considered similar to a second profile of a second user if a similarity function applied to vector representations of the first and the second profiles indicates that the similarity between the vectors reaches a predetermined threshold. For example, the similarity function may compute the angle (dot product) between the vectors, and if the cosine of the angle is larger than a certain predetermined threshold, the profiles may be considered similar. In another example, the Pearson correlation may be used to determine the similarity of two vectors. In yet another example, similarity between binary vectors representing profiles may be determined according to the Hamming distance of the vectors (e.g., if the hamming distance is below a predetermined threshold, the profiles are considered similar).

In one embodiment, profiles utilized by a collaborative filtering algorithm to suggest templates for a certain user to utilize come from users belonging to organizations that are different from an organization to which the certain user belongs. Often, this can help suggest to the certain user test scenario templates that may be useful for the certain user, but are however unknown or not typically utilized within the organization of the certain user. This may help increase the scope, coverage, and/or diversity of aspects that are tested by runs of test scenarios of the user, which can increase the efficiency of test scenarios, possibly reducing the number of test scenarios that need to be run.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to miming a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 61A to FIG. 61G illustrate some, but not all, combinations of system modules that may be used in embodiments described in this disclosure to process the template and/or suggest the template to a user.

Figure 61A:
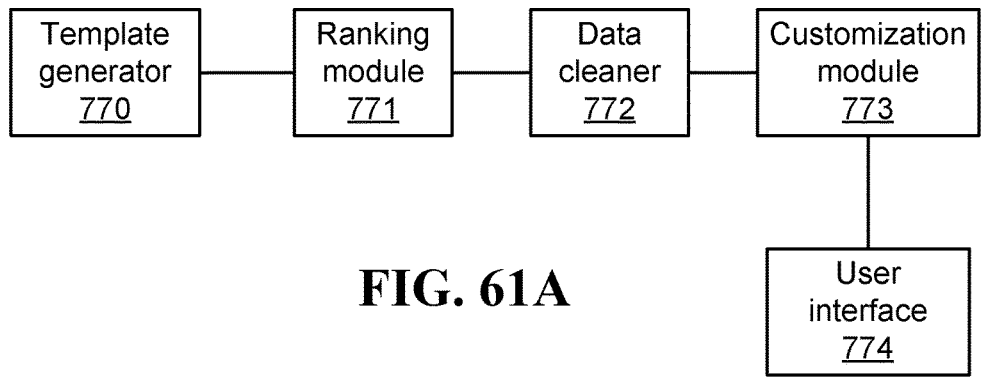
FIG. 61A illustrates a combination of system modules that may be used in embodiments described in this disclosure.

FIG. 61A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 61B:
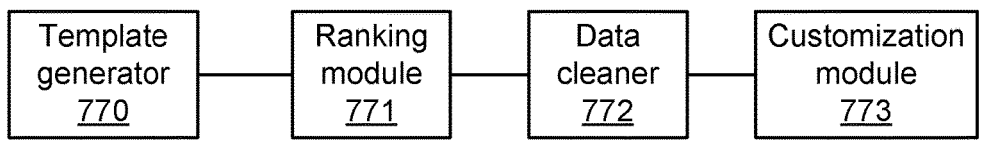
FIG. 61B illustrates a combination of system modules that may be used in embodiments described in this disclosure.

In other embodiments, after being processed by various modules, a template generated by the template generator need not be provided to a user interface. For example, it may be stored in the system for further use. FIG. 61B illustrates a similar portion of a system to the system illustrated in FIG. 61A, however in this system after being subjected to ranking, removal of proprietary data, and customization, a template is not presented to a user via a user interface.

Figure 61C:
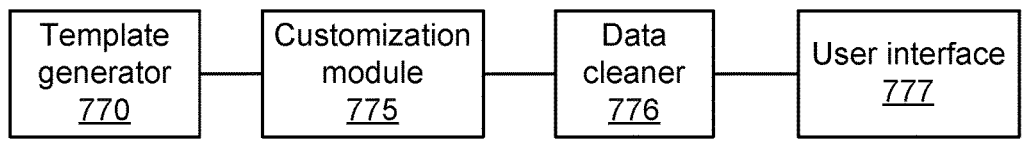
FIG. 61C illustrates a combination of system modules that may be used in embodiments described in this disclosure.
Figure 61D:
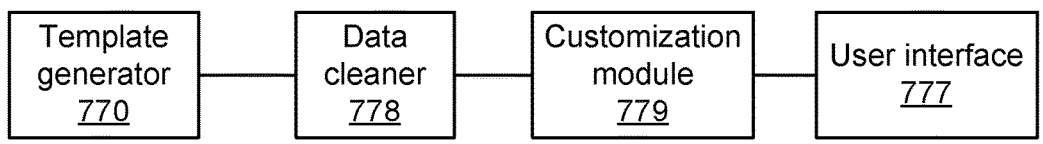
FIG. 61D illustrates a combination of system modules that may be used in embodiments described in this disclosure.

The order in which a template may undergo processing by system modules may differ between embodiments. For example, FIG. 61C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 61D illustrates a similar system, however in it a template generated by the template generator 770 is first provided to a data cleaner 778. After removing proprietary data from the template, the template is provided to a customization module 779. The customized template may then be presented to a user via the user interface 777.

Figure 61E:
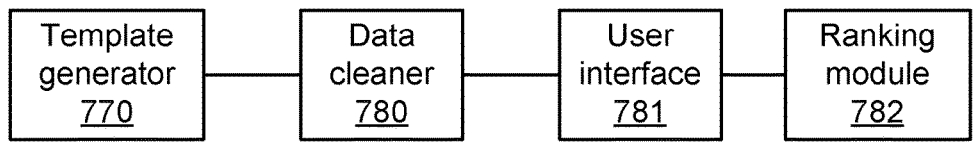
FIG. 61E illustrates a combination of system modules that may be used in embodiments described in this disclosure.
Figure 61F:
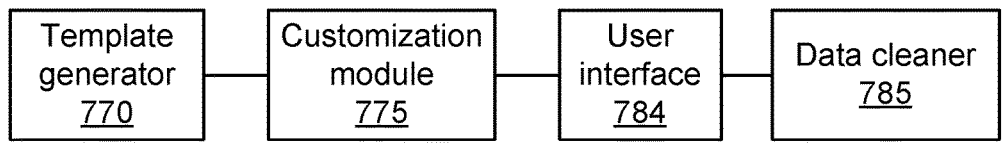
FIG. 61F illustrates a combination of system modules that may be used in embodiments described in this disclosure.

In some embodiments, a user interface is not necessarily used to suggest templates to a user; it may be utilized by other system modules to perform their task. FIG. 61E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 61F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 61G:
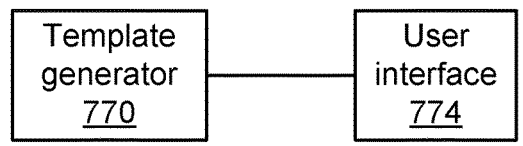
FIG. 61G illustrates a combination of system modules that may be used in embodiments described in this disclosure.

In some embodiments, a template that is generated by a template generator does not undergo additional processing by system modules. For example, as illustrated in FIG. 61G, after being generated by the template generator 770, the template may be sent to the user interface 774 (e.g., to be suggested to a user).

Routes and Divergent Routes

A route, as used in some embodiments described in this disclosure, defines a sequence of one or more elements involved in the running of a test scenario. Optionally, an element may be a test step, a transaction, and/or a screen. Optionally, a run of the test scenario, such as a run obtained from monitoring a user running the test scenario, describes the sequence of one or more elements involved in the running of the test scenario. For example, the run of a test scenario may describe the test steps performed while running the test scenario, the transactions executed while running the test scenario, and/or the screens presented to a user while the user ran the test scenario.

In one embodiment, a test scenario template defines certain elements that are to be executed when running an instantiation of the template, and an order of execution of the elements in the instantiation. The template may include logic that determines the order according to runtime parameters. Thus, a test scenario template defines one or more routes (also referred to as "the template route/s") that may be associated with the template. Execution of an instantiation of the template, i.e., running a test scenario based on the template, is expected to follow the template route/s. For example, if a template includes screens 1-4 (and in that order), an instantiation of the template is expected to present screen 1, followed by screen 2, screen 3 and then screen 4.

In some embodiments, by examining a run of the test scenario it may be determined whether during the running of the test scenario a certain route was followed or not. For example, if a sequence of one or more elements described in the run corresponds to the sequence of the route, then it may be assumed that the run follows the route. Conversely, if the sequence of one or more elements described in the run diverges from the sequence of the route, then it may be assumed that the run diverges from the route.

In one embodiment, a test scenario template may have more than one route that may be treated as a template route. Optionally, the template may include alternative test steps that may depend on a choice made by a user. For example, when a user attempts to update a record, according to the template, certain test steps are conducted if the update is successful, while other steps are to be conducted if the update attempt returns an error. In another example, a screen belonging to the template provides the user with an option, such as setting the price of a part. Based on the price range, certain actions may be required: with a price of below $1000 the user may continue as usual, however, a price of $1000 or more requires the user to fill out a screen that generates a request for manager approval. Thus, when examining routes a template test scenario may define, it is possible for there to be more than one template route.

There may be various relationships between routes (e.g., different routes identified in multiple runs of test scenarios). For example, routes may be distinct of each other (e.g., they do not contain any essentially similar elements). In another example, a first route may be contained or partially contained in a second route (e.g., there are one or more elements that are essentially the same in both of the first and the second routes). In the latter case, the first and/or the second routes may be considered divergent routes, and/or one of the two routes may be considered to diverge from the other. In particular, herein we may consider a route that diverges from a template route. Optionally, in cases where a certain test scenario template may have a multiple template routes, a route may be considered a divergent route if it diverges from all of the multiple template routes.

A divergent route does not completely follow a route to which it is compared, such as a template route. By "not completely follows" it is meant that there is a substantial difference between the divergent route and the route to which it is being compared, such as an element not shared by both routes. In one embodiment, a divergent route is characterized by a different sequence of elements compared to a sequence of elements defined by the template route, and/or different configurations of the transactions used by the process under test. For example, the sequence of the divergent route may include a transaction not included in the sequence of the template route. In another example, the sequence of the divergent route may be missing a transaction that is in the sequence of the template route. In yet another example, the sequence of the divergent route includes at least one transaction that is executed out of order, with respect to an order of executing transactions that is defined by the template route.

In some embodiments, for a first route to be considered a divergent route with respect to a second route, the first and second routes must have a certain degree of similarity. Optionally, the first and second routes need to be considered similar to each other. Additionally, the first and second route may need to be considered essentially the same. Additional information regarding how to interpret routes that are similar and/or essentially the same is given below.

Routes followed by runs of test scenarios may diverge from their respective template routes for various reasons.

In one example, different organizations may configure and/or use their systems in different ways. The different configurations and/or ways of using the systems may change the behavior of the transactions, and as a result, may change the test scenarios that correspond to the transactions that behave differently. Optionally, the different configurations may lead to a different choice of transactions that are to be executed in a test scenario, and/or a different order of execution of the transactions. In one example, a different choice of transactions and/or order of execution may represent an alternative way to perform a certain task. Though a task is typically performed in a first organization in a first method, which corresponds to a first route, it may be performed in another way, such as the way it is performed by a second organizations, represented by a second route. Thus, the second route, which may be considered a divergent route with respect to the first, may be a legitimate method for performing the task, and follow a route that a user of the first organization may actually end up following (e.g., through inadvertent configuration change or serendipitous discovery of the user). Thus, it may be advantageous for the first organization to also test the second route.

In one example, a manual test scenario is interpreted by a user and executed by a processor. The manual test scenario may be based on a certain template (e.g., a script given to the user), and as such, executing the script should lead to a run of the test scenario that follows the template route. However, as the user runs the test scenario, the user may perform certain actions that do not follow the script; for example, the user may determine that certain test steps in the script are incorrect or irrelevant and thus should not be performed. Thus, decisions, reactions, and/or adaptations made by a user running a manual test scenario can lead to divergent routes.

In another example, a test scenario may be an automatic test scenario that is interpreted and executed by a processor. The automatic test scenario may have a certain template (e.g., commands that execute a sequence of test steps), and as such, executing the automatic test scenario should lead to a run of the test scenario that follows the template route. However, there may be cases in which the automatic test scenario utilizes randomly generated or randomly selected values. For example, to automatically fill certain fields, the automatic test randomly generates values, or selects certain random records from a database. Such an element of randomness which may introduce unexpected values into a run of the automatic test scenario may lead to unexpected behavior of the system (e.g., generation of certain errors or execution of different transactions than were expected). Thus, a run of an automatic test scenario may end up following a divergent route that diverges from its template route.

In yet another example, a semiautomatic test scenario, which is a combination of the aforementioned manual test scenario and automatic test scenario, is run by a user. The semiautomatic test scenario may end up not following its template route due various reasons, as described above. For example, actions of the user (e.g., values entered by the user) may lead to unexpected behavior of the system. Similarly, values randomly generated or automatically selected by the system may also lead to unexpected behavior while running the semiautomatic test scenario. Thus, a run of a semiautomatic may end up diverging from its intended template route.

A divergent route that diverges from a template route may do so in various ways. A route analyzer may be configured to identify various types of divergent routes, which diverge in different ways from the template route.

Figure 62A:
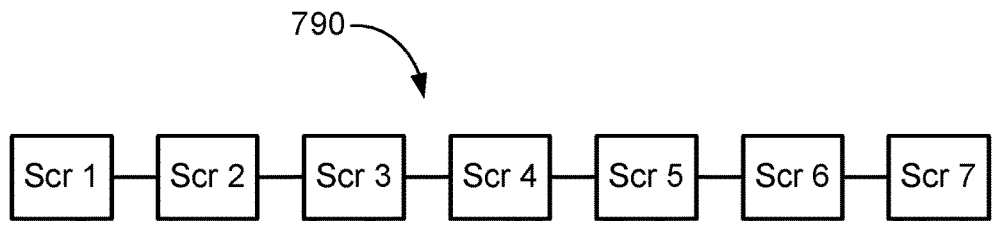
FIG. 62A illustrates a template route that includes a sequence of seven screens.
Figure 62B:
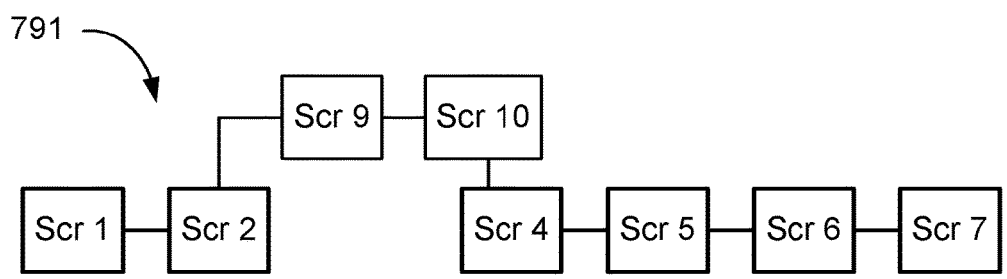
FIG. 62B illustrates a divergent route that diverges from the template route and later on converges back to the template route.

In one embodiment, a route analyzer is configured to identify divergent routes that diverge from the template route and later on converge back to the template route. FIG. 62A illustrates a template route 790 that includes a sequence of seven screens (SCR1 to SCR7) that are to be executed in that order. In one example, as illustrated in FIG. 62B, a divergent route 791 includes screens 1,2, and then two screens not included in the template route, screens 9 and 10, and then includes screens 4, 5, 6, and 7 from the template route. Note that screen 3 from the template route is not part of the divergent route, but that need not be the case in all examples. In other examples, a divergent route that diverges from the template route and later on converges back to the template route may include all the elements of the template route and in addition some elements that are not part of the template route.

Figure 62C:
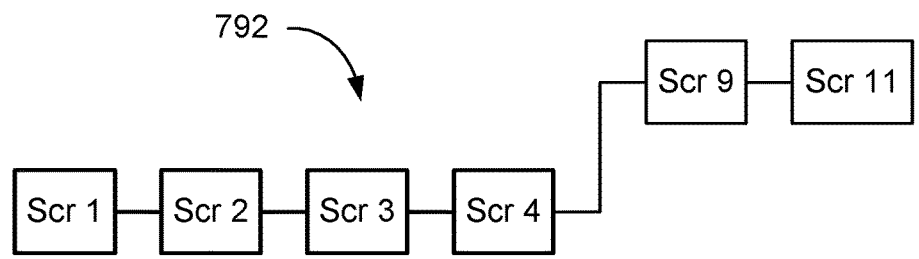
FIG. 62C illustrates a divergent route that diverges from the template route and does not converge back to the template route.

In another embodiment, a route analyzer is configured to identify divergent routes that diverge from the template route and do not converge back to the template route. In one example, as illustrated in FIG. 62C, a divergent route 792 that diverges from the template route 790 does not include screens 5, 6, and 7 from the template route 790. Additionally, the divergent route 792 includes screens 9 and 11, which are not part of the template route 790. Note that even though screens 5, 6, and 7 from the template route are not part of the divergent route, which need not be the case in all examples. In other examples, a divergent route that diverges from the template route and does not converge back to the template route may include all the elements of the template route and in addition some elements that are not part of the template route that are to be executed after the elements of the template route.

Figure 62D:
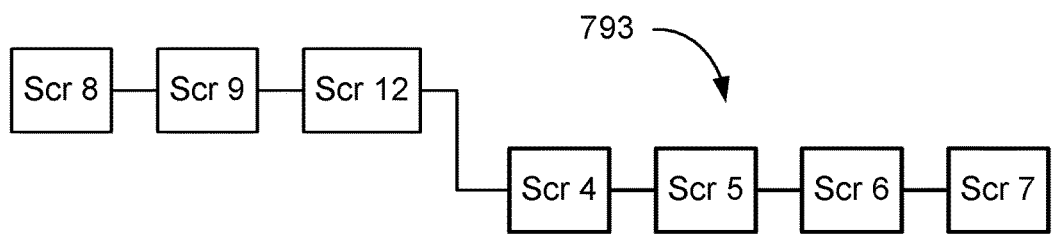
FIG. 62D illustrates a divergent route that merges with the template route.

In yet another embodiment, a route analyzer is configured to identify divergent routes that merge with the template route. A divergent route 793 illustrated in FIG. 62D includes screens 8, 9, and 12, which are not part of the template route 790, and then four screens that are part of the template route 790 (screens 4, 5, 6, and 7). Note that screens 1, 2, and 3 from the template route 790 are not part of the divergent route 793, but that need not be the case in all examples. In other examples, a divergent route that merges with the template route may include all the elements of the template route and in addition some elements that are not part of the template route that are to be executed before the elements of the template route and/or after it.

In one embodiment, a route from identified in a run of a test scenarios (i.e., the run follows the route), may be stored in a database. Optionally, the route may be a divergent route with respect to a certain template route corresponding to a certain test scenario template. Optionally, storing the route involves recording the run and/or information extracted from the run in the database. Additionally or alternatively, storing the route may involve recording elements of the route (e.g., test steps, transactions, and/or screens) in the database. Additionally or alternatively, storing the route may involve storing a value computed from the run and/or the route, such as a hash value computed from screen identification numbers and/or transaction identification numbers. Optionally, storing a divergent route that diverges from a template route may involve storing information related to the template route and/or a test scenario template which defines the template route. Optionally, storing a divergent route that diverges from a template route may involve storing information regarding one or more differences between the route and the template route.

In one embodiment, storing a route may involve taking note of information pertaining to a certain user that ran a run which follows the route, and/or a certain organization associated with the run. In one example, storing a route involves adding the certain user and/or the certain organization to a list corresponding to the route. In another example, storing a route involves incrementing a counter corresponding to a number of users and/or incrementing a counter that corresponds to a number of organizations. Optionally, maintaining the aforementioned lists and/or counters may enable determination of popularity of certain routes with users and/or organizations in general, and/or popularity of certain routes with specific users and/or specific organizations.

In one embodiment, a route stored in a database may be processed. For example, the route may be processed before being received by the database, processed by the database (e.g., before storage and/or after retrieval), and/or processed after being delivered from the database.

In one example, processing a route may involve selecting certain types of elements to be included in the route. For example, processing a route may involve retaining transactions included in the route, while other types of elements such as descriptions of screens are not stored.

In another example, processing a route may involve altering values included in elements belonging to the route.

For example, data such as numbers or addresses may be converted to a certain format. Additionally or alternatively, values may undergo filtering, noise removal, and/or stemming of text. Altering values included in elements may assist in standardizing stored routes and make it easier to retrieve and/or compare routes.

In yet another example, processing a route may involve filtering elements according to their popularity. For example, certain elements that are not utilized in a sufficient number of routes, by a sufficient number of users, and/or be associated with a sufficient number of organizations may be excluded from a stored route. Low utilization may indicate that the excluded elements are not likely to be useful for other organizations.

In still another example, processing a route may involve removing elements that are considered proprietary and/or removing values that may be considered proprietary. For example, if screens included in a route include proprietary field values, those values may be removed or replaced with default values.

In some embodiments, similarity between two routes may be characterized in different ways. For example, the two routes may be characterized as being "similar to each other" and/or "essentially the same". Both terms indicate that the two routes have a degree of similarity between them (e.g., they have certain elements in common); however, as used herein, the term "essentially the same" typically indicates a higher level of similarity between two routes compared to similarity indicated by the term "similar to each other". Usually, as used herein, any two routes that are referred to as being essentially the same may also be considered similar to each other, but the converse is not necessarily true.

In one embodiment, two routes are essentially the same if they contain the same exact elements. For example, the two routes involve the same screens (e.g., as determined by the fields in the screens and/or screen identification codes). In another example, two routes that are essentially the same involve execution of the same transactions (e.g., as determined from commands involved in the transactions and/or transaction identifiers). Optionally, the two routes that are essentially the same may have different values associated with one or more elements that are the same in both routes. For example, two routes may be considered essentially the same if they contain the same screens (e.g., the screens may have the same identification numbers); however, different customizations done to elements of each route may cause certain field names and/or default values for fields to be slightly different in the screens corresponding to the two routes.

In another embodiment, two routes may be considered similar to each other and/or essentially the same if they involve similar elements. For example, the two routes involve the similar screens (e.g., as determined by similar composition of fields in the two screens and/or similar values utilized by the two screens identification codes). In another example, the two routes may involve execution of the similar transactions (e.g., as determined from similarity in commands involved in the transactions and/or similar transaction identifiers).

Similarity between routes may depend on the number and/or proportion of same or similar elements shared by the routes. In one example, if two routes contain at least a first number of same elements, they may be considered similar to each other; and if the two routes contain at least a second number of same elements, they may be considered essentially the same. In this example, the second number may be higher than the first number. For example, two routes may be considered similar if they both involve executing 3 identical transactions, and they may be considered essentially the same if they both involve executing 7 identical transactions. In another example, if two routes have at least a first proportion of similar elements, they may be considered similar to each other; and if the two routes contain at least a second proportion of similar elements, they may be considered essentially the same. In this example, the second proportion may be higher than the first proportion. For example, two routes may be considered similar to each other if at least 50% of the screens in a first rout of the two routes are similar to the screens in the second route of the two; furthermore, if at least 80% of the screens in the first route are similar to the screens in the second route, the two routes may be considered essentially the same.

In yet another embodiment, similarity between two routes is determined according to a distance metric that indicates that the distance (difference) between them. Optionally, if a distance between the two routes is below a first threshold, the two routes are considered similar to each other; and if the distance below them is below a second threshold, they are considered essentially the same. Optionally the second threshold is lower than the first. A distance metric may also express a level of similarity between routes. In such a case, if similarity between two routes exceeds a first threshold, the two routes may be considered similar to each other, and if the similarity exceeds a second threshold, possibly higher than the first, the two routes may be considered essentially the same.

In one example, routes are represented as a sequence of transaction identifiers. A distance metric between two routes may be a standard sequence similarity metric, such as edit distance or Manhattan distance. In this example, two routes may be considered essentially the same if the edit distance and/or the Manhattan distance is below a predetermined threshold; for instance, the predetermined threshold may be 20% of the length of the longest sequence corresponding to one of the routes.

In another example, routes may be converted to a vector representation. For example, each element may correspond to one or more dimensions in a vector space. Optionally, certain vector dimensions may correspond to the presence of certain elements (e.g., a value of 1 is given if the element is present in a route and 0 otherwise). Optionally, certain vector dimensions may correspond to values associated with elements in the routes. Those skilled in the art may recognize that there are various ways in which a route may be represented as a vector. The choice of representation may depend on various factors, such as the length of the desired vectors and/or the type of data included in routes. In one example, two routes may be considered essentially the same if a distance between vectors representing the two routes is below a predetermined threshold. The cosine of the angle between two vectors may be used to measure the distance (or similarity) between the vectors. For example, if the angle between the two vectors, as determined from the cosine, is smaller than a predetermined threshold, the two routes corresponding to the vectors may be considered essentially the same. Optionally, if the angle is below a second, slightly higher predetermined threshold, the two routes may be considered similar to each other.

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers. The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system configured to generate a test scenario template from runs of test scenarios run on software systems belonging to different organizations, comprising:
    at least one processor and memory; the at least one processor and the memory cooperating to function as:
    a clustering module configured to cluster runs of the test scenarios to clusters comprising similar runs of test scenarios;
    a cluster selector configured to select from the clusters a certain cluster comprising a first run of a first test scenario and a second run of a second test scenario; wherein the first run is associated with a first organization belonging to the different organizations, the second run is associated with a second organization belonging to the different organizations, and each organization of the different organizations has a different composition of shareholders; and wherein at least 95% of values used in the first run of the first test scenario are provided automatically by a test script; and
    a template generator configured to generate a test scenario template based on the first and second runs; wherein the test scenario template identifies a transaction used in the first and second runs, and possible values for running the transaction.

2. The computer system of claim 1, further comprising a semiautomatic test scenario executer configured to communicate with a user in order to obtain a value needed for running the first test scenario.

3. The computer system of claim 1, wherein at least 95% of values used in the second run of the second test scenario are provided automatically by a test script.

4. The computer system of claim 1, wherein the first and second runs are run without requiring a user to input values to screens involved in running the first and second test scenarios, respectively.

5. The computer system of claim 1, further comprising a template filter configured to receive a profile of a certain user and to test whether the test scenario template is relevant to the certain user based on the user profile; and further comprising a user interface, coupled to the template filter, configured to suggest a relevant test scenario template to the certain user.

6. The computer system of claim 1, wherein at least one of the possible values for running the transaction does not appear in each of the first and second runs.

7. The computer system of claim 1, wherein the test scenario template includes a combination of the possible values, and the combination does not appear in any of the first and second runs.

8. The computer system of claim 1, further comprising a customization module configured to customize the test scenario template by adding thereto proprietary data relevant to a certain user for whom the test scenario template is customized.

9. The computer system of claim 1, wherein the template generator is further configured to receive the certain cluster from the clustering module, and to select the first and second runs from the certain cluster.

10. The computer system of claim 1, wherein similar runs of test scenarios are characterized by having at least one of: essentially same fields, essentially same field values, similar combinations of fields, similar combinations of field values, similar execution of transactions, similar user interactions, similar requests, similar calls to procedures, and similar executions.

11. A computer implemented method for generating a test scenario template from runs of test scenarios run on software systems belonging to different organizations, comprising:
    clustering, on a system comprising a processor and memory, the runs to clusters comprising similar runs of test scenarios;
    selecting from the clusters a certain cluster comprising a first run of a first test scenario and a second run of a second test scenario; wherein the first run is associated with a first organization belonging to the different organizations, the second run is associated with a second organization belonging to the different organizations, and each organization of the different organizations has a different composition of shareholders; and wherein at least 95% of values used in the first run of the first test scenario are provided automatically by a test script; and
    generating, based on the first and second runs, a test scenario template representing the certain cluster; wherein the test scenario template identifies a transaction used in the first and second runs, and possible values for running the transaction.

12. The computer implemented method of claim 11, further comprising communicating with a user in order to obtain a value needed for running the first test scenario.

13. The computer implemented method of claim 11, further comprising executing the first and second runs without requiring a user to input values to screens involved in running the first and second test scenarios, respectively.

14. The computer implemented method of claim 11, further comprising receiving a profile of a certain user; determining that the test scenario template is relevant to the certain user based on the user profile; and suggesting to the certain user to utilize the test scenario template.

15. The computer implemented method of claim 11, wherein the clustering of the runs of the test scenarios to clusters comprising similar runs of test scenarios is based on counting number of similar fields used in screens corresponding to the runs; the more similar fields, the more similar the runs of the test scenarios are considered to be.

16. The computer implemented method of claim 11, wherein the clustering of the runs of test scenarios to clusters comprising similar runs of test scenarios is based on similarity between order of displaying similar fields in screens corresponding to the runs; the closer the orders, the more similar the runs are considered to be.

17. The computer implemented method of claim 11, wherein the clustering of the runs of test scenarios to clusters comprising similar runs of test scenarios is based on one or more of the following: similarity between executed procedures associated with the test scenarios, order of executing the procedures, and transactions executed as part of runs of test scenarios.

18. The computer implemented method of claim 11, further comprising estimating importance of a test scenario for a certain user; and suggesting to the certain user templates corresponding to most important test scenarios first.

19. A non-transitory computer-readable medium for use in a computer to generate a test scenario template from runs of test scenarios run on software systems belonging to different organizations, the computer comprises a processor, and the non-transitory computer-readable medium comprising:
    program code for clustering the runs to clusters comprising similar runs of test scenarios;
    program code for selecting from the clusters a certain cluster comprising a first run of a first test scenario and a second run of a second test scenario; wherein the first run is associated with a first organization belonging to the different organizations, the second run is associated with a second organization belonging to the different organizations, and each organization of the different organizations has a different composition of shareholders; and wherein at least 95% of values used in the first run of the first test scenario are provided automatically by a test script; and
    program code for generating, based on the first and second runs, a test scenario template representing the certain cluster; wherein the test scenario template identifies a transaction used in the first and second runs, and possible values for running the transaction.

20. The non-transitory computer-readable medium of claim 19, further comprising program code for communicating with a user in order to obtain a value needed for running the first test scenario.

21. The non-transitory computer-readable medium of claim 19, further comprising program code for receiving a profile of a certain user, program code for determining that the test scenario template is relevant to the certain user based on the user profile, and program code for suggesting to the certain user to utilize the test scenario template based on the profile.

* * * * *